(12) United States Patent
Takashima

(10) Patent No.: US 11,930,308 B2
(45) Date of Patent: Mar. 12, 2024

(54) IMAGE PROCESSING DEVICE AND IMAGE PROCESSING METHOD THAT REDUCE VARIATION IN OUTPUT VALUE AMONG IMAGING DEVICES

(71) Applicant: SONY GROUP CORPORATION, Tokyo (JP)

(72) Inventor: Masatoshi Takashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/755,840

(22) PCT Filed: Oct. 28, 2020

(86) PCT No.: PCT/JP2020/040441
§ 371 (c)(1),
(2) Date: May 10, 2022

(87) PCT Pub. No.: WO2021/100426
PCT Pub. Date: May 27, 2021

(65) Prior Publication Data
US 2022/0408068 A1    Dec. 22, 2022

(30) Foreign Application Priority Data

Nov. 19, 2019   (JP) ................. 2019-208567

(51) Int. Cl.
*H04N 5/335* (2011.01)
*H04N 9/77* (2006.01)
(Continued)

(52) U.S. Cl.
CPC .............. *H04N 9/77* (2013.01); *H04N 23/55* (2023.01); *H04N 23/72* (2023.01); *H04N 25/13* (2023.01)

(58) Field of Classification Search
CPC .................................................. H04N 23/695
See application file for complete search history.

(56) References Cited

U.S. PATENT DOCUMENTS

| 7,375,803 | B1  |   | 5/2008 | Bamji |
| 2018/0035017 | A1 | * | 2/2018 | Kim ..................... H04N 23/675 |
| 2020/0112662 | A1 |   | 4/2020 | Sakamoto et al. |

FOREIGN PATENT DOCUMENTS

| JP | 2008-206090 A |   | 9/2008 |
| JP | 2008206090 A | * | 9/2008 |

(Continued)

OTHER PUBLICATIONS

International Search Report and Written Opinion of PCT Application No. PCT/JP2020/040441, dated Dec. 1, 2020, 10 pages of ISRWO.

*Primary Examiner* — Gary C Vieaux
(74) *Attorney, Agent, or Firm* — CHIP LAW GROUP

(57) ABSTRACT

Provided are a device and a method for executing gain calculation processing and gain adjustment processing for matching an output of an imaging element of a multispectral camera with an output of a reference machine, on the basis of a reference machine band-corresponding pixel value that is a pixel value within a specific band acquired on the basis of an output value of an imaging element of the reference camera, and an adjustment machine band-corresponding pixel value that is a pixel value within a specific band acquired on the basis of an output value of an imaging element of the adjustment camera.

20 Claims, 48 Drawing Sheets

(51) Int. Cl.
*H04N 23/55* (2023.01)
*H04N 23/72* (2023.01)
*H04N 25/13* (2023.01)

(56) References Cited

FOREIGN PATENT DOCUMENTS

| | | |
|---|---|---|
| JP | 2011-146936 A | 7/2011 |
| JP | 2013-092885 A | 5/2013 |
| JP | 2016-152445 A | 8/2016 |
| WO | 2018/135315 A1 | 7/2018 |

\* cited by examiner

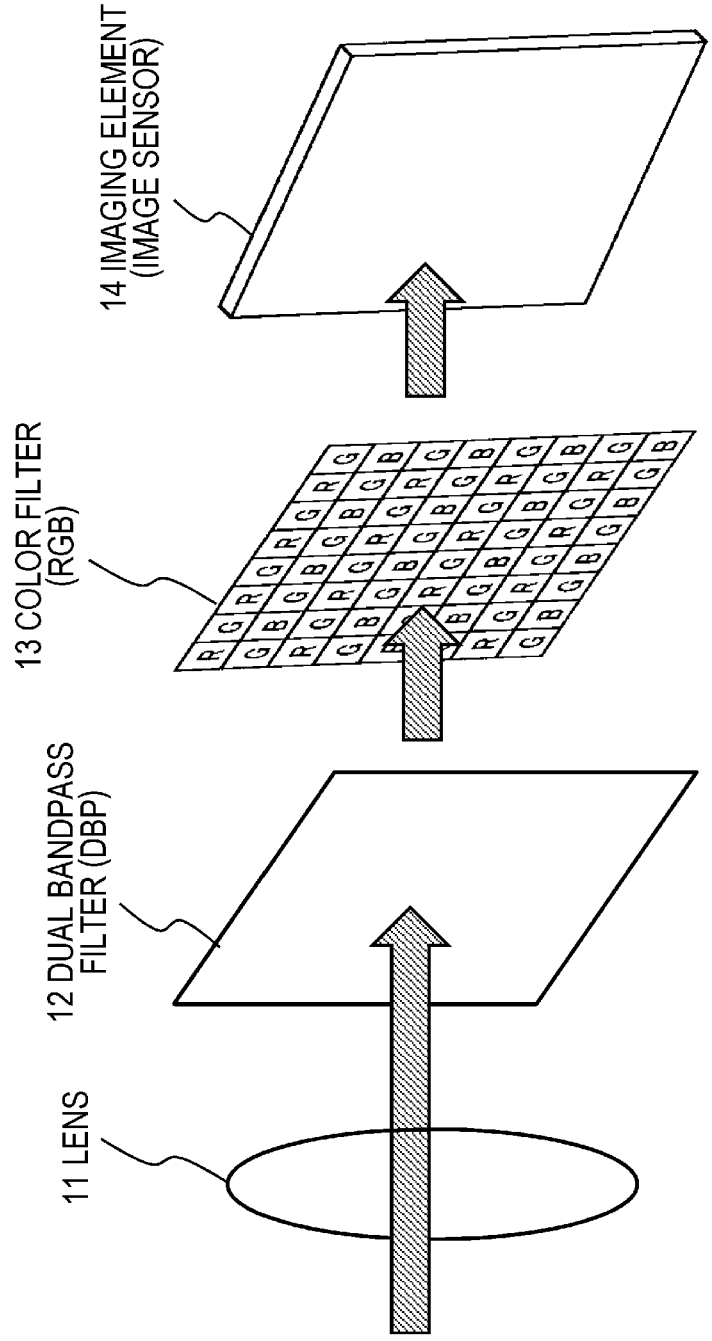

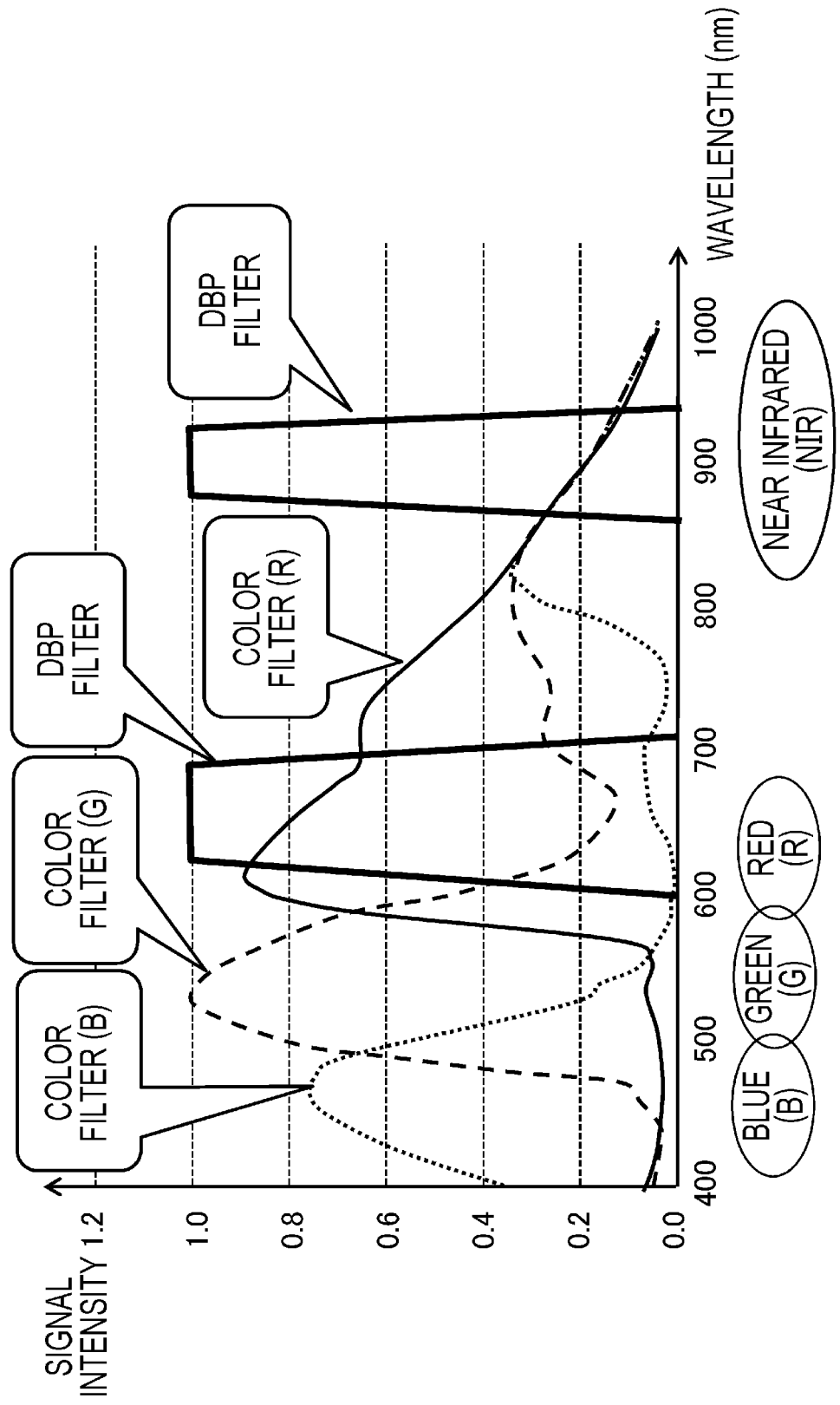

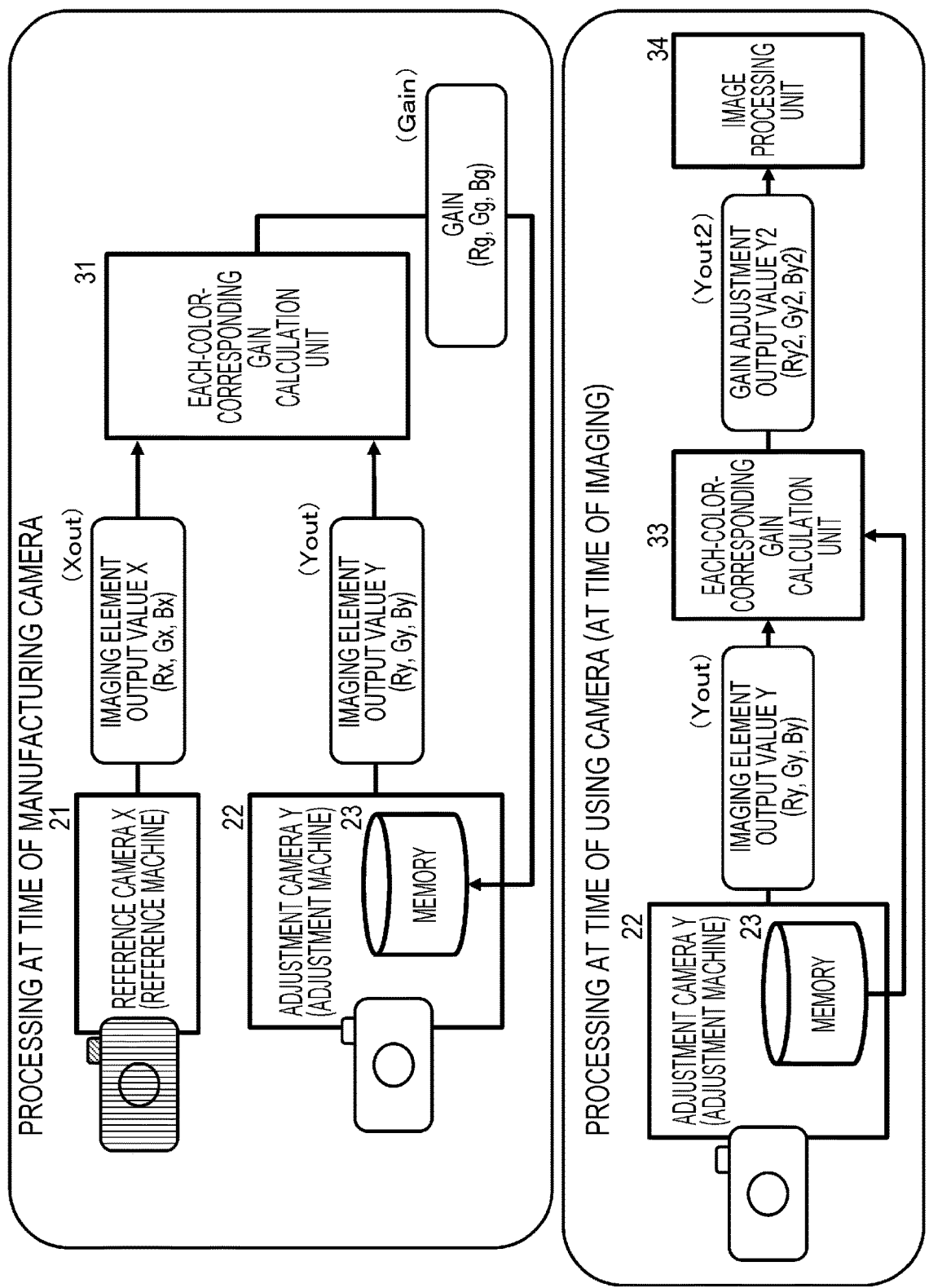

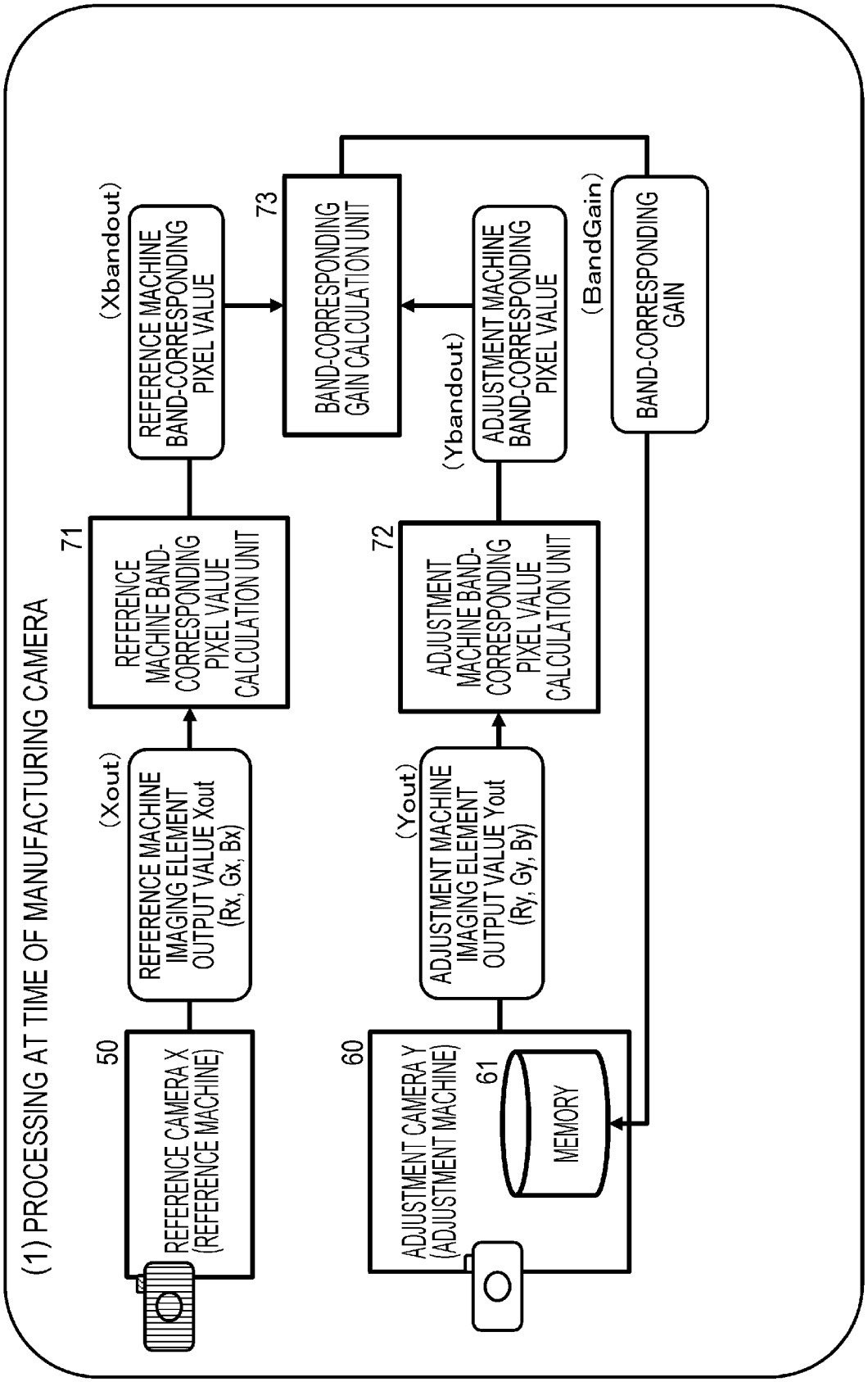

FIG. 9

COLOR FILTER (ABCD FILTER)

| C | B | C | B | C | B | C | B |
|---|---|---|---|---|---|---|---|
| A | D | A | D | A | D | A | D |
| C | B | C | B | C | B | C | B |
| A | D | A | D | A | D | A | D |
| C | B | C | B | C | B | C | B |
| A | D | A | D | A | D | A | D |
| C | B | C | B | C | B | C | B |
| A | D | A | D | A | D | A | D |

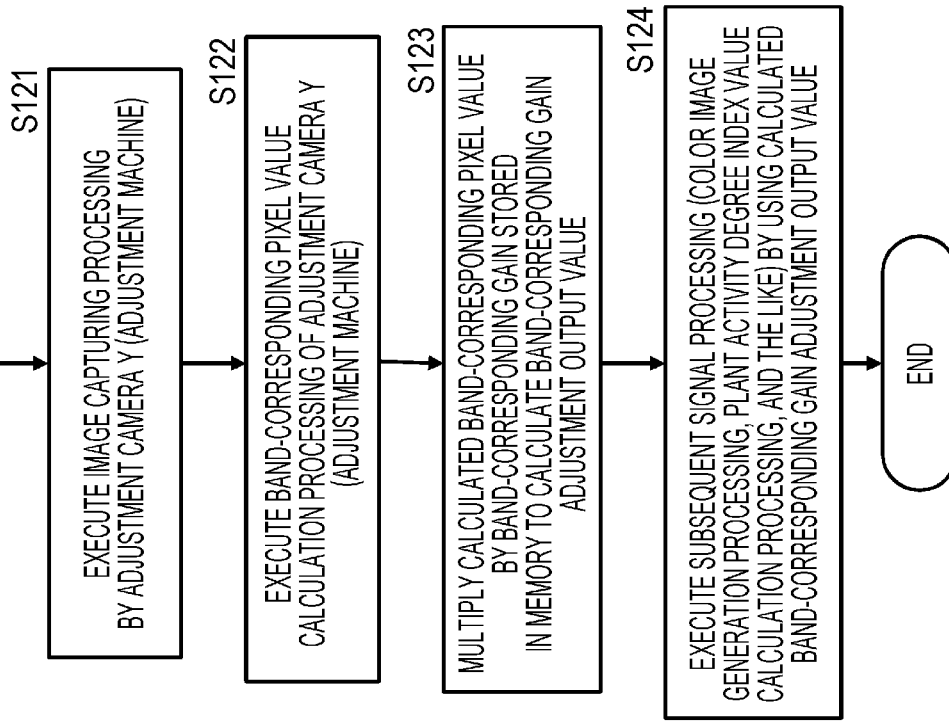
FIG. 14B AT TIME OF USING CAMERA (AT TIME OF IMAGING)
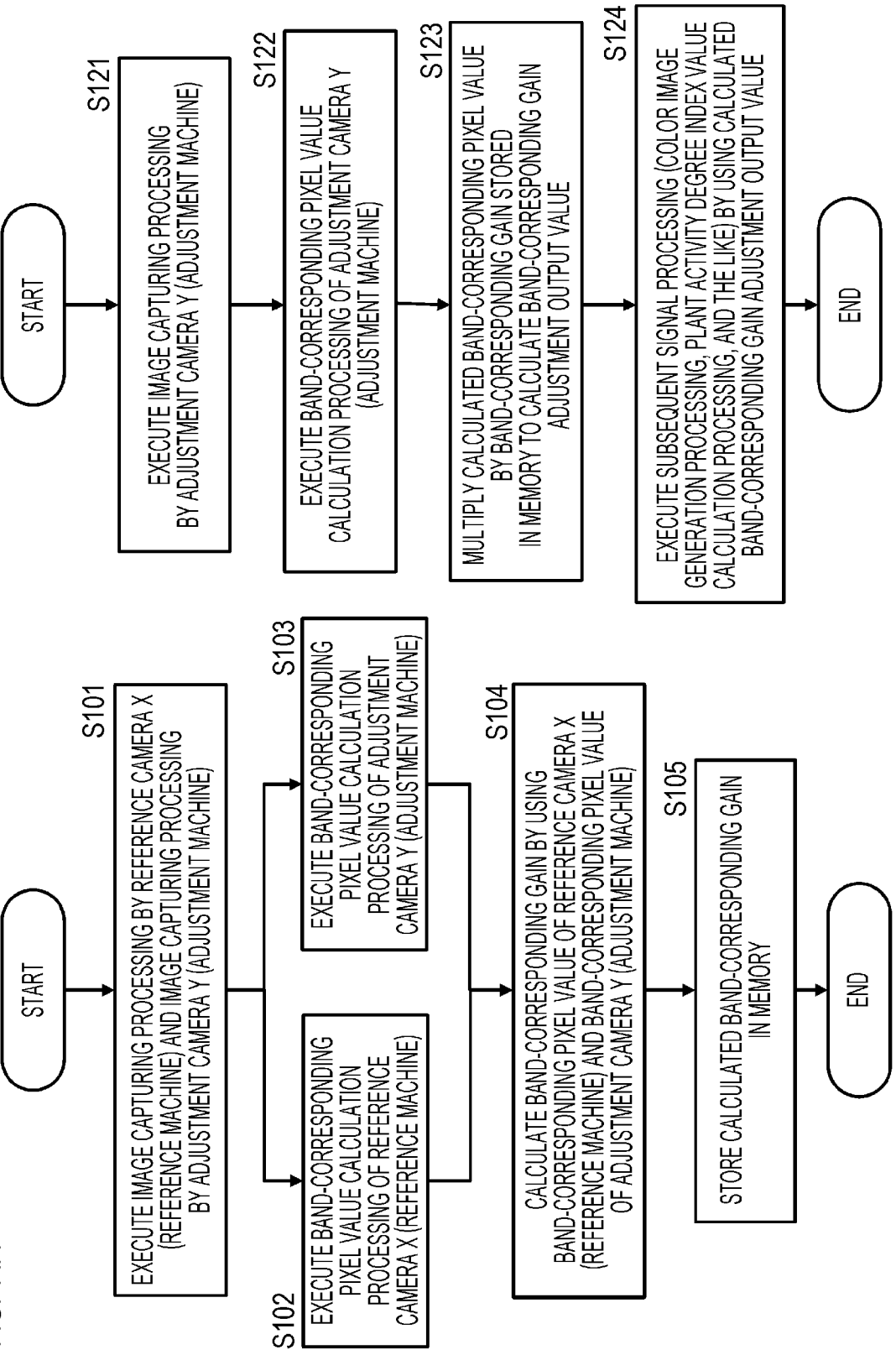
FIG. 14A AT TIME OF MANUFACTURING CAMERA

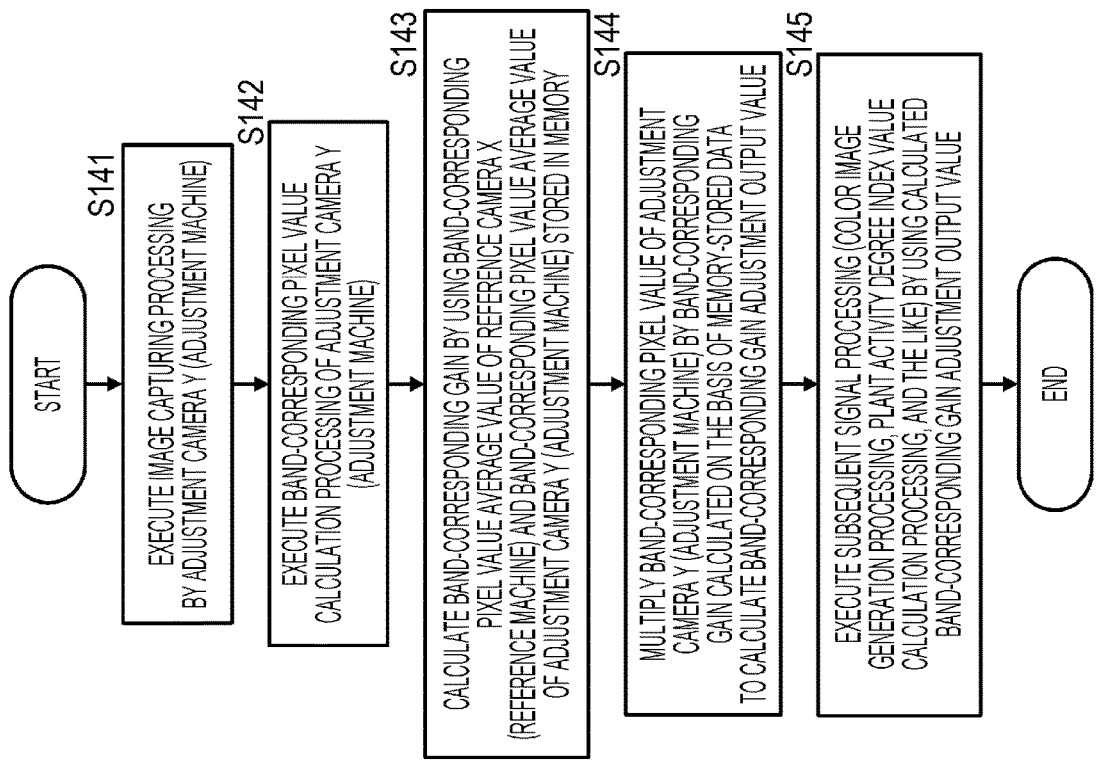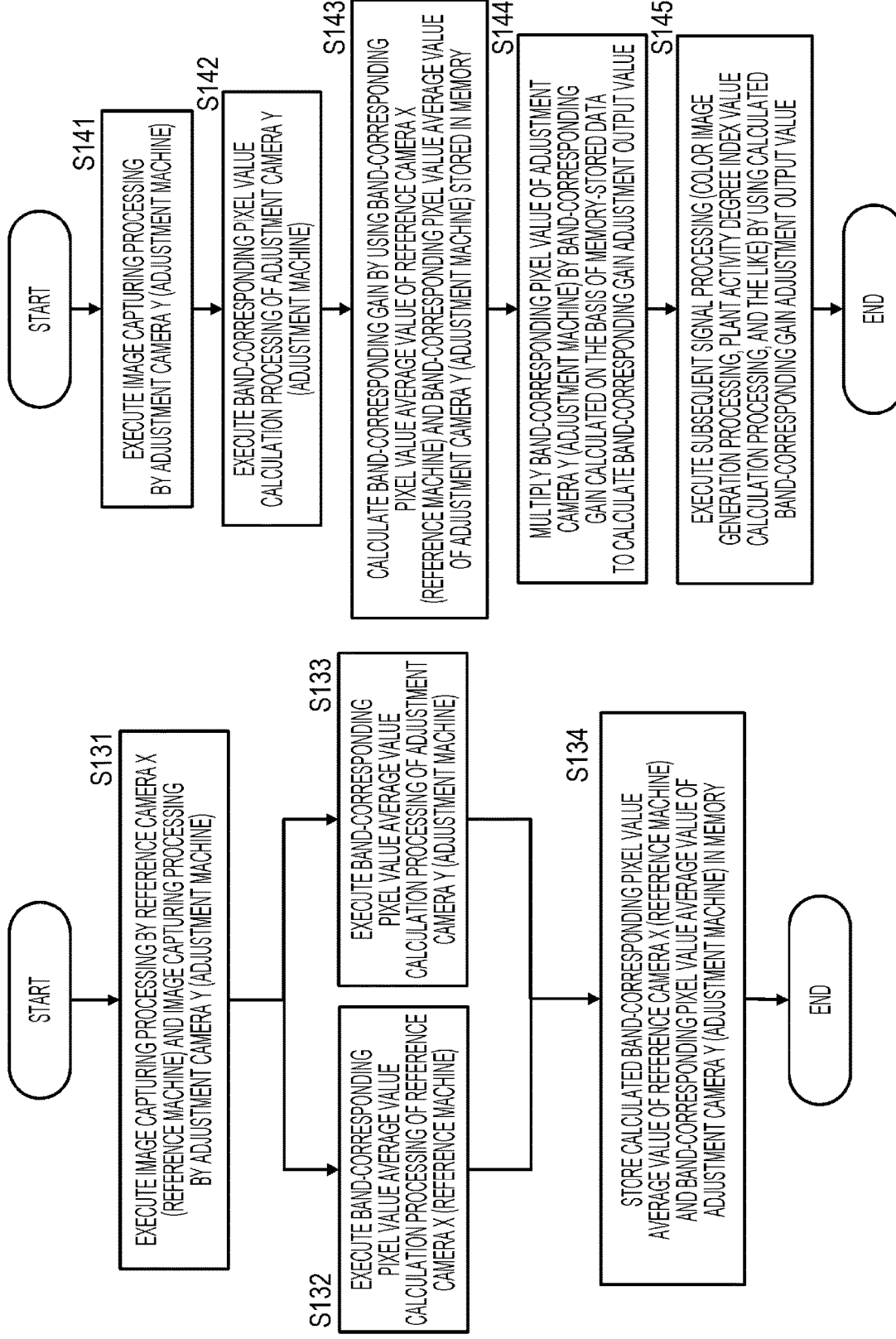

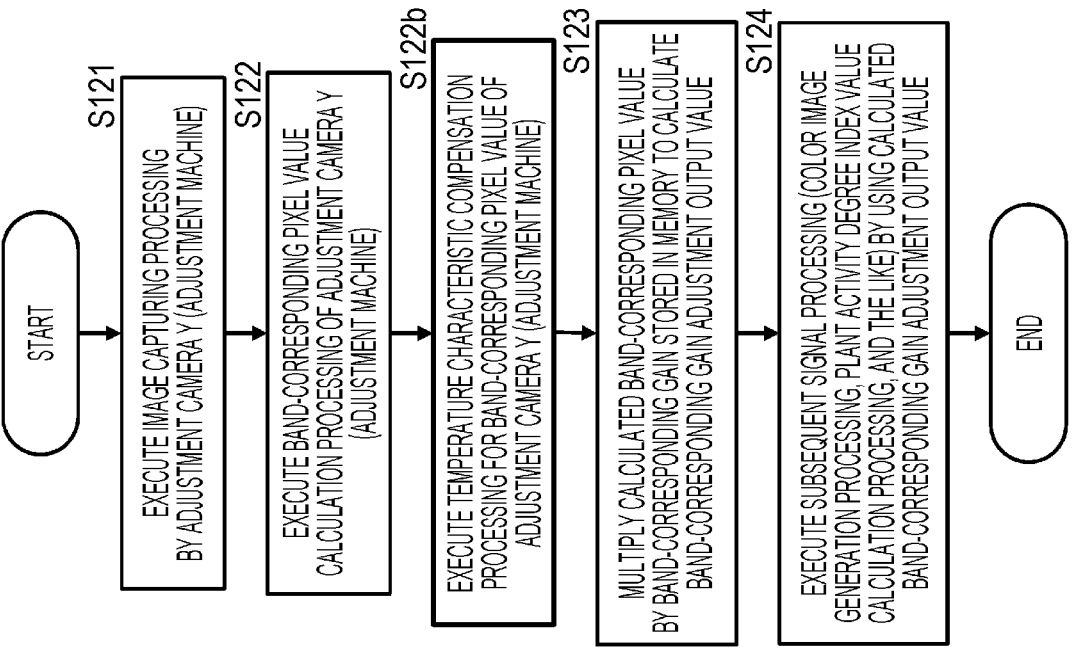
FIG. 27B AT TIME OF USING CAMERA (AT TIME OF IMAGING)
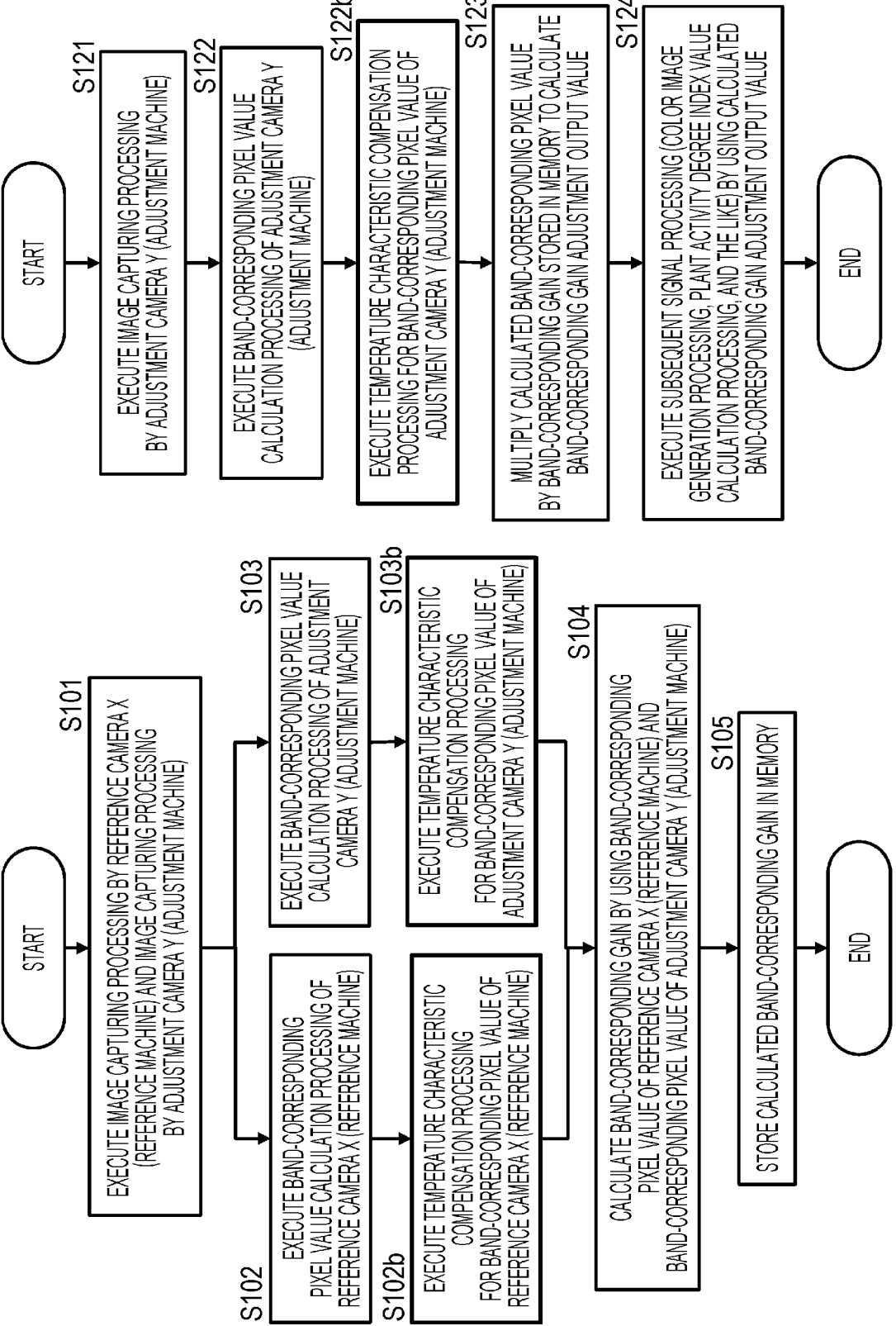
FIG. 27A AT TIME OF MANUFACTURING CAMERA

FIG. 44

| | | EXAMPLE 1 | EXAMPLE 2 | EXAMPLE 3 | EXAMPLE 4 |
|---|---|---|---|---|---|
| (1) PROCESSING AT TIME OF MANUFACTURING CAMERA | (1a) DESIGN STAGE PROCESSING (MEASUREMENT PROCESSING) | SEPARATION COEFFICIENTS Kband1 Kband2 (COMMON TO REFERENCE MACHINE AND ADJUSTMENT MACHINE) | SEPARATION COEFFICIENTS Kband1 Kband2 / TEMPERATURE CHARACTERISTIC COEFFICIENTS Ared, Anir | TEMPERATURE CHARACTERISTIC COEFFICIENTS Ared, Anir | SEPARATION COEFFICIENTS Kband1(x) Kband2(x) / TEMPERATURE CHARACTERISTIC COEFFICIENTS Ared, Anir |
| | (1b) CAMERA MANUFACTURING STAGE PROCESSING | REFERENCE MACHINE X: Rraw(x), Braw(x) ⇒ AVERAGE VALUE (Rrawave(x), Brawave(x)) ADJUSTMENT MACHINE Y: Rraw(y), Braw(y) ⇒ AVERAGE VALUE (Rraeave(y), Brawave(y)) | REFERENCE MACHINE X: T(x) (TEMPERATURE AT TIME OF REFERENCE MACHINE MEASUREMENT) Rraw(x), Braw(x) ⇒ AVERAGE VALUE (Rrawave(x), Brawave(x)) ADJUSTMENT MACHINE: T(y) (TEMPERATURE AT TIME OF ADJUSTMENT MACHINE MEASUREMENT) Rraw(y), Braw(y) ⇒ AVERAGE VALUE Rrawave(y), Brawave(y) | REFERENCE MACHINE X: IRC-Rraw(x), IRC-Braw(x) VC-Rraw(x), VC-Braw(x) ⇒ AVERAGE VALUE (IRC-Rrawave(x), IRC-Braw ave(x)), (VC-Rrawave(x), VC-Brawave(x)) ADJUSTMENT MACHINE Y: IRC-Rraw(y), IRC-Braw(y) VC-Rraw(y), VC-Braw(y) ⇒ AVERAGE VALUE (IRC-Rrawave(y), IRC-Braw ave(y)), (VC-Rrawave(y), VC-Brawave(y)) | REFERENCE MACHINE X: all-Rraw(x), all-Braw(x) VC-Rraw(x), VC-Braw(x) ⇒ AVERAGE VALUE (all-Rrawave(x), all-Brawave(x)), (VC-Rrawave(x), VC-Brawave(x)) ADJUSTMENT MACHINE Y: all-Rraw(y), all-Braw(y) VC-Rraw(y), VC-Braw(y) ⇒ AVERAGE VALUE (all-Rrawave(y), all-Brawave(y)), (VC-Rrawave(y), VC-Brawave(y)) |
| (2) PROCESSING AT TIME OF USING CAMERA (AT TIME OF IMAGING) (EXECUTED BY CAMERA, PC, SERVER) | (2a) BAND-CORRESPONDING GAIN CALCULATION PROCESSING OF ADJUSTMENT MACHINE Y | AVERAGE VALUE (OR REPRESENTATIVE VALUE) APPLICATION PROCESSING ADJUSTMENT MACHINE Y: REDgain(y) NIRgain(y) | AVERAGE VALUE (OR REPRESENTATIVE VALUE) APPLICATION PROCESSING ADJUSTMENT MACHINE Y: REDgain(y) NIRgain(y) | AVERAGE VALUE (OR REPRESENTATIVE VALUE) APPLICATION PROCESSING REFERENCE ADJUSTMENT MACHINE X MACHINE Y ADJUSTMENT SEPARATION SEPARATION MACHINE Y: COEFFICIENTS COEFFICIENTS REDgain(y) Kband1(x) Kband1(x) NIRgain(y) Kband2(x) Kband2(x) | AVERAGE VALUE (OR REPRESENTATIVE VALUE) APPLICATION PROCESSING ADJUSTMENT MACHINE Y: SEPARATION REDgain(y) COEFFICIENTS NIRgain(y) Kband1(y) Kband2(y) |
| | (2b) CAPTURED IMAGE ANALYSIS PROCESSING (ALL PIXELS) | ALL PIXEL PROCESSING ADJUSTMENT MACHINE Y: band1@Rraw(y) band2@Braw(y) | ALL PIXEL PROCESSING ADJUSTMENT MACHINE Y: band1@Rraw(y) band2@Braw(y) | ALL PIXEL PROCESSING ADJUSTMENT MACHINE Y: band1@Rraw(y) band2@Braw(y) | ALL PIXEL PROCESSING ADJUSTMENT MACHINE Y: band1@Rraw(y) band2@Braw(y) |

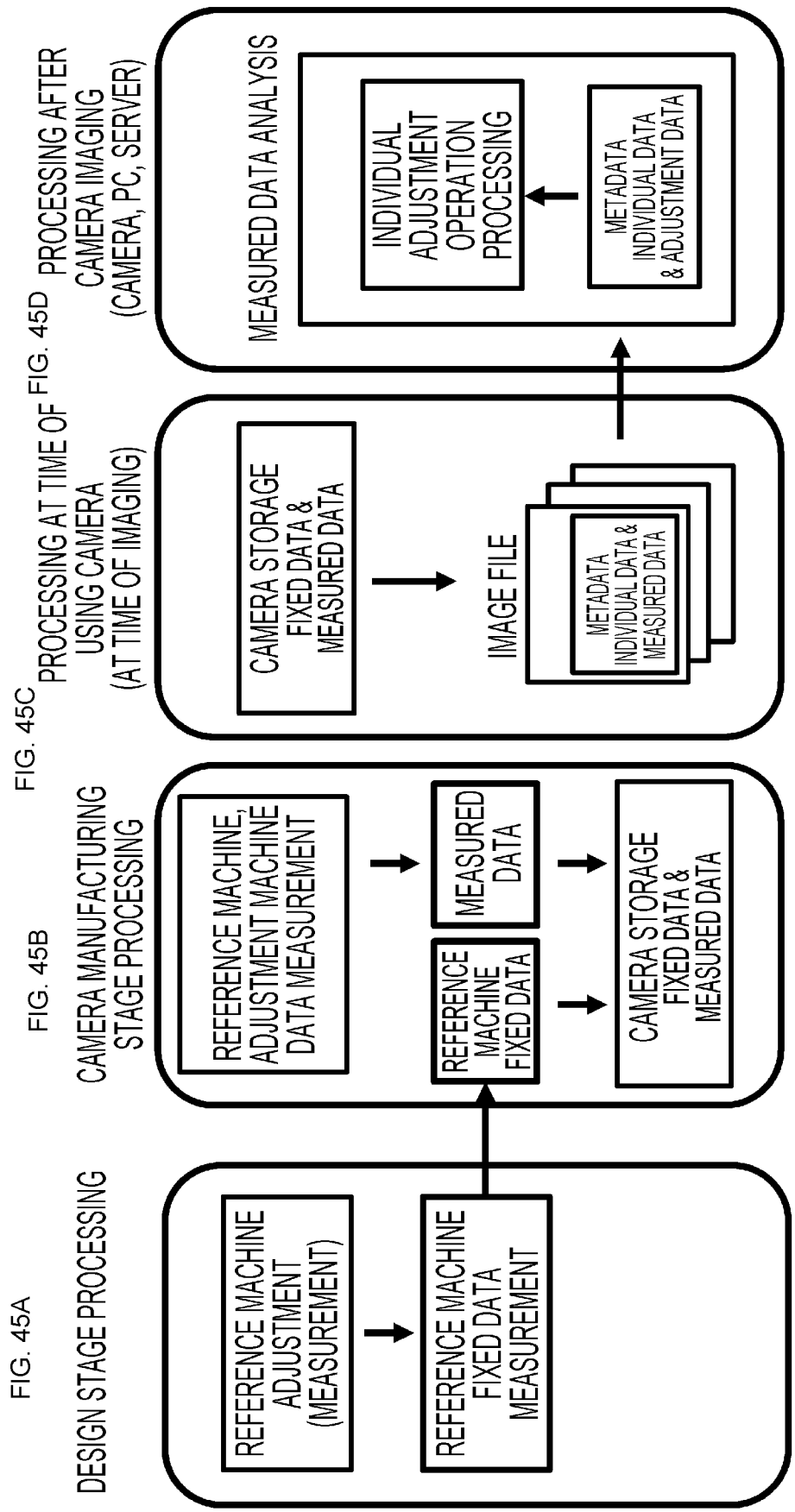

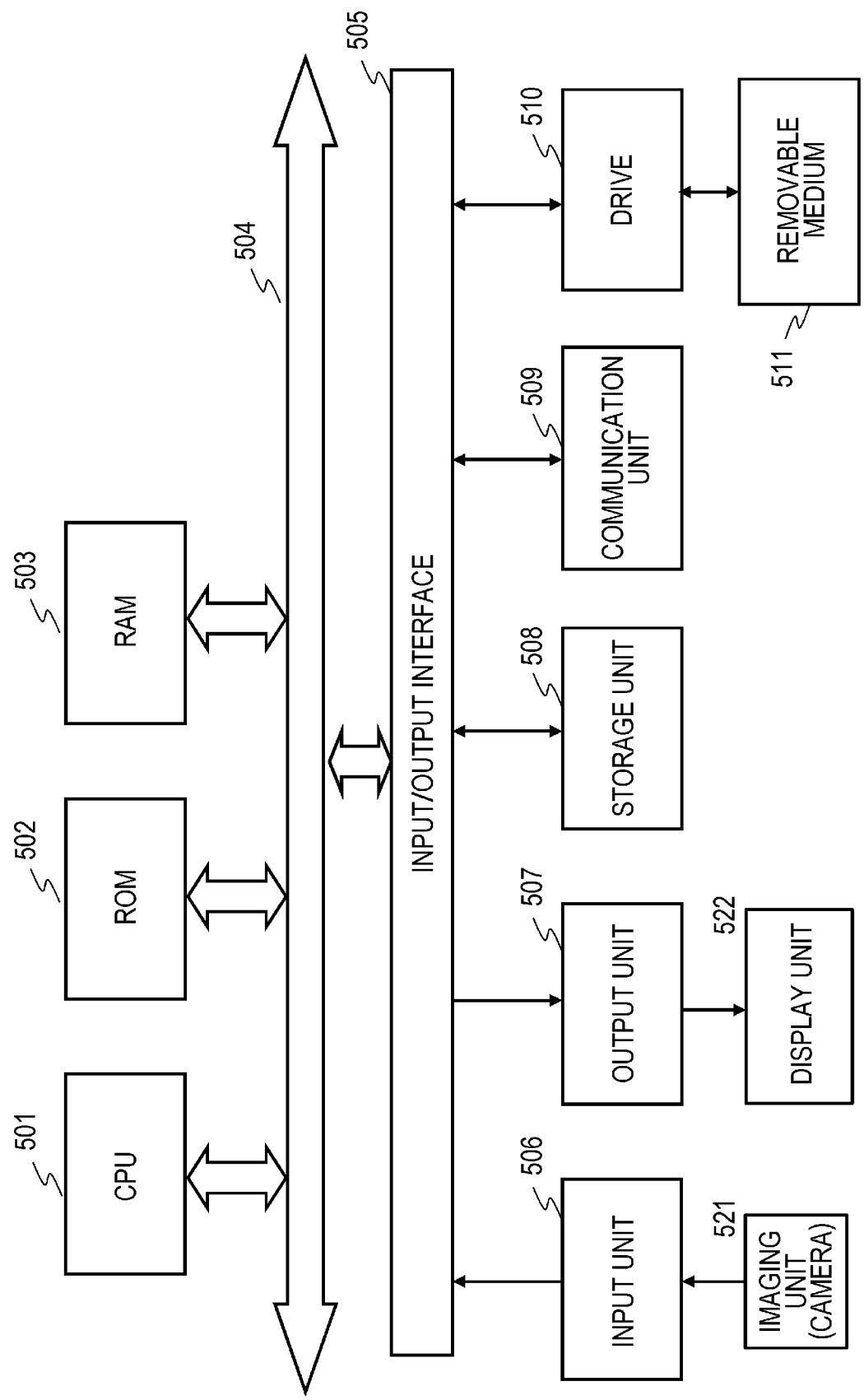

IMAGE PROCESSING DEVICE AND IMAGE PROCESSING METHOD THAT REDUCE VARIATION IN OUTPUT VALUE AMONG IMAGING DEVICES

CROSS REFERENCE TO RELATED APPLICATIONS

This application is a U.S. National Phase of International Patent Application No. PCT/JP2020/040441 filed on Oct. 28, 2020, which claims priority benefit of Japanese Patent Application No. JP 2019-208567 filed in the Japan Patent Office on Nov. 19, 2019. Each of the above-referenced applications is hereby incorporated herein by reference in its entirety.

TECHNICAL FIELD

The present disclosure relates to an image processing device, an image processing method, and a program. Specifically, the present disclosure relates to an image processing device, an image processing method, and a program that reduce variation in output value based on individual differences among imaging devices (cameras).

BACKGROUND ART

An imaging device (camera) inputs light through, for example, an RGB color filter to an imaging element (image sensor) Each of pixels of the imaging element outputs a pixel value depending on an input light intensity corresponding to light of each wavelength (RGB) of the filter to a signal processing unit. The signal processing unit generates a color image by using output pixel values of the imaging element, that is, RGB pixel value signals.

The imaging element includes a large number of pixels, and a pixel that receives light passing through a red (R) region of the RGB color filter is referred to as an R pixel, a pixel that receives light passing through a green (G) region of the color filter is referred to as a G pixel, and a pixel that receives light passing through a blue (B) region of the color filter is referred to as a B pixel.

However, the light passing through each color (RGB) region of the RGB color filter also includes a signal of a wavelength (color) that is not desired to be included originally.

For example, most of the light passing through the red (R) region of the RGB color filter is light of a wavelength of a red (R) component, but light of a wavelength of green (G) and blue (B) other than red (R), and further infrared light (IR) and the like is also slightly included.

The same applies to the light passing through the green (G) and blue (B) regions other than the red (R) region of the RGB color filter, and most of light passing through a green (G) filter is light of a wavelength of a green (G) component, but light of other wavelengths is also included, and most of light passing through a blue (B) filter is light of a wavelength of a blue (B) component, but light of other wavelengths is also included.

As a result, the pixel value of each of RGB pixels of the imaging element to which light through the RGB color filter is input is not a pixel value including only a signal of each of RGB colors but a pixel value including a noise component that is another color component.

The color image generated on the basis of the pixel value including such a noise component includes the noise component, and image quality is degraded.

Moreover, recently, for example, there is a technology for measuring a degree of activity of a plant by capturing an image of various plants such as crops, flowers, and trees by using a camera equipped in a drone or the like and analyzing the captured image.

As a vegetation index indicating the degree of activity of the plant, for example, there is a normalized difference vegetation index (NDVI).

The NDVI of the plant captured in the image is calculated by analysis of a camera-captured image, whereby the degree of activity of the plant in the captured image can be estimated.

In processing of calculating the NDVI, it is necessary to analyze color components contained in a plant as a subject with high accuracy.

However, when the above-described noise component is included in each of the RGB pixel values of the captured image by the imaging element, highly accurate NDVI calculation becomes impossible, and the degree of activity of the plant in the captured image cannot be accurately estimated.

Note that there is a multispectral camera as a camera for performing color component analysis of a subject with high accuracy.

The multispectral camera is a camera using a band pass filter (BP filter) that causes only light of a specific wavelength to pass in combination with a color filter.

By inputting the light caused to pass through the band pass filter (BP filter) and the color filter to the imaging element, it becomes possible to selectively input a light of a specific wavelength component passing through the band pass filter (BP filter) to the pixel of the imaging element.

Note that, as a conventional technology that discloses a multispectral camera, there is Patent Document 1 (U.S. Pat. No. 7,375,803), for example.

The technology disclosed in Patent Document 1 discloses a configuration in which an imaging element having RGB and infrared (IR) pixels is used to extract and use an IR component value in detection of a distance to a subject.

However, a problem here is variation in output value based on individual differences among imaging devices (cameras).

In a case where an imaging device is manufactured in a factory, an imaging element (image sensor) and a color filter are attached to each imaging device, but there are individual differences among these imaging elements and color filters. That is, there is variation in characteristic.

When there are individual differences in characteristics among the imaging elements and the filters of the imaging devices (cameras) as described above, variation also occurs in output values of the imaging devices.

For example, when an NDVI value that is a vegetation index indicating the degree of activity of the plant described above is calculated by using each of such imaging devices in which output values vary, a different value is calculated for each imaging device, and the degree of activity of the plant cannot be accurately calculated.

CITATION LIST

Patent Document

Patent Document 1: U.S. Pat. No. 7,375,803

SUMMARY OF THE INVENTION

Problems to be Solved by the Invention

The present disclosure has been made in view of the problems described above, for example, and an object of the present disclosure is to provide an image processing device, an image processing method, and a program that reduce variation in output value based on individual differences in characteristics among imaging devices (cameras).

Solutions to Problems

A first aspect of the present disclosure is in
an image processing device including
a signal processing unit that calculates a gain or gain calculation parameters for matching an output of an adjustment camera that is a multispectral camera with an output of a reference camera, in which
the signal processing unit calculates a band-corresponding gain or band-corresponding gain calculation parameters that match the output of the adjustment camera with the output of the reference camera, on the basis of:
a reference machine band-corresponding pixel value that is a pixel value within a specific band acquired on the basis of an output value of an imaging element of the reference camera; and
an adjustment machine band-corresponding pixel value that is a pixel value within a specific band acquired on the basis of an output value of an imaging element of the adjustment camera.

Moreover, a second aspect of the present disclosure is in
an image processing device including:
a multiband pass filter that selectively transmits band light of a specific band;
a color filter that transmits band light of a specific band in units of pixels of an imaging element;
an imaging element that receives light transmitted through the multiband pass filter and the color filter; and
a signal processing unit that executes signal processing on an output of the imaging element, in which
the signal processing unit
acquires band-corresponding gain calculation parameters for calculating a band-corresponding gain that is a gain in units of specific bands from a memory, and calculates the band-corresponding gain on the basis of the band-corresponding gain calculation parameters acquired, and
multiplies the output of the imaging element by the band-corresponding gain calculated, to execute output value adjustment processing that matches the output of the imaging element with an output of a reference machine.

Moreover, a third aspect of the present disclosure is in
an image processing device including:
a multiband pass filter that selectively transmits band light of a specific band;
a color filter that transmits band light of a specific band in units of pixels of an imaging element;
an imaging element that receives light transmitted through the multiband pass filter and the color filter; and
a signal processing unit that executes signal processing on an output of the imaging element, in which
the signal processing unit acquires a band-corresponding gain that is a gain in units of specific bands from a memory, and
multiplies the output of the imaging element by the band-corresponding gain acquired, to execute output value adjustment processing that matches the output of the imaging element with an output of a reference machine.

Moreover, a fourth aspect of the present disclosure is in
an image processing method executed in an image processing device, in which
the image processing device includes a signal processing unit that calculates a gain for matching an output of an adjustment camera that is a multispectral camera with an output of a reference camera, and
the signal processing unit calculates a band-corresponding gain or band-corresponding gain calculation parameters that match the output of the adjustment camera with the output of the reference camera, on the basis of:
a reference machine band-corresponding pixel value that is a pixel value within a specific band acquired on the basis of an output value of an imaging element of the reference camera; and
an adjustment machine band-corresponding pixel value that is a pixel value within a specific band acquired on the basis of an output value of an imaging element of the adjustment camera.

Moreover, a fifth aspect of the present disclosure is in
an image processing method executed in an image processing device, in which
the image processing device includes:
a multiband pass filter that selectively transmits band light of a specific band;
a color filter that transmits band light of a specific band in units of pixels of an imaging element;
an imaging element that receives light transmitted through the multiband pass filter and the color filter; and
a signal processing unit that executes signal processing on an output of the imaging element, and
the signal processing unit
acquires band-corresponding gain calculation parameters for calculating a band-corresponding gain that is a gain in units of specific bands from a memory, and calculates the band-corresponding gain on the basis of the band-corresponding gain calculation parameters acquired, and
multiplies the output of the imaging element by the band-corresponding gain calculated, to execute output value adjustment processing that matches the output of the imaging element with an output of a reference machine.

Moreover, a sixth aspect of the present disclosure is in
a program for causing an image processing device to execute image processing, in which
the image processing device includes a signal processing unit that calculates a gain for matching an output of an adjustment camera that is a multispectral camera with an output of a reference camera, and
the program causes the signal processing unit to calculate a band-corresponding gain or band-corresponding gain calculation parameters that match the output of the adjustment camera with the output of the reference camera, on the basis of:
a reference machine band-corresponding pixel value that is a pixel value within a specific band acquired on the basis of an output value of an imaging element of the reference camera; and
an adjustment machine band-corresponding pixel value that is a pixel value within a specific band acquired on the basis of an output value of an imaging element of the adjustment camera.

Moreover, a seventh aspect of the present disclosure is in
a program for causing an image processing device to execute image processing, in which the image processing device includes:
a multiband pass filter that selectively transmits band light of a specific band;
a color filter that transmits band light of a specific band in units of pixels of an imaging element;
an imaging element that receives light transmitted through the multiband pass filter and the color filter; and
a signal processing unit that executes signal processing on an output of the imaging element, and
the program causes the processing unit to
acquire band-corresponding gain calculation parameters for calculating a band-corresponding gain that is a gain in units of specific bands from a memory, and calculate the band-corresponding gain on the basis of the band-corresponding gain calculation parameters acquired, and
multiply the output of the imaging element by the band-corresponding gain calculated, to execute output value adjustment processing that matches the output of the imaging element with an output of a reference machine.

Note that, the program of the present disclosure is, for example, a program that can be provided by a communication medium or a storage medium provided in a computer readable form to a computer system or an information processing device that can execute various program codes. By providing such a program in a computer readable form, processing is implemented according to the program on the information processing device or the computer system.

Still other objects, features and advantages of the present disclosure will become apparent from the detailed description based on examples of the present disclosure and attached drawings to be described later. Note that, in this specification, the term "system" refers to a logical group configuration of a plurality of devices, and is not limited to a system in which the devices of respective configurations are in the same housing.

According to a configuration of an example of the present disclosure, a device and a method are implemented that execute gain calculation processing and gain adjustment processing for matching the output of the imaging element of the multispectral camera with the output of the reference machine.

Specifically, for example, as the gain calculation processing for matching the output of the adjustment camera with the output of the reference camera at the time of manufacturing the multispectral camera, the band-corresponding gain is calculated that matches the output of the adjustment camera with the output of the reference camera, on the basis of: the reference machine band-corresponding pixel value that is the pixel value within the specific band acquired on the basis of the output value of the imaging element of the reference camera; and the adjustment machine band-corresponding pixel value that is the pixel value within the specific band acquired on the basis of the output value of the imaging element of the adjustment camera. Furthermore, at the time of using the camera, the output value adjustment processing that matches the output of the imaging element with the output of the reference machine is executed, by acquiring the band-corresponding gain from the memory, and multiplying the output of the imaging element by the acquired band-corresponding gain.

With these configurations, the device and the method are implemented that execute the gain calculation processing and the gain adjustment processing for matching the output of the imaging element of the multispectral camera with the output of the reference machine.

Note that, the advantageous effects described in this specification are merely exemplifications, and the advantageous effects of the present technology are not limited to them and may include additional effects.

BRIEF DESCRIPTION OF DRAWINGS

FIG. 1 is a diagram explaining a configuration example of a multispectral camera.

FIG. 2 is a diagram explaining an example of spectral characteristics of filters of the multispectral camera.

FIGS. 4A and 4B are diagrams explaining a general adjustment example for eliminating output variation of an imaging device.

FIG. 5 is a diagram explaining an adjustment example of output variation of the imaging device by processing of the present disclosure.

FIG. 9 is a diagram explaining a configuration example of an ABCD color filter that transmits four types of different wavelength signals A to D.

FIGS. 14A and 14B are diagrams illustrating a flowchart explaining a sequence of processing executed by the image processing device of the present disclosure.

FIGS. 20A and 20B are diagrams illustrating a flowchart explaining a sequence of processing executed by the image processing device of the present disclosure.

FIGS. 27A and 27B are diagrams illustrating a flowchart explaining an image processing sequence of Example 2 of the present disclosure.

FIG. 44 is a diagram collectively explaining processing of Examples 1 to 4. FIGS. 45A, 45B, 45C, and 45D are diagrams for explaining transfer of camera-specific adjustment data such as a band-corresponding gain, and a processing configuration to be used.

FIG. 48 is a diagram explaining a hardware configuration example of the image processing device of the present disclosure.

MODE FOR CARRYING OUT THE INVENTION

Figure 3A:
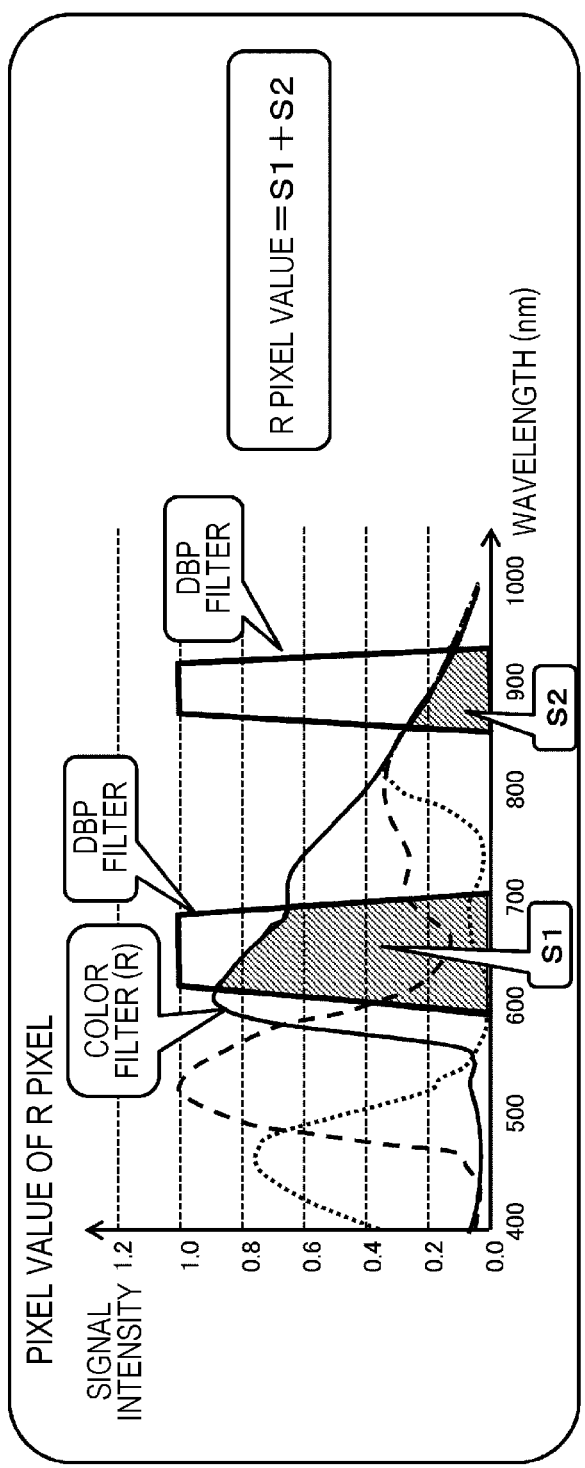
FIGS. 3A and 3B are diagrams explaining pixel values of the multispectral camera.

Hereinafter, with reference to the drawings, details will be described of an image processing device, an image processing method, and a program of the present disclosure. Note that, the description will be made in accordance with the following items.

1. Outline of multispectral camera
2. General method for adjusting individual variation of multispectral camera
3. Outline of processing executed by imaging device and image processing device of present disclosure
4. Band-corresponding pixel value calculation processing
5. Band-corresponding gain calculation processing and band-corresponding gain adjustment processing
6. Sequence of processing executed by image processing device of present disclosure
7. Configuration and processing example of executing band-corresponding gain calculation processing at time of using camera
8. Processing of calculating spectral characteristic parameter (separation coefficient) of multispectral camera
9. Specific examples to which processing of present disclosure is applied
9-1 (Example 1) Example using multispectral camera using dual band pass (DBP)
9-2 (Example 2) Example of executing temperature compensation to perform band-corresponding gain calculation and band-corresponding gain adjustment
9-3 (Example 3) Example of executing processing of calculating band-corresponding gain and processing of calculating spectral characteristic parameter (separation coefficient) using special light source
9-4 (Example 4) Example of executing processing of calculating band-corresponding gain and spectral characteristic parameter (separation coefficient) by using both measured spectral characteristic parameter (separation coefficient) of reference machine and special light source
10. Summary of processing of Examples 1 to 4
11. Transfer of camera-specific adjustment data such as band-corresponding gain, and processing configuration to be used
12. Configuration example of image processing device and image processing system of present disclosure
13. Hardware configuration example of image processing device
14. Summary of configuration of present disclosure 1. Outline of Multispectral Camera First, an outline of a multispectral camera will be described.

As described above, the multispectral camera is a camera using a band pass filter (BP filter) that causes only light of a specific wavelength to pass in combination with a color filter.

By inputting the light caused to pass through the band pass filter (BP filter) and the color filter to the imaging element, it becomes possible to highly accurately input a specific wavelength component of light passing through the band pass filter (BP filter) to the pixel of the imaging element.

FIG. 1 illustrates a configuration example of a multispectral camera 10.

The multispectral camera 10 illustrated in FIG. 1 is used, for example, to analyze a degree of activity of a plant. Specifically, for example, the multispectral camera 10 is a camera that captures an image for analyzing a red (R) component and a near infrared (NIR) component included in a captured image.

As described above, there is a normalized difference vegetation index (NDVI) as an index value of the degree of activity of the plant.

The NDVI of the plant captured in the image is calculated by analysis of a camera-captured image, whereby the degree of activity of the plant in the captured image can be estimated.

In processing of calculating the NDVI, it is necessary to analyze color components contained in a plant as a subject with high accuracy.

Imaging light of a subject input through a lens 11 of the multispectral camera 10 illustrated in FIG. 1 is input to an imaging element (image sensor) 14 through a dual bandpass filter (DBP) 12 and a color filter (RGB color filter) 13.

The dual bandpass filter (DBP) 12 is a filter that selectively transmits two different wavelength components of light.

The dual bandpass filter (DBP) 12 described here is a filter that selectively transmits two different wavelength components of light, a red (R) component and a near infrared (NIR) component.

The color filter (RGB color filter) 13 is a filter that transmits light of a wavelength of each of R, G, and B color components in units of pixels. For example, the RGB color filter is an RGB filter in a Bayer array.

Light passing through the dual bandpass filter (DBP) 12, and a red (R) filter, a green (G) filter, or a blue (B) filter of the color filter (RGB color filter) 13 is input to each pixel of the imaging element (image sensor) 14.

Light passing through the dual bandpass filter (DBP) 12 and the red (R) filter of the color filter (RGB color filter) 13 is input to an R pixel of the imaging element (image sensor) 14.

Light passing through the dual bandpass filter (DBP) 12 and the green (G) filter of the color filter (RGB color filter) 13 is input to a G pixel of the imaging element (image sensor) 14.

Light passing through the dual bandpass filter (DBP) 12 and the blue (B) filter of the color filter (RGB color filter) 13 is input to a B pixel of the imaging element (image sensor) 14.

FIG. 2 is a diagram illustrating a graph explaining spectral characteristics of the dual bandpass filter (DBP) 12 and the color filter (RGB color filter) 13.

The horizontal axis represents a wavelength (400 to 1000 nm), and the vertical axis represents a signal intensity (relative value) of filter transmitted light.

It can be seen that most of the light transmitted through a color filter (B) constituting the color filter (RGB color filter) 13 is a blue (B) component that is light of a wavelength in the vicinity of about 450 nm, but light of other wavelength components is also transmitted to no small extent.

Furthermore, most of the light transmitted through a color filter (G) is a green (G) component that is light of a wavelength in the vicinity of about 540 nm, but light of other wavelength components is also included.

Similarly, most of the light transmitted through a color filter (R) is a red (R) component that is light of a wavelength in the vicinity of about 650 nm, but light of other wavelength components is also included.

The light transmitted through the dual bandpass filter (DBP) 12 has two wavelength components of light, a red (R) component that is light of a wavelength in the vicinity of about 650 nm and a near infrared (NIR) component that is light of a wavelength in the vicinity of about 900 nm.

Next, with reference to FIGS. 3A and 3B, a pixel value calculation example will be described of each pixel of the R pixel and the B pixel that are constituent pixels of the imaging element (image sensor) 14 in a case where image capturing is performed by using the dual bandpass filter (DBP) 12 and color filter (RGB color filter) 13 having the spectral characteristics illustrated in FIG. 2.

Figure 3B:
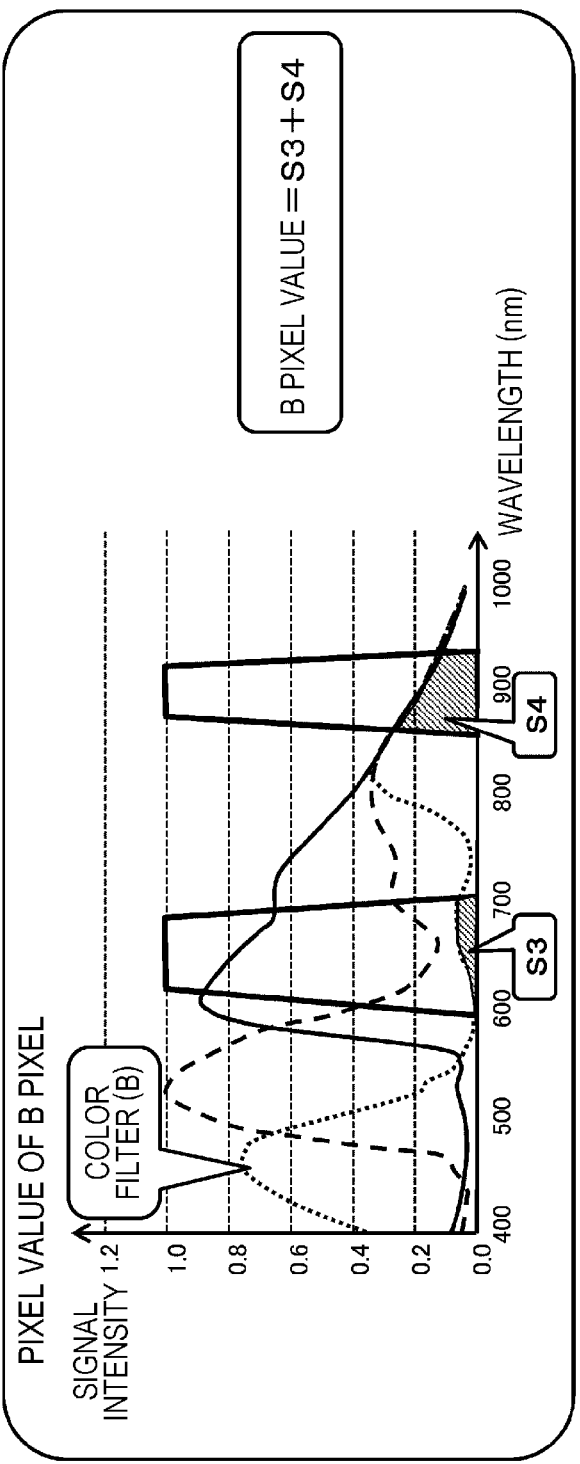

FIGS. 3A and 3B illustrate pixel value calculation examples of respective pixels described below.

FIG. 3A Pixel value of R pixel

FIG. 3B Pixel value of B pixel

First, a calculation example will be described of FIG. 3A Pixel value of R pixel.

Light passing through the dual bandpass filter (DBP) 12 and the red (R) filter of the color filter (RGB color filter) 13 is input to the R pixel that is a constituent pixel of the imaging element (image sensor) 14.

As described above, most of the light transmitted through the color filter (R) is a red (R) component that is light of a wavelength in the vicinity of about 650 nm, but light of other wavelength components is also included.

The light transmitted through the dual bandpass filter (DBP) 12 has two wavelength components of light, a red (R) component that is light of a wavelength in the vicinity of about 650 nm and a near infrared (NIR) component that is light of a wavelength in the vicinity of about 900 nm.

As a result, a pixel value of the R pixel that is a constituent pixel of the imaging element (image sensor) 14 is a pixel value corresponding to an addition signal of a signal S1 and a signal S2 illustrated in FIG. 3A.

That is, the pixel value of the R pixel is $R_{raw} = S1 + S2.$

Note that raw of Rraw means a raw image (RAW image). That is, the pixel value is a pixel value on the imaging element not subjected to signal processing.

Next, a calculation example will be described of FIG. 2B Pixel value of B pixel.

Light passing through the dual bandpass filter (DBP) 12 and the blue (B) filter of the color filter (RGB color filter) 13 is input to the B pixel that is a constituent pixel of the imaging element (image sensor) 14.

Most of the light transmitted through the color filter (B) is a blue (B) component that is light of a wavelength in the vicinity of about 450 nm, but light of other wavelength components is also included.

The light transmitted through the dual bandpass filter (DBP) 12 has two wavelength components of light, a red (R) component that is light of a wavelength in the vicinity of about 650 nm and a near infrared (NIR) component that is light of a wavelength in the vicinity of about 900 nm.

As a result, a pixel value of the B pixel that is a constituent pixel of the imaging element (image sensor) 14 is a pixel value corresponding to an addition signal of a signal S3 and a signal S4 illustrated in FIG. 3B.

That is,
the pixel value of the B pixel is $$Braw = S3 + S4.$$

Note that it becomes possible to calculate a red (R) signal, a near infrared (NIR) signal, and wavelength components of light by using the pixel value of the R pixel and the pixel value of the B pixel.

As can be seen from FIGS. 3A and 3B S2≈S4, and S3≈0.

From this relationship, a red (R) component signal that is light of a wavelength in the vicinity of about 650 nm can be calculated by the following calculation formula.

$$R = (S1+S2) - (S3+S4) = Rraw - Braw$$

By using the formula described above, it is possible to calculate a highly accurate value of the red (R) component signal included in the subject from the R pixel value (Rraw) and the B pixel value (Braw) of the raw image (RAW image) of the imaging element.

Similarly,
a near infrared (NIR) component signal that is light of a wavelength in the vicinity of about 900 nm is $$NIR = S4 \approx (S3+S4) = Braw.$$

If the formula described above is used, it is possible to calculate a highly accurate value of the near infrared (NIR) component signal included in the subject from the B pixel value (Braw) of the imaging element.

As described above, it becomes possible to calculate highly accurate values of signals (R, NIR) in a specific wavelength band on the basis of pixel values (Rraw, Braw) of pixels input to the imaging element (image sensor) 14 through the dual bandpass filter (DBP) 12 and the color filter (RGB color filter) 13.

By using this analysis value, it is possible to calculate, for example, the degree of activity index of the plant with high accuracy.

Note that, in a case where a true pixel value in a specific wavelength band is calculated from the pixel value of the RAW image output from the imaging element (image sensor) 14 of the multispectral camera 10 as illustrated in FIG. 1, a matrix operation is generally used. For example, in accordance with (Formula 11) below, it is possible to calculate highly accurate values of the red (R) component signal and the near infrared (NIR) component signal by using the R pixel value (Rraw) and the B pixel value (Braw) that are RAW image pixel values obtained as outputs of the imaging element.

[Expression 1]

$$\begin{pmatrix} RED \\ NIR \end{pmatrix} = \begin{pmatrix} G1 & G2 \\ G3 & G4 \end{pmatrix} \begin{pmatrix} Rraw \\ Braw \end{pmatrix} \qquad \text{(Formula 11)}$$

By appropriately selecting values of G1, G2, G3, and G4 that are matrix elements of a matrix of (Formula 11) described above, it becomes possible to calculate signals in a RED band and an NIR band efficiently and with high accuracy.

As the simplest example, assuming that a signal level (signal S3 in FIG. 3B) in a red (R) band included in the B pixel value (Braw) is small, the matrix elements are set as
G1=1, G2=−1, G3=0, G4=1. By using such a matrix, a signal calculation formula similar to that described earlier, that is, $$R = Rraw - Braw$$

$$NIR = Braw,$$

the same calculation processing as described above can be performed.

However, a separation characteristic between a signal in the red (R) band and a signal in the near infrared (NIR) band is insufficient, and it is difficult to obtain a highly accurate result.

Moreover, when a light source or the subject changes, a ratio between "a signal level in the near infrared (NIR) band included in the B pixel value (Braw) (signal S4 in FIG. 3B)" and "a signal level in the red (R) band included in the R pixel value (Rraw) (signal S1 in FIG. 3A)" changes, and thus there is a problem that it is difficult to obtain a highly accurate value even if the pixel value in each band is calculated by using the same values as the matrix elements (G1 to G4) described above.

2. General Method for Adjusting Individual Variation of Multispectral Camera Next, a general method for adjusting individual variation of the multispectral camera will be described.

As described above, one example of use of the multispectral camera is processing of analyzing the degree of activity of the plant. The degree of activity of the plant is determined by analyzing the red (R) component and the near infrared (NIR) component included in the captured image by the multispectral camera.

Specifically, for example, it is used to calculate an NDVI value that is an index value of the degree of activity of the plant described above.

In processing of calculating the NDVI, it is necessary to analyze color components contained in a plant as a subject with high accuracy.

However, a problem here is an individual difference of the imaging device (camera). In particular, it is difficult to make the characteristics of the color filters uniform, and variations occur in characteristics of the filters mounted on the respective imaging devices. As a result, there is a problem that output values based on the captured image by the imaging device also vary.

When an NDVI value that is a vegetation index indicating the degree of activity of the plant described above is calculated by using each of such imaging devices in which output values vary, a different value is calculated for each imaging device, and the degree of activity of the plant cannot be accurately calculated.

First, a general adjustment example for eliminating output variation of the imaging device will be described with reference to FIGS. 4A and 4B and subsequent figures.

FIGS. 4A and 4B illustrate the following two diagrams.

FIG. 4A Processing at time of manufacturing camera

FIG. 4B Processing at time of using camera 5 (at time of imaging)

FIG. 4A Processing at time of manufacturing camera is a diagram explaining processing of calculating an adjustment value, specifically, a gain, for making an output value of each camera uniform and storing the adjustment value, specifically, the gain, in a memory of each camera in a case where multispectral cameras are mass-produced in a camera manufacturing factory, for example.

FIG. 4B Processing at time of using camera (at time of imaging) is a diagram explaining processing of adjusting and uniformizing the output value by using the value of the gain recorded in the memory in the camera at the time of manufacturing the camera.

First, "FIG. 4A Processing at time of manufacturing camera" will be described.

A reference camera X (reference machine) 21 is one reference camera. An adjustment camera Y (adjustment machine) 22 is a camera manufactured and sold.

An output adjustment parameter, that is, a gain for matching an output of the adjustment camera Y (adjustment machine) 22 with an output of the reference camera X (reference machine) 21 is calculated and stored in a memory 23 of the adjustment camera Y (adjustment machine) 22.

The same subject is imaged by the reference camera X (reference machine) 21 and the adjustment camera Y (adjustment machine) 22, and respective imaging element output values are acquired. Each of the cameras is provided with a filter and an imaging element, and characteristics of these do not completely match, so that there is a difference between output values of the respective cameras.

An imaging element output value Xout of the reference camera X (reference machine) 21 is set as $$Xout=(Rx,Gx,Bx).$$

Rx is a transmission pixel value of an R filter, Gx is a transmission pixel value of a G filter, and Bx is a transmission pixel value of a B filter.

An imaging element output value Yout of the adjustment camera Y (adjustment machine) 22 is set as $$Yout=(Ry,Gy,By).$$

Pixel values of Xout and Yout are different values due to an individual difference of each camera, particularly, a difference between characteristics of the color filters.

The imaging element output value Xout of the reference camera X (reference machine) 21, $$Xout=(Rx,Gx,Bx), \text{ and}$$

the imaging element output value Yout of the adjustment camera Y (adjustment machine) 22, $$Yout=(Ry,Gy,By),$$

these two output values are input to an each-color-corresponding gain calculation unit 31.

The each-color-corresponding gain calculation unit 31 compares the output values of the respective colors (RGB) of the two cameras 21 and 22, and calculates a gain (Gain) for matching the imaging element output value Yout of the adjustment camera Y (adjustment machine) 22, $$Yout=(Ry,Gy,By) \text{ with}$$

the imaging element output value Xout of the reference camera X (reference machine) 21, $$Xout=(Rx,Gx,Bx).$$

The gain Gain includes the following gains corresponding to the respective colors (RGB).

$$Gain=(Rg,Gg,Bg)$$

Specific values of the gains corresponding to the respective colors are as follows.

$$Rg=Rx/Ry$$

$$Gg=Gx\cdot Gy$$

$$Bg=Bx/Yb$$

The gains corresponding to the respective colors calculated in this manner, $$Gain=(Rg,Gg,Bg)$$

are stored in the memory 23 of the adjustment camera Y (adjustment machine) 22.

Next, "FIG. 4B Processing at time of using camera (at time of imaging)" will be described.

The adjustment camera Y (adjustment machine) 22 stores, in the memory 23, the gains corresponding to the respective colors calculated in "FIG. 4A Processing at time of manufacturing camera", that is, the gains corresponding to the respective colors $$Gain=(Rg,Gg,Bg)=((Rx/Ry),(Gx/Gy),(Bx/By)).$$

First, a certain subject, for example, a plant is imaged by the adjustment camera Y (adjustment machine) 22.

The imaging element output value Yout in this imaging processing is set as $$Yout=(Ry,Gy,By).$$

Next, the imaging element output value Yout is input to an each-color-corresponding gain adjustment unit 33, and output value adjustment for each color by gain adjustment is performed.

Specifically, for the imaging element output value Yout=(Ry, Gy, By), Gain=(Rg, Gg, Bg)=((Rx/Ry), (Gx/Gy), (Bx/By)) stored in the memory 23, the gains corresponding to the respective colors are multiplied to adjust the output value, and an adjustment output value Y2 is calculated.

The adjustment output value Y2 is the following value.

$$\text{Output adjustment value } Y2=(Ry2,Gy2,By2)$$

$$=(Ry\times Rg, Gy\times Gg, By\times Bg)$$

$$=(Ry\times(Rx/Ry),Gy\times(Gx/Gy),By\times(Bx/By))$$

$$=(Rx,Gx,Bx)$$

After the output value Yout=(Ry, Gy, By) of the adjustment camera Y (adjustment machine) 22 is matched with the output value of the reference camera (reference machine) 21 in this way, the output value Yout is input to an image processing unit 34, and the operation and the like described earlier with reference to FIGS. 2, 3A, and 3B are executed to perform processing of calculating signal values of the red (R) component signal and the near infrared (NIR) component signal, and the like.

According to the processing illustrated in FIGS. 4A and 4B, the output value Yout=(Ry, Gy, By) of the adjustment camera Y (adjustment machine) 22 is matched with the output value of the reference camera (reference machine) 21, and the adjustment camera Y (adjustment machine) 22 seems to be able to obtain exactly the same analysis value as the reference camera (reference machine) 21.

However, in practice, even if the output value adjustment to which the gains corresponding to the respective colors calculated by the processing as illustrated in FIGS. 4A and 4B are applied are performed, the signal values of the red (R) component signal and the near infrared (NIR) component signal calculated on the basis of the output value of the adjustment camera Y (adjustment machine) 22 may be different from the signal values of the red (R) component signal and the near infrared (NIR) component signal calculated on the basis of the output value of the reference camera (reference machine) 21.

A reason for this will be described.

In a case where values of the red (R) component signal and the near infrared (NIR) component signal are calculated from the output value of the imaging element of the multispectral camera, for example, the values are calculated by the matrix operation described earlier, that is, the matrix operation expressed in (Formula 11).

For this matrix operation, the R pixel value (Rraw) and the B pixel value (Braw) are used that are the RAW image pixel values obtained as outputs of the imaging element.

However, the R pixel value (Rraw) and the B pixel value (Braw) of the imaging element of the multispectral camera are addition values of a plurality of different band signals, as described earlier with reference to FIGS. 3A and 3B. That is, $$R=S1+S2$$

$$B=S3+S4$$

The R pixel value (Rraw) and the B pixel value (Braw) of the imaging element of the multispectral camera are addition values of signal values of a plurality of different bands, as described above.

Note that S1 to S4 are signal values of two bands that are transmitted through the dual bandpass filter (DBP) 12 of the multispectral camera illustrated in FIG. 1.

S1 and S3 are red (R) components of light of a wavelength in the vicinity of about 650 nm in the light transmitted through the dual bandpass filter (DBP) 12.

S2 and S4 are near infrared (NIR) components as light of a wavelength of about 900 nm in the light transmitted through the dual bandpass filter (DBP) 12.

In both the reference camera (reference machine) 21 and the adjustment camera Y (adjustment machine) 22 described with reference to FIGS. 4A and 4B, the R pixel value is acquired as R=S1+S2, and the B pixel value is acquired as S3+S4.

However, a signal ratio between these, that is, a ratio between S1 and S2 that are constituent signals of the R pixel value, or a ratio between S3 and S4 that are constituent signals of the B pixel value, changes when the light source or the subject changes. Thus, even if a gain calculated under a certain condition is applied to a captured image under a different condition, accurate adjustment cannot be performed.

That is, even if the gain calculated at the time of manufacturing the camera is applied to an image captured under a condition different from that at the time of manufacturing, the output of the adjustment machine cannot be matched with the output of the reference machine.

3. Outline of Processing Executed by Imaging Device and Image Processing Device of Present Disclosure Next, a description will be given of an outline of processing executed by the imaging device and the image processing device of the present disclosure.

As described above, the output of the imaging element of the multispectral camera is a mixed signal of band signals corresponding to respective transmission bands of the band pass filter.

In the imaging device and the image processing device of the present disclosure, band signals included in the output of the imaging element of the multispectral camera are separated, and gains in units of the separated band signals are calculated and applied. The gains calculated by this processing are all gains corresponding to one band, and are not gains corresponding to the mixed signal of a plurality of bands.

As described above, in the mixed signal of the signals of the plurality of bands, the ratio between the band signals included in the pixel value changes due to a change in an imaging condition, and thus, it is difficult to perform accurate gain adjustment even if the gain calculated under a certain condition is applied to an image captured under a different condition; however, all the gains calculated in the processing of the present disclosure are gains corresponding to one band, and can be used even if the imaging condition changes, and the output of the adjustment machine can be matched with that of the reference machine.

Output variation adjustment examples of the imaging device by the processing of the present disclosure will be described with reference to FIGS. 5 and 6.

Figure 6:
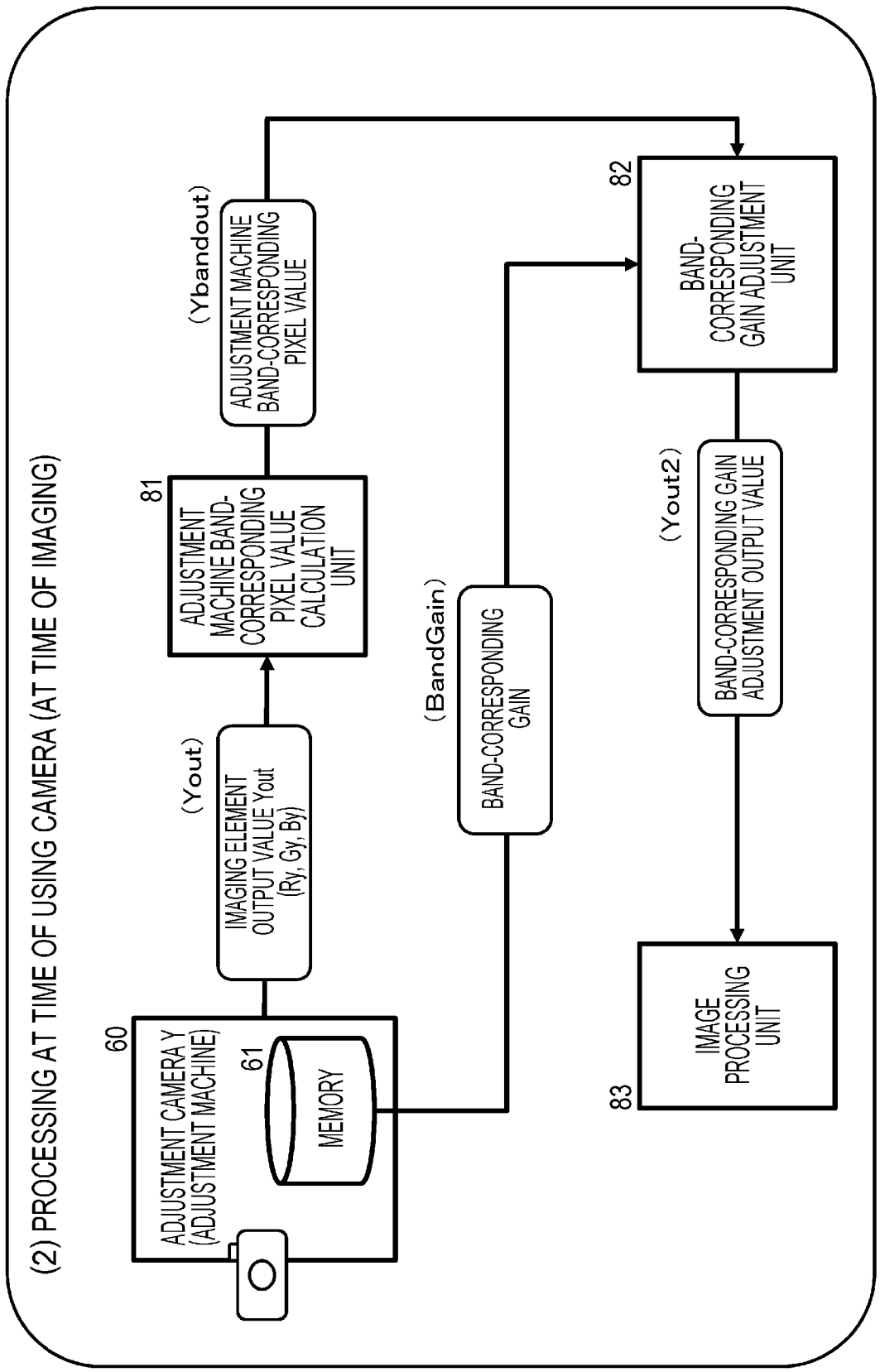
FIG. 6 is a diagram explaining an adjustment example of output variation of the imaging device by the processing of the present disclosure.

FIGS. 5 and 6 illustrate the following two diagrams, as described earlier with reference to FIGS. 4A and 4B.

FIG. 4A Processing at time of manufacturing camera

FIG. 4B Processing at time of using camera (at time of imaging)

In "(1) Processing at time of manufacturing camera" to which the processing of the present disclosure illustrated in FIG. 5 is applied, gain calculation in units of bands included in the respective colors is performed instead of calculation of the gains corresponding to the colors described with reference to FIGS. 4A and 4B, that is, the gain calculation corresponding to each of colors of R, G, and B.

Furthermore, in "(2) Processing at time of using camera (at time of imaging)" to which the processing of the present disclosure illustrated in FIG. 6 is applied, output value adjustment processing by gain application processing in units of bands included in the respective colors is performed instead of the application processing of the gains corresponding to the colors described with reference to FIGS. 4A and 4B, that is, the gain application processing in units of RGB colors.

First, "(1) Processing at time of manufacturing camera" of the present disclosure will be described with reference to FIG. 5.

This processing is a diagram explaining processing of calculating an adjustment value, specifically, a gain, for making an output value of each camera uniform and storing the adjustment value, specifically, the gain, in a memory of each camera in a case where multispectral cameras are mass-produced in a camera manufacturing factory, for example.

In the processing of the present disclosure, as described above, the gain calculation in units of bands included in the respective colors is performed instead of the gain calculation corresponding to each single color of RGB.

A reference camera X (reference machine) 50 is one reference camera. An adjustment camera Y (adjustment machine) 120 is a camera manufactured and sold.

As output adjustment parameters for matching the output of an adjustment camera Y (adjustment machine) 60 with the output of the reference camera X (reference machine) 50, gains corresponding to bands included in the respective colors are calculated and stored in a memory 61 of the adjustment camera Y (adjustment machine) 60.

The same subject is imaged by the reference camera X (reference machine) 50 and the adjustment camera Y (adjustment machine) 60, and respective imaging element output values are acquired. Each of the cameras is provided with a filter and an imaging element, and characteristics of these do not completely match, so that there is a difference between output values of the respective cameras.

An imaging element output value Xout of the reference camera X (reference machine) 50 is set as $$Xout=(Rx,Gx,Bx).$$

Rx is a transmission pixel value of an R filter, Gx is a transmission pixel value of a G filter, and Bx is a transmission pixel value of a B filter.

An imaging element output value Yout of the adjustment camera Y (adjustment machine) 60 is set as $$Yout=(Ry,Gy,By).$$

Pixel values of Xout and Yout are different values due to an individual difference of each camera, particularly, a difference between characteristics of the color filters.

The imaging element output value Xout of the reference camera X (reference machine) 50, $$Xout=(Rx,Gx,Bx), \text{ and}$$

the imaging element output value Yout of the adjustment camera Y (adjustment machine) 60, $$Yout=(Ry,Gy,By),$$

These two output values are input to a reference machine band-corresponding pixel value calculation unit 71 and an adjustment machine band-corresponding pixel value calculation unit 72, respectively.

Note that, these processing units, the reference machine band-corresponding pixel value calculation unit 71, the adjustment machine band-corresponding pixel value calculation unit 72, and a band-corresponding gain calculation unit 73 illustrated in FIG. 5, may be included in an image processing device outside each of the cameras 50 and 60, or may be included in each of the cameras 50 and 60.

For example, a setting is possible in which the reference machine band-corresponding pixel value calculation unit 71 is included in the reference camera X (reference machine) 50, and the adjustment machine band-corresponding pixel value calculation unit 72 and the band-corresponding gain calculation unit 73 are included in the adjustment camera Y (adjustment machine).

The reference machine band-corresponding pixel value calculation unit 71 inputs the imaging element output value Xout=(Rx, Gx, Bx) of the reference camera X (reference machine) 50, and calculates a signal value in units of bands included in pixel values corresponding to these respective colors, that is, a reference machine band-corresponding pixel value (Xbandout).

Specifically, for example, the signal value S1 and the like in units of bands described earlier with reference to FIGS. 3A and 3B are calculated.

Details of processing of calculating the band-corresponding pixel value will be described later.

Similarly, the adjustment machine band-corresponding pixel value calculation unit 72 inputs the imaging element output value Yout=(Ry, Gy, By) of the adjustment camera Y (adjustment machine) 60, and calculates a signal value in units of bands included in pixel values corresponding to these respective colors, that is, an adjustment machine band-corresponding pixel value (Ybandout).

The reference machine band-corresponding pixel value Xbandout of the reference camera X (reference machine) 60 calculated by the reference machine band-corresponding pixel value calculation unit 71 and the adjustment machine band-corresponding pixel value Ybandout of the adjustment camera Y (adjustment machine) calculated by the adjustment machine band-corresponding pixel value calculation unit 72 are input to the band-corresponding gain calculation unit 73.

The band-corresponding gain calculation unit 73 compares the band-corresponding pixel values of the two cameras 50 and 60 to calculate a gain for matching the adjustment machine band-corresponding pixel value Ybandout of the adjustment camera Y (adjustment machine) 60 with the reference machine band-corresponding pixel value Xbandout of the reference camera X (reference machine) 50, that is, a band-corresponding gain (BandGain).

The band-corresponding gain calculated by the band-corresponding gain calculation unit 73 is stored in the memory 61 of the adjustment camera Y (adjustment machine) 60.

Note that one reference camera X (reference machine) 50 is used for processing of calculating band-corresponding gains of a large number of adjustment cameras Y (adjustment machines) 60.

That is, the reference machine band-corresponding pixel value calculated by the reference machine band-corresponding pixel value calculation unit 71 based on the captured image by the reference camera X (reference machine) 50 can be used for the processing of calculating the band-corresponding gains of a large number of adjustment cameras Y (adjustment machines) 60.

Thus, the reference machine band-corresponding pixel value calculated by the reference machine band-corresponding pixel value calculation unit 71 based on the captured image by the reference camera X (reference machine) 50 is stored in, for example, a memory of the reference camera X (reference machine) 50 or a memory of an external device, and this memory-stored data can be applied to band-corresponding gain calculation processing for the subsequent other adjustment cameras Y (adjustment machines) 60.

By transmitting the measurement value of the reference camera as metadata, it becomes possible to improve the separation performance in processing in a subsequent stage. In this case, the processing including the gain adjustment is performed in the subsequent stage, and the operation in the reference camera is performed every time.

Next, with reference to FIG. 6, a description will be given of "(2) Processing at time of using camera (at time of imaging)" to which the processing of the present disclosure is applied.

(2) At time of using camera (at time of imaging), processing is executed of adjusting the output value by using the value of the gain recorded in the memory in the camera at the time of manufacturing the camera to adjust the output value to a value similar to that of the reference machine.

In the adjustment camera Y (adjustment machine) 60, the band-corresponding gain (BandGain) calculated in "(1) Processing at time of manufacturing camera" is stored in the memory 61.

First, a certain subject, for example, a plant is imaged by the adjustment camera Y (adjustment machine) 60.

The imaging element output value Yout in this imaging processing is set as $$Yout=(Ry,Gy,By).$$

Next, the imaging element output value Yout is input to an adjustment machine band-corresponding pixel value calculation unit 81.

Note that, these processing units, the adjustment machine band-corresponding pixel value calculation unit 81 and a band-corresponding gain adjustment unit 82 illustrated in FIG. 6, may be included in an image processing device outside the adjustment camera Y (adjustment machine) 60, or may be included in the adjustment camera Y (adjustment machine) 60.

The adjustment machine band-corresponding pixel value calculation unit 81 inputs the imaging element output value Yout=(Ry, Gy, By) of the adjustment camera Y (adjustment machine) 60, and calculates a signal value in units of bands included in pixel values corresponding to these respective colors.

The signal value is the adjustment machine band-corresponding pixel value Ybandout illustrated in FIG. 6.

A specific example of processing of calculating signal values corresponding to respective bands included in pixel values corresponding to respective colors of the imaging element will be described in detail later.

The adjustment machine band-corresponding pixel value Ybandout calculated by the adjustment machine band-corresponding pixel value calculation unit 81 is input to the band-corresponding gain adjustment unit 82.

The band-corresponding gain adjustment unit 82 adjusts the output value by applying the band-corresponding gain (BandGain) stored in the memory 61 of the adjustment camera Y (adjustment machine) 60 to the adjustment machine band-corresponding pixel value (Ybandout) input from the adjustment machine band-corresponding pixel value calculation unit 81, and calculates a band-corresponding gain adjustment output value Yout2.

By this processing, the band-corresponding gain adjustment output value Yout2 is an output that matches the output value of the reference machine regardless of the imaging condition. The band-corresponding gain adjustment output value Yout2 is input to an image processing unit 83, and the operation and the like described earlier with reference to FIGS. 2, 3A, and 3B are executed to perform processing of calculating signal values of the red (R) component signal and the near infrared (NIR) component signal, and the like.

In the processing described with reference to FIGS. 5 and 6, each color output value of the imaging element of each camera is further separated into each band signal, a band signal-corresponding gain is calculated, and the output value of the adjustment camera Y (adjustment machine) 60 is adjusted by using the band-corresponding gain.

By performing such processing, it becomes possible to eliminate deviation of the output value based on differences in filter characteristics of the cameras and to match the output value Yout=(Ry, Gy, By) of the adjustment camera Y (adjustment machine) 60 with the output value of the reference camera (reference machine) 50.

4. Band-Corresponding Pixel Value Calculation Processing

Next, band-corresponding pixel value calculation processing will be described.

In the reference machine band-corresponding pixel value calculation unit 71 and the adjustment machine band-corresponding pixel value calculation unit 72 in "(1) Processing at time of manufacturing camera" described with reference to FIG. 5, band-corresponding pixel values of the reference camera X (reference machine) 50 and the adjustment camera Y (adjustment machine) 60 are calculated, respectively.

As described above, the reference machine band-corresponding pixel value calculation unit 71 inputs the imaging element output value Xout=(Rx, Gx, Bx) of the reference camera X (reference machine) 50, and calculates the signal value in units of bands included in pixel values corresponding to these respective colors, that is, the reference machine band-corresponding pixel value (Xbandout).

Specifically, for example, as described earlier with reference to FIGS. 3A and 3B, the signal value in units of transmitted light bands of the band pass filter is calculated as the reference machine band-corresponding pixel value (Xbandout).

Similarly, the adjustment machine band-corresponding pixel value calculation unit 72 inputs the imaging element output value Yout=(Ry, Gy, By) of the adjustment camera Y (adjustment machine) 60, and calculates the signal value in units of bands included in pixel values corresponding to these respective colors, that is, the signal value in units of transmitted light bands of the band pass filter, as the adjustment machine band-corresponding pixel value (Ybandout).

Furthermore, the adjustment machine band-corresponding pixel value calculation unit 81 in "(2) Processing at time of using camera (at time of imaging)" described with reference to FIG. 6 also inputs the imaging element output value Yout=(Ry, Gy, By) of the adjustment camera Y (adjustment machine) 60, and calculates the signal value in units of bands included in the pixel values corresponding to the respective colors, that is, the signal value in units of transmitted light bands of the band pass filter, as the adjustment machine band-corresponding pixel value (Ybandout).

Hereinafter, a description will be given of details of processing of calculating the band-corresponding pixel value from the output pixel value of the imaging element executed by the imaging device and the image processing device of the present disclosure. Note that the imaging device is a configuration example of the image processing device, and in the following description, the image processing device includes the imaging device.

The image processing device of the present disclosure acquires a narrow band signal with less noise in units of limited wavelength bands, for example, a signal of a specific band with less noise of each of R, G, B, and IR by performing signal processing on a captured image based on light transmitted through a color filter and a multiband pass filter (MBP), and calculates and applies a gain corresponding to the acquired band signal.

The gain is an adjustment parameter for matching the output of the adjustment machine with the output of the reference machine.

Figure 7:
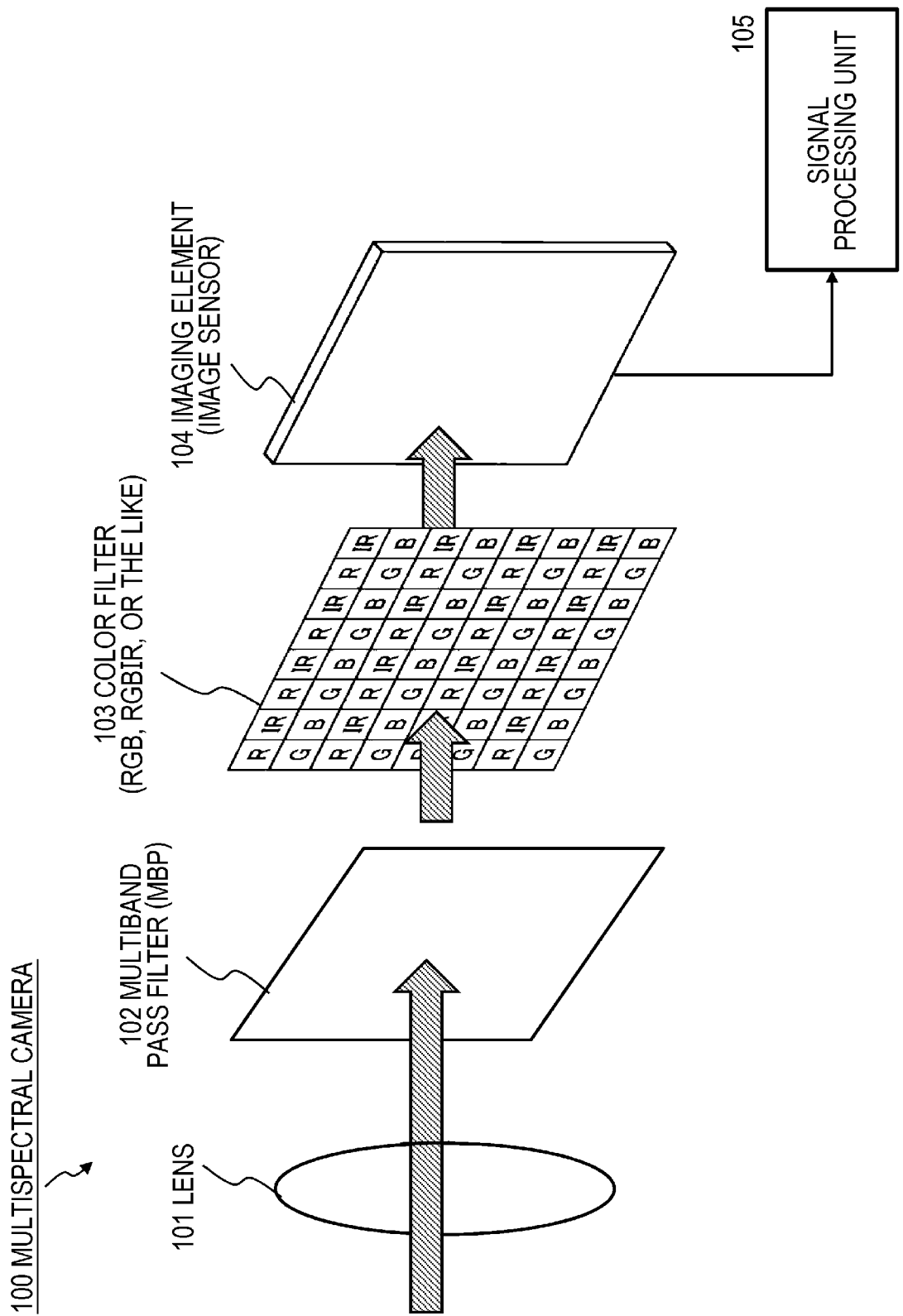
FIG. 7 is a diagram explaining a configuration example of a multispectral camera.

FIG. 7 illustrates a configuration example of a multispectral camera 100 that is an example of the image processing device of the present disclosure.

The configuration of the multispectral camera 100 illustrated in FIG. 7 corresponds to the configuration of the reference camera X (reference machine) 50 illustrated in FIG. 5 and the configuration of the adjustment camera Y (adjustment machine) 60 illustrated in FIGS. 5 and 6.

When "(1) Processing at time of manufacturing camera" described with reference to FIG. 5 is executed, the processing described with reference to FIG. 5 is executed by using the reference camera X (reference machine) 50 and the adjustment camera Y (adjustment machine) 60 having the configuration illustrated in FIG. 7.

Furthermore, when "(2) Processing at time of using camera (at time of imaging)" described with reference to FIG. 6 is executed, the processing described with reference to FIG. 6 is executed by using the adjustment camera Y (adjustment machine) 60 having the configuration illustrated in FIG. 7.

The configuration and processing of the multispectral camera 100 illustrated in FIG. 7 will be described.

In the multispectral camera 100 illustrated in FIG. 7, imaging light of a subject input through a lens 101 is input to an imaging element (image sensor) 104 through a multiband pass filter (MBP) 102 and a color filter (RGBIR color filter) 103.

Moreover, pixel values (Rraw, Graw, Braw, IRraw) of the imaging element (image sensor) 104 are input to a signal processing unit 105, and signal processing is performed.

The signal processing unit 105 removes a noise component from the pixel value (Rraw, Graw, Braw, IRraw) of the imaging element (image sensor) 104 and calculates a highly accurate value of each of the R, G, B, and IR signals, that is, a band-corresponding pixel value corresponding to each of the R, G, B, and IR bands.

Note that the signal processing unit 105 may be included in the multispectral camera 100 or may be included in an external device.

In addition to the band-corresponding pixel value calculation processing described above, the signal processing unit 105 also executes band-corresponding gain calculation processing, band-corresponding gain adjustment processing, and the like.

The band-corresponding pixel value calculation processing executed by the signal processing unit 105 corresponds to, for example, processing executed by the reference machine band-corresponding pixel value calculation unit 71 and the adjustment machine band-corresponding pixel value calculation unit 72 illustrated in FIG. 5, or the adjustment machine band-corresponding pixel value calculation unit 81 illustrated in FIG. 6.

Furthermore, the band-corresponding gain calculation processing executed by the signal processing unit 105 corresponds to, for example, processing executed by the band-corresponding gain calculation unit 73 illustrated in FIG. 5.

Furthermore, the band-corresponding gain adjustment processing executed by the signal processing unit 105 corresponds to, for example, processing executed by the band-corresponding gain adjustment unit 82 illustrated in FIG. 6.

The multiband pass filter (MBP) 102 is a filter that selectively transmits a plurality of band lights.

In the configuration illustrated in FIG. 7, the color filter (RGBIR color filter) 103 includes four types of filter regions of R, G, B, and IR, and the multiband pass filter (MBP) 102 is also an example configured as a filter that selectively transmits these four types of wavelengths of R, G, B, and IR.

An example of distribution data of light of each wavelength input to the R, G, B, and IR pixels of the imaging element 104 will be described with reference to FIG. 8.

Figure 8:
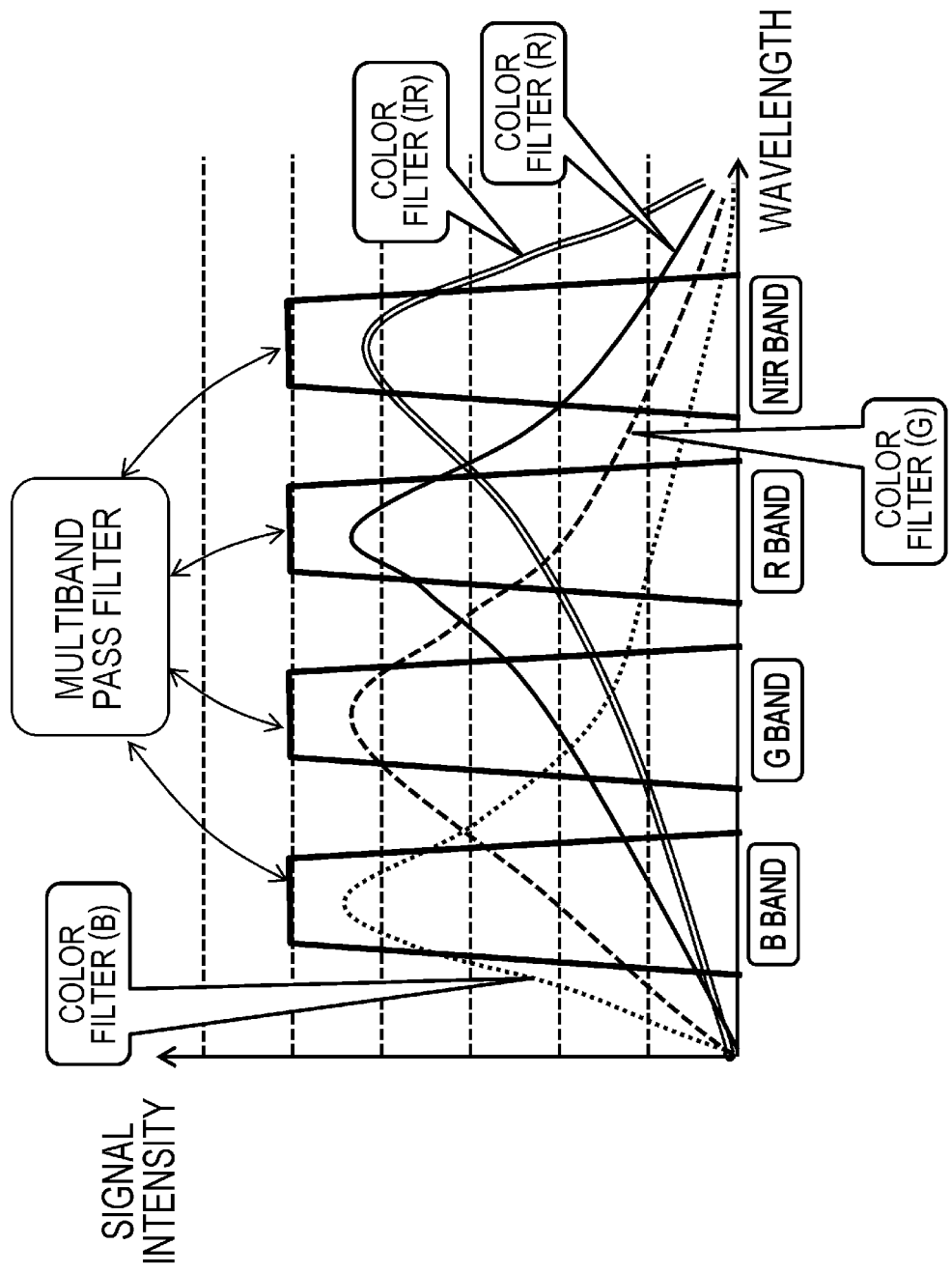
FIG. 8 is a diagram explaining spectral characteristics of a multiband pass filter (MBP) and a color filter (RGBIR color filter).

FIG. 8 is a diagram illustrating spectral characteristics of the multiband pass filter (MBP) 102 and the color filter (RGBIR color filter) 103.

The horizontal axis represents a wavelength (400 to 1000 nm), and the vertical axis represents a signal intensity (relative value) of filter transmitted light.

It can be seen that most of the light transmitted through the color filter (B) constituting the color filter (RGB color filter) 103 is a blue (B) component that is light of a wavelength in the vicinity of about 450 nm, but light of other wavelength components is also transmitted to no small extent.

Furthermore, most of the light transmitted through the color filter (G) is a green (G) component that is light of a wavelength in the vicinity of about 540 nm, but light of other wavelength components is also included.

Most of the light transmitted through the color filter (R) is a red (R) component that is light of a wavelength in the vicinity of about 650 nm, but light of other wavelength components is also included.

Similarly, most of the light transmitted through the color filter (IR) is a near infrared (NIR) component that is light of a wavelength in the vicinity of about 950 nm, but light of other wavelength components is also included.

Furthermore, the light transmitted through the multiband pass filter (MBP) 102 selectively transmits the following four types of wavelength components over the entire surface.

(1) Blue (B) component that is light of a wavelength in the vicinity of about 450 nm, (2) Green (G) component that is light of a wavelength in the vicinity of about 540 nm, (3) Red (R) component that is light of a wavelength in the vicinity of about 650 nm, (4) Near infrared (NIR) component that is light of a wavelength in the vicinity of about 900 nm, Light passing through the multiband pass filter (MBP) 102 and the red (R) filter of the color filter (RGBIR color filter) 103 is input to the R pixel of the imaging element (image sensor) 104, that is, the R pixel that is an R region transmitted light receiving pixel of the color filter 103. The pixel value on the imaging element by the input light, that is, the pixel value of the R pixel of the RAW image is set as Rraw.

Light passing through the multiband pass filter (MBP) 102 and the green (G) filter of the color filter (RGBIR color filter) 103 is input to the G pixel of the imaging element (image sensor) 104. The pixel value on the imaging element by the input light, that is, the pixel value of the G pixel of the RAW image is set as Graw.

Light passing through the multiband pass filter (MBP) 102 and the blue (B) filter of the color filter (RGBIR color filter) 103 is input to the B pixel of the imaging element (image sensor) 104. The pixel value on the imaging element by the input light, that is, the pixel value of the B pixel of the RAW image is set as Braw.

Light passing through the multiband pass filter (MBP) 102 and a near infrared (NIR) filter of the color filter (RGBIR color filter) 103 is input to an IR pixel of the imaging element (image sensor) 104. The pixel value on the imaging element by the input light, that is, the pixel value of the IR pixel of the RAW image is set as IRraw.

The RAW image pixel values of the imaging element 104: Rraw, Graw, Braw, and IRraw, each of these pixel values includes not only a narrow band signal of each of R, G, B, and IR but also noise of other wavelengths.

The signal processing unit 105 inputs the RAW image pixel values (Rraw, Graw, Braw, IRraw) of the imaging element 104, removes noise components from these pixel values, and calculates highly accurate pixel values of respective wavelengths of R, G, B, and IR, that is, band-corresponding pixel values.

A specific example of signal processing executed by the signal processing unit 105 will be described with reference to FIG. 9 and subsequent figures.

Note that, in the following description, to generalize and describe the configuration and processing of the present disclosure, the description will be given assuming that the color filter 103 is configured by an ABCD color filter that transmits four types of different wavelength signals A to D as illustrated in FIG. 9.

The ABCD color filter is a color filter including the following four types of band filters of an A band filter that mainly transmits light of a wavelength of a band A,
a B band filter that mainly transmits light of a wavelength of a band B,
a C band filter that mainly transmits light of a wavelength of a band C, and
a D band filter that mainly transmits light of a wavelength of a band D.

Note that the image processing device of the present disclosure can use various configurations as the color filter. It is possible to use a color filter of three colors of R, G, and B, a color filter of four colors of R, G, B, and IR, and various other different color filters.

Hereinafter, as a representative example, a description will be given of a configuration and a processing example in a case of using a color filter including filters that transmit four types of different wavelength bands A to D as illustrated in FIG. 9.

Figure 10:
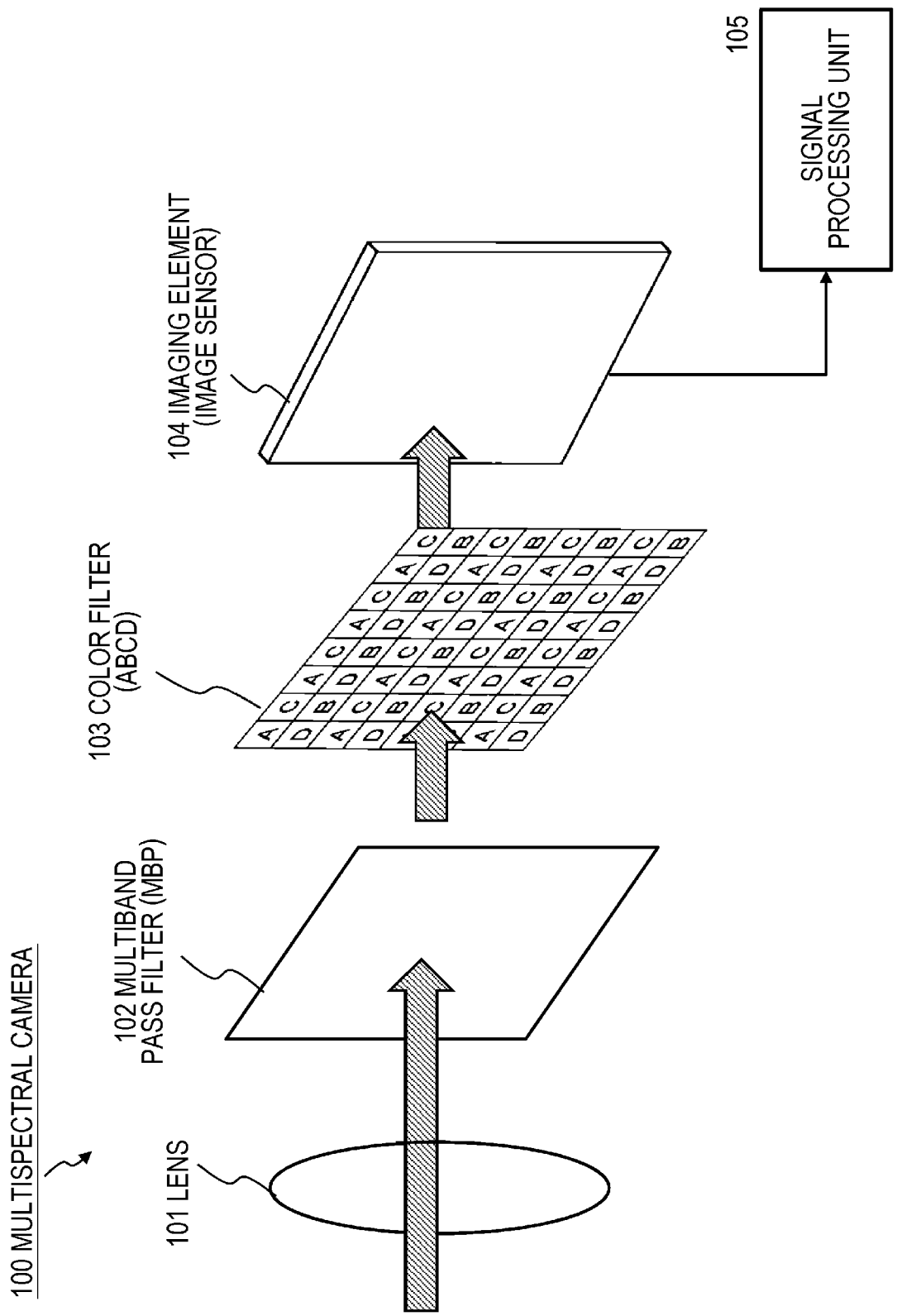
FIG. 10 is a diagram explaining a configuration example of the multispectral camera that is a configuration example of an image processing device of the present disclosure using the ABCD color filter illustrated in FIG. 9.

FIG. 10 is a diagram illustrating the multispectral camera 100 that is a configuration example of the image processing device of the present disclosure using the ABCD color filter illustrated in FIG. 9.

The multispectral camera 100 illustrated in FIG. 10 has a configuration in which the RGBIR color filter of the multispectral camera 100 described earlier with reference to FIG. 7 is replaced with an ABCD color filter including the A, B, C, and D band filters, having the configuration illustrated in FIG. 9.

The multiband pass filter (MBP) 102 is a filter that selectively transmits signals of four types of different wavelength bands corresponding to the four types of filters A to D constituting the ABCD color filter.

Similarly to FIG. 8 described earlier, FIG. 11 is a diagram illustrating spectral characteristics of the multiband pass filter (MBP) 102 and the color filter (ABCD color filter) 103.

The horizontal axis represents a wavelength (400 to 1000 nm), and the vertical axis represents a signal intensity (relative value) of filter transmitted light.

Most of the light transmitted through the color filter (A) constituting the color filter (RGB color filter) 103 is light of a wavelength in the vicinity of the band A, but light of other wavelength components is also transmitted to no small extent.

Furthermore, most of the light transmitted through the color filter (B) is light of a wavelength in the vicinity of the band B, but light of other wavelength components is also transmitted to no small extent.

Furthermore, most of the light transmitted through the color filter (C) is light of a wavelength in the vicinity of the band C but light of other wavelength components is also transmitted to no small extent.

Furthermore, most of the light transmitted through the color filter (D) is light of a wavelength in the vicinity of the band D but light of other wavelength components is also transmitted to no small extent.

Furthermore, the light transmitted through the multiband pass filter (MBP) 102 selectively transmits four types of wavelength components of the bands A to D over the entire surface.

Light passing through the multiband pass filter (MBP) 102 and the A band filter of the color filter (ABCD color filter) 103 is input to an A pixel of the imaging element (image sensor) 104, that is, the A pixel that receives light transmitted through a region A of the color filter 103. The RAW image pixel value of the A pixel is set as Araw.

Light passing through the multiband pass filter (MBP) 102 and the B band filter of the color filter (ABCD color filter) 103 is input to a B pixel of the imaging element (image sensor) 104. The RAW image pixel value of the B pixel is set as Braw.

Light passing through the multiband pass filter (MBP) 102 and the C band filter of the color filter (ABCD color filter) 103 is input to a C pixel of the imaging element (image sensor) 104. The RAW image pixel value of the C pixel is set as Craw.

Light passing through the multiband pass filter (MBP) 102 and the D band filter of the color filter (ABCD color filter) 103 is input to a D pixel of the imaging element (image sensor) 104. The RAW image pixel value of the D pixel is set as Draw.

The RAW image pixel values of the imaging element 104: Araw, Braw, Craw, and Draw, each of these pixel values includes not only a narrow band signal of each of A, B, C, and D but also noise of other wavelengths.

The signal processing unit 105 inputs the RAW image pixel values (Araw, Braw, Craw, Draw) of the imaging element 104, removes noise components from these pixel values, and calculates highly accurate pixel values of respective bands of A, B, C, and D.

Figure 11:
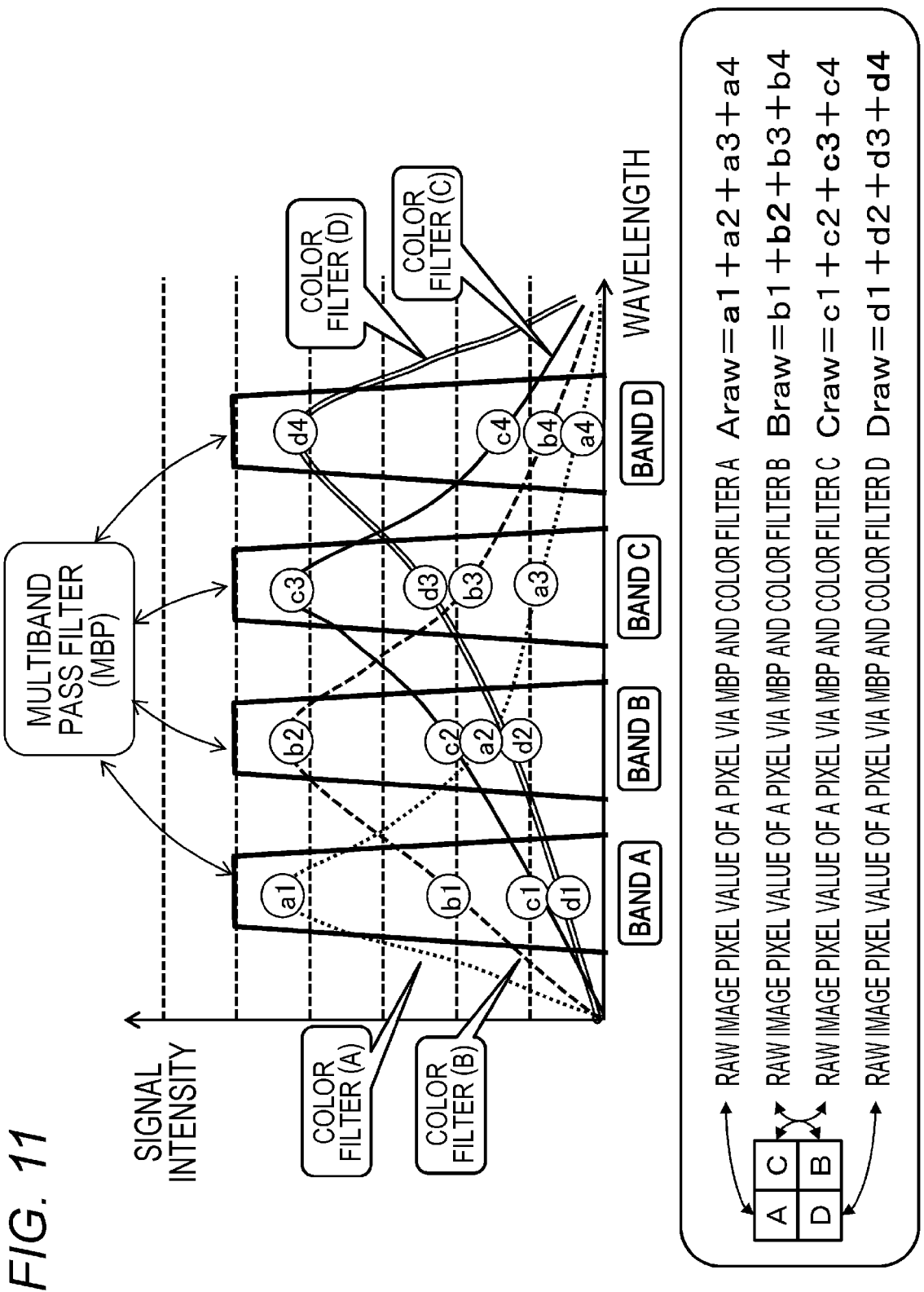
FIG. 11 is a diagram explaining spectral characteristics of the multiband pass filter (MBP) and the color filter (ABCD color filter).

In the lower part of FIG. 11, a calculation formula of the pixel values of Araw, Braw, Craw, and Draw of the imaging element 104 is shown. The RAW image pixel values of Araw, Braw, Craw, and Draw of the imaging element 104 can be calculated by the following calculation formula.

$$A\text{raw}=a1+a2+a3+a4$$

$$B\text{raw}=b1+b2+b3+b4$$

$$C\text{raw}=c1+c2+c3+c4$$

$$D\text{raw}=d1+d2+d3+d4$$

The symbols a1, b2, c3, and d4 correspond to points illustrated in the graph of FIG. 11 and correspond to the following signals.

a1=signal component of band A included in RAW image pixel value Araw,
a2=signal component of band B included in RAW image pixel value Araw,
a3=signal component of band C included in RAW image pixel value Araw,
a4=signal component of band D included in RAW image pixel value Araw,
b1=signal component of band A included in RAW image pixel value Braw,
b2=signal component of band B included in RAW image pixel value Braw,
b3=signal component of band C included in RAW image pixel value Braw,
b4=signal component of band D included in RAW image pixel value Braw,
c1=signal component of band A included in RAW image pixel value Craw,
c2=signal component of band B included in RAW image pixel value Craw,
c3=signal component of band C included in RAW image pixel value Craw,
c4=signal component of band D included in RAW image pixel value Craw,
d1=signal component of band A included in RAW image pixel value Draw, d2=signal component of band B included in RAW image pixel value Draw, d3=signal component of band C included in RAW image pixel value Draw, d4=signal component of band D included in RAW image pixel value Draw, Note that, among the signal components a1 to a4 included in the RAW image pixel value Araw of the A pixel of the imaging element 104, the signal corresponding to the band A is only a1, and the other a2, a3, and a4 correspond to noise signals.

Similarly, among the signal components b1 to b4 included in the RAW image pixel value Braw of the B pixel of the imaging element 104, the signal corresponding to the band B is only b2, and the other b1, b3, and b4 correspond to noise signals.

Similarly, among the signal components c1 to c4 included in the RAW image pixel value Craw of the C pixel of the imaging element 104, the signal corresponding to the band B is only c3, and the other c1, c2, and c4 correspond to noise signals.

Similarly, among the signal components d1 to d4 included in the RAW image pixel value Draw of the D pixel of the imaging element 104, the signal corresponding to the band D is only d4, and the other d1, d2, and d3 correspond to noise signals.

The signal processing unit 105 inputs the RAW image pixel values (Araw to Draw) including these noise components from the imaging element 104, and executes processing of calculating true band-corresponding pixel values (a1, b2, c3, d4) of the respective bands A to D from which the noise components are removed.

The processing executed by the signal processing unit 105 will be described with reference to FIG. 12 and subsequent figures.

Figure 12:
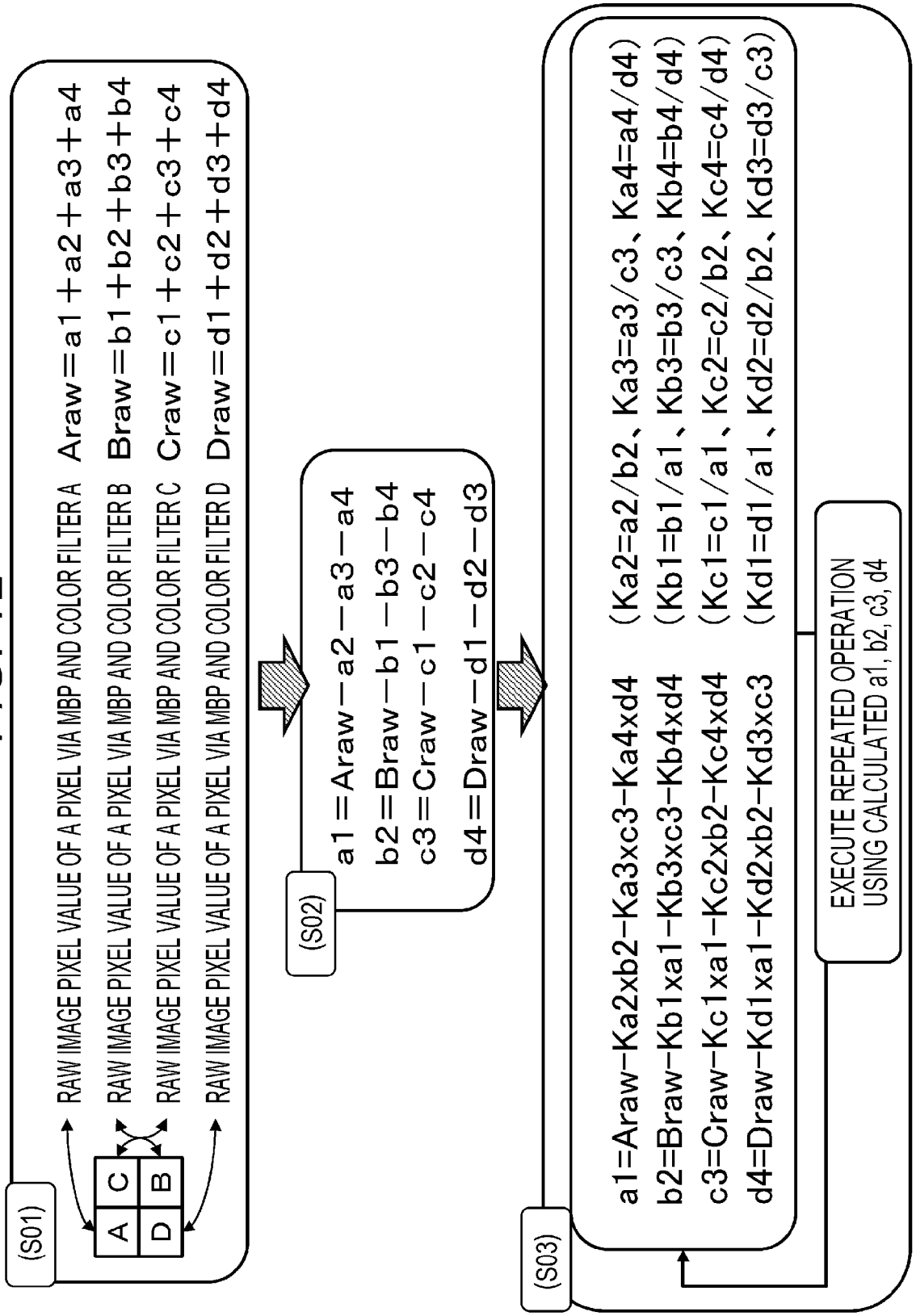
FIG. 12 is a diagram explaining processing executed by a signal processing unit.

FIG. 12 is a diagram explaining band-corresponding pixel values (a1, b2, c3, d4) calculation processing executed by the signal processing unit 105.

The signal processing unit 105 executes processing of steps S01 to S03 illustrated in FIG. 12.

(Step S01) Step S01 illustrated in FIG. 12 is processing of generating a calculation formula for RAW image-based pixel values (Araw to Draw) in pixel units based on the input pixel values from the imaging element 104 by the signal processing unit 105.

FIG. 12 (S01) illustrates a calculation formula for the RAW image-based pixel values (Araw to Draw) in units of pixels generated on the basis of the RAW image input from the imaging element 104, that is, the following RAW image-based pixel value calculation formula (Formula 21).

$$A\text{raw}=a1+a2+a3+a4$$

$$B\text{raw}=b1+b2+b3+b4$$

$$C\text{raw}=c1+c2+c3+c4$$

$$D\text{raw}=d1+d2+d3+d4 \quad \text{(Formula 21)}$$

Note that these RAW image-based pixel values (Araw to Draw) are generated in units of pixels of the imaging element, and the processing of steps Sa1 to S03 is executed in units of pixels, and the signal processing unit 105 calculates the true band-corresponding pixel values (a1, b2, c3, d4) of the respective bands A to D from which the noise components are removed in units of pixels.

The RAW image output from the imaging element 104 is a RAW image in which A, B, C, and D pixel values are set for respective pixels depending on arrangement of the ABCD color filter, and the signal processing unit 105 executes demosaic processing on this RAW image and sets the A, B, C, and D pixel values for the respective pixels of the imaging element 104. The RAW image-based pixel values (Araw to Draw) expressed in (Formula 21) described above are pixel values of one same pixel after the demosaic processing.

Note that such demosaic processing may be omitted, and the processing of steps S01 to S03 may be executed in units of predetermined pixel blocks.

For example, it is also possible to have a configuration in which 2×2 A, B, C, and D pixels of the imaging element, that is, a block of four pixels is set as one processing block, and four RAW image pixel values (Araw to Draw) of this one processing block are processed as RAW image-based pixel values (Araw to Draw) of the entire four pixels. In this case, although the resolution decreases, a similar noise reduction effect can be obtained.

(Step S02)

Next, in step S02, the signal processing unit 105 generates a formula for calculating the true band-corresponding pixel values (a1, b2, c3, d4) of the respective bands A to D in which the noise components are removed from the RAW image-based pixel values (Araw to Draw) described above.

As illustrated in FIG. 12 (S02), a calculation formula for the true band-corresponding pixel values (a1, b2, c3, d4) of the respective bands A to D is expressed by (Formula 22) below.

$$a1=A\text{raw}-a2-a3-a4$$

$$b2=B\text{raw}-b1-b3-b4$$

$$c3=C\text{raw}-c1-c2-a4$$

$$d4=D\text{raw}-d1-d2-d3 \quad \text{(Formula 22)}$$

This (Formula 22) is a formula obtained by developing the RAW image-based pixel values (Araw to Draw) calculation formula (Formula 21) shown in the (step S01) described above.

(Step S03)

Next, in step S03, the signal processing unit 105 replaces the noise component data included in the true band-corresponding pixel values (a1, b2, c3, d4) calculation formula generated in the (step S02) described above with the spectral characteristic parameters (Kan to Kdn) of the multispectral camera 100, to generate a band-corresponding pixel value calculation formula for calculating the true band-corresponding pixel values (a1, b2, c3, d4) of the respective bands A to D shown as (Formula 23) below.

$$a1=A\text{raw}-Ka2\times b2-Ka3\times c3-Ka4\times d4$$

$$b2=B\text{raw}-Kb1\times a1-Kb3\times c3-Kb4\times d4$$

$$c3=C\text{raw}-Kc1\times a1-Kc2\times b2-Kc4\times d4$$

$$d4=D\text{raw}-Kd1\times a1-Kd2\times b2-Kd3\times c3 \quad \text{(Formula 23)}$$

Note that the spectral characteristic parameters (Kan to Kdn) are camera-specific parameters, and are also called separation coefficients.

For the spectral characteristic parameters (Kan to Kdn), values measured in advance are stored in a memory. Note that the spectral characteristic parameters (Kan to Kdn) can be measured on the basis of, for example, image capturing data obtained by using a special light source, and the measurement values may be stored in a memory. Details of processing of calculating the spectral characteristic parameters (Kan to Kdn) based on the image capturing data obtained by using the special light source will be described later.

The spectral characteristic parameters (Kan to Kdn) of the multispectral camera 100 used in (Formula 23) described above are the following parameters.

$$Ka2=a2/b2$$

$$Ka3=a3/c3$$

$$Ka4=a4/d4$$

$$Kb1=b1/a1$$

$$Kb3=b3/c3$$

$$Kb4=b4/d4$$

$$Kc1=c1/a1$$

$$Kc2=c2/b2$$

$$Kc4=c4/d4$$

$$Kd1=d1/a1$$

$$Kd2=d2/b2$$

$$Kd3=d3/c3$$

For example, $Ka2=a2/b2$ is a ratio ($a2/b2$) between the transmission signal $a2$ of the filter A and the transmission signal $b2$ of the filter B in the band B region of the graph illustrated in FIG. 11.

$Ka3=a3/c3$ is a ratio ($a3/c3$) between the transmission signal $a3$ of the filter A and the transmission signal $c3$ of the filter C in the band C region of the graph illustrated in FIG. 11.

$Ka4=a4/cd$ is a ratio ($a4/d4$) between the transmission signal $a4$ of the filter A and the transmission signal $d4$ of the filter D in the band D region of the graph illustrated in FIG. 11.

$Kb1=b1/a1$ is a ratio ($b1/a1$) between the transmission signal $b1$ of the filter B and the transmission signal $a1$ of the filter A in the band A region of the graph illustrated in FIG. 11.

The same applies to others, the spectral characteristic parameters of the multispectral camera 100 are intensity ratios of the light transmitted through the plurality of different color filters constituting the color filter, in a specific band, that is, a transmitted light band of the multiband pass filter.

In the present example, the spectral characteristic parameters (Kan to Kdn) of the multispectral camera 100 are ratio data of transmission signals of the filters A to D constituting the color filter in the bands A to D.

The spectral characteristic parameters (Kan to Kdn) are camera-specific parameters and are values that can be measured in advance.

The multispectral camera 100 that is the image processing device of the present disclosure stores the spectral characteristic parameters (Kan to Kdn) of the multispectral camera 100 in a memory, and uses the parameters acquired from the memory to calculate a1, b2, c3, and d4 by substituting them into the true band-corresponding pixel values (a1, b2, c3, d4) calculation formula shown in FIG. 12 (step S03), that is, (Formula 23) that is the band-corresponding pixel value calculation formula.

$$a1=A\text{raw}-Ka2 \times b2-Ka3 \times c3-Ka4 \times d4$$

$$b2=B\text{raw}-Kb1 \times a1-Kb3 \times c3-Kb4 \times d4$$

$$c3=C\text{raw}-Kc1 \times a1-Kc2 \times b2-Kc4 \times d4$$

$$d4=D\text{raw}-Kd1 \times a1-Kd2 \times b2-Kd3 \times c3 \quad \text{(Formula 23)}$$

Note that the spectral characteristic parameters (Kan to Kdn) of the multispectral camera 100 may be acquired from, for example, an external device or an external server.

First, the signal processing unit 105 inputs the following RAW image-based pixel values (Araw to Draw) as initial values of a1, b2, c3, and d4 in the right side portion of the equation of (Formula 23) described above.

$$a1=A\text{raw}$$

$$b2=B\text{raw}$$

$$c3=C\text{raw}$$

$$d4=D\text{raw}$$

By substituting these values, an initial setting formula (Formula 24) for the band-corresponding pixel value calculation formula is generated.

$$a1=A\text{raw}-Ka2 \times B\text{raw}-Ka3 \times C\text{raw}-Ka4 \times D\text{raw}$$

$$b2=B\text{raw}-Kb1 \times A\text{raw}-Kb3 \times C\text{raw}-Kb4 \times D\text{raw}$$

$$c3=C\text{raw}-Kc1 \times A\text{raw}-Kc2 \times B\text{raw}-Kc4 \times D\text{raw}$$

$$d4=D\text{raw}-Kd1 \times A\text{raw}-Kd2 \times B\text{raw}-Kd3 \times C\text{raw} \quad \text{(Formula 24)}$$

The signal processing unit 105 further substitutes a1, b2, c3, and d4 calculated in accordance with the initial setting formula (Formula 24) described above into the right side portion of the equation of the band-corresponding pixel value calculation formula (Formula 23) described earlier to calculate new values of a1, b2, c3, and d4.

Moreover, the calculated value are substituted into the right side portion of the band-corresponding pixel value calculation formula (Formula 23) to calculate new values of a1, b2, c3, and d4.

This operation is repeated. That is, "repeated operation" is executed of repeating the iterative calculation using the band-corresponding pixel value calculation formula (Formula 23) a plurality of times.

When the iterative calculation using the band-corresponding pixel value calculation formula (Formula 23) described above is repeatedly executed a plurality of times, the values of a1, b2, c3, and d4 gradually converge.

Figure 13:
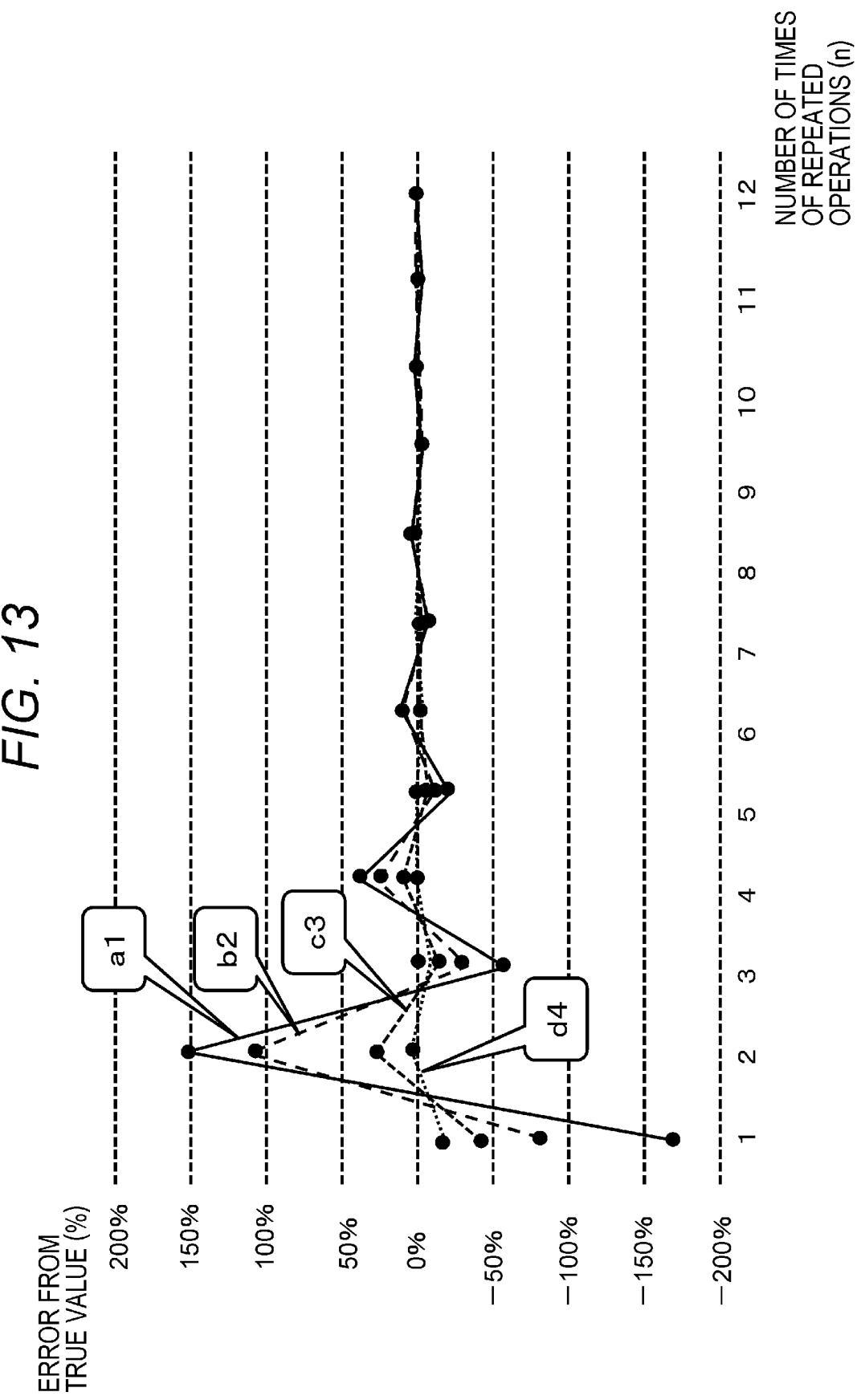
FIG. 13 is a diagram explaining an example of convergence of calculated values by iterative calculation using a band-corresponding pixel value calculation formula.

An example of convergence of a1, b2, c3, and d4 by actual iterative calculation is illustrated in FIG. 13.

FIG. 13 is a graph in which the horizontal axis represents the number of executions of calculation according to the band-corresponding pixel value calculation formula (Formula 23) described above, and the vertical axis represents an error (%) from the true value.

The graph shows transition of the values of a1, b2, c3, and d4 obtained by repeating the calculation according to (Formula 23) described above.

As understood from the graph, by executing the iterative calculation six to seven times, the values of a1, b2, c3, and d4 almost converge.

The signal processing unit 105 sets convergence values by the iterative calculation to which the band-corresponding pixel value calculation formula (Formula 23) described above is applied as the true band-corresponding pixel values (a1, b2, c3, d4) in the respective bands A to D.

As for determination whether or not the pixel values (a1, b2, c3, d4) have converged by the iterative calculation to which the band-corresponding pixel value calculation formula (Formula 23) described above is applied, it is possible to apply, for example, a method of determining that the pixel values have converged in a case where differences between calculation results of a plurality of pixel values obtained by the n-th iterative calculation and calculation results obtained by the previous (n−1)-th iterative calculation are all less than or equal to a predetermined threshold value, for example, less than or equal to 5%.

Alternatively, the number of executions of the iterative calculation may be set in advance as a specified number of times such as six times or seven times, and it may be determined that the pixel values have converged at the end of the specified number of times of iterative calculation.

The signal processing unit 105 sets the convergence values of the iterative calculation results in step S103 as the true band-corresponding pixel values (a1, b2, c3, d4) of the respective bands A to D.

By executing the processing of steps Sa1 to S03 in units of pixels, the signal processing unit 105 calculates the true band-corresponding pixel values (a1, b2, c3, d4) of the respective bands A to D in units of pixels for all the pixels constituting the imaging element.

Note that, as described above, the processing may be executed in units of predetermined pixel blocks, and the band-corresponding pixel values (a1, b2, c3, d4) may be calculated in units of blocks.

Note that the signal processing unit 105 uses the calculated true band-corresponding pixel values (a1, b2, c3, d4) of the respective bands A to D, and then performs the band-corresponding gain calculation processing or the band-corresponding gain adjustment processing.

Hereinafter, these pieces of processing will be described.

5. Band-Corresponding Gain Calculation Processing and Band-Corresponding Gain Adjustment Processing Next, a description will be given of the band-corresponding gain calculation processing and the band-corresponding gain adjustment processing.

In a case where "(1) Processing at time of manufacturing camera" described earlier with reference to FIG. 5 is executed, the band-corresponding gain calculation unit 73 calculates the true band-corresponding pixel values (a1, b2, c3, d4) of the respective bands A to D for each of the reference camera X (reference machine) 50 and the adjustment camera Y (adjustment machine) 60, and calculates a band-corresponding gain on the basis of these two sets of the band-corresponding pixel values (a1, b2, c3, d4).

Furthermore, in a case where "(2) Processing at time of using camera (at time of imaging)" described earlier with reference to FIG. 6 is executed, the band-corresponding gain adjustment unit 82 calculates the true band-corresponding pixel values (a1, b2, c3, d4) of the adjustment camera Y (adjustment machine) 60, executes gain adjustment by using the band-corresponding gain stored in the memory, and calculates the band-corresponding gain adjustment output value of the adjustment camera Y (adjustment machine) 60.

These pieces of processing by the band-corresponding gain calculation unit 73 illustrated in FIG. 5 and the band-corresponding gain adjustment unit 82 illustrated in FIG. 6 can be executed as processing by the signal processing unit 105 of the multispectral camera 100 illustrated in FIG. 10, for example.

As described earlier, the band-corresponding pixel value calculation processing, the band-corresponding gain calculation processing, and the band-corresponding gain adjustment processing may be performed by the signal processing unit inside the camera, or may be executed by an external device.

Here, a description will be given assuming that the processing is executed in the signal processing unit 105 of the multispectral camera 100 illustrated in FIG. 10, for example, in each of signal processing units of the reference camera X (reference machine) 50 and the adjustment camera Y (adjustment machine) 60.

First, a description will be given of processing executed by the band-corresponding gain calculation unit 73 of "(1) Processing at time of manufacturing camera" illustrated in FIG. 5.

The signal processing unit 105 performs processing in the band-corresponding gain calculation unit 73 illustrated in FIG. 5, that is, processing of calculating the band-corresponding gain.

As described above, the signal processing unit 105 calculates the true band-corresponding pixel values (a1, b2, c3, d4) of the respective bands A to D for each of the reference camera X (reference machine) 50 and the adjustment camera Y (adjustment machine) 60, and calculates the band-corresponding gain on the basis of these two sets of band-corresponding pixel values (a1, b2, c3, d4).

The band-corresponding gain calculated by the signal processing unit 105 is, for example, the following gain.

When the band-corresponding pixel values of the respective bands A to D of the reference camera X (reference machine) 50 are (ax1, bx2, cx3, dx4), and the band-corresponding pixel values of the respective bands A to D of the adjustment camera Y (adjustment machine) 60 are (ay1, by2, cy3, dy4), the signal processing unit 105 calculates the following band-corresponding gains.

Band-$A$-corresponding gain=$ax1/ay1$

Band-$B$-corresponding gain=$bx2/by2$

Band-$C$-corresponding gain=$cx3/cy3$

Band-$D$-corresponding gain=$dx4/dy4$

The band-corresponding gains calculated by the signal processing unit 105 (=the band-corresponding gain calculation unit 73) are stored in the memory 61 of the adjustment camera Y (adjustment machine) 60 as described earlier with reference to FIG. 5.

Next, a description will be given of processing executed by the band-corresponding gain adjustment unit 82 of "(2) Processing at time of using camera (at time of imaging)" described earlier with reference to FIG. 6.

The signal processing unit 105 of the adjustment camera Y (adjustment machine) 60 performs processing in the band-corresponding gain adjustment unit 82 illustrated in FIG. 6, that is, output value adjustment processing based on the band-corresponding gains.

The signal processing unit 105 calculates the true band-corresponding pixel values (a1, b2, c3, d4) of the adjustment camera Y (adjustment machine) 60 by the band-corresponding pixel value calculation processing described earlier, executes gain adjustment by using the band-corresponding gains stored in the memory 61, and calculates the band-corresponding gain adjustment output value of the adjustment camera Y (adjustment machine) 60.

The band-corresponding gain adjustment output value calculated by the signal processing unit 105 is, for example, the following output value.

When the band-corresponding pixel values of the respective bands A to D of the adjustment camera Y (adjustment machine) 60 are (ay1, by2, cy3, dy4), and the band-corresponding gains of the respective bands A to D stored in the memory are the band-*A*-corresponding gain=*ax*1/*ay*1, the band-*B*-corresponding gain=*bx*2/*by*2, the band-*C*-corresponding gain=*cx*3/*cy*3, and the band-*D*-corresponding gain=*dx*4/*dy*4, the signal processing unit 105 calculates the following band-corresponding gain adjustment output values.

Band-*A*-corresponding gain adjustment output value=
(*ax*1/*ay*1)×*ay*1=*ax*1

Band-*B*-corresponding gain adjustment output value=
(*bx*2/*by*2)×*by*2=*bx*2

Band-*C*-corresponding gain adjustment output
value=(*cx*3/*cy*3)×*cy*3=*cx*3

Band-*D*-corresponding gain adjustment output
value=(*dx*4/*dy*4)×*dy*4=*dx*4

By such band-corresponding gain adjustment output value calculation processing, the band-corresponding pixel value of the adjustment camera Y (adjustment machine) 60 is an output value matching the output value of the reference camera X (reference machine) 50.

Since the gain calculated by this processing is the band-corresponding gain and is not the gain corresponding to the mixed signal of the plurality of different band signals, the gain does not greatly change depending on the imaging condition (light source or subject).

Thus, even in a case where the imaging condition at the time of using the camera (at the time of imaging) is different from the imaging condition at the time of manufacturing the camera, it is possible to match the output of the adjustment machine with that of the reference machine by applying the gain calculated at the time of manufacturing the camera.

Note that, for example, in "(2) Processing at time of using camera (at time of imaging)" described earlier with reference to FIG. 6, the signal processing unit 105 further calculates the band-corresponding gain adjustment output values, and then, executes generation of a color image, analysis of color components of the subject, and the like on the basis of the calculated band-corresponding gain adjustment output values.

The analysis of the color components of the subject is, for example, processing of analyzing a normalized difference vegetation index (NDVI) that is an index value of the degree of activity of the plant described above, and the like. To calculate an NDVI of a plant imaged in an image, values of red (RED) and near infrared (NIR) contained as color components of the plant as a subject are required.

Specifically, the NDVI can be calculated in accordance with the following formula.

NDVI=(NIR−RED)/(NIR+RED)

In the formula described above, RED and NIR are intensities (pixel values) of the RED wavelength and the NIR wavelength in each pixel of the image.

Note that the generation of the color image, the analysis of the color components of the subject, and the like may be performed by the signal processing unit 105 itself, but may be executed in a data processing unit in the subsequent stage by outputting the true band-corresponding pixel values (a1, b2, c3, d4) of the respective bands A to D calculated by the signal processing unit 105 to the data processing unit.

6. Sequence of Processing Executed by Image Processing Device of Present Disclosure Next, a sequence will be described of processing executed by the image processing device of the present disclosure.

FIGS. 14A and 14B illustrate the following two processing flows.

FIG. 14A Flow of processing at time of manufacturing camera

FIG. 14B Flow of processing at time of using camera (at time of imaging)

FIG. 14A Flow of processing at time of manufacturing camera is a flow explaining a sequence of processing corresponding to "(1) Processing at time of manufacturing camera" described earlier with reference to FIG. 5.

FIG. 14B Flow of processing at time of using camera (at time of imaging) is a flow explaining a sequence of processing corresponding to "(2) Processing at time of using camera (at time of imaging)" described earlier with reference to FIG. 6.

Hereinafter, processing of each step of these flows will be described.

Note that the processing according to flowcharts illustrated in FIGS. 14A and 14B and subsequent figures can be executed in accordance with a program stored in a storage unit in an image processing device such as an imaging device or a PC. A data processing unit of the imaging device or the image processing device executes processing according to the flowcharts illustrated in FIGS. 14A and 14B and the subsequent figures in accordance with the program stored in the storage unit First, FIG. 14A Flow of processing at time of manufacturing camera will be described.

(Step S101)

First, in step S101, image capturing processing by the reference camera X (reference machine) and image capturing processing by the adjustment camera Y (adjustment machine) are executed. The image capturing is preferably executed under the same condition.

(Steps S102 and S103)

The processing steps of the next step S102 and step S103 are executed in parallel.

In step S102, a band-corresponding pixel value of the reference camera X (reference machine) is calculated, and in step S103, a band-corresponding pixel value of the adjustment camera Y (adjustment machine) is calculated.

These pieces of processing correspond to the processing described earlier with reference to FIGS. 11 to 13.

These pieces of processing are executed by the reference machine band-corresponding pixel value calculation unit 71 and the adjustment machine band-corresponding pixel value calculation unit 72 illustrated in FIG. 5. As described earlier, these processing units may be provided, for example, in the signal processing unit 105 of the reference camera X (reference machine) 50 or the adjustment camera Y (adjustment machine) 60 having the same configuration as the multispectral camera 100 illustrated in FIG. 10, or may be provided in an image processing device such as a PC outside the camera.

Note that a detailed flow of the band-corresponding pixel value calculation processing executed in steps S102 and S103 will be described later with reference to FIG. 15.

(Step S104)

Next, in step S104, a band-corresponding gain is calculated by using the band-corresponding pixel value of the reference camera X (reference machine) and the band-corresponding pixel value of the adjustment camera Y (adjustment machine).

This processing is processing executed by the band-corresponding gain calculation unit 73 illustrated in FIG. 5. As described earlier, this processing unit may be provided, for example, in the signal processing unit 105 of the multispectral camera 100 illustrated in FIG. 10, or may be provided in an image processing device such as a PC outside the camera.

The band-corresponding gain calculated is, for example, the following gain.

When the band-corresponding pixel values of the respective bands A to D of the reference camera X (reference machine) 50 are (ax1, bx2, cx3, dx4), and the band-corresponding pixel values of the respective bands A to D of the adjustment camera Y (adjustment machine) 60 are (ay1, by2, cy3, dy4), the signal processing unit 105 calculates the following band-corresponding gains.

Band-$A$-corresponding gain=$ax1/ay1$

Band-$B$-corresponding gain=$bx2/by2$

Band-$C$-corresponding gain=$cx3/cy3$

Band-$D$-corresponding gain=$dx4/dy4$ (Step S105)

Finally, in step S105, the band-corresponding gains calculated in step S104 are stored in the memory of the adjustment camera Y (adjustment machine).

Note that, as described earlier with reference to FIG. 5, the reference machine band-corresponding pixel value calculated on the basis of the captured image by the reference camera X (reference machine) is used for the processing of calculating the band-corresponding gains of a large number of adjustment cameras Y (adjustment machines). Thus, the reference machine band-corresponding pixel value calculated in step S102 may be stored in, for example, a memory of the reference camera X (reference machine) or a memory of an external device, and this memory-stored data may be applied to the band-corresponding gain calculation processing for the subsequent other adjustment cameras Y (adjustment machines).

In this case, in a case where processing is performed on the second and subsequent adjustment cameras (adjustment machines), it becomes possible to perform processing in which image capturing is performed only by the adjustment camera Y (adjustment machine) in step S101, the processing in step S102 is omitted, and the reference machine band-corresponding pixel values stored in the memory are read and the band-corresponding gains of the adjustment machine are calculated in step S104.

Next, FIG. 14B Flow of processing at time of using camera (at time of imaging) will be described.

(Step S121)

First, in step S121, image capturing processing by the adjustment camera Y (adjustment machine) is executed.

(Step S122)

Next, in step S122, a band-corresponding pixel value of the adjustment camera Y (adjustment machine) is calculated.

This processing corresponds to the processing described earlier with reference to FIGS. 11 to 13.

This processing is processing executed by the adjustment machine band-corresponding pixel value calculation unit 81 illustrated in FIG. 6. As described earlier, this processing unit may be provided, for example, in the signal processing unit 105 of the adjustment camera Y (adjustment machine) 60 having a configuration similar to the multispectral camera 100 illustrated in FIG. 10, or may be provided in an image processing device such as a PC outside the camera.

Note that a detailed flow of the band-corresponding pixel value calculation processing executed in step S122 will be described later with reference to FIG. 15.

(Step S123)

Next, in step S123, the band-corresponding pixel value calculated in step S122 is multiplied by the band-corresponding gain stored in the memory, whereby the band-corresponding gain adjustment output value is calculated.

This processing is processing executed by the band-corresponding gain adjustment unit 82 illustrated in FIG. 6. As described earlier, this processing unit may be provided, for example, in the signal processing unit 105 of the multispectral camera 100 illustrated in FIG. 10, or may be provided in an image processing device such as a PC outside the camera.

The band-corresponding gain adjustment output value calculated is, for example, the following output value.

When the band-corresponding pixel values of the respective bands A to D of the adjustment camera Y (adjustment machine) 60 are (ay1, by2, cy3, dy4), and the band-corresponding gains of the respective bands A to D stored in the memory are the band-$A$-corresponding gain=$ax1/ay1$, the band-$B$-corresponding gain=$bx2/by2$, the band-$C$-corresponding gain=$cx3/cy3$, and the band-$D$-corresponding gain=$dx4/dy4$, the signal processing unit 105 calculates the following band-corresponding gain adjustment output values.

Band-$A$-corresponding gain adjustment output value= $(ax1/ay1) \times ay1 = ax1$ Band-$B$-corresponding gain adjustment output value= $(bx2/by2) \times by2 = bx2$ Band-$C$-corresponding gain adjustment output value=$(cx3/cy3) \times cy3 = cx3$ Band-$D$-corresponding gain adjustment output value=$(dx4/dy4) \times dy4 = dx4$ By such band-corresponding gain adjustment output value calculation processing, the band-corresponding pixel value of the adjustment camera Y (adjustment machine) 60 is an output value matching the output value of the reference camera X (reference machine) 50.

Since the gain calculated by this processing is the band-corresponding gain and is not the gain corresponding to the mixed signal of the plurality of different band signals, the gain does not greatly change depending on the imaging condition (light source or subject).

Thus, even in a case where the imaging condition at the time of using the camera (at the time of imaging) is different from the imaging condition at the time of manufacturing the camera, it is possible to match the output of the adjustment machine with that of the reference machine by applying the gain calculated at the time of manufacturing the camera.

(Step S124)

Moreover, in step S124, generation of a color image, analysis of color components of a subject, and the like are executed on the basis of the band-corresponding gain adjustment output values calculated in step S123.

Specifically, processing of calculating the activation index value of the plant and the like are executed.

Next, a detailed sequence of the band-corresponding pixel value calculation processing executed in steps S102, S103, and S122 of the flow illustrated in FIGS. 14A and 14B will be described with reference to the flow illustrated in FIG. 15.

Hereinafter, processing of each step of the flow will be sequentially described.

(Step S201) The processing of step S201 is executed after the processing of steps S101 and S121 of the flow of FIGS. 14A and 14B, that is, executed after the image capturing by the multispectral camera.

In step S201, the signal processing unit 105 of the image processing device generates a band-corresponding pixel value calculation formula for calculating true pixel values (a1, b2, c3, d4) corresponding to respective bands (wavelengths) by using the RAW image-based pixel values (Araw to Draw) in units of pixels generated by the demosaic processing based on the RAW image input from the imaging element (image sensor) 104 and the spectral characteristic parameters (Kan to Kdn) of the camera.

Note that the processing in steps S201 to S205 is executed in units of pixels.

In step S201, the signal processing unit 105 of the image processing device generates the band-corresponding pixel value calculation formula for a processing target pixel, that is, the band-corresponding pixel value calculation formula (Formula 23) described earlier shown below.

$$a1 = A\text{raw} - Ka2 \times b2 - Ka3 \times c3 - Ka4 \times d4$$

$$b2 = B\text{raw} - Kb1 \times a1 - Kb3 \times c3 - Kb4 \times d4$$

$$c3 = C\text{raw} - Kc1 \times a1 - Kc2 \times b2 - Kc4 \times d4$$

$$d4 = D\text{raw} - Kd1 \times a1 - Kd2 \times b2 - Kd3 \times c3 \quad \text{(Formula 23)}$$

(Step S202)

Next, in step S202, the image processing device executes iterative calculation processing using the band-corresponding pixel value calculation formula generated in step S201.

That is, first, the following RAW image-based pixel values (Araw to Draw) are input as initial values of a1, b2, c3, and d4 in the right side portion of the equation of (Formula 23) described above.

$$a1 = A\text{raw}$$

$$b2 = B\text{raw}$$

$$c3 = C\text{raw}$$

$$d4 = D\text{raw}$$

By substituting these values, an initial setting formula (Formula 24) for the band-corresponding pixel value calculation formula is generated.

$$a1 = A\text{raw} - Ka2 \times B\text{raw} - Ka3 \times C\text{raw} - Ka4 \times D\text{raw}$$

$$b2 = B\text{raw} - Kb1 \times A\text{raw} - Kb3 \times C\text{raw} - Kb4 \times D\text{raw}$$

$$c3 = C\text{raw} - Kc1 \times A\text{raw} - Kc2 \times B\text{raw} - Kc4 \times D\text{raw}$$

$$d4 = D\text{raw} - Kd1 \times A\text{raw} - Kd2 \times B\text{raw} - Kd3 \times C\text{raw} \quad \text{(Formula 24)}$$

The signal processing unit 105 further substitutes a1, b2, c3, and d4 calculated in accordance with the initial setting formula (Formula 24) described above into the right side portion of the equation of the band-corresponding pixel value calculation formula (Formula 23) described above to calculate new values of a1, b2, c3, and d4. Moreover, the calculated value are substituted into the right side portion of the band-corresponding pixel value calculation formula (Formula 23) to calculate new values of a1, b2, c3, and d4. This iterative calculation is repeatedly executed.

As described earlier with reference to FIG. 13, when the iterative calculation using the band-corresponding pixel value calculation formula (Formula 23) described above is repeatedly executed a plurality of times, the values of a1, b2, c3, and d4 gradually converge.

(Step S203)

In step S203, the image processing device determines whether or not the band-corresponding pixel values (a1, b2, c3, d4) calculated by using the band-corresponding pixel value calculation formula have converged.

Note that, as for determination whether or not the band-corresponding pixel values (a1, b2, c3, d4) have converged by the iterative calculation to which the band-corresponding pixel value calculation formula (Formula 23) described above is applied, as described above, it is possible to apply, for example, a method of determining that the pixel values have converged in a case where differences between calculation results of a plurality of pixel values obtained by the n-th iterative calculation and calculation results obtained by the previous (n−1)-th iterative calculation are all less than or equal to a predetermined threshold value, for example, less than or equal to 5%.

Alternatively, the number of executions of the iterative calculation may be set to six times, seven times, or the like to be determined in advance as a specified number of times, and it may be determined that the pixel values have converged at the time when the specified number of times of iterative calculation ends.

In a case where it is determined in step S203 that the band-corresponding pixel values (a1, b2, c3, d4) have not converged, the processing returns to step S202 and the iterative calculation is repeated. On the other hand, in a case where it is determined that the band-corresponding pixel values (a1, b2, c3, d4) have converged, the processing proceeds to step S204.

(Step S204)

In a case where it is determined in step S203 that the band-corresponding pixel values (a1, b2, c3, d4) have converged, the processing proceeds to step S204.

In step S204, the signal processing unit 105 of the image processing device sets the converged band-corresponding pixel values (a1, b2, c3, d4) as the pixel values of the processing target pixel.

(Step S205)

Next, in step S205, the signal processing unit 105 of the image processing device determines whether or not the calculation of the band-corresponding pixel values (a1, b2, c3, d4) for all the pixels of the imaging element is completed.

In a case where there is a pixel for which the calculation of the band-corresponding pixel values (a1, b2, c3, d4) is not completed, the processing returns to step S201, and the processing of steps S201 to S205 is executed for the unprocessed pixel.

In a case where it is determined that the calculation of the band-corresponding pixel values (a1, b2, c3, d4) of all the pixels is completed, the band-corresponding pixel value calculation processing is ended, and the processing proceeds to the next step, that is, step S104 or step S123 of the flow illustrated in FIGS. 14A and 14B.

Note that, in the above description, it has been described that calculation processing for the band-corresponding pixel values (a1, b2, c3, d4) by iterative calculation of the band-corresponding pixel value calculation formula is executed in units of pixels; however, as described above, the calculation processing may be executed in units of predetermined pixel blocks.

As described with reference to the flow, the image processing device of the present disclosure, for example, the multispectral camera illustrated in FIGS. 7 and 10 generates the band-corresponding pixel value calculation formula (Formula 23) for calculating the true pixel values (a1, b2, c3, d4) corresponding to the respective bands (wavelengths) by using the RAW image-based pixel values (Araw to Draw) set in units of pixels on the basis of the pixel values of the RAW image captured through the multiband pass filter and the color filter and the spectral characteristic parameters (Kan to Kdn) of the camera, and calculates the true pixel values (a1, b2, c3, d4) corresponding to the bands by iterative calculation using the band-corresponding pixel value calculation formula.

Note that, as a method of iterative calculation using the band-corresponding pixel value calculation formula, there is a plurality of different methods.

Two methods of iterative calculation will be described with reference to FIGS. 16 and 17.

Figure 15:
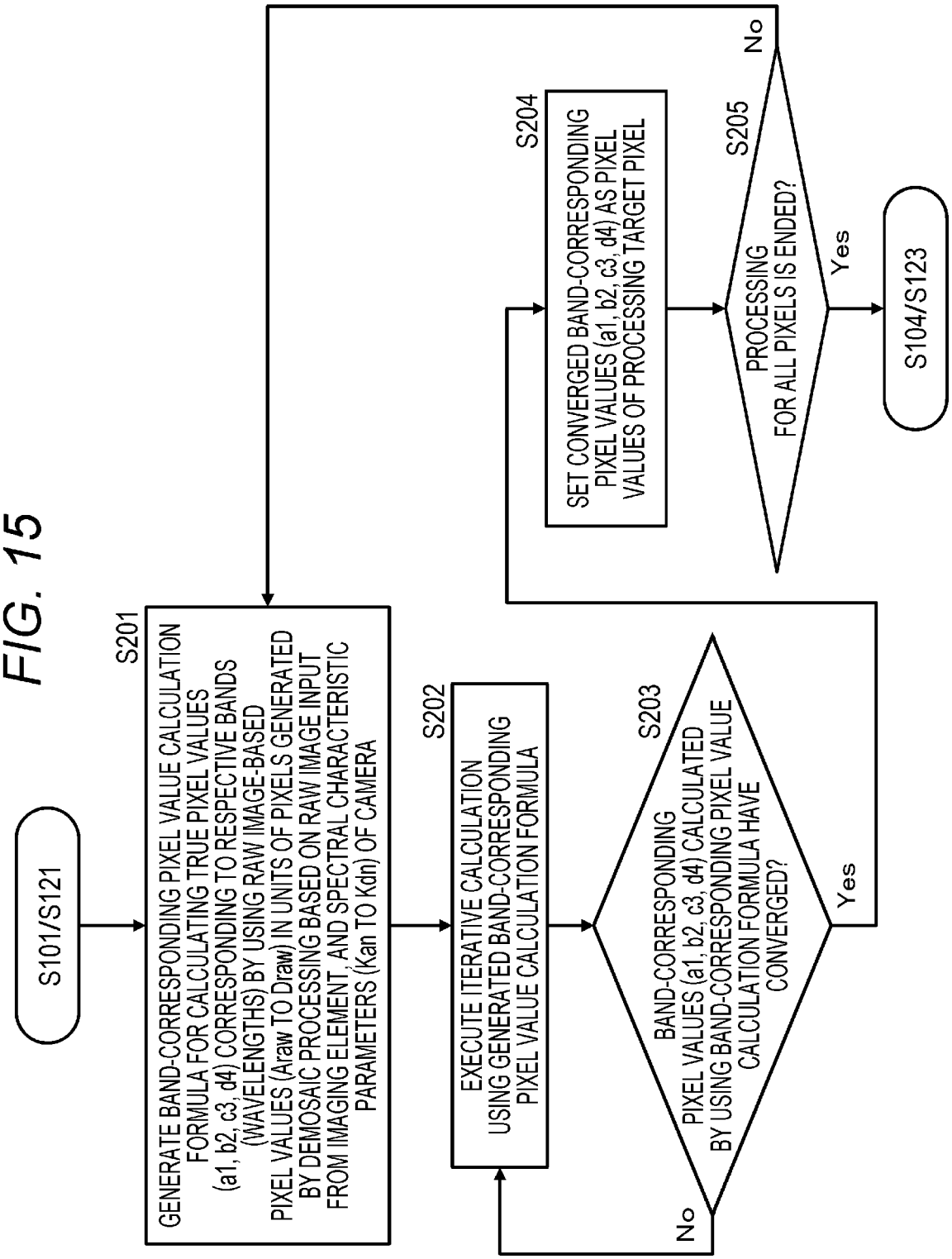
FIG. 15 is a diagram illustrating a flowchart explaining a sequence of processing executed by the image processing device of the present disclosure.
Figure 16:
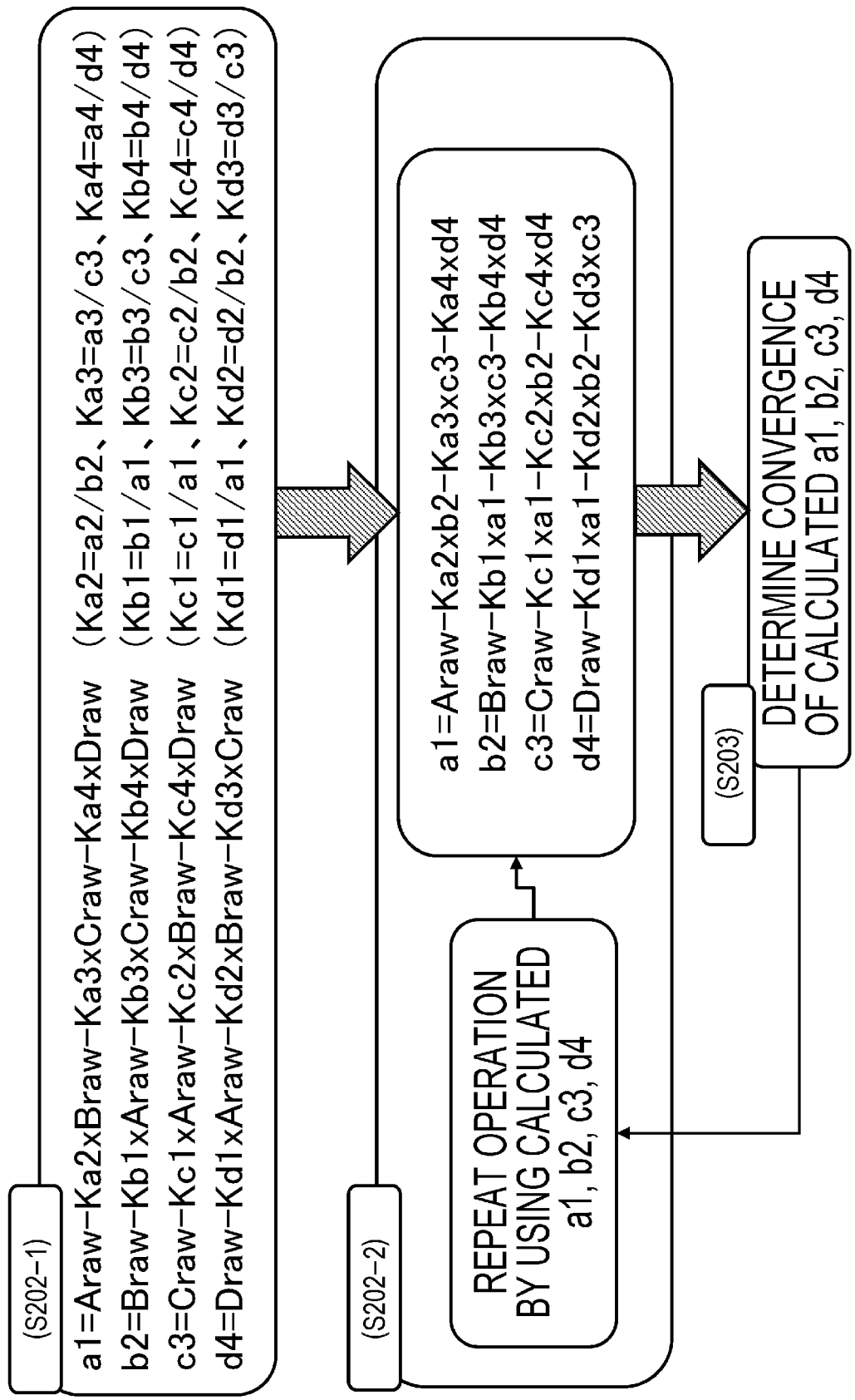
FIG. 16 is a diagram explaining a method of iterative calculation using the band-corresponding pixel value calculation formula.

FIG. 16 illustrates processing similar to the processing described in accordance with the flow illustrated in FIG. 15 described above.

FIG. 16 is a diagram explaining in detail the iterative calculation of the band-corresponding pixel value calculation formula executed in step S202 illustrated in FIG. 15.

In step S202-1, the RAW image-based pixel values (Araw to Draw) are input as the initial values of a1, b2, c3, and d4 in the right side portion of the equation of the band-corresponding pixel value calculation formula (Formula 23) described earlier, and the initial setting formula (Formula 24) of the following band-corresponding pixel value calculation formula is generated.

$a1 = A\text{raw} - Ka2 \times B\text{raw} - Ka3 \times C\text{raw} - Ka4 \times D\text{raw}$ $b2 = B\text{raw} - Kb1 \times A\text{raw} - Kb3 \times C\text{raw} - Kb4 \times D\text{raw}$ $c3 = C\text{raw} - Kc1 \times A\text{raw} - Kc2 \times B\text{raw} - Kc4 \times D\text{raw}$ $d4 = D\text{raw} - Kd1 \times A\text{raw} - Kd2 \times B\text{raw} - Kd3 \times C\text{raw}$ (Formula 24)

Next, in step S202-2, a1, b2, c3, and d4 calculated in accordance with the initial setting formula (Formula 24) described above are substituted into the right side portion of the equation of the band-corresponding pixel value calculation formula (Formula 23), that is, $a1 = A\text{raw} - Ka2 \times b2 - Ka3 \times c3 - Ka4 \times d4$ $b2 = B\text{raw} - Kb1 \times a1 - Kb3 \times c3 - Kb4 \times d4$ $c3 = C\text{raw} - Kc1 \times a1 - Kc2 \times b2 - Kc4 \times d4$ $d4 = D\text{raw} - Kd1 \times a1 - Kd2 \times b2 - Kd3 \times c3$ (Formula 23), to calculate new values of a1, b2, c3, and d4.

Moreover, the calculated value are substituted into the right side portion of the band-corresponding pixel value calculation formula (Formula 23) to calculate new values of a1, b2, c3, and d4. This iterative calculation is repeatedly executed.

When the iterative calculation using the band-corresponding pixel value calculation formula (Formula 23) described above is repeatedly executed a plurality of times, the values of a1, b2, c3, and d4 gradually converge.

A method different from such a method of processing the iterative calculation will be described with reference to FIG. 17.

Figure 17:
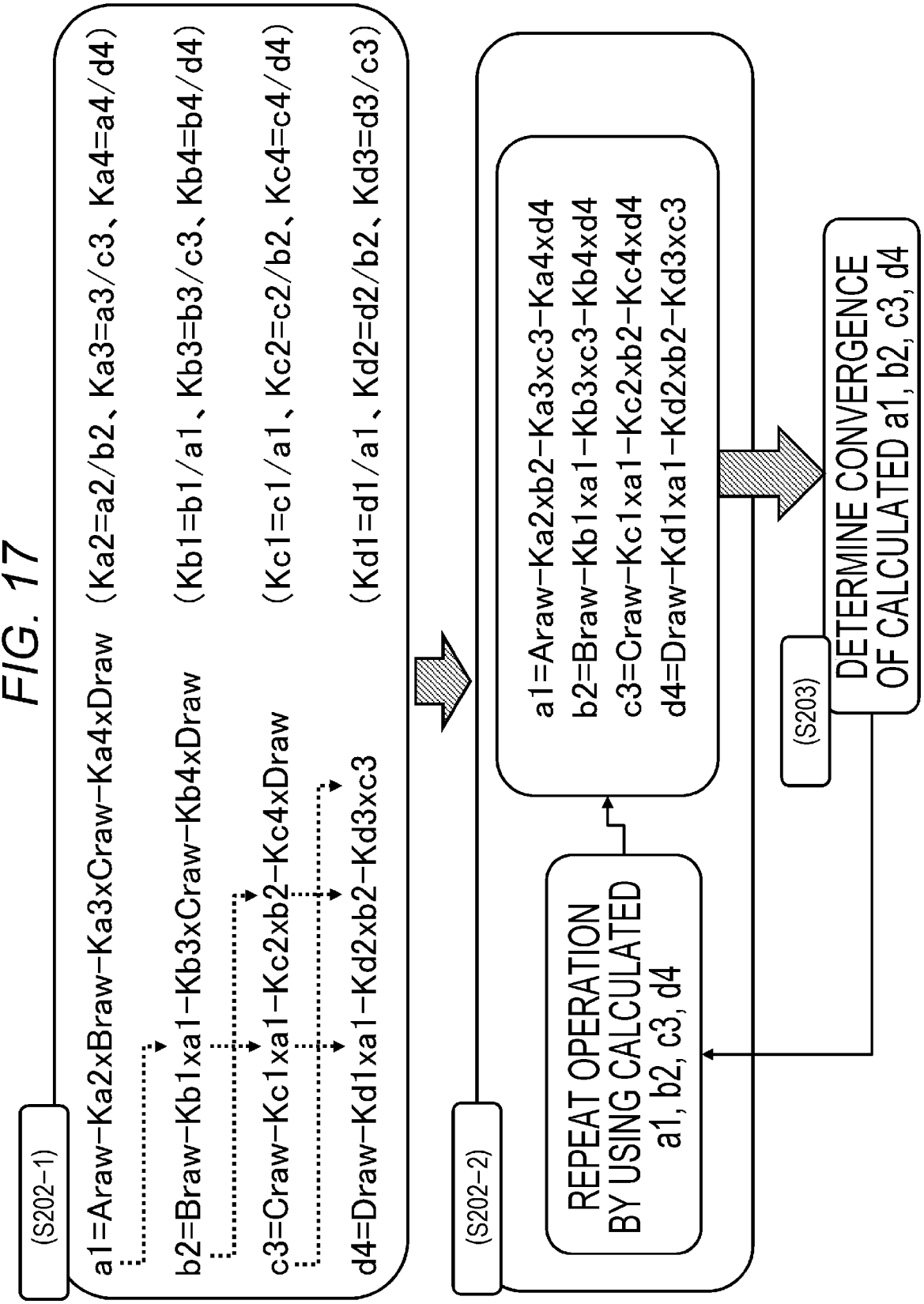
FIG. 17 is a diagram explaining the method of iterative calculation using the band-corresponding pixel value calculation formula.

FIG. 17 is also a diagram explaining in detail the iterative calculation of the band-corresponding pixel value calculation formula that can be executed in step S202 illustrated in FIG. 15.

In step S202-1 illustrated in FIG. 17, first, a1 is calculated by using the following formula (Formula 24-1), an a1 calculation formula of the initial setting formula (Formula 24) of the above-described band-corresponding pixel value calculation formula, $a1 = A\text{raw} - Ka2 \times B\text{raw} - Ka3 \times C\text{raw} - Ka4 \times D\text{raw}$ (Formula 24-a).

Next, b2 is calculated by using the following formula (Formula 24-3)

$b2 = B\text{raw} - Kb1 \times a1 - Kb3 \times C\text{raw} - Kb4 \times D\text{raw}$ (Equation 24-3), which is a formula obtained by replacing Araw in the following formula (formula 24-2) with a1 calculated by (formula 24-1), $b2 = B\text{raw} - Kb1 \times A\text{raw} - Kb3 \times C\text{raw} - Kb4 \times D\text{raw}$ (Equation 24-2), which is a b2 calculation formula of the initial setting formula (Formula 24) of the band-corresponding pixel value calculation formula.

Next, c3 is calculated by using the following formula (Formula 24-5)

$c3 = C\text{raw} - Kc1 \times a1 - Kc2 \times b2 - Kc4 \times D\text{raw}$ (Equation 24-5), which is a formula obtained by replacing Araw and Braw in the following formula (Formula 24-4) with a1 and b2 calculated by (Formula 24-1) and (Formula 24-3)

$c3 = C\text{raw} - Kc1 \times A\text{raw} - Kc2 \times B\text{raw} - Kc4 \times D\text{raw}$ (Equation 24-4), which is a c3 calculation formula of the initial setting formula (Formula 24) of the band-corresponding pixel value calculation formula.

Next, d4 is calculated by using the following formula (Formula 24-7)

$d4 = D\text{raw} - Kd1 \times Aa1 - Kd2 \times b2 - Kd3 \times c3$ (Formula 24-7), which is a formula obtained by replacing Araw, Braw, and Craw in the following formula (Formula 24-6) with a1, b2, and c3 calculated by (Formula 24-1), (Formula 24-3), and (Formula 24-5)

$d4 = D\text{raw} - Kd1 \times A\text{raw} - Kd2 \times B\text{raw} - Kd3 \times C\text{raw}$ (Formula 24-6), which is a d4 calculation formula of the initial setting formula (Formula 24) of the band-corresponding pixel value calculation formula.

Next, in step S202-2, a1, b2, c3, and d4 calculated in step S202-1 described above are substituted into the right side portion of the equation of the band-corresponding pixel value calculation formula (Formula 23), that is, $a1 = A\text{raw} - Ka2 \times b2 - Ka3 \times c3 - Ka4 \times d4$ $b2 = B\text{raw} - Kb1 \times a1 - Kb3 \times c3 - Kb4 \times d4$ $$c3 = Craw - Kc1 \times a1 - Kc2 \times b2 - Kc4 \times d4$$

$$d4 = Draw - Kd1 \times a1 - Kd2 \times b2 - Kd3 \times c3 \quad \text{(Formula 23)}$$

to calculate new values of a1, b2, c3, and d4.

Moreover, the calculated value are substituted into the right side portion of the band-corresponding pixel value calculation formula (Formula 23) to calculate new values of a1, b2, c3, and d4. This iterative calculation is repeatedly executed.

When the iterative calculation using the band-corresponding pixel value calculation formula (Formula 23) described above is repeatedly executed a plurality of times, the values of a1, b2, c3, and d4 gradually converge.

In the method illustrated in FIG. 17, processing is executed of substituting a value calculated by using one of a plurality of formulas constituting the initial setting formula (Formula 24) of the band-corresponding pixel value calculation formula into other formulas of the initial setting formula. Such processing is performed, whereby the pixel values converge more quickly, and the number of operations is reduced.

7. Configuration and Processing Example of Executing Band-Corresponding Gain Calculation Processing at Time of Using Camera Next, a description will be given of a configuration and a processing example of executing the band-corresponding gain calculation processing at the time of using the camera In the description with reference to FIGS. 5, 6, 7, 8, 9, 10, 11, 12, 13, 14A, and 14B, for example, as illustrated in FIG. 5 and the flow of FIGS. 14A and 14B, the band-corresponding gain calculation processing has been described as being executed at the time of manufacturing the camera.

However, the band-corresponding gain calculation processing may be executed at the time of using the camera.

Hereinafter, a description will be given of a configuration and a processing example of executing the band-corresponding gain calculation processing at the time of using the camera.

Figure 18:
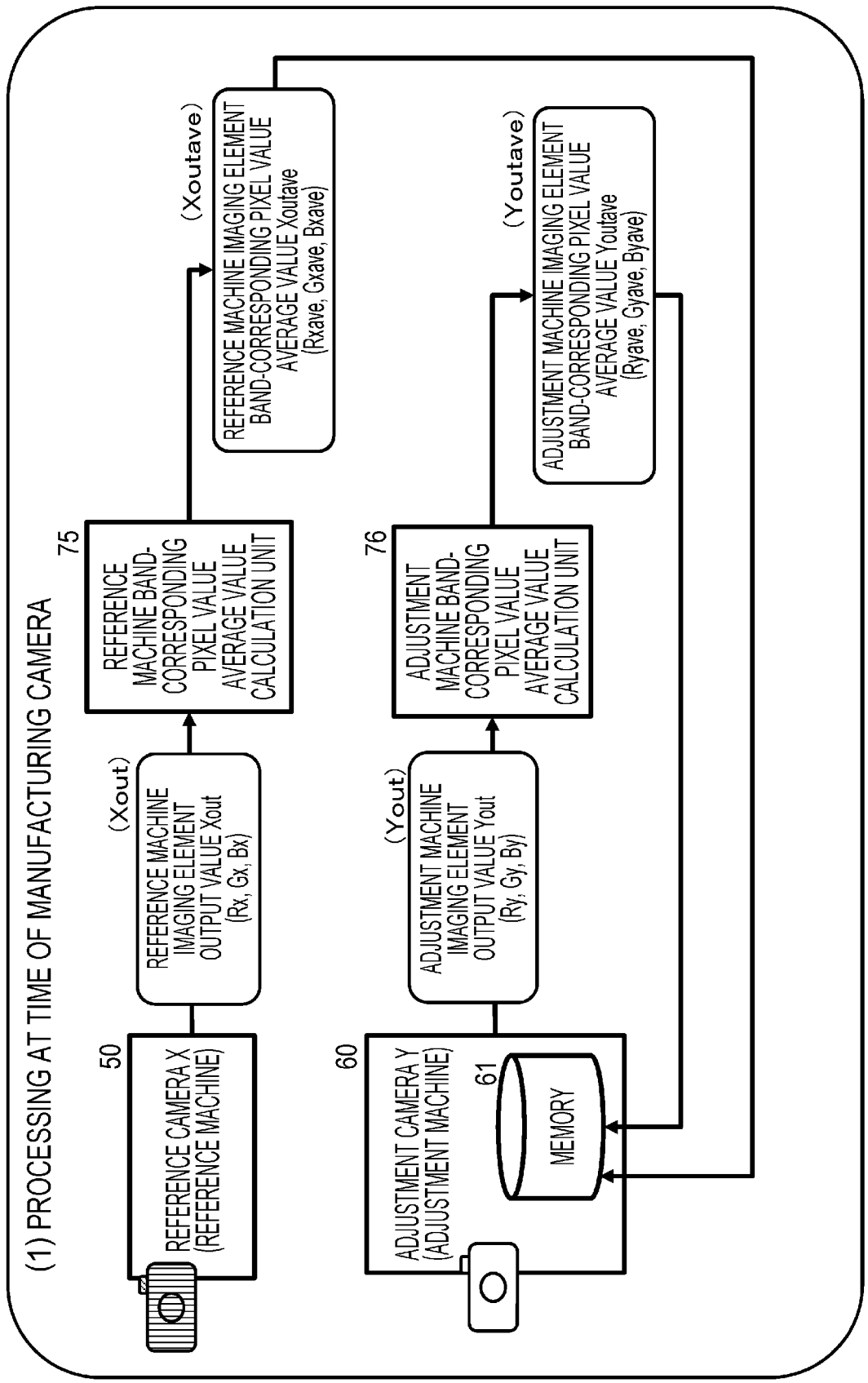
FIG. 18 is a diagram explaining an adjustment example of output variation of the imaging device by the processing of the present disclosure.
Figure 19:
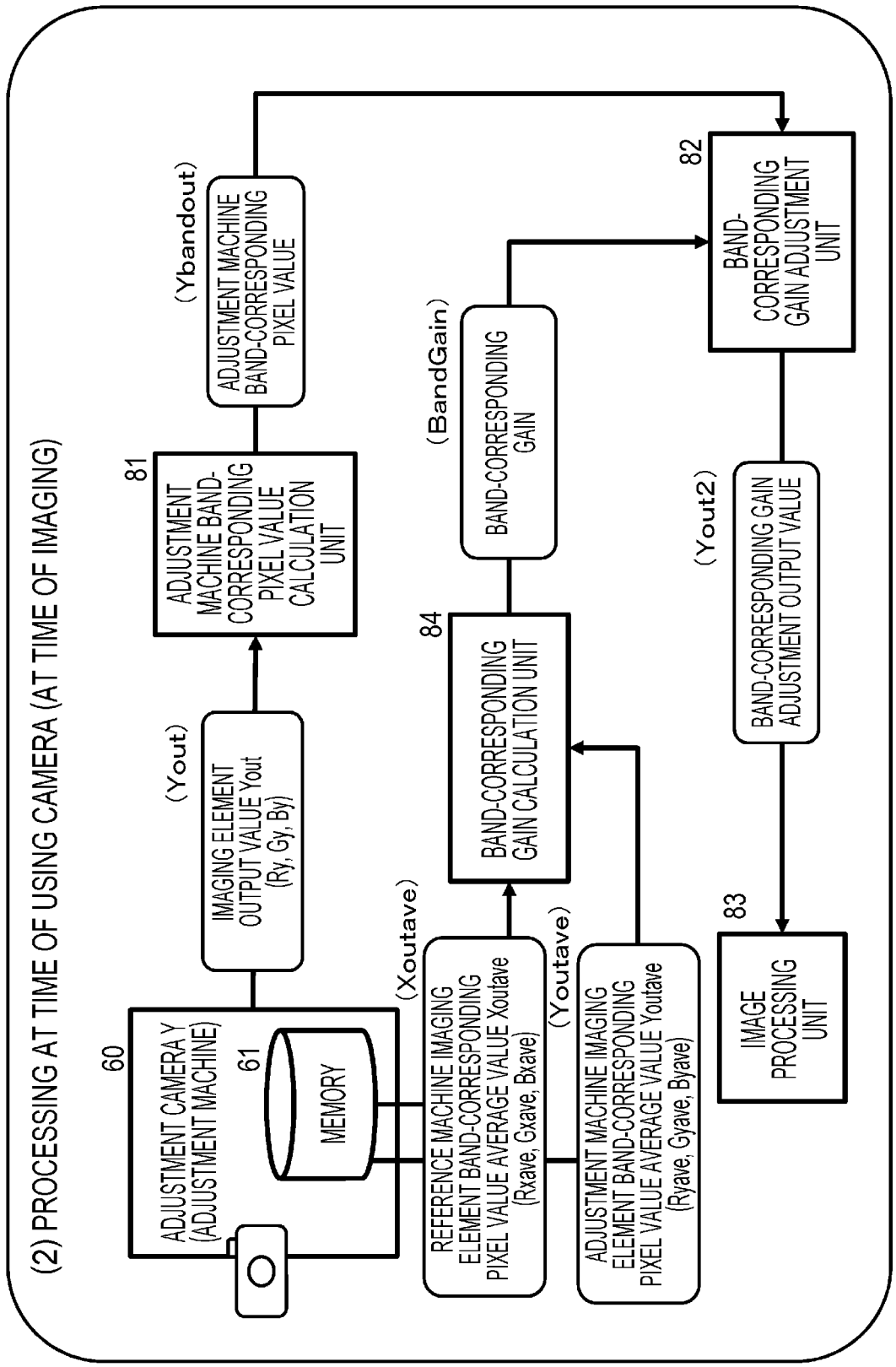
FIG. 19 is a diagram explaining an adjustment example of output variation of the imaging device by the processing of the present disclosure.

FIGS. 18 and 19 illustrate the following two diagrams, as described earlier with reference to FIGS. 5 and 6.

(1) Processing at time of manufacturing camera (2) Processing at time of using camera (at time of imaging)

First, "(1) Processing at time of manufacturing camera" of the present disclosure will be described with reference to FIG. 18.

This processing is a diagram explaining processing of storing the following values used for calculating a gain for making an output value of each camera uniform in the memory 61 of the adjustment camera Y (adjustment machine) 60 in a case where multispectral cameras are mass-produced in a camera manufacturing factory, for example.

(a) Reference machine imaging element band-corresponding pixel value average value (Xoutave) calculated from pixel values of reference camera X (reference machine) 50

(b) Adjustment machine imaging element band-corresponding pixel value average value (Youtave) calculated from pixel values of adjustment camera Y (adjustment machine) 60

The reference camera X (reference machine) 50 is one reference camera. The adjustment camera Y (adjustment machine) 120 is a camera manufactured and sold.

As output adjustment parameters for matching the output of the adjustment camera Y (adjustment machine) 60 with the output of the reference camera X (reference machine) 50, the above-described values used to calculate the gains corresponding bands included in the respective colors, that is, (a) reference machine imaging element band-corresponding pixel value average value (Xoutave) calculated from pixel values of reference camera X (reference machine) 50

(b) adjustment machine imaging element band-corresponding pixel value average value (Youtave) calculated from pixel values of adjustment camera Y (adjustment machine) 60 are calculated and stored in the memory 61 of the adjustment camera Y (adjustment machine) 60.

The same subject is imaged by the reference camera X (reference machine) 50 and the adjustment camera Y (adjustment machine) 60, and respective imaging element output values are acquired. Each of the cameras is provided with a filter and an imaging element, and characteristics of these do not completely match, so that there is a difference between output values of the respective cameras.

The imaging element output value Xout of the reference camera X (reference machine) 50 is set as $$Xout = (Rx, Gx, Bx).$$

The imaging element output value Yout of the adjustment camera Y (adjustment machine) 60 is set as $$Yout = (Ry, Gy, By).$$

Pixel values of Xout and Yout are different values due to an individual difference of each camera, particularly, a difference between characteristics of the color filters.

A reference machine band-corresponding pixel value average value calculation unit 75 illustrated in FIG. 18 inputs the imaging element output value Xout=(Rx, Gx, Bx) of the reference camera X (reference machine) 50, calculates an average value of all pixel values of the same color (each band) of the constituent pixels of the imaging element, and stores the average value in the memory 61 of the adjustment camera Y (adjustment machine) 60.

That is, the reference machine imaging element band-corresponding pixel value average value (Xoutave)=(Rxave, Gxave, Bxave) shown in FIG. 18 is calculated and stored in the memory 61 of the adjustment camera Y (adjustment machine) 60.

Furthermore, an adjustment machine band-corresponding pixel value average value calculation unit 76 illustrated in FIG. 18 inputs the imaging element output value Yout=(Ry, Gy, By) of the adjustment camera Y (adjustment machine) 60, and calculates an average value of all pixel values of the same color (each band) of the constituent pixels of the imaging element. That is, the adjustment machine imaging element band-corresponding pixel value average value (Youtave) shown in FIG. 18 is calculated and stored in the memory 61 of the adjustment camera Y (adjustment machine) 60.

That is, the adjustment machine imaging element band-corresponding pixel value average value (Youtave)=(Ryave, Gyave, Byave) shown in FIG. 18 is calculated and stored in the memory 61 of the adjustment camera Y (adjustment machine) 60.

Note that the imaging element band-corresponding pixel value average value calculation processing is executed by applying the processing described earlier with reference to FIGS. 11 to 13.

Note that the reference machine band-corresponding pixel value average value calculation unit 75 and the adjustment machine band-corresponding pixel value average value calculation unit 76 illustrated in FIG. 18 may be provided, for example, in the signal processing unit 105 of the reference camera X (reference machine) 50 or the adjustment camera Y (adjustment machine) 60 having the same configuration as the multispectral camera 100 illustrated in FIG. 10, or may be provided in an image processing device such as a PC outside the camera.

Next, (2) Processing at time of using camera (at time of imaging)" will be described with reference to FIG. 19.

(2) At time of using camera (at time of imaging), processing is executed of calculating a band-corresponding gain (BandGain) by using values recorded in the memory in the camera at the time of manufacturing the camera, that is, (a) reference machine imaging element band-corresponding pixel value average value (Xoutave) calculated from pixel values of reference camera X (reference machine) 50 and (b) adjustment machine imaging element band-corresponding pixel value average value (Youtave) calculated from pixel values of adjustment camera Y (adjustment machine) 60, and adjusting an output value of the adjustment camera Y (adjustment machine) 60 by using a value of the band corresponding gain (BandGain) calculated, to adjust the output value to a value similar to that of the reference machine.

First, a certain subject, for example, a plant is imaged by the adjustment camera Y (adjustment machine) 60.

The imaging element output value Yout in this imaging processing is set as $$Yout=(Ry, Gy, By).$$

Next, the imaging element output value Yout is input to the adjustment machine band-corresponding pixel value calculation unit 81.

The adjustment machine band-corresponding pixel value calculation unit 81 inputs the imaging element output value Yout=(Ry, Gy, By) of the adjustment camera Y (adjustment machine) 60, and calculates a signal value in units of bands included in pixel values corresponding to these respective colors.

The signal value is the adjustment machine band-corresponding pixel value Ybandout illustrated in FIG. 19.

The adjustment machine band-corresponding pixel value Ybandout calculated by the adjustment machine band-corresponding pixel value calculation unit 81 is input to the band-corresponding gain adjustment unit 82.

Meanwhile, a band-corresponding gain calculation unit 84 illustrated in FIG. 19 calculates a band-corresponding gain (BandGain)

by using the following values stored in the memory 81, that is, (a) reference machine imaging element band-corresponding pixel value average value (Xoutave) calculated from pixel values of reference camera X (reference machine) 50, and (b) adjustment machine imaging element band-corresponding pixel value average value (Youtave) calculated from pixel values of adjustment camera Y (adjustment machine) 60.

The band-corresponding gain calculation unit 84 compares the band-corresponding pixel value average values of the same color (band) of the two cameras 50 and 60 stored in the memory 81 to calculate a gain for matching the adjustment machine band-corresponding pixel value average value of the adjustment camera Y (adjustment machine) 60 with the reference machine band-corresponding pixel value average value of the reference camera X (reference machine) 50, that is, the band-corresponding gain (BandGain).

The band-corresponding gain calculated by the band-corresponding gain calculation unit 84 is input to the band-corresponding gain adjustment unit 82.

The band-corresponding gain adjustment unit 82 adjusts the output value by applying the band-corresponding gain (BandGain) calculated by the band-corresponding gain calculation unit 84 to the adjustment machine band-corresponding pixel value (Ybandout) input from the adjustment machine band-corresponding pixel value calculation unit 81, and calculates a band-corresponding gain adjustment output value Yout2.

By this processing, the band-corresponding gain adjustment output value Yout2 is an output that matches the output value of the reference machine regardless of the imaging condition. The band-corresponding gain adjustment output value Yout2 is input to an image processing unit 83, and the operation and the like described earlier with reference to FIGS. 2, 3A, and 3B are executed to perform processing of calculating signal values of the red (R) component signal and the near infrared (NIR) component signal, and the like.

Also in the processing described with reference to FIGS. 18 and 19, similarly to the processing described earlier with reference to FIGS. 5 and 6, each color output value of the imaging element of each camera is further separated into each band signal, a band signal-corresponding gain is calculated, and the output value of the adjustment camera Y (adjustment machine) 60 is adjusted by using the band-corresponding gain.

By performing such processing, it becomes possible to eliminate deviation of the output value based on differences in filter characteristics of the cameras and to match the output value Yout=(Ry, Gy, By) of the adjustment camera Y (adjustment machine) 60 with the output value of the reference camera (reference machine) 50.

Note that, in the description with reference to FIGS. 18 and 19, the configuration has been described in which the values, (a) reference machine imaging element band-corresponding pixel value average value (Xoutave) of reference camera X (reference machine) 50 and (b) adjustment machine imaging element band-corresponding pixel value average value (Youtave) of adjustment camera Y (adjustment machine) 60, are stored in the memory 61 of the adjustment camera Y (adjustment machine) 60, and the band-corresponding gain is calculated by using these pixel value average values.

Instead of the pixel value average value, representative values of respective colors (respective bands) of each camera may be stored in the memory 61, and the band-corresponding gain may be calculated by using these pixel value representative values.

Next, with reference to FIGS. 20A and 20B, a description will be given of a sequence of processing executed by the image processing device of the present disclosure in a case where the processing described with reference to FIGS. 18 and 19 is performed.

FIGS. 20A and 20B illustrate the following two processing flows.

FIG. 20A Flow of processing at time of manufacturing camera

FIG. 20B Flow of processing at time of using camera (at time of imaging)

FIG. 20A Flow of processing at time of manufacturing camera is a flow explaining a sequence of processing corresponding to "(1) Processing at time of manufacturing camera" described earlier with reference to FIG. 18.

FIG. 20B Flow of processing at time of using camera (at time of imaging) is a flow explaining a sequence of processing corresponding to "(2) Processing at time of using camera (at time of imaging)" described earlier with reference to FIG. 19.

Hereinafter, processing of each step of these flows will be described.

Note that the processing according to flowcharts illustrated in FIGS. 20A and 20B and subsequent figures can be executed in accordance with a program stored in a storage unit in an image processing device such as an imaging device or a PC. A data processing unit of the imaging device or the image processing device executes processing according to the flowcharts illustrated in FIGS. 20A and 20B and the subsequent figures in accordance with the program stored in the storage unit.

First, FIG. 20A(1) Flow of processing at time of manufacturing camera will be described.

(Step S131)

First, in step S131, image capturing processing by each of the reference camera X (reference machine) and the adjustment camera Y (adjustment machine) is executed. The image capturing is preferably executed under the same condition.

(Steps S132 and S133)

The processing steps of the next step S132 and step S133 are executed in parallel.

In step S132, a band-corresponding pixel value average value of the reference camera X (reference machine) is calculated, and in step S133, a band-corresponding pixel value average value of the adjustment camera Y (adjustment machine) is calculated.

These pieces of processing are executed by the reference machine band-corresponding pixel value average value calculation unit 75 and the adjustment machine band-corresponding pixel value average value calculation unit 76 illustrated in FIG. 18.

The imaging element band-corresponding pixel value average value calculation processing is executed by applying the processing described earlier with reference to FIGS. 11 to 13.

These pieces of processing are executed by the reference machine band-corresponding pixel value calculation unit 71 and the adjustment machine band-corresponding pixel value calculation unit 72 illustrated in FIG. 5. As described earlier, these processing units may be provided, for example, in the signal processing unit 105 of the reference camera X (reference machine) 50 or the adjustment camera Y (adjustment machine) 60 having the same configuration as the multispectral camera 100 illustrated in FIG. 10, or may be provided in an image processing device such as a PC outside the camera.

Note that the band-corresponding pixel value average value calculation processing executed in steps S132 and S133 can be executed as processing of first calculating individual band-corresponding pixel values in accordance with the flow illustrated in FIG. 15 described earlier and calculating an average value thereof.

(Step S134)

Next, in step S134, the following values calculated in steps S132 and S133 are stored in the memory 61 of the adjustment camera Y (adjustment machine) 60.

(a) Reference machine imaging element band-corresponding pixel value average value (Xoutave) calculated from pixel values of reference camera X (reference machine) 50

(b) Adjustment machine imaging element band-corresponding pixel value average value (Youtave) calculated from pixel values of adjustment camera Y (adjustment machine) 60

Note that, the reference machine band-corresponding pixel value average value calculated on the basis of the captured image by the reference camera X (reference machine) is used for the processing of calculating the band-corresponding gains of a large number of adjustment cameras Y (adjustment machines). Thus, the reference machine band-corresponding pixel value average value calculated in step S132 may be stored in, for example, a memory of the reference camera X (reference machine) or a memory of an external device, and this memory-stored data may be stored in memories of the subsequent other adjustment cameras Y (adjustment machines).

In this case, in a case where processing is performed on the second and subsequent adjustment cameras (adjustment machines), image capturing is performed only by the adjustment camera Y (adjustment machine) in step S131, and the processing in step S132 can be omitted.

Next, (2) Flow of processing at time of using camera (at time of imaging) will be described.

(Step S141)

First, in step S141, image capturing processing by the adjustment camera Y (adjustment machine) is executed.

(Step S142)

Next, in step S142, a band-corresponding pixel value of the adjustment camera Y (adjustment machine) is calculated.

This processing corresponds to the processing described earlier with reference to FIGS. 11 to 13.

This processing is processing executed by the adjustment machine band-corresponding pixel value calculation unit 81 illustrated in FIG. 19.

Note that the band-corresponding pixel value calculation processing executed in step S142 can be executed in accordance with the flow illustrated in FIG. 15 described earlier.

(Step S143)

Next, in step S143, the band-corresponding gain is calculated by using the values, (a) reference machine imaging element band-corresponding pixel value average value (Xoutave) and (b) adjustment machine imaging element band-corresponding pixel value average value (Youtave)

stored in the memory of the adjustment camera Y (adjustment machine).

This processing is processing executed by the band-corresponding gain calculation unit 84 illustrated in FIG. 19.

The band-corresponding gain calculated by the band-corresponding gain calculation unit 84 is, for example, the following gain.

When the band-corresponding pixel value average values of the respective bands A to D of the reference camera X (reference machine) 50 are (ax1ave, bx2ave, cx3ave, dx4ave) and the band-corresponding pixel value average values of the respective bands A to D of the adjustment camera Y (adjustment machine) 60 are (ay1ave, by2ave, cy3ave, dy4ave), the signal processing unit 105 calculates the following band-corresponding gains.

Band-$A$-corresponding gain=$ax1ave/ay1ave$

Band-$B$-corresponding gain=$bx2ave/by2ave$

Band-$C$-corresponding gain=$cx3ave/cy3ave$

Band-$D$-corresponding gain=$dx4ave/dy4ave$ (Step S144)

Next, in step S144, the band-corresponding pixel value calculated in step S142 is multiplied by the band-corresponding gain calculated in step S143, whereby the band-corresponding gain adjustment output value is calculated.

This processing is processing executed by the band-corresponding gain adjustment unit 82 illustrated in FIG. 19.

The band-corresponding gain adjustment output value calculated is, for example, the following output value.

When the band-corresponding pixel values of the respective bands A to D of the adjustment camera Y (adjustment machine) 60 are (ay1, by2, cy3, dy4), and the band-corresponding gains of the respective bands A to D calculated in step S143 are the band-$A$-corresponding gain=$ax1ave/ay1ave$, the band-$B$-corresponding gain=$bx2ave/by2ave$, the band-$C$-corresponding gain=$cx3ave/cy3ave$, and the band-$D$-corresponding gain=$dx4ave/dy4ave$, the following band-corresponding gain adjustment output values are calculated.

Band-$A$-corresponding gain adjustment output value= $(ax1ave/ay1ave) \times ay1 = ax1$ Band-$B$-corresponding gain adjustment output value= $(bx2ave/by2ave) \times by2 = bx2$ Band-$C$-corresponding gain adjustment output value=$(cx3ave/cy3ave) \times cy3 = cx3$ Band-$D$-corresponding gain adjustment output value=$(dx4ave/dy4ave) \times dy4 = dx4$ By such band-corresponding gain adjustment output value calculation processing, the band-corresponding pixel value of the adjustment camera Y (adjustment machine) 60 is an output value matching the output value of the reference camera X (reference machine) 50.

Since the gain calculated by this processing is the band-corresponding gain and is not the gain corresponding to the mixed signal of the plurality of different band signals, the gain does not greatly change depending on the imaging condition (light source or subject).

Thus, even in a case where the imaging condition at the time of using the camera (at the time of imaging) is different from the imaging condition at the time of manufacturing the camera, it is possible to match the output of the adjustment machine with that of the reference machine by applying the gain calculated at the time of manufacturing the camera.

(Step S145)

Moreover, in step S145, generation of a color image, analysis of color components of a subject, and the like are executed on the basis of the band-corresponding gain adjustment output values calculated in step S144.

Specifically, processing of calculating the activation index value of the plant and the like are executed.

8. Processing of Calculating Spectral Characteristic Parameter (Separation Coefficient) of Multispectral Camera Next, a description will be given of processing of calculating the spectral characteristic parameters (separation coefficients) of the multispectral camera.

For example, as described earlier with reference to FIG. 12, the spectral characteristic parameters (Kan to Kdn) of the multispectral camera 100 are camera-specific parameters, and the values measured in advance are stored in the memory.

The spectral characteristic parameters of the multispectral camera can also be measured by imaging, with the multispectral camera, output light of a special light source that outputs light in a specific band.

Hereinafter, this processing will be described.

A configuration and processing for calculating the spectral characteristic parameters of the multispectral camera will be described with reference to FIG. 21.

Figure 21:
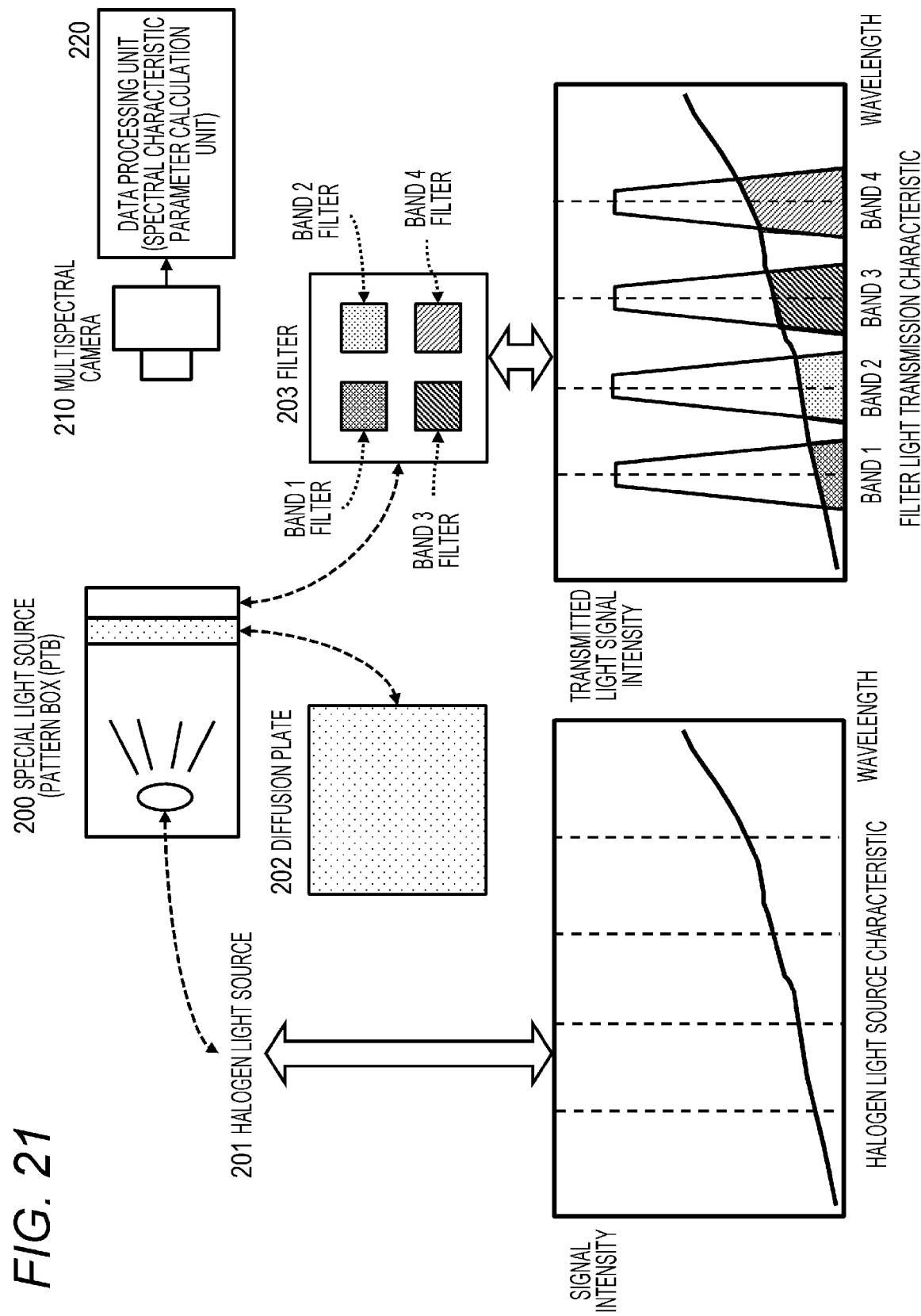
FIG. 21 is a diagram explaining an example of a special light source (pattern box).

FIG. 21 illustrates a special light source (pattern box) 200 and a multispectral camera 210 that captures an image of output light of the special light source (pattern box) 200 and calculates spectral characteristic parameters.

The special light source (pattern box) 200 includes a halogen light source 201, a diffusion plate 202, and a filter 203, and output light of the halogen light source 201 is output through the diffusion plate 202 and the filter 203, and the camera 210 images the output light.

The halogen light source 201 has a characteristic as illustrated in the lower left part of the figure. The output light of the halogen light source 201 passes through the diffusion plate 202 having a relatively flat characteristic and is output through the filter 203. In the filter 203, different filters are mounted to four windows.

The light transmission characteristic of each filter is a characteristic illustrated in the lower right of the figure.

That is, the following four types of filters are mounted on the filter 203.

Band 1 filter that transmits light in band 1,
Band 2 filter that transmits light in band 2,
Band 3 filter that transmits light in band 3,
Band 4 filter that transmits light in band 4, Three of these four types of filters are closed, and an image of light transmitted through one filter is captured by the multispectral camera 210. The filters for transmitting the light are sequentially switched, and images of light in four different bands are sequentially captured by the multispectral camera 210.

These captured images are input to a data processing unit (spectral characteristic parameter) 220 in the subsequent stage, and the spectral characteristic parameters of the multispectral camera 210 are calculated.

Alternatively, it is also possible to simultaneously capture images of light transmitted through the four filters, cut out each of transmitted light portions of respective filters, and input the transmitted light portions to the data processing unit (spectral characteristic parameter) 220 in the subsequent stage to calculate the spectral characteristic parameters of the multispectral camera 210.

The data processing unit (spectral characteristic parameter) 220 may be an external device such as a PC or may be a component in the multispectral camera 210.

Hereinafter, a description will be given of details of processing of calculating the spectral characteristic parameters of the multispectral camera 210 executed in the data processing unit (spectral characteristic parameter) 220.

The transmitted light bands of the four types of filters of the filter 203 of the special light source (pattern box) 200 are set as the band 1=band1Light, the band 2=band2Light, the band 3=band3Light, and the band 4=band4Light, respectively.

Furthermore, the multispectral camera 200 is assumed to be a camera having the configuration illustrated in FIG. 10 including the color filter (ABCD filter) illustrated in FIG. 9.

The 4ch Raw outputs, Araw, Braw, Craw, and Draw, of respective pixels of A, B, C, and D in a case where the light in each of the bands 1 to 4 (band1light to band4light) is received by the multispectral camera 200 are expressed as follows.

(1) Raw outputs of respective pixels of A, B, C, and D when band 1=band1Light is received
    Araw@ band1Light
    Braw@ band1Light
    Craw@ band1Light
    Draw@ band1Light (2) Raw outputs of respective pixels of A, B, C, and D when band 2=band2Light is received
    Araw@ band2Light
    Braw@ band2Light
    Craw@ band2Light
    Draw@ band2Light (3) Raw outputs of respective pixels of A, B, C, and D when band 3=band3Light is received
    Araw@ band3Light
    Braw@ band3Light
    Craw@ band3Light
    Draw@ band3Light (4) Raw outputs of respective pixels of A, B, C, and D when band 4=band4Light is received
    Araw@ band4Light
    Braw@ band4Light
    Craw@ band4Light
    Draw@ band4Light Using these, the data processing unit (spectral characteristic parameter calculation unit) 220 calculates band-corresponding pixel values of the respective bands A, B, C, and D included in the A, B, C, and D pixel values (raw pixel values), that is, the following band-corresponding pixel values illustrated in FIG. 11, similarly to the description with reference to FIG. 11.

Pixel values a1, a2, a3, and a4 of bands A, B, C, and D included in pixel value of A pixel, Pixel values b1, b2, b3, and b4 of bands A, B, C, and D included in pixel value of B pixel, Pixel values c1, c2, c3, and c4 of bands A, B, C, and D included in pixel value of C pixel, Pixel values d1, d2, d3, and d4 of bands A, B, C, and D included in pixel value of D pixel, The pixel values, a1, a2, a3, a4, b1, b2, b3, b4, c1, c2, c3, c4, d1, d2, d3, and d4, are expressed as follows.

$a1 = A\text{raw}@\text{band1Light}$, $b1 = B\text{raw}@\text{band1Light}$, $c1 = C\text{raw}@\text{band1Light}$, $d1 = D\text{raw}@\text{band1Light}$ $a2 = A\text{raw}@\text{band2Light}$, $b2 = B\text{raw}@\text{band2Light}$, $c2 = C\text{raw}@\text{band2Light}$, $d2 = D\text{raw}@\text{band2Light}$ $a3 = A\text{raw}@\text{band3Light}$, $b3 = B\text{raw}@\text{band3Light}$, $c3 = C\text{raw}@\text{band3Light}$, $d3 = D\text{raw}@\text{band3Light}$ $a4 = A\text{raw}@\text{band4Light}$, $b4 = B\text{raw}@\text{band4Light}$, $c4 = C\text{raw}@\text{band4Light}$, $d4 = D\text{raw}@\text{band4Light}$ Using these a1 to d4, the spectral characteristic parameters (separation coefficients) can be expressed by the following relational expression.

$$Ka2 = a2/b2, Ka3 = a3/c3, Ka4 = a4/d4$$

$$Kb1 = b1/a1, Kb3 = b3/c3, Kb4 = b4/d4$$

$$Kc1 = c1/a1, Kc2 = c2/b2, Kc4 = c4/d4$$

$$Kd1 = d1/a1, Kd2 = d2/b2, Kd3 = d3/c3$$

The spectral characteristic parameters (separation coefficients) can be calculated for each of the reference camera X (reference machine) 50 and the adjustment camera Y (adjustment machine) 60.

Note that, in a case where one camera is continuously used as the reference camera X (reference machine) 50, the spectral characteristic parameters (separation coefficients) are only required to be calculated once.

Note that gains corresponding to the bands 1 to 4, that is, band-corresponding gains 1 to 4 (Ga1 to Ga4) for matching the output of the adjustment camera Y (adjustment machine) 60 with the output of the reference camera X (reference machine) 50 can be expressed as follows.

$$Ga1 = a1(x)/a1(y)$$

$$Gb2 = b2(x)/b2(y)$$

$$Gc3 = c3(x)/c3(y)$$

$$Gd4 = d4(x)/d4(y)$$

Note that $a1(x)$, $b2(x)$, $c3(x)$, and $d4(x)$ are band-corresponding pixel values corresponding to the bands 1 to 4 of the reference camera X (reference machine) 50, and $a1(y)$, b2(y), c3 (y), and d4 (y) are band-corresponding pixel values corresponding to the bands 1 to 4 of the adjustment camera Y (adjustment machine) 60.

9. Specific Examples to which Processing of Present Disclosure is Applied

Next, a description will be given of a specific example to which the above-described processing of the present disclosure is applied.

A plurality of examples below will be sequentially described.

(Example 1) Example using multispectral camera using dual band pass (DBP)

(Example 2) Example of executing temperature compensation to perform band-corresponding gain calculation and band-corresponding gain adjustment (Example 3) Example of executing processing of calculating band-corresponding gain and processing of calculating spectral characteristic parameter (separation coefficient) using special light source (Example 4) Example of executing processing of calculating band-corresponding gain and processing of calculating spectral characteristic parameter (separation coefficient) by using both measured spectral characteristic parameter (separation coefficient) of reference machine and special light source Hereinafter, these examples will be sequentially described.

9-1. (Example 1) Example Using Multispectral Camera Using Dual Band Pass (DBP)

First, as (Example 1), a description will be given of an example using a multispectral camera using a dual band pass (DBP)

In Example 1, at the time of manufacturing the camera, processing according to the configuration of "(1) Processing at time of manufacturing camera" in FIG. 5 described earlier is executed. Furthermore, at the time of using the camera (at the time of imaging), processing according to the configuration of "(2) Processing at time of using camera (at time of imaging)" described with reference to FIG. 6 is executed.

The present example is an example in which the simplest multispectral camera, that is, a multispectral camera using a DBP filter as a band pass filter is used as the reference camera X (reference machine) 50 illustrated in FIG. 5 and the adjustment camera Y (adjustment machine) 60 illustrated in FIGS. 5 and 6.

Figure 22:
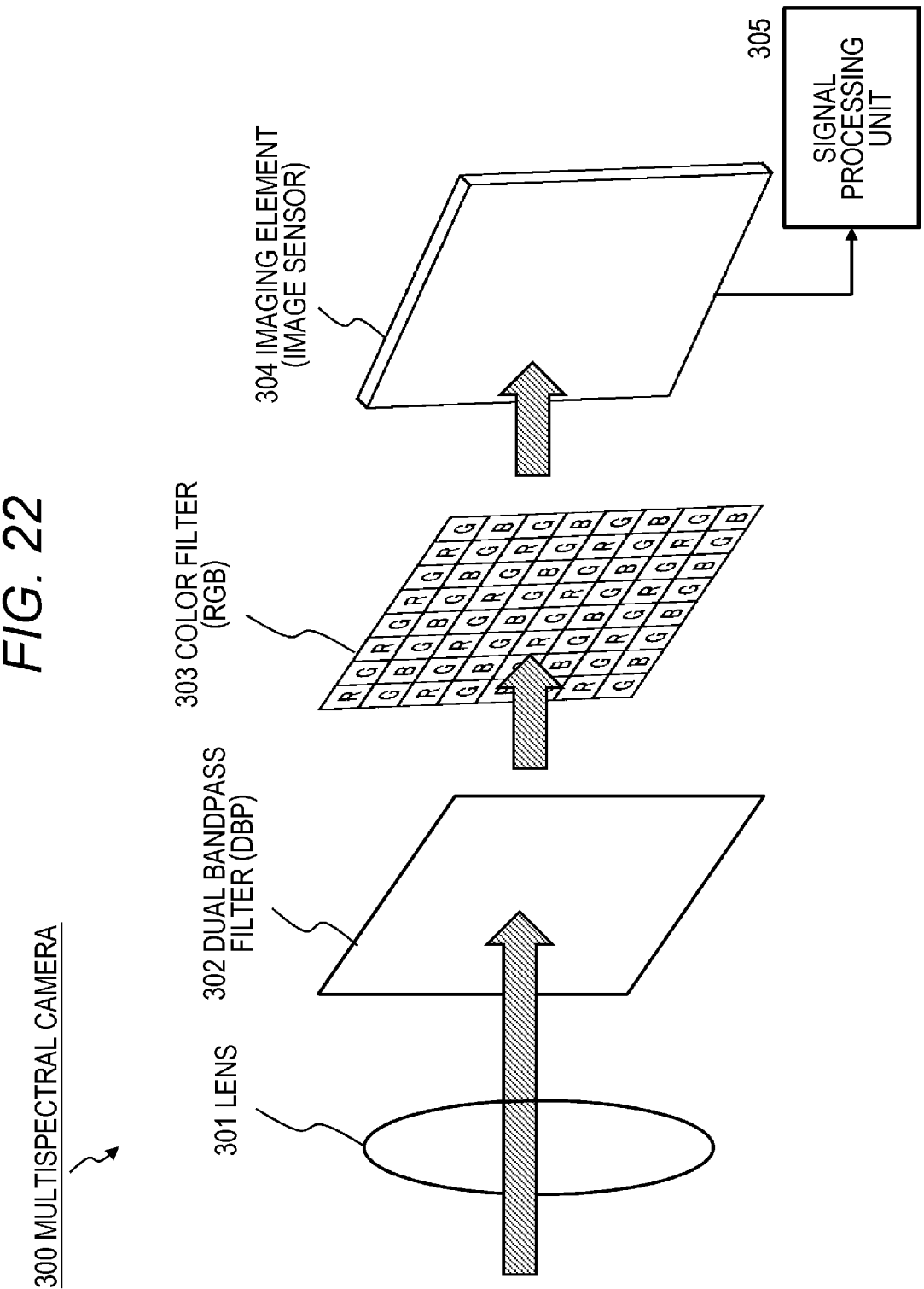
FIG. 22 is a diagram explaining a configuration example of a multispectral camera.

The reference camera X (reference machine) 50 and the adjustment camera Y (adjustment machine) 60 each have a configuration illustrated in FIG. 22.

A multispectral camera 300 illustrated in FIG. 22 has a configuration similar to that of the multispectral camera 10 described earlier with reference to FIG. 1.

Imaging light of a subject input through a lens 301 of the multispectral camera 300 illustrated in FIG. 22 is input to an imaging element (image sensor) 304 through a dual bandpass filter (DBP) 302 and a color filter (RGB color filter) 303.

The dual bandpass filter (DBP) 302 is a filter that selectively transmits two different wavelength components of light.

The dual bandpass filter (DBP) 302 described here is a filter that selectively transmits two different wavelength components of light, a red (R) component and a near infrared (NIR) component.

The color filter (RGB color filter) 303 is a filter that transmits light of a wavelength of each of R, G, and B color components in units of pixels. For example, the RGB color filter is an RGB filter in a Bayer array.

Light passing through the dual bandpass filter (DBP) 302, and a red (R) filter, a green (G) filter, or a blue (B) filter of the color filter (RGB color filter) 303 is input to each pixel of the imaging element (image sensor) 304.

Light passing through the dual bandpass filter (DBP) 302 and the red (R) filter of the color filter (RGB color filter) 303 is input to an R pixel of the imaging element (image sensor) 304.

Light passing through the dual bandpass filter (DBP) 302 and the green (G) filter of the color filter (RGB color filter) 303 is input to a G pixel of the imaging element (image sensor) 304.

Light passing through the dual bandpass filter (DBP) 302 and the blue (B) filter of the color filter (RGB color filter) 303 is input to a B pixel of the imaging element (image sensor) 304.

Figure 23:
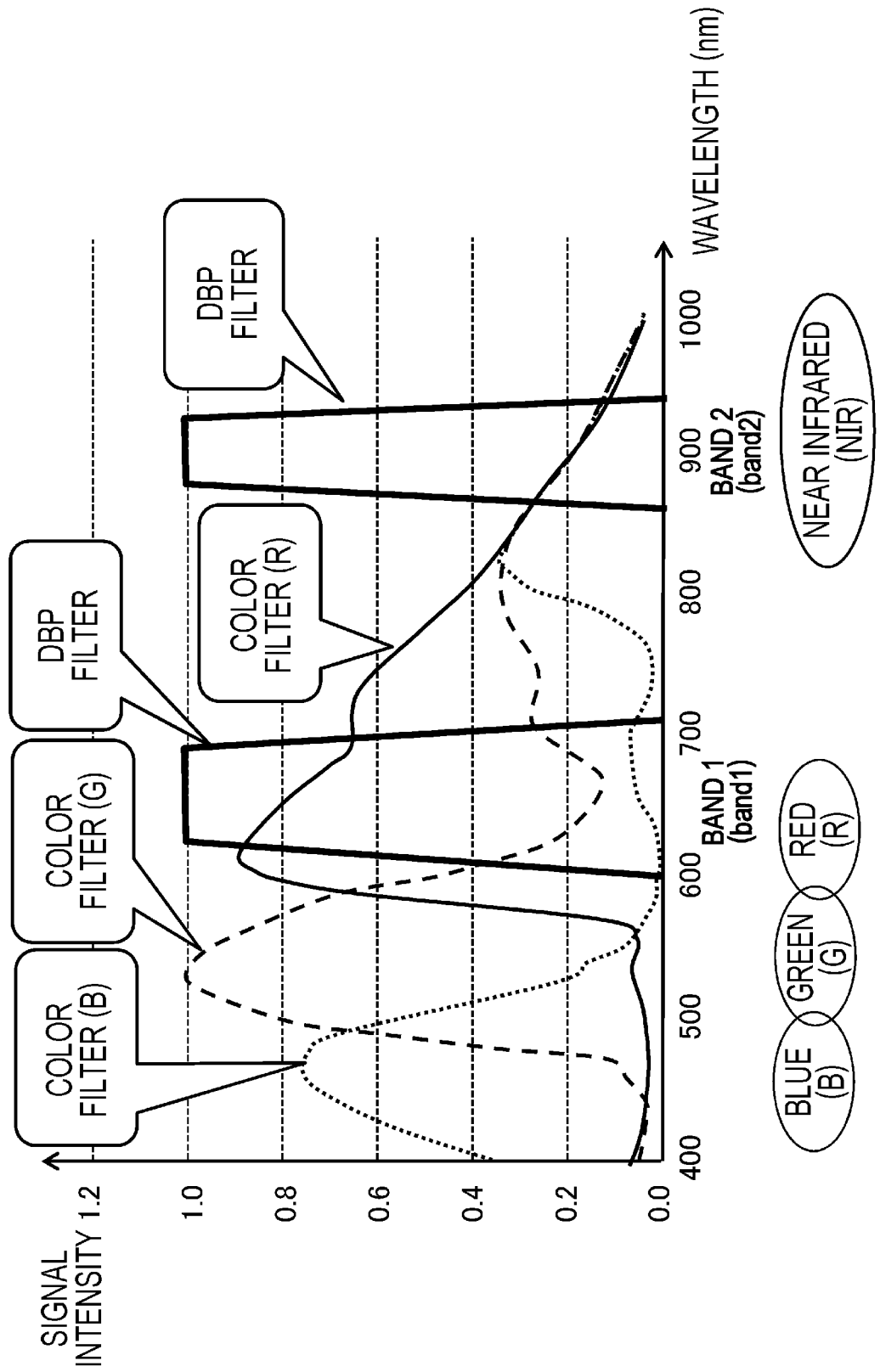
FIG. 23 is a diagram explaining spectral characteristics of a multiband pass filter (MBP) and a color filter (ABCD color filter).

FIG. 23 is a diagram illustrating a graph explaining spectral characteristics of the dual bandpass filter (DBP) 302 and the color filter (RGB color filter) 303.

The horizontal axis represents a wavelength (400 to 1000 nm), and the vertical axis represents a signal intensity (relative value) of filter transmitted light.

It can be seen that most of the light transmitted through the color filter (B) constituting the color filter (RGB color filter) 303 is a blue (B) component that is light of a wavelength in the vicinity of about 450 nm, but light of other wavelength components is also transmitted to no small extent.

Furthermore, most of the light transmitted through the color filter (G) is a green (G) component that is light of a wavelength in the vicinity of about 540 nm, but light of other wavelength components is also included.

Similarly, most of the light transmitted through the color filter (R) is a red (R) component that is light of a wavelength in the vicinity of about 650 nm, but light of other wavelength components is also included.

The light transmitted through the dual bandpass filter (DBP) 302 has components of light of two wavelength bands, the band 1 (band1) corresponding to a red (R) component that is light of a wavelength in the vicinity of about 650 nm and the band 2 (band2) corresponding to a near infrared (NIR) component that is light of a wavelength in the vicinity of about 900 nm.

Next, with reference to FIGS. 24A and 24B, a description will be given of pixel values of respective pixels of R pixels and B pixels that are constituent pixels of the imaging element (image sensor) 304 in a case where image capturing is performed by using the dual bandpass filter (DBP) 302 and the color filter (RGB color filter) 303 having the spectral characteristics illustrated in FIG. 23.

FIG. 24 illustrates examples of band components included in pixel values of respective pixels below.

Figures 24A, 24B:
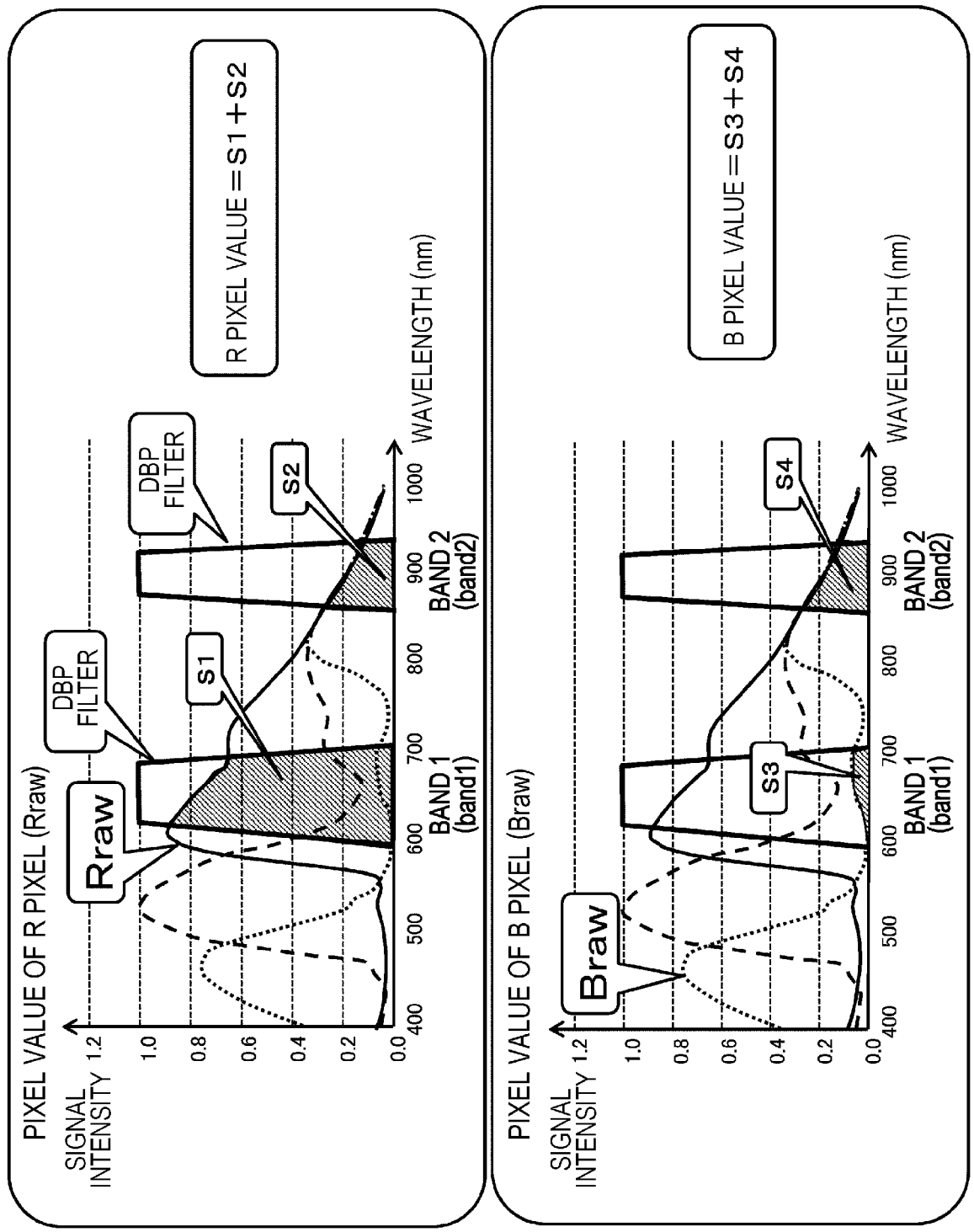
FIGS. 24A and 24B are diagrams explaining pixel values of the multispectral camera.

FIG. 24A Pixel value of R pixel (Rraw)

FIG. 24B Pixel value of B pixel (BRaw)

In the pixel value (Rraw) of the R pixel, a signal in the RED band of the band 1 (band1) and a signal in the NIR band of the band 2 (band2) are mixed.

Similarly, the pixel value (Braw) of the B pixel is output in which a signal in the RED band of the band 1 (band1) and a signal in the NIR band of the band 2 (band2) are mixed.

Note that the RED band of the band 1 (band1) and the NIR band of the band 2 (band2) are transmitted light bands of the dual bandpass filter (DBP) 302.

In Example 1, at the time of manufacturing the camera, the processing according to the configuration of "(1) Processing at time of manufacturing camera" in FIG. 5 described earlier is executed.

That is, as a processing sequence, processing according to the flow illustrated in FIG. 14A is performed.

The processing at the time of manufacturing the camera of Example 1 will be described with reference to FIG. 5 and the flow illustrated in FIG. 14A.

(Step S101)

First, in step S101, image capturing processing by the reference camera X (reference machine) and image capturing processing by the adjustment camera Y (adjustment machine) are executed. The image capturing is preferably executed under the same condition.

(Steps S102 and S103)

In the next step S102, a band-corresponding pixel value of the reference camera X (reference machine) is calculated, and in step S103, a band-corresponding pixel value of the adjustment camera Y (adjustment machine) is calculated.

These pieces of processing correspond to the processing described earlier with reference to FIGS. 11 to 13.

Note that the band-corresponding pixel value calculation processing executed in steps S102 and S103 is executed in accordance with the flow described earlier with reference to FIG. 15. That is, the band-corresponding pixel value calculation processing is processing involving processing of calculating a value that converges by the repeated operation described earlier with reference to FIGS. 12 and 13.

In Example 1, the band-corresponding pixel values to be calculated are the following band-corresponding pixel values.

The following band-corresponding pixel values are calculated as band-corresponding pixel values of the reference camera X (reference machine) 50.

Band-corresponding pixel value of band 1 (band1) included in R pixel value (Rraw) of reference camera X (reference machine) 50: band1@Rraw (x), Band-corresponding pixel value of band 2 (band2) included in B pixel value (Braw) of reference camera X (reference machine) 50: band2@Braw(x), Furthermore, the following band-corresponding pixel values are calculated as band-corresponding pixel values of the adjustment camera Y (adjustment machine) 60.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), (Step S104)

Next, in step S104, a band-corresponding gain is calculated by using the band-corresponding pixel value of the reference camera X (reference machine) and the band-corresponding pixel value of the adjustment camera Y (adjustment machine).

In Example 1, the band-corresponding gains to be calculated are the following band-corresponding gains.

Band-corresponding gain of band 1(band1)=band1@Rraw(x)/band1@Rraw(y)

Band-corresponding gain of band 2(band2)=band2@Braw(x)/band2@Braw(y)

The band-corresponding gains of these two bands, that is, the two bands corresponding to the transmitted light band of the dual band bus filter 302, are calculated.

(Step S105)

Finally, in step S105, the band-corresponding gains calculated in step S104 are stored in the memory of the adjustment camera Y (adjustment machine).

Note that, as described earlier with reference to FIG. 5, the reference machine band-corresponding pixel value calculated on the basis of the captured image by the reference camera X (reference machine) is used for the processing of calculating the band-corresponding gains of a large number of adjustment cameras Y (adjustment machines). Thus, the reference machine band-corresponding pixel value calculated in step S102 may be stored in, for example, a memory of the reference camera X (reference machine) or a memory of an external device, and this memory-stored data may be applied to the band-corresponding gain calculation processing for the subsequent other adjustment cameras Y (adjustment machines).

In this case, in a case where processing is performed on the second and subsequent adjustment cameras (adjustment machines), it becomes possible to perform processing in which image capturing is performed only by the adjustment camera Y (adjustment machine) in step S101, the processing in step S102 is omitted, and the reference machine band-corresponding pixel values stored in the memory are read and the band-corresponding gains of the adjustment machine are calculated in step S104.

Next, processing at the time of using the camera (at the time of imaging) in Example 1 will be described.

At the time of using the camera of Example 1, the processing according to the configuration of "(2) Processing at time of using camera (at time of imaging)" in FIG. 6 described earlier is executed.

That is, as a processing sequence, processing according to the flow illustrated in FIG. 14B is performed.

The processing at the time of using the camera (at the time of imaging) of Example 1 will be described with reference to FIG. 6 and the flow illustrated in FIG. 14B.

(Step S121)

First, in step S121, image capturing processing by the adjustment camera Y (adjustment machine) is executed.

(Step S122)

Next, in step S122, a band-corresponding pixel value of the adjustment camera Y (adjustment machine) is calculated.

This processing corresponds to the processing described earlier with reference to FIGS. 11 to 13.

Note that the band-corresponding pixel value calculation processing executed in step S122 is executed in accordance with the flow described earlier with reference to FIG. 15. That is, the band-corresponding pixel value calculation processing is processing involving processing of calculating a value that converges by the repeated operation described earlier with reference to FIGS. 12 and 13.

In Example 1, the band-corresponding pixel values of the adjustment camera Y (adjustment machine) 60 to be calculated are the following band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), (Step S123)

Next, in step S123, the band-corresponding pixel value calculated in step S122 is multiplied by the band-corresponding gain stored in the memory, whereby the band-corresponding gain adjustment output value is calculated.

By the band-corresponding gain adjustment output value calculation processing, the band-corresponding pixel values of the adjustment camera Y (adjustment machine) 60 are output values matching the output value of the reference camera X (reference machine) 50.

Since the gain calculated by this processing is the band-corresponding gain and is not the gain corresponding to the mixed signal of the plurality of different band signals, the gain does not greatly change depending on the imaging condition (light source or subject).

Thus, even in a case where the imaging condition at the time of using the camera (at the time of imaging) is different from the imaging condition at the time of manufacturing the camera, it is possible to match the output of the adjustment machine with that of the reference machine by applying the gain calculated at the time of manufacturing the camera.

(Step S124)

Moreover, in step S124, generation of a color image, analysis of color components of a subject, and the like are executed on the basis of the band-corresponding gain adjustment output values calculated in step S123.

Specifically, processing of calculating the activation index value of the plant such as the NDVI described earlier is executed.

Note that, as a modification of Example 1, at the time of manufacturing the camera, the processing according to the configuration of "(1) Processing at time of manufacturing camera" in FIG. 18 described earlier may be executed, and at the time of using the camera (at the time of imaging), the processing according to the configuration of "(2) Processing at time of using camera (at time of imaging)" described with reference to FIG. 19 may be executed.

That is, the band-corresponding gain calculation processing may be performed not at the time of manufacturing the camera but at the time of using the camera (at the time of imaging).

At the time of manufacturing the camera, the pixel value average value or the representative value is stored in the memory 61 of the adjustment camera Y (adjustment machine) 60, and the band-corresponding gain is calculated by using the pixel value average value or the representative value stored in the memory 61 at the time of using the camera (at the time of imaging).

The processing flow in this case is processing according to the flow described earlier with reference to FIGS. 20A and 20B.

9-2 (Example 2) Example of Executing Temperature Compensation to Perform Band-Corresponding Gain Calculation and Band-Corresponding Gain Adjustment Next, as (Example 2), a description will be given of an example of executing temperature compensation to perform band-corresponding gain calculation and band-corresponding gain adjustment.

Characteristics of the imaging element and the filter slightly change due to temperature change. Example 2 is an example of performing the gain calculation and the gain adjustment in consideration of a change in the output value accompanying the temperature change.

In Example 2, temperature characteristic compensation (temperature characteristic compensation) is performed on the band-corresponding pixel value calculated by the band-corresponding pixel value calculation unit by using a temperature characteristic coefficient (temperature characteristic coefficient) in units of bands, and then the gain calculation and the gain adjustment corresponding to the band are executed by using the band-corresponding pixel value subjected to the temperature characteristic compensation.

Example 2 will be described as an example using a multispectral camera using a dual band pass (DBP) similarly to Example 1 described earlier.

That is, the reference camera X (reference machine) 50 and the adjustment camera Y (adjustment machine) 60 each have a configuration illustrated in FIG. 22.

The dual bandpass filter (DBP) 302 is a filter that selectively transmits two different wavelength components of light, a red (R) component and a near infrared (NIR) component.

Figure 25:
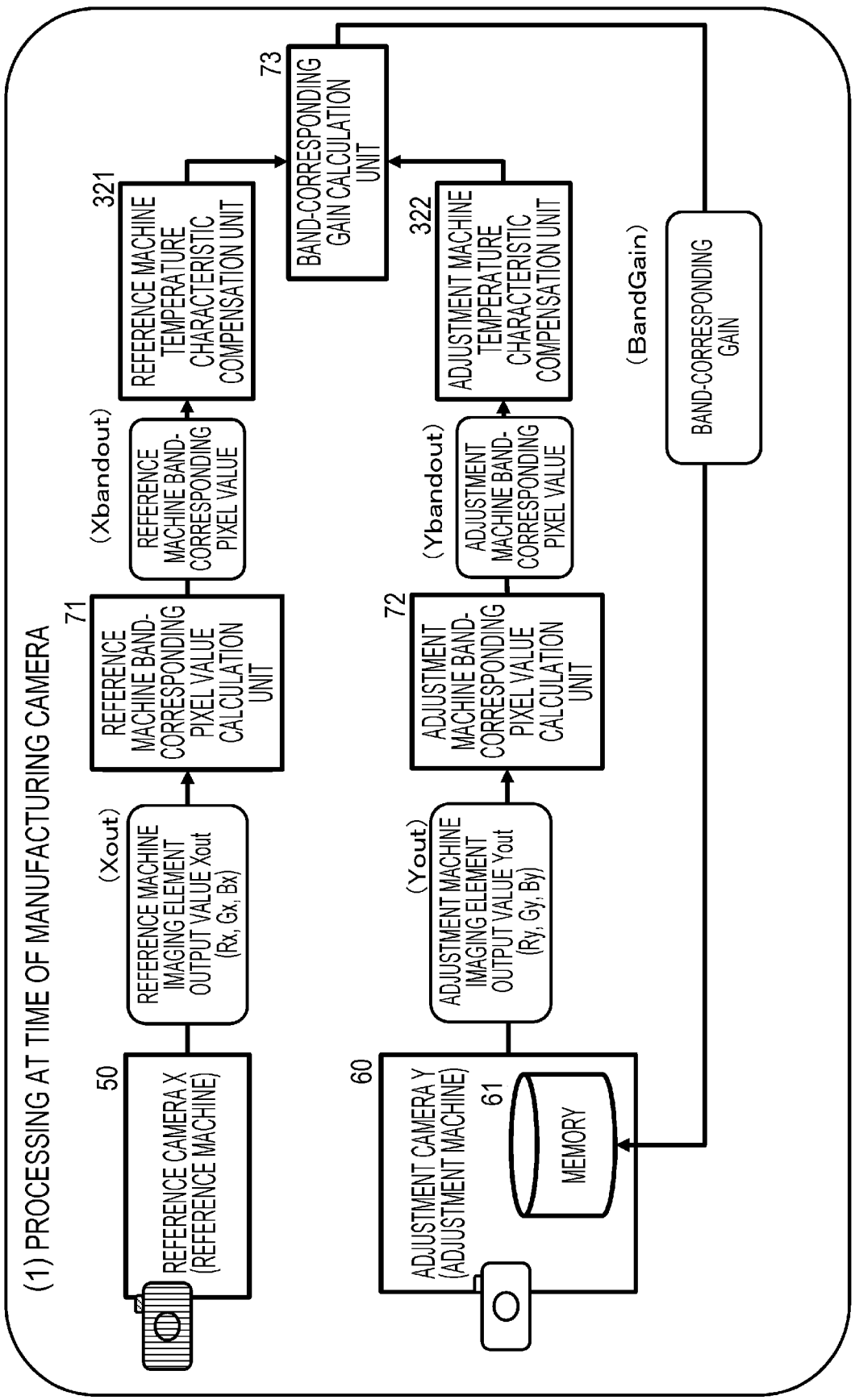
FIG. 25 is a diagram explaining an adjustment example of output variation of an imaging device of Example 2 of the present disclosure.

In Example 2, at the time of manufacturing the camera, processing according to the configuration of "(1) Processing at time of manufacturing camera" in FIG. 25 is executed.

Figure 26:
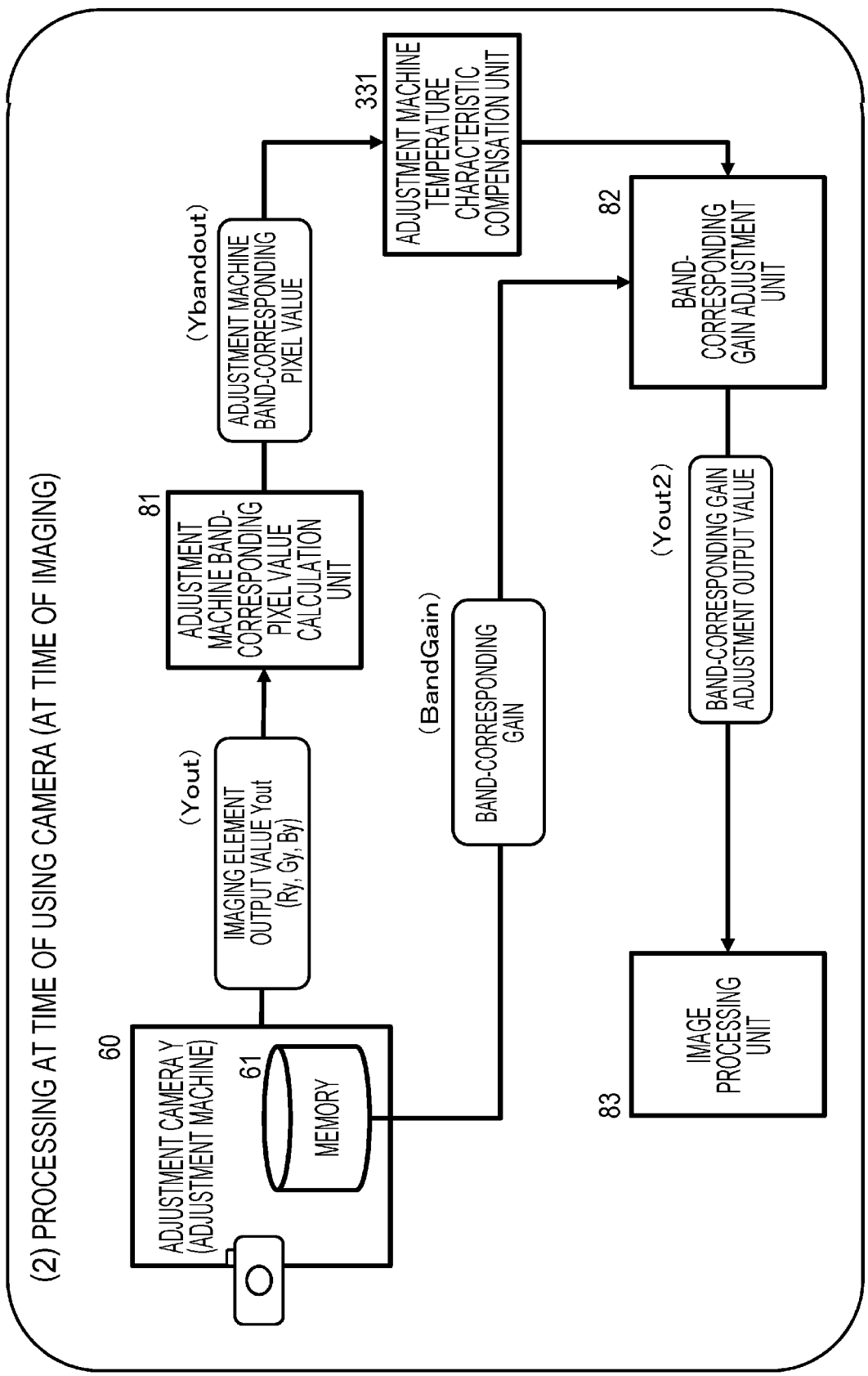
FIG. 26 is a diagram explaining an adjustment example of output variation of the imaging device of Example 2 of the present disclosure.

Furthermore, at the time of using the camera (at the time of imaging), processing according to the configuration of "(2) Processing at time of using camera (at time of imaging)" in FIG. 26 is executed.

The configuration illustrated in "(1) Processing at time of manufacturing camera" in FIG. 25 is a configuration in which a reference machine temperature characteristic assurance unit 321 and an adjustment machine temperature characteristic assurance unit 322 are added to the preceding stage of the band-corresponding gain calculation unit 73 in the configuration illustrated in" (1) Processing at time of manufacturing camera" in FIG. 5 described earlier.

The configuration illustrated in "(2) Processing at time of using camera (at time of imaging)" in FIG. 26 is a configuration in which a reference machine temperature characteristic assurance unit 331 is added to the preceding stage of the band-corresponding gain adjustment unit 82 in the configuration illustrated in "(1) Processing at time of using camera (at time of imaging)" in FIG. 6 described earlier.

Furthermore, a processing sequence at the time of manufacturing the camera is processing according to the flow illustrated in FIG. 27A.

The flow illustrated in FIG. 27A is a flow in which the processing steps of steps S102b and S103b are added after steps S102 and S103 of the flow illustrated in FIG. 14A described earlier as the processing flow of (Example 1).

In steps S102b and S103b, the temperature characteristic compensation (temperature characteristic compensation) is performed on the band-corresponding pixel value calculated by the band-corresponding pixel value calculation unit by using the temperature characteristic coefficient (temperature characteristic coefficient) in units of bands.

Furthermore, a processing sequence at the time of using the camera (at the time of imaging) is processing according to the flow illustrated in FIG. 27B.

The flow illustrated in FIG. 27B is a flow in which the processing step of step S122b is added after step S122 of the flow illustrated in FIG. 14B described earlier as the processing flow of (Example 1).

In step S122b, the temperature characteristic compensation (temperature characteristic compensation) is performed on the band-corresponding pixel value calculated by the band-corresponding pixel value calculation unit by using the temperature characteristic coefficient (temperature characteristic coefficient) in units of bands.

First, the processing at the time of manufacturing the camera of Example 2 will be described with reference to FIG. 25 and the flow illustrated in FIG. 27A.

(Step S101)

First, in step S101, image capturing processing by the reference camera X (reference machine) and image capturing processing by the adjustment camera Y (adjustment machine) are executed. The image capturing is preferably executed under the same condition.

(Steps S102 and S103)

In the next step S102, a band-corresponding pixel value of the reference camera X (reference machine) is calculated, and in step S103, a band-corresponding pixel value of the adjustment camera Y (adjustment machine) is calculated.

These pieces of processing correspond to the processing described earlier with reference to FIGS. 11 to 13.

Note that the band-corresponding pixel value calculation processing executed in steps S102 and S103 is executed in accordance with the flow described earlier with reference to FIG. 15. That is, the band-corresponding pixel value calculation processing is processing involving processing of calculating a value that converges by the repeated operation described earlier with reference to FIGS. 12 and 13.

In Example 1, the band-corresponding pixel values to be calculated are the following band-corresponding pixel values.

The following band-corresponding pixel values are calculated as band-corresponding pixel values of the reference camera X (reference machine) 50.

Band-corresponding pixel value of band 1 (band1) included in R pixel value (Rraw) of reference camera X (reference machine) 50: band1@Rraw (x), Band-corresponding pixel value of band 2 (band2) included in B pixel value (Braw) of reference camera X (reference machine) 50: band2@Braw(x), Furthermore, the following band-corresponding pixel values are calculated as band-corresponding pixel values of the adjustment camera Y (adjustment machine) 60.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), (Steps S102b and S103b)

Next, in steps S102b and S103b, temperature characteristic compensation (temperature characteristic compensation processing) is performed on the band-corresponding pixel value of the reference camera X (reference machine) and the band-corresponding pixel value of the adjustment camera Y (adjustment machine).

The temperature characteristic compensation processing will be described with reference to FIG. 28.

Figure 28:
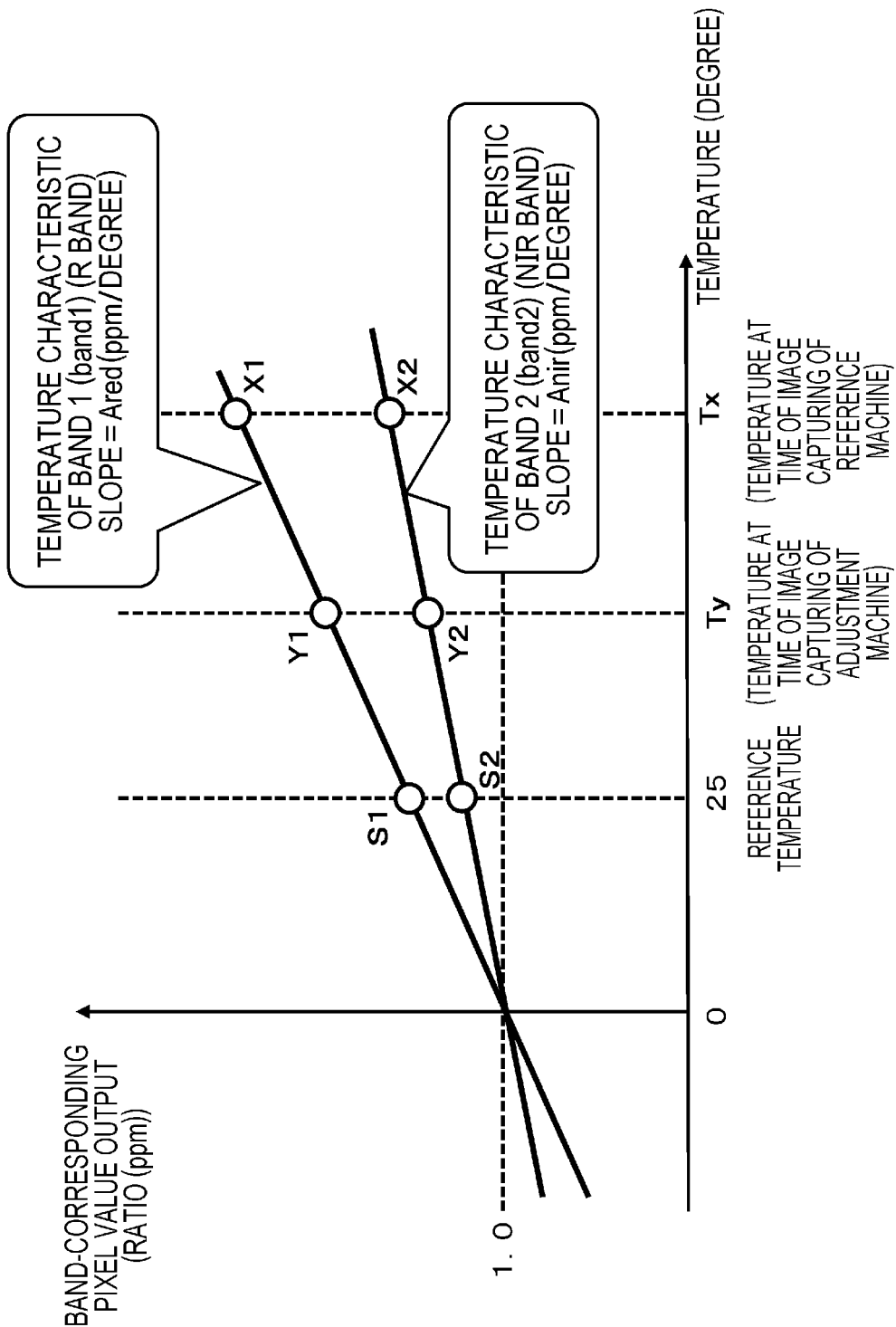
FIG. 28 is a diagram explaining temperature characteristic compensation processing executed in Example 2 of the present disclosure.

The graph illustrated in FIG. 28 is a graph illustrating temperature special make of the band-corresponding pixel values.

The horizontal axis represents the temperature, and the vertical axis represents the band-corresponding pixel value (ratio). The band-corresponding pixel value (ratio (ppm)) on the vertical axis is indicated by a ratio (ppm) when the output value of 0 degrees is set to 1.0.

FIG. 28 illustrates a temperature characteristic of the band 1 (band1) that is a red (R) color light band and a temperature characteristic of the band 2 (band2) that is an infrared light (NIR) band.

The slope of the temperature characteristic of the band 1 (band1) that is the red (R) color light band is set as Ared (ppm/degree), and the slope of the temperature characteristic of the band 2 (band2) that is the infrared light (NIR) band is set as Anir (ppm/degree).

Furthermore, a reference temperature is set to 25° C.

The temperature characteristic compensation processing executed in steps S102b and S103b is processing of correcting the band-corresponding pixel value calculated on the basis of the image captured by each camera to the band-corresponding pixel value calculated on the basis of the image captured at the reference temperature.

Here, it is assumed that temperatures at the time of the imaging processing in step S101 of the flow of FIGS. 27A and 27B are the following temperatures.

Tx: temperature at which imaging processing by reference camera X (reference machine) 50 is executed, Ty: temperature at which imaging processing by adjustment camera Y (adjustment machine) 60 is executed, It is assumed that band-corresponding pixel values based on the images captured at the respective temperatures are the following values for the reference camera X (reference machine) 50 and the reference camera X (reference machine) 50.

Reference camera X (reference machine) 50

Band-corresponding pixel value of band 1 (band1) that is red (R) color light band=X1

Band-corresponding pixel value of band 2 (band2) that is infrared light (NIR) band=X2

Adjustment camera Y (adjustment machine) 60

Band-corresponding pixel value of band 1 (band1) that is red (R) color light band=Y1

Band-corresponding pixel value of band 2 (band2) that is infrared light (NIR) band=Y2

These band-corresponding pixel values are changed to band-corresponding pixel values in a case where it is assumed that image capturing is performed at the reference temperature, for example, 25 degrees in the present example. In the temperature characteristic compensation, such pixel value correction processing is executed.

That is, a band-corresponding pixel value estimated to be output in a case where image capturing processing by each camera is executed at the reference temperature is calculated.

A band-corresponding pixel value after temperature characteristic compensation is calculated as follows.

Note that, the reference temperature is 25 degrees.

The band-corresponding pixel value of the band 1 (band1) included in the R pixel value (Rraw) and the band-corresponding pixel value of the band 2 (band2) included in the B pixel value (Braw), which are calculated on the basis of the captured image by the reference camera X (reference machine) 50 captured at the temperature Tx, are respectively expressed as follows.

band1@Rraw (x) (Tx), band2@Braw(x) (Tx),

On the basis of the two band-corresponding pixel values described above calculated on the basis of the captured image at the temperature Tx by the reference camera X (reference machine) 50, band-corresponding pixel values after the temperature characteristic compensation, that is, temperature-characteristic-compensated band-corresponding pixel values estimated to be calculated from the captured image at the reference temperature (25 degrees)

are set as band1@Rraw(x) (T25), band2@Braw(x) (T25).

Furthermore, the band-corresponding pixel value of the band 1 (band1) included in the R pixel value (Rraw) and the band-corresponding pixel value of the band 2 (band2) included in the B pixel value (Braw), which are calculated on the basis of the captured image by the adjustment camera Y (adjustment machine) 60 captured at the temperature Ty, are respectively expressed as follows.

band1@Rraw (y) (Ty), band2@Braw(y) (Ty),

On the basis of the two band-corresponding pixel values described above calculated on the basis of the captured image at the temperature Ty by the adjustment camera Y (adjustment machine) 60, band-corresponding pixel values after the temperature characteristic compensation, that is, temperature-characteristic-compensated band-corresponding pixel values estimated to be calculated from the captured image at the reference temperature (25 degrees) are set as band1@Rraw(y) (T25), band2@Braw(y) (T25), First, in step S102b, the temperature-characteristic-compensated band-corresponding pixel value of the reference camera X (reference machine) 50 is calculated in accordance with the following formula.

Temperature-characteristic-compensated band-corresponding pixel value of band 1 (band1) included in R pixel value (Rraw): band1@Rraw(x) (T25)

=(band1@Rraw(x)(Tx))×((1+Ared×25)/(1+Ared×Tx))

Temperature-characteristic-compensated band-corresponding pixel value of band 2 (band2) included in B pixel value (Braw): band2@Braw(x) (T25), =(band2@Braw(x)(Tx))×((1+Anir×25)/(1+Anir×Tx))

Furthermore, in step S103b, the temperature-characteristic-compensated band-corresponding pixel value of the adjustment camera Y (adjustment machine) 60 is calculated in accordance with the following formula.

Temperature-characteristic-compensated band-corresponding pixel value of band 1 (band1) included in R pixel value (Rraw): band1@Rraw(y) (T25)

=(band1@Rraw(y)(Ty))×((1+Ared×25)/(1+Ared×Ty))

Temperature-characteristic-compensated band-corresponding pixel value in band 2 (band2) included in B pixel value (Braw): band2@Braw(y) (T25), =(band2@Braw(y)(Ty))×((1+Anir×25)/(1+Anir×Ty))

In steps S102b and S103b, the temperature characteristic compensation (temperature characteristic compensation processing) is performed on the band-corresponding pixel value of the reference camera X (reference machine) and the band-corresponding pixel value of the adjustment camera Y (adjustment machine) in this manner.

As a result, the temperature-characteristic-compensated band-corresponding pixel value of the reference camera X (reference machine) and the temperature-characteristic-compensated band-corresponding pixel value of the adjustment camera Y (adjustment machine) are calculated, and in the subsequent steps, processing, that is, processing of calculating the band-corresponding gain is performed by using these band-corresponding pixel values subjected to the temperature characteristic compensation.

(Step S104)

Next, in step S104, a band-corresponding gain is calculated by using the band-corresponding pixel value of the reference camera X (reference machine) and the band-corresponding pixel value of the adjustment camera Y (adjustment machine).

However, what is used for the gain calculation is the band-corresponding pixel value subjected to the temperature characteristic compensation calculated in steps S102b and S103b.

In Example 2, the band-corresponding gains to be calculated are the following band-corresponding gains.

However, the reference temperature is 25 degrees.

Band-corresponding gain of band 1 (band1)=band1@Rraw (x) (T25)/band1@Rraw (y) (T25)

Band-corresponding gain of band 2 (band2)=band2@Braw(x) (T25)/band2@Braw(y) (T25)

The band-corresponding gains after the temperature characteristic compensation of these two bands, that is, the two bands corresponding to the transmitted light band of the dual band bus filter 302, are calculated.

(Step S105)

Finally, in step S105, the band-corresponding gains calculated in step S104 are stored in the memory of the adjustment camera Y (adjustment machine).

Note that, as described earlier with reference to FIG. 5, the reference machine band-corresponding pixel value calculated on the basis of the captured image by the reference camera X (reference machine) is used for the processing of calculating the band-corresponding gains of a large number of adjustment cameras Y (adjustment machines). Thus, the temperature-characteristic-compensated reference machine band-corresponding pixel value calculated in step S102b may be stored in, for example, a memory of the reference camera X (reference machine) or a memory of an external device, and this memory-stored data may be applied to the band-corresponding gain calculation processing for the subsequent other adjustment cameras Y (adjustment machines).

In this case, in a case where processing is performed on the second and subsequent adjustment cameras (adjustment machines), it is possible to perform processing in which image capturing is performed only by the adjustment camera Y (adjustment machine) in step S101, the processing in steps S102 and S102b is omitted, and the temperature-characteristic-compensated reference machine band-corresponding pixel value stored in the memory is read and the band-corresponding gain of the adjustment machine is calculated in step S104.

Next, processing at the time of using the camera (at the time of imaging) in Example 2 will be described.

At the time of using the camera of Example 2, the processing according to the configuration of "(2) Processing at time of using camera (at time of imaging)" in FIG. 26 is executed. As a processing sequence, processing according to the flow illustrated in FIG. 27B is performed.

The processing at the time of using the camera (at the time of imaging) of Example 2 will be described with reference to FIG. 26 and the flow illustrated in FIG. 27B.

(Step S121)

First, in step S121, image capturing processing by the adjustment camera Y (adjustment machine) is executed.

(Step S122)

Next, in step S122, a band-corresponding pixel value of the adjustment camera Y (adjustment machine) is calculated.

This processing corresponds to the processing described earlier with reference to FIGS. 11 to 13.

Note that the band-corresponding pixel value calculation processing executed in step S122 is executed in accordance with the flow described earlier with reference to FIG. 15. That is, the band-corresponding pixel value calculation processing is processing involving processing of calculating a value that converges by the repeated operation described earlier with reference to FIGS. 12 and 13.

In Example 2, the band-corresponding pixel values of the adjustment camera Y (adjustment machine) 60 to be calculated are the following band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), (Step S122b)

Next, in step S122b, the temperature characteristic compensation of the band-corresponding pixel value of the adjustment camera Y (adjustment machine) is executed to calculate the band-corresponding pixel value after the temperature characteristic compensation.

This processing is similar to the processing of step S103b of the flow of FIG. 27A described earlier.

In a case where the temperature at the time of image capturing in step S121 is Ty and the reference temperature is 25 degrees, the temperature-characteristic-compensated band-corresponding pixel value of the adjustment camera Y (adjustment machine) 60 is calculated in accordance with the following equation.

Temperature-characteristic-compensated band-corresponding pixel value of band 1 (band1) included in R pixel value (Rraw): band1@Rraw(y) (T25)

=(band1@Rraw(y)(Ty))×((1+Ared×25)/(1+Ared×Ty))

Temperature-characteristic-compensated band-corresponding pixel value in band 2 (band2) included in B pixel value (Braw): band2@Braw(y) (T25), =(band2@Braw(y)(Ty))×((1+Anir×25)/(1+Anir×Ty))

The following processing is executed by using these band-corresponding pixel values after the temperature characteristic compensation.

(Step S123)

Next, in step S123, the band-corresponding pixel value after temperature characteristic compensation calculated in step S122b is multiplied by the band-corresponding gain stored in the memory, whereby the band-corresponding gain adjustment output value is calculated.

By the band-corresponding gain adjustment output value calculation processing, the band-corresponding pixel values of the adjustment camera Y (adjustment machine) 60 are output values matching the output value of the reference camera X (reference machine) 50.

Since the gain calculated by this processing is the band-corresponding gain and is not the gain corresponding to the mixed signal of the plurality of different band signals, the gain does not greatly change depending on the imaging condition (light source or subject).

Furthermore, the output value can be set to the same value as in the case of imaging at the reference temperature even in a case where the gain is the band-corresponding gain subjected to the temperature characteristic compensation and the imaging temperature is different.

Thus, even in a case where the imaging condition at the time of using the camera (at the time of imaging) is different from the imaging condition at the time of manufacturing the camera, it is possible to match the output of the adjustment machine with that of the reference machine by applying the gain calculated at the time of manufacturing the camera.

(Step S124)

Moreover, in step S124, generation of a color image, analysis of color components of a subject, and the like are executed on the basis of the band-corresponding gain adjustment output values calculated in step S123.

Specifically, processing of calculating the activation index value of the plant such as the NDVI described earlier is executed.

Note that, also in Example 2, similarly to Example 1 described earlier, the band-corresponding gain calculation processing may be performed not at the time of manufacturing the camera but at the time of using the camera (at the time of imaging).

Figure 29:
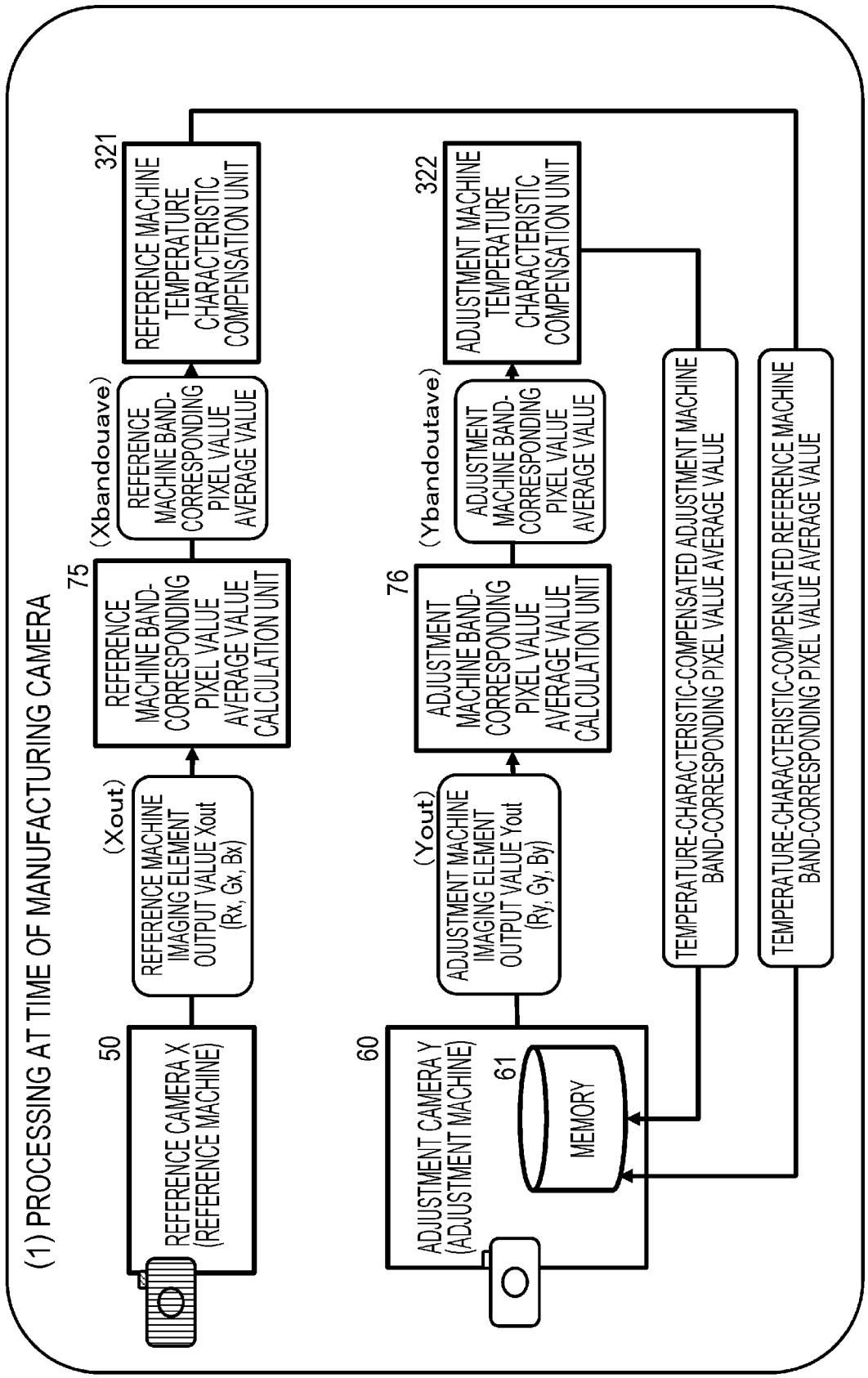
FIG. 29 is a diagram explaining an adjustment example of output variation of the imaging device of Example 2 of the present disclosure.
Figure 30:
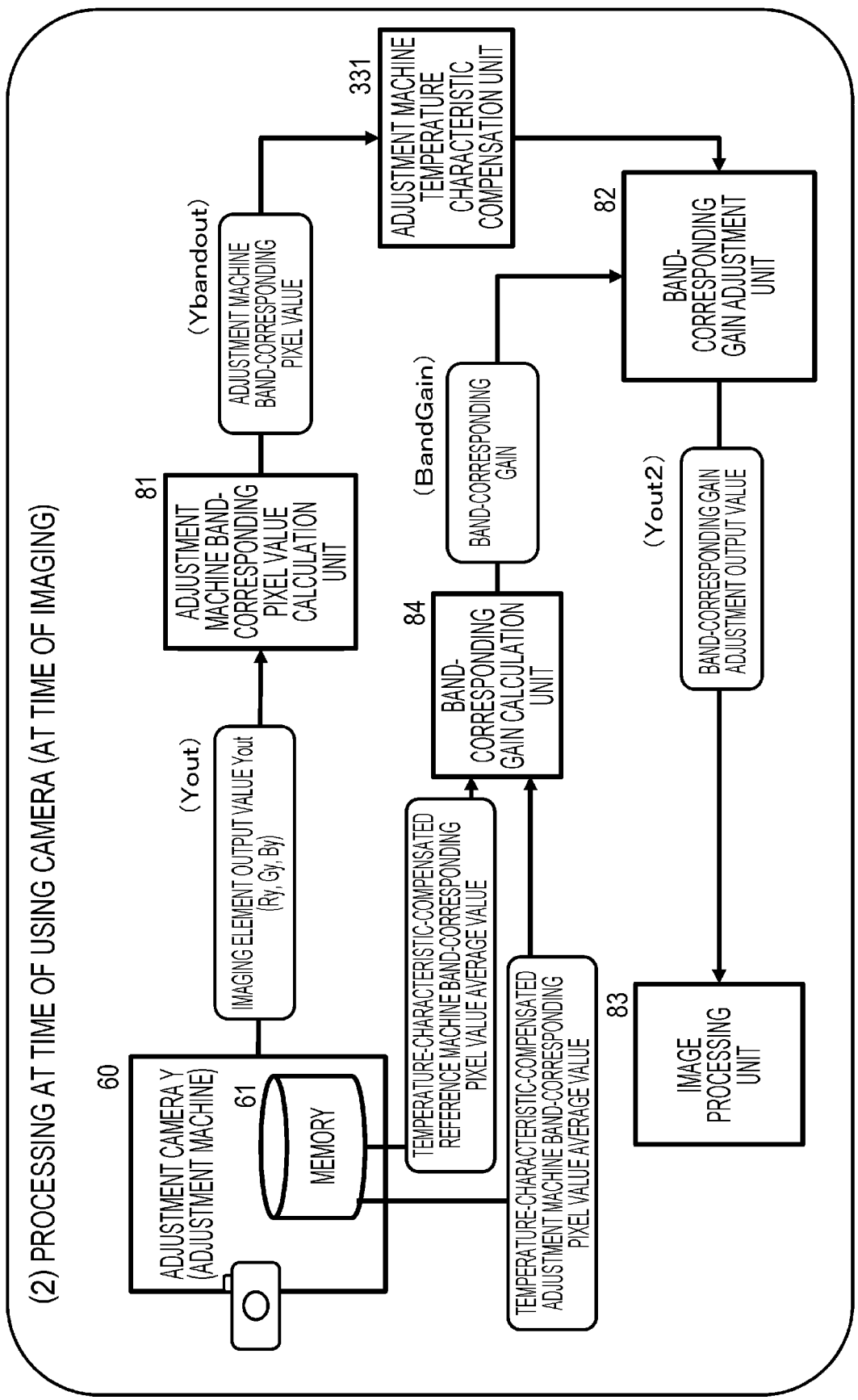
FIG. 30 is a diagram explaining an adjustment example of output variation of the imaging device of Example 2 of the present disclosure.

FIGS. 29 and 30 illustrate a processing configuration in a case where the band-corresponding gain calculation processing is performed not at the time of manufacturing the camera but at the time of using the camera (at the time of imaging).

FIG. 29 is a configuration illustrating "(1) Processing at time of manufacturing camera".

FIG. 30 is a configuration illustrating "(2) Processing at time of using camera (at time of imaging)".

Figure 31:
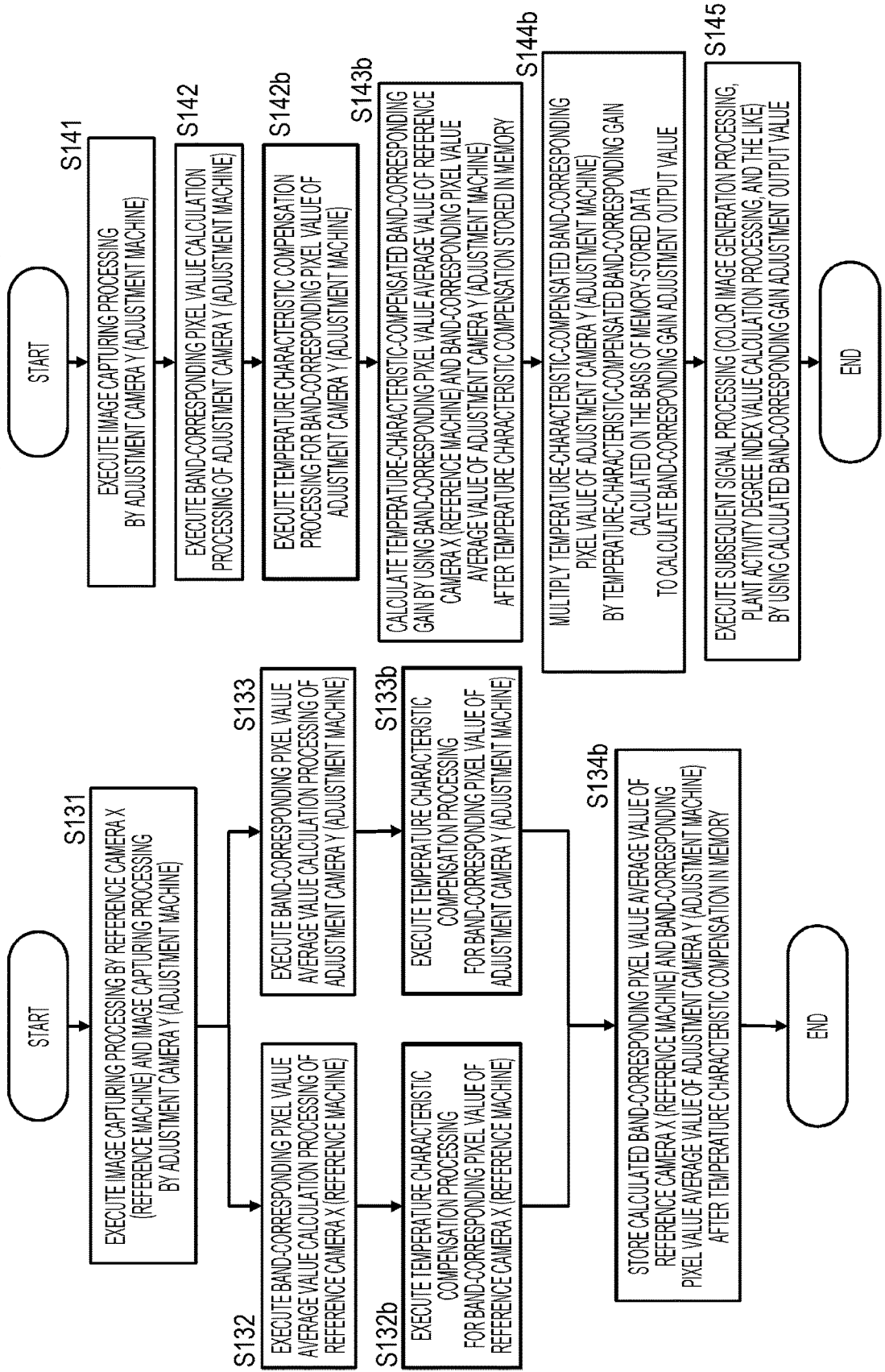
FIGS. 31A and 31B are diagrams illustrating a flowchart explaining an image processing sequence of Example 2 of the present disclosure.

Furthermore, a processing sequence in a case where these processing configurations are used is illustrated in FIGS. 31A and 31B.

As illustrated in FIG. 29, the following values are stored in the memory 61 of the adjustment camera Y (adjustment machine) 60 at the time of manufacturing the camera.

(a) Temperature-characteristic-compensated reference machine band-corresponding pixel value average value that is value after temperature characteristic compensation of reference machine imaging element band-corresponding pixel value average value (Xoutave) calculated from pixel values of reference camera X (reference machine) 50

(b) Temperature-characteristic-compensated adjustment machine band-corresponding pixel value average value that is value after temperature characteristic compensation of adjustment machine imaging element band-corresponding pixel value average value (Youtave) calculated from pixel values of adjustment camera Y (adjustment machine) 60

These are calculated and stored in the memory 61 of the adjustment camera Y (adjustment machine) 60.

Furthermore, as illustrated in FIG. 30, at the time of using the camera (at the time of imaging), from the memory 61 of the adjustment camera Y (adjustment machine) 60, (a) temperature-characteristic-compensated reference machine band-corresponding pixel value average value of reference camera X (reference machine) 50 and (b) temperature-characteristic-compensated adjustment machine band-corresponding pixel value average value of adjustment camera Y (adjustment machine) 60 are acquired, and the band-corresponding gain calculation unit calculates the band-corresponding gain.

A processing sequence using the processing configurations of FIGS. 29 and 30 is a processing flow illustrated in FIGS. 31A and 31B.

The processing flow illustrated in FIGS. 31A and 31B are different in that the band-corresponding gain calculation processing in step S104 of FIG. 27A flow at time of manufacturing camera described earlier with reference to FIGS. 27A and 27B are omitted, and this processing is added as step S143b of FIG. 27B flow at time of using camera (at time of imaging).

As described above, also in Example 2, similarly to Example 1 described earlier, the band-corresponding gain calculation processing may be performed not at the time of manufacturing the camera but at the time of using the camera (at the time of imaging).

At the time of manufacturing the camera, the pixel value average value or the representative value subjected to the temperature characteristic compensation processing is stored in the memory 61 of the adjustment camera Y (adjustment machine) 60, and the band-corresponding gain is calculated by using the pixel value average value or the representative value subjected to the temperature characteristic compensation processing stored in the memory 61 at the time of using the camera (at the time of imaging).

9-3 (Example 3) Example of Executing Processing of Calculating Band-Corresponding Gain and Processing of Calculating Spectral Characteristic Parameter (Separation Coefficient) Using Special Light Source Next, as (Example 3), a description will be given of an example of executing processing of calculating a band-corresponding gain and processing of calculating a spectral characteristic parameter (separation coefficient) using a special light source.

Example 3 will also be described as an example using a multispectral camera using a dual band pass (DBP) similarly to Examples 1 and 2 described earlier.

That is, the reference camera X (reference machine) 50 and the adjustment camera Y (adjustment machine) 60 each have a configuration illustrated in FIG. 22.

The dual bandpass filter (DBP) 302 is a filter that selectively transmits two different wavelength components of light, a red (R) component and a near infrared (NIR) component.

In Example 3, the band-corresponding gain is calculated by using the special light source. Moreover, processing of calculating the spectral characteristic parameter (separation coefficient) is also executed.

Figure 32:
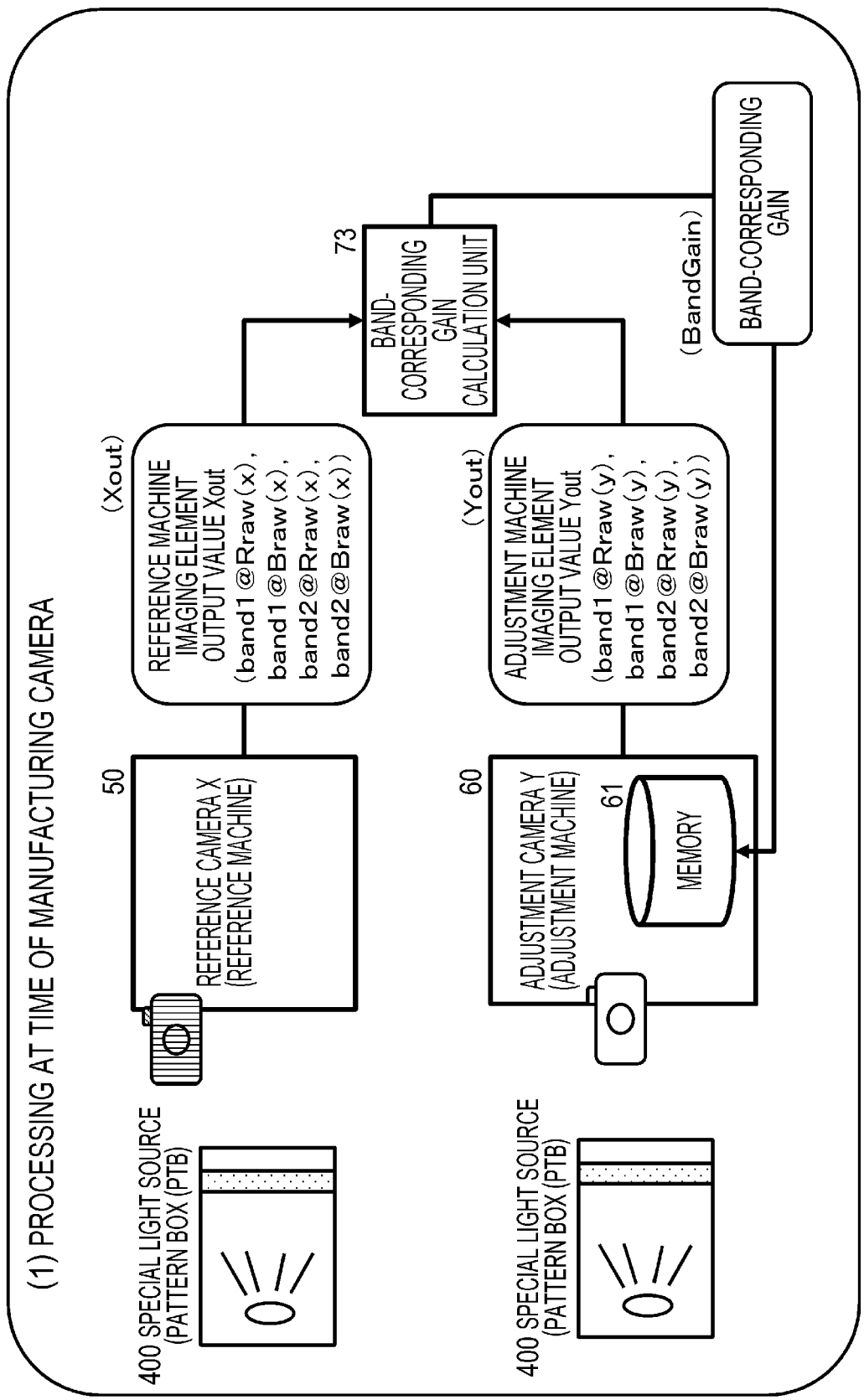
FIG. 32 is a diagram explaining an adjustment example of output variation of an imaging device of Example 3 of the present disclosure.

In Example 3, at the time of manufacturing the camera, band-corresponding gain calculation processing and memory storage processing of the adjustment camera Y (adjustment machine) 60 are executed in accordance with the configuration of "(1) Processing at time of manufacturing camera" in FIG. 32.

Processing of Example 3 will be described with reference to FIG. 32.

In Example 3, as illustrated in FIG. 32, first, the reference camera (reference machine) 50 and the adjustment camera Y (adjustment machine) 60 capture an image of output light of a special light source (pattern box (PTB)) 400.

As described earlier with reference to FIG. 21, the special light source (pattern box (PTB)) is a light source including a halogen light source, a diffusion plate, and a filter and having a configuration of selectively outputting light in a specific band through the filter.

However, the special light source (pattern box (PTB)) used in Example 3 has a filter configuration different from that of the special light source (pattern box (PTB)) 200 described earlier with reference to FIG. 21.

A configuration of the special light source (pattern box (PTB)) 400 used in Example 3 will be described with reference to FIG. 33.

Figure 33:
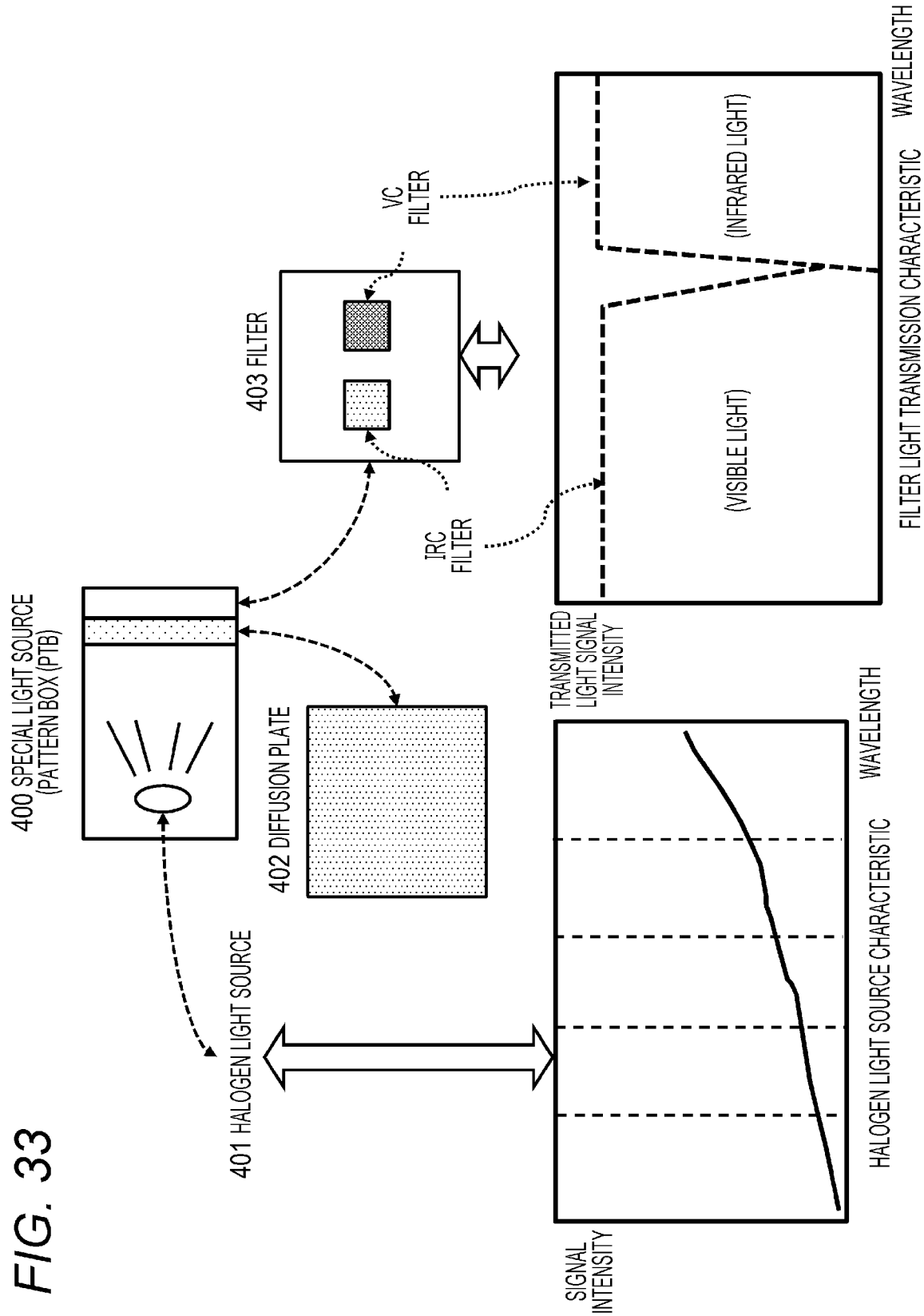
FIG. 33 is a diagram explaining a special feature light source used in Example 3 of the present disclosure.

As illustrated in FIG. 33, the special light source (pattern box) 400 includes a halogen light source 401, a diffusion plate 402, and a filter 403, and output light of the halogen light source 401 is output through the diffusion plate 402 and the filter 403, and an image of this output light is captured by multispectral cameras, that is, the reference camera (reference machine) 50 and the adjustment camera Y (adjustment machine) 60.

The halogen light source 401 has a characteristic as illustrated in the lower left part of the figure. The output light of the halogen light source 401 passes through the diffusion plate 402 having a relatively flat characteristic and is output through the filter 403. Different filters, an IRC filter and a VC filter, are attached to the filter 403 in two windows.

The light transmission characteristics of the IRC filter and the VC filter are as illustrated in the lower right graph of FIG. 33.

That is, the IRC filter is an infrared light (IR) cut filter, and has a characteristic of not transmitting an infrared light component but transmitting a visible light component.

On the other hand, the VC filter is a visible light (Visible) cut filter, and has a characteristic of not transmitting a visible light component but transmitting an infrared light component contrary to the IRC filter.

One of the IRC filter or the VC filter having such different light transmission characteristics is closed, and an image of light transmitted through only one filter is captured by the multispectral cameras (the reference camera (reference machine) 50 and the adjustment camera Y (adjustment machine) 60). The filters that transmit light are sequentially switched, and images of light in two different bands are sequentially captured by the multispectral cameras. Output values obtained from these captured images are output values shown in FIG. 32.

That is, the pixel values (output values Xout) (=Rraw, Braw) of the R pixel and the B pixel of the reference camera X (reference machine) 50 are the following pixel values.

At time of imaging IRC filter transmitted light, $R\text{raw}(x) = \text{band1}@R\text{raw}(x)$ $B\text{raw}(x) = \text{band1}@B\text{raw}(x)$ At time of imaging VC filter transmitted light, $R\text{raw}(x) = \text{band2}@R\text{raw}(x)$ $B\text{raw}(x) = \text{band2}@B\text{raw}(x)$ Meanwhile, the pixel values (output values Xout) (=Rraw, Braw) of the R pixel and the B pixel of the adjustment camera Y (adjustment machine) 60 are the following pixel values.

At time of imaging IRC filter transmitted light, $R\text{raw}(y) = \text{band1}@R\text{raw}(y)$ $B\text{raw}(y) = \text{band1}@B\text{raw}(y)$ At time of imaging VC filter transmitted light, $R\text{raw}(y) = \text{band2}@R\text{raw}(y)$ $B\text{raw}(y) = \text{band2}@B\text{raw}(y)$ A reason why these output values are obtained will be described with reference to FIG. 34.

Figure 34:
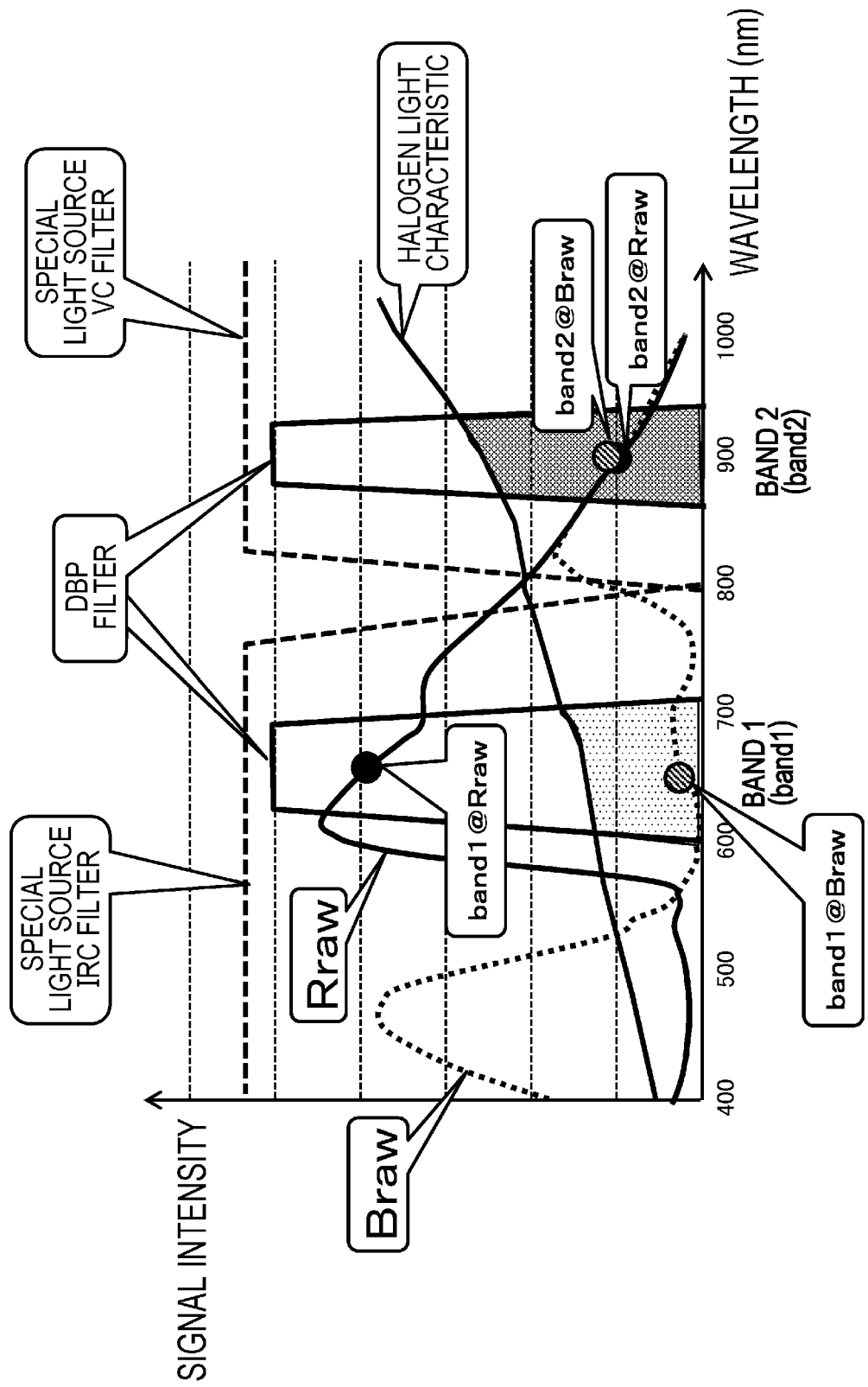
FIG. 34 is a diagram explaining the special feature light source, characteristics of respective filters, and pixel values of an imaging element used in Example 3 of the present disclosure.

The graph illustrated in FIG. 34 is a graph in which the wavelength is set on the horizontal axis and the signal intensity is set on the vertical axis.

The graph illustrates the transmission characteristics of the IRC filter and the VC filter described earlier with reference to FIG. 33.

Moreover, the light transmission characteristics of the color filter and the dual bandpass filter of the multispectral (the reference camera (reference machine) 50 and the adjustment camera Y (adjustment machine) 60) that perform image capturing are illustrated.

Note that the multispectral (the reference camera (reference machine) 50 and the adjustment camera Y (adjustment machine) 60) used in Example 3 has the configuration illustrated in FIG. 22 similarly to Example 1 described earlier.

That is, the dual bandpass filter (DBP) 302 is a filter that selectively transmits two different wavelength components of light, a red (R) component and a near infrared (NIR) component.

FIG. 34 illustrates the light transmission characteristic of the dual bandpass filter (DBP) 302. Light in the band 1 (band1) and the band 2 (band2) is selectively transmitted.

(Rraw) and (Braw) illustrated in FIG. 34 are the light transmission characteristics of R and B of the color filter 303.

Light input to the imaging element 304 of the multispectral (the reference camera (reference machine) 50 and the adjustment camera Y (adjustment machine) 60) that perform image capturing is light passing through three filters of
(1) the IRC filter or the VC filter of the special light source 400,
(2) the dual bandpass filter (DBP) 302 that selectively transmits light in the band 1 (band1) and the band 2 (band2), and
(3) the color filter.

As understood from FIG. 34, at the time of imaging light transmitted through the IRC filter of the special light source 400, only transmitted light in the band 1 (band1) of the dual bandpass filter (DBP) 302 is transmitted through each of R and B pixels of the color filter 303 and input to the imaging element 304.

As a result, the pixel value (Rraw) of the R pixel of the imaging element 304 is $R\text{raw}=\text{band1}@R\text{raw}$ as shown in FIG. 34.

Furthermore, the pixel value (Braw) of the B pixel of the imaging element 304 is $B\text{raw}=\text{band1}@B\text{raw}$ as shown in FIG. 34.

On the other hand, at the time of imaging light transmitted through the VC filter of the special light source 400, only transmitted light in the band 2 (band2) of the dual bandpass filter (DBP) 302 is transmitted through each of R and B pixels of the color filter 303 and input to the imaging element 304.

As a result, the pixel value (Rraw) of the R pixel of the imaging element 304 is $R\text{raw}=\text{band2}@R\text{raw}$ as shown in FIG. 34.

Furthermore, the pixel value (Braw) of the B pixel of the imaging element 304 is $B\text{raw}=\text{band2}@B\text{raw}$ as shown in FIG. 34.

As described above, the IRC filter and the VC filter of the special light source 400 are sequentially switched and an image is captured by the multispectral cameras (the reference camera (reference machine) 50 and the adjustment camera Y (adjustment machine) 60), so that the following pixel values can be acquired as the output values shown in FIG. 26, that is, the pixel values (output values Xout) (=Rraw, Braw) of the R pixel and the B pixel of the reference camera X (reference machine) 50.

Alternatively, the following pixel values can be similarly acquired by simultaneously imaging the light transmitted through the two filters and cutting out portions of the transmitted through the respective filters.

At time of imaging IRC filter transmitted light, $R\text{raw}(x)=\text{band1}@R\text{raw}(x)$ $B\text{raw}(x)=\text{band1}@B\text{raw}(x)$ At time of imaging VC filter transmitted light, $R\text{raw}(x)=\text{band2}@R\text{raw}(x)$ $B\text{raw}(x)=\text{band2}@B\text{raw}(x)$ Meanwhile, the following pixel values can be acquired as the pixel values (output values Xout) (=Rraw, Braw) of the pixel values (output values Xout) (=Rraw, Braw) of the R pixel and the B pixel of the adjustment camera Y (adjustment machine) 60.

At time of imaging IRC filter transmitted light, $R\text{raw}(y)=\text{band1}@R\text{raw}(y)$ $B\text{raw}(y)=\text{band1}@B\text{raw}(y)$ At time of imaging VC filter transmitted light, $R\text{raw}(y)=\text{band2}@R\text{raw}(y)$ $B\text{raw}(y)=\text{band2}@B\text{raw}(y)$ The band-corresponding gain calculation unit 73 illustrated in FIG. 32 inputs the values described above from the reference camera (reference machine) 50 and the adjustment camera Y (adjustment machine) 60, and calculates band-corresponding gains of the adjustment camera Y (adjustment machine) 60.

The band-corresponding gains calculated by the band-corresponding gain calculation unit 73 are the following values.

Band-corresponding gain of band
$1(\text{band1})=\text{band1}@R\text{raw}(x)/\text{band1}@R\text{raw}(y)$ Band-corresponding gain of band
$2(\text{band2})=\text{band2}@B\text{raw}(x)/\text{band2}@B\text{raw}(y)$ The band-corresponding gains of these two bands, that is, the two bands corresponding to the transmitted light band of the dual band bus filter 302, can be calculated.

Figure 35:
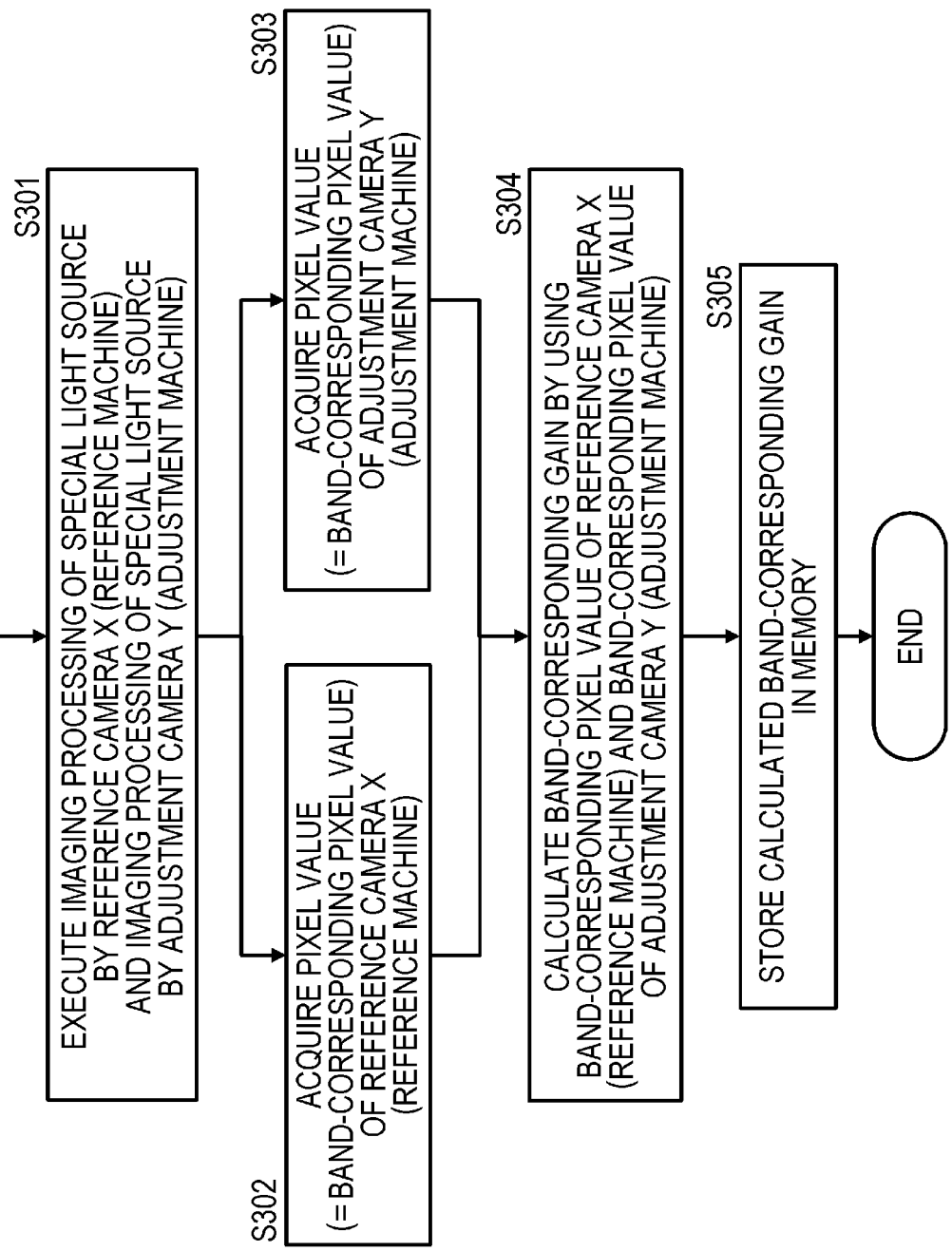
FIG. 35 is a diagram illustrating a flowchart explaining an image processing sequence of Example 3 of the present disclosure.

A processing sequence of the band-corresponding gain calculation processing of Example 3 will be described with reference to a flowchart illustrated in FIG. 35.

(Step S301)

First, in step S301, imaging processing of the special light source by the reference camera X (reference machine) and imaging processing of the special light source by the adjustment camera Y (adjustment machine) are executed. The image capturing is preferably executed under the same condition.

(Steps S302 and S303)

In the next steps S302 and S303, the captured pixel values of the reference camera X (reference machine) and the adjustment camera Y (adjustment machine), that is, the R pixel value (Rraw) and the B pixel value (Braw) are acquired.

As described earlier with reference to FIG. 34, the acquired pixel values are values that are the band-corresponding pixel values of the band 1 (band1) and the band 2 (band2).

Thus, in Example 3, it is not necessary to perform the processing of calculating the band-corresponding pixel value executed in Example 1.

In steps S302 and S303, the following band-corresponding pixel values can be acquired as the pixel values of the captured image.

That is, the following band-corresponding pixel values can be obtained from the pixel values of the reference camera X (reference machine).

At time of imaging IRC filter transmitted light, $R\text{raw}(x) = \text{band1}@R\text{raw}(x)$ $B\text{raw}(x) = \text{band1}@B\text{raw}(x)$ At time of imaging VC filter transmitted light, $R\text{raw}(x) = \text{band2}@R\text{raw}(x)$ $B\text{raw}(x) = \text{band2}@B\text{raw}(x)$ Meanwhile, the following band-corresponding pixel values can be obtained from the pixel values of the adjustment camera Y (adjustment machine).

At time of imaging IRC filter transmitted light, $R\text{raw}(y) = \text{band1}@R\text{raw}(y)$ $B\text{raw}(y) = \text{band1}@B\text{raw}(y)$ At time of imaging VC filter transmitted light, $R\text{raw}(y) = \text{band2}@R\text{raw}(y)$ $B\text{raw}(y) = \text{band2}@B\text{raw}(y)$ (Step S304)

Next, in step S304, a band-corresponding gain is calculated by using the band-corresponding pixel value of the reference camera X (reference machine) and the band-corresponding pixel value of the adjustment camera Y (adjustment machine).

In Example 3, the band-corresponding gains to be calculated are the following band-corresponding gains.

Band-corresponding gain of band 1(band1) = band1@$R$raw($x$)/band1@$R$raw($y$)

Band-corresponding gain of band 2(band2) = band2@$B$raw($x$)/band2@$B$raw($y$)

The band-corresponding gains of these two bands, that is, the two bands corresponding to the transmitted light band of the dual band bus filter 302, are calculated.

(Step S305)

Finally, in step S305, the band-corresponding gains calculated in step S304 are stored in the memory of the adjustment camera Y (adjustment machine).

Note that, as described earlier with reference to FIG. 5, the reference machine band-corresponding pixel value obtained from the pixel value of the captured image by the reference camera X (reference machine) is used for the processing of calculating the band-corresponding gains of a large number of adjustment cameras Y (adjustment machines). Thus, the reference machine band-corresponding pixel value acquired in step S302 may be stored in, for example, a memory of the reference camera X (reference machine) or a memory of an external device, and this memory-stored data may be applied to the band-corresponding gain calculation processing for the subsequent other adjustment cameras Y (adjustment machines).

In this case, in a case where processing is performed on the second and subsequent adjustment cameras (adjustment machines), it becomes possible to perform processing in which image capturing is performed only by the adjustment camera Y (adjustment machine) in step S301, the processing in step S302 is omitted, and the reference machine band-corresponding pixel values stored in the memory are read and the band-corresponding gains of the adjustment machine are calculated in step S304.

Note that, in Example 3, it is also possible to calculate spectral characteristic parameters (separation coefficients) and store the spectral characteristic parameters in the memory in addition to the processing of calculating the band-corresponding gain to be stored in the adjustment camera Y (adjustment machine)

The spectral characteristic parameters (separation coefficients) are intensity ratios of the light transmitted through the plurality of different color filters constituting the color filter of the multispectral camera, in a specific band, that is, a transmitted light band of the multiband pass filter.

The intensity ratio of the light transmitted through the R and B pixels of the color filter of each of the band 1 (band1) and the band 2 (band2) illustrated in FIG. 34 can be directly calculated from the pixel values (Rraw, Braw) of the multispectral camera that captures an image of the light of the special light source 400 in Example 3.

The spectral characteristic parameter (separation coefficient) of each of the band 1 (band1) and the band 2 (band2) can be calculated as follows.

Reference camera X (reference machine)

Spectral characteristic parameter (separation coefficient) corresponding to band 1 (band1)

$K\text{band1}(x) = \text{band1}@B\text{raw}(x)/\text{band1}@R\text{raw}(x)$

Spectral characteristic parameter (separation coefficient) corresponding to band 2 (band2)

$K\text{band2}(x) = \text{band2}@R\text{raw}(x)/\text{band2}@B\text{raw}(x)$

Adjustment camera Y (adjustment machine)

Spectral characteristic parameter (separation coefficient) corresponding to band 1 (band1)

$K\text{band1}(y) = \text{band1}@B\text{raw}(y)/\text{band1}@R\text{raw}(y)$

Spectral characteristic parameter (separation coefficient) corresponding to band 2 (band2)

$K\text{band2}(y) = \text{band2}@R\text{raw}(y)/\text{band2}@B\text{raw}(y)$

As described above, in Example 3, it is possible to calculate the intensity ratio of the light transmitted through the R and B pixels of the color filter of each of the band 1 (band1) and the band 2 (band2), that is, the spectral characteristic parameter (separation coefficient), from the pixel values (Rraw, Braw) of the multispectral camera that captures the image of the light of the special light source 400.

Figure 36:
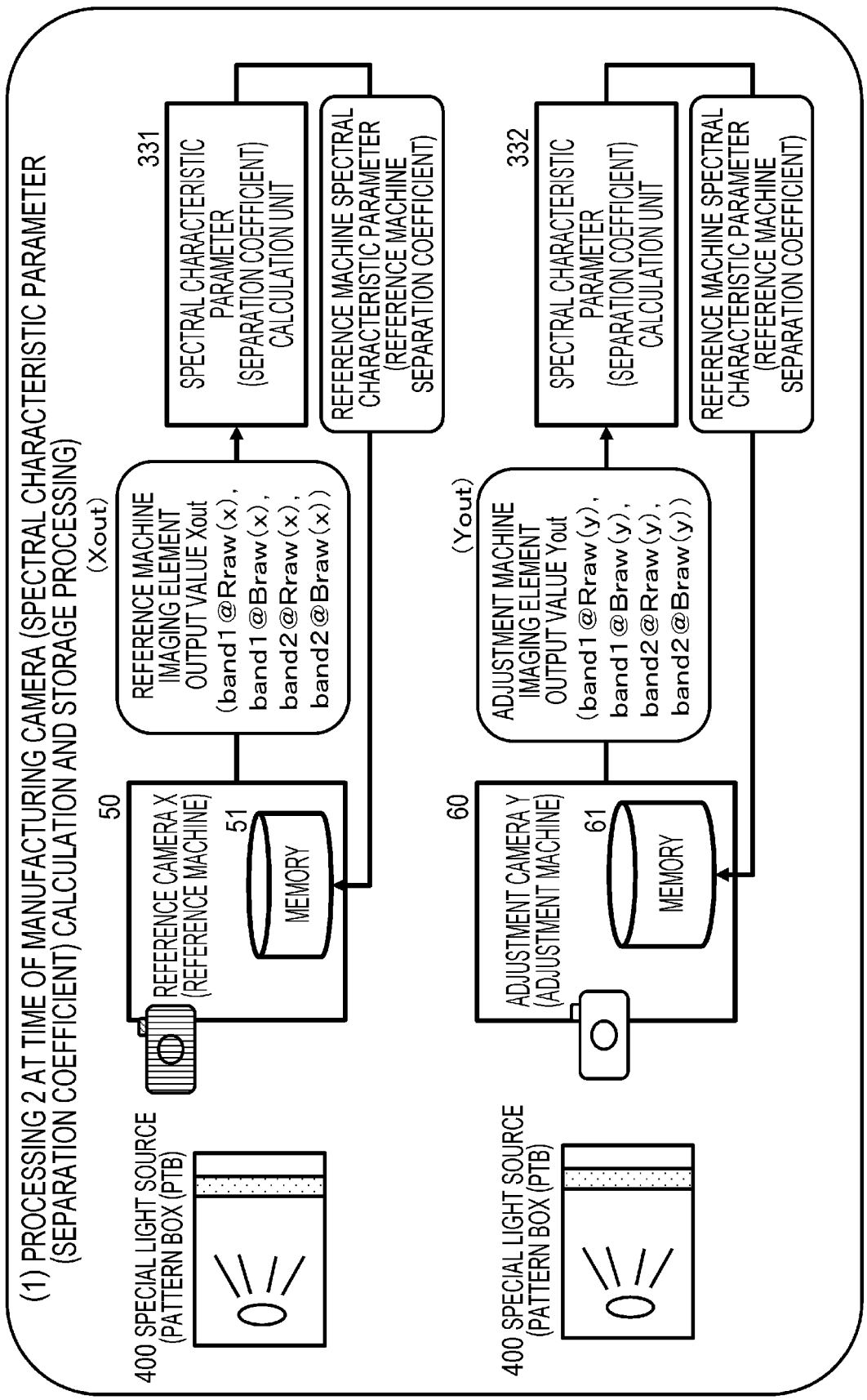
FIG. 36 is a diagram explaining processing of calculating and recording a spectral characteristic parameter (separation coefficient) in Example 3 of the present disclosure.

Thus, for example, as illustrated in FIG. 36, a configuration may be adopted that is provided with a spectral characteristic parameter (separation coefficient) calculation unit 331 that inputs a captured image by the reference camera X (reference machine) 50 and calculates a spectral characteristic parameter (separation coefficient) corresponding to the reference machine, and a spectral characteristic parameter (separation coefficient) calculation unit 332 that inputs a captured image by the adjustment camera Y (adjustment machine) 60 and calculates a spectral characteristic parameter (separation coefficient) corresponding to the adjustment machine.

By storing the spectral characteristic parameter (separation coefficient) calculated in each of these units in the memory of each camera or the memory of the external device, it is possible to use the spectral characteristic parameter in the case of calculating the band-corresponding gain by a method other than Example 3, such as Example 1 and Example 2.

Note that, also in Example 3, similarly to the modifications of Examples 1 and 2 described earlier, the band-corresponding gain calculation processing may be executed not at the time of manufacturing the camera but at the time of using the camera (at the time of imaging).

At the time of manufacturing the camera, the pixel value average value or the representative value is stored in the memory 61 of the adjustment camera Y (adjustment machine) 60, and the band-corresponding gain is calculated by using the pixel value average value or the representative value stored in the memory 61 at the time of using the camera (at the time of imaging).

9-4 (Example 4) Example of Executing Processing of Calculating Band-Corresponding Gain and Spectral Characteristic Parameter (Separation Coefficient) by Using Both Measured Spectral Characteristic Parameter (Separation Coefficient) of Reference Machine and Special Light Source)

Next, a description will be given of (Example 4) Example of executing processing of calculating band-corresponding gain and spectral characteristic parameter (separation coefficient) by using both measured spectral characteristic parameter (separation coefficient) of reference machine and special light source.

As described earlier with reference to FIG. 36, for example, the spectral characteristic parameter (separation coefficient) can be calculated on the basis of the captured data of the light source using the special light source.

Example 4 described below is an example in which the processing of calculating the band-corresponding gain using the measured spectral characteristic parameter (separation coefficient) of the reference machine is executed.

Also in Example 4, similarly to Example 3, the band-corresponding gain of the adjustment camera Y (adjustment machine) 60 is calculated by using the captured image of the output light of the special light source (pattern box (PTB)).

Note that, also in Example 4, a description will be given of an example using a multispectral camera using a dual band pass (DBP) similarly to Examples 1 to 3 described earlier.

That is, the reference camera X (reference machine) 50 and the adjustment camera Y (adjustment machine) 60 each have a configuration illustrated in FIG. 22.

The dual bandpass filter (DBP) 302 is a filter that selectively transmits two different wavelength components of light, a red (R) component and a near infrared (NIR) component.

A configuration example of the special light source (pattern box (PTB)) used in Example 4 will be described with reference to FIG. 37.

Figure 37:
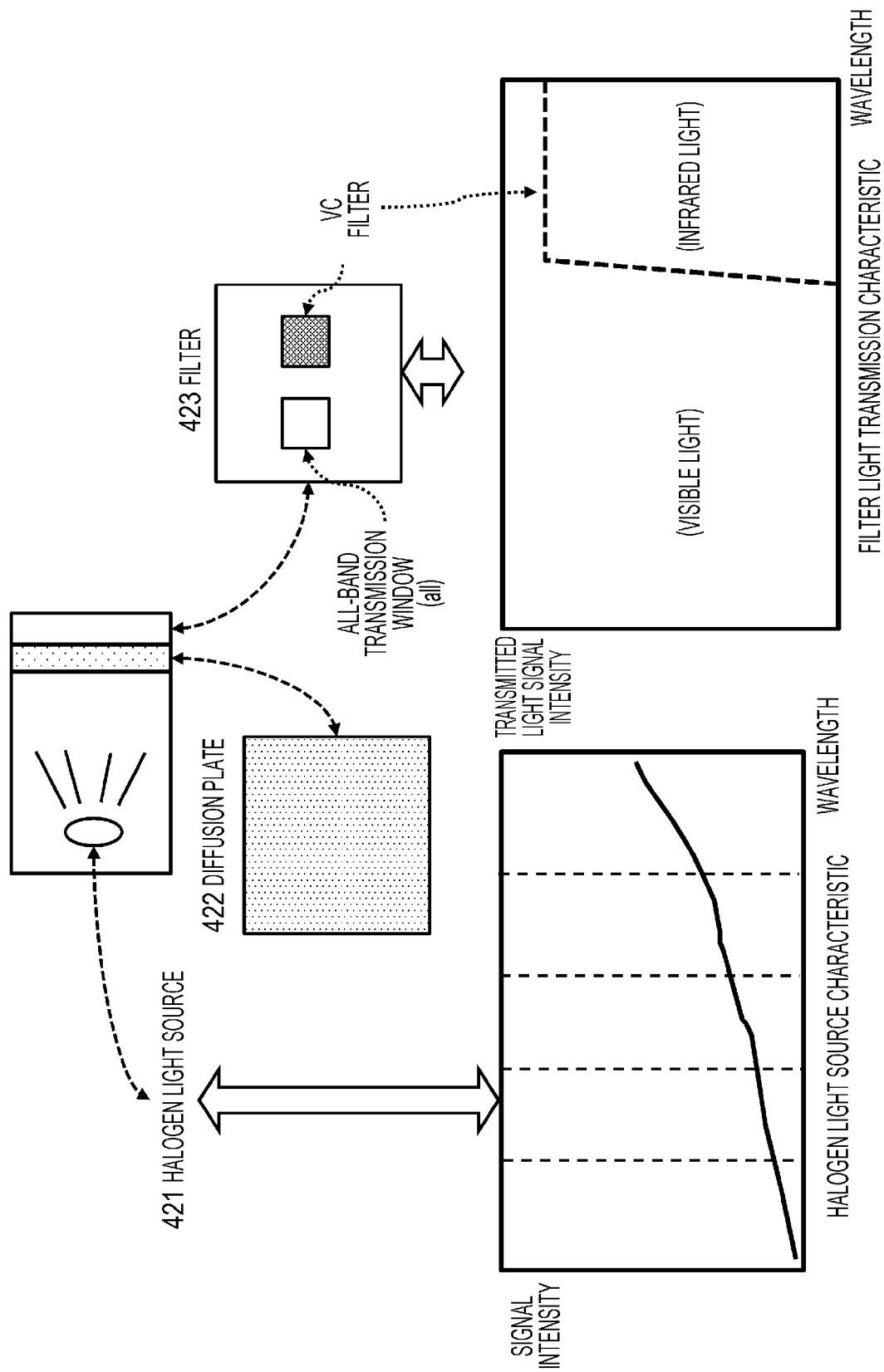
FIG. 37 is a diagram explaining a special feature light source used in Example 4 of the present disclosure.

As illustrated in FIG. 37, a special light source (pattern box) 420 includes a halogen light source 421, a diffusion plate 422, and a filter 423, and output light of the halogen light source 421 is output through the diffusion plate 422 and the filter 423, and an image of this output light is captured by multispectral cameras, that is, the reference camera (reference machine) 50 and the adjustment camera Y (adjustment machine) 60.

The halogen light source 421 has a characteristic as illustrated in the lower left part of the figure. The output light of the halogen light source 421 passes through the diffusion plate 422 having a relatively flat characteristic and is output through the filter 423. The filter 423 includes two windows; one is an all-band transmission window (ALL) and the VC filter is mounted on the other.

The all-band transmission window (ALL) is a window that transmits visible light and infrared light regions all. The light transmission characteristic of the VC filter is as illustrated in the lower right graph of FIG. 37.

That is, the VC filter is a visible light (Visible) cut filter, and has a characteristic of not transmitting a visible light component but transmitting an infrared light component.

One of the all-band transmission window (ALL) or the VC filter having such different light transmission characteristics is closed, and an image of light transmitted through only one of them is captured by the multispectral cameras (the reference camera (reference machine) 50 and the adjustment camera Y (adjustment machine) 60). Light transmission windows are sequentially switched, and images of light in two different bands are sequentially captured by the multispectral cameras. Pixel values (output values) obtained from these captured images will be described with reference to FIG. 38.

Figure 38:
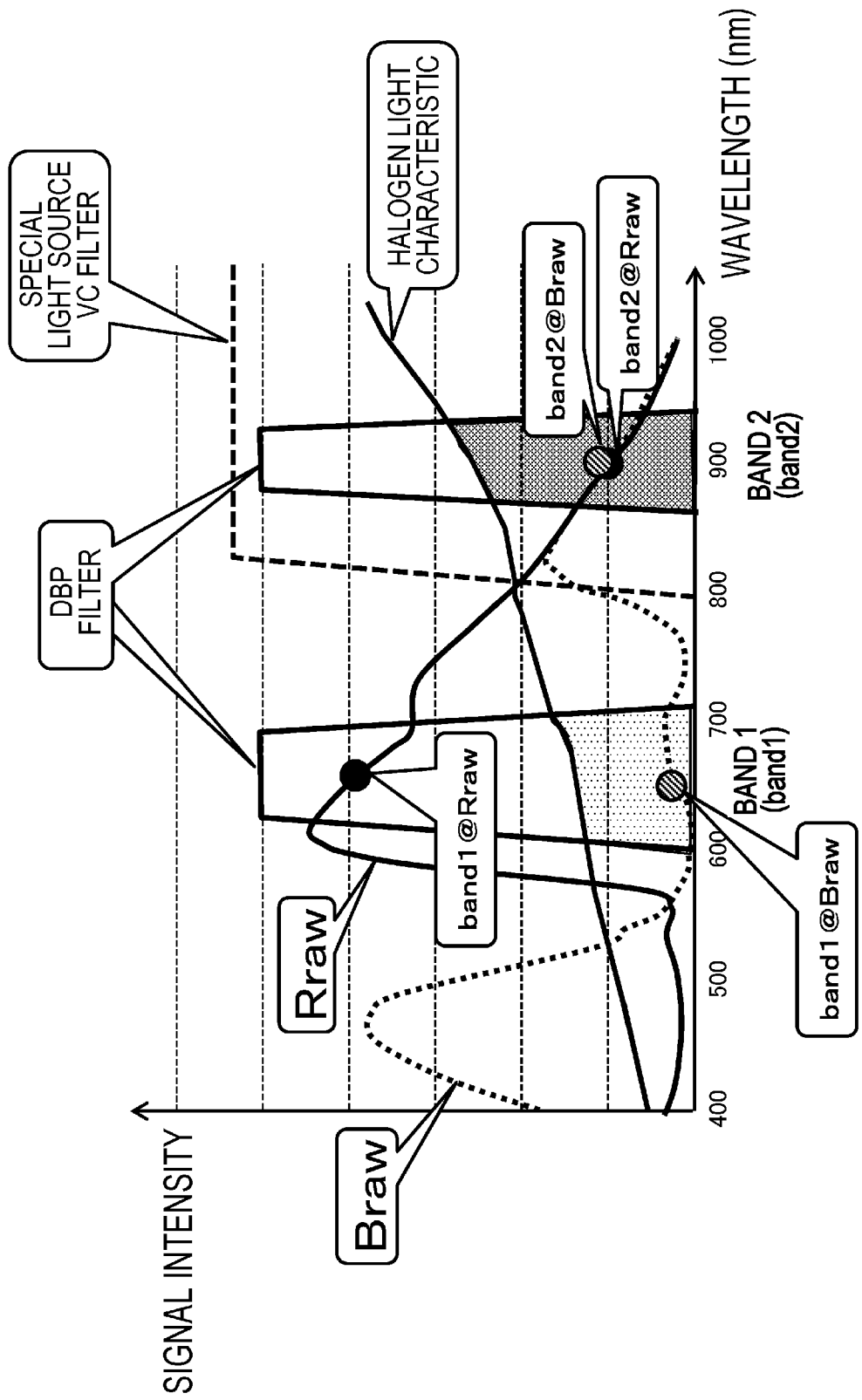
FIG. 38 is a diagram explaining the special feature light source, characteristics of respective filters, and pixel values of an imaging element used in Example 4 of the present disclosure.

The graph illustrated in FIG. 38 is a graph in which the wavelength is set on the horizontal axis and the signal intensity is set on the vertical axis.

The graph illustrates the transmission characteristic of the VC filter described earlier with reference to FIG. 37.

Moreover, the light transmission characteristics of the color filter and the dual bandpass filter of the multispectral (the reference camera (reference machine) 50 and the adjustment camera Y (adjustment machine) 60) that perform image capturing are illustrated.

Note that the multispectral (the reference camera (reference machine) 50 and the adjustment camera Y (adjustment machine) 60) used in Example 4 has the configuration illustrated in FIG. 22 similarly to Example 1 described earlier.

That is, the dual bandpass filter (DBP) 302 is a filter that selectively transmits two different wavelength components of light, a red (R) component and a near infrared (NIR) component.

FIG. 38 illustrates the light transmission characteristic of the dual bandpass filter (DBP) 302. Light in the band 1 (band1) and the band 2 (band2) is selectively transmitted.

(Rraw) and (Braw) illustrated in FIG. 38 are the light transmission characteristics of R and B of the color filter 303.

Light input to the imaging element 304 of the multispectral (the reference camera (reference machine) 50 and the adjustment camera Y (adjustment machine) 60) that perform image capturing is light passing through three filters of (1) the all-band transmission window (ALL) or the VC filter of the special light source 420,
(2) the dual bandpass filter (DBP) 302 that selectively transmits light in the band 1 (band1) and the band 2 (band2), and
(3) the color filter.

At the time of imaging light transmitted through the all-band transmission window (ALL) of the special light source 420, transmitted light in the band 1 (band1) and the band 2 (band2) of the dual bandpass filter (DBP) 302 is transmitted through each of R and B pixels of the color filter 303 and input to the imaging element 304.

As a result, the pixel value (Rraw) of the R pixel of the imaging element 304 is $$R\text{raw} = \text{band1}@R\text{raw} + \text{band2}@R\text{raw} = \text{band}(1+2)@R\text{raw}$$

as shown in FIG. 38.

Furthermore, the pixel value (Braw) of the B pixel of the imaging element 304 is $$Braw=band1@Braw+band2@Braw=band(1+2)@Braw$$

as shown in FIG. 38.

On the other hand, at the time of imaging light transmitted through the VC filter of the special light source 420, only transmitted light in the band 2 (band2) of the dual bandpass filter (DBP) 302 is transmitted through each of R and B pixels of the color filter 303 and input to the imaging element 304.

As a result, the pixel value (Rraw) of the R pixel of the imaging element 304 is $$Rraw=band2@Rraw$$

as shown in FIG. 38.

Furthermore, the pixel value (Braw) of the B pixel of the imaging element 304 is $$Braw=band2@Braw$$

as shown in FIG. 38.

As described above, in Example 4, the all-band transmission window (ALL) and the VC filter of the special light source 420 are sequentially switched and an image is captured by the multispectral cameras (the reference camera (reference machine) 50 and the adjustment camera Y (adjustment machine) 60).

The band-corresponding gain of the adjustment camera Y (adjustment machine) 60 is calculated by using the captured data.

Figure 39:
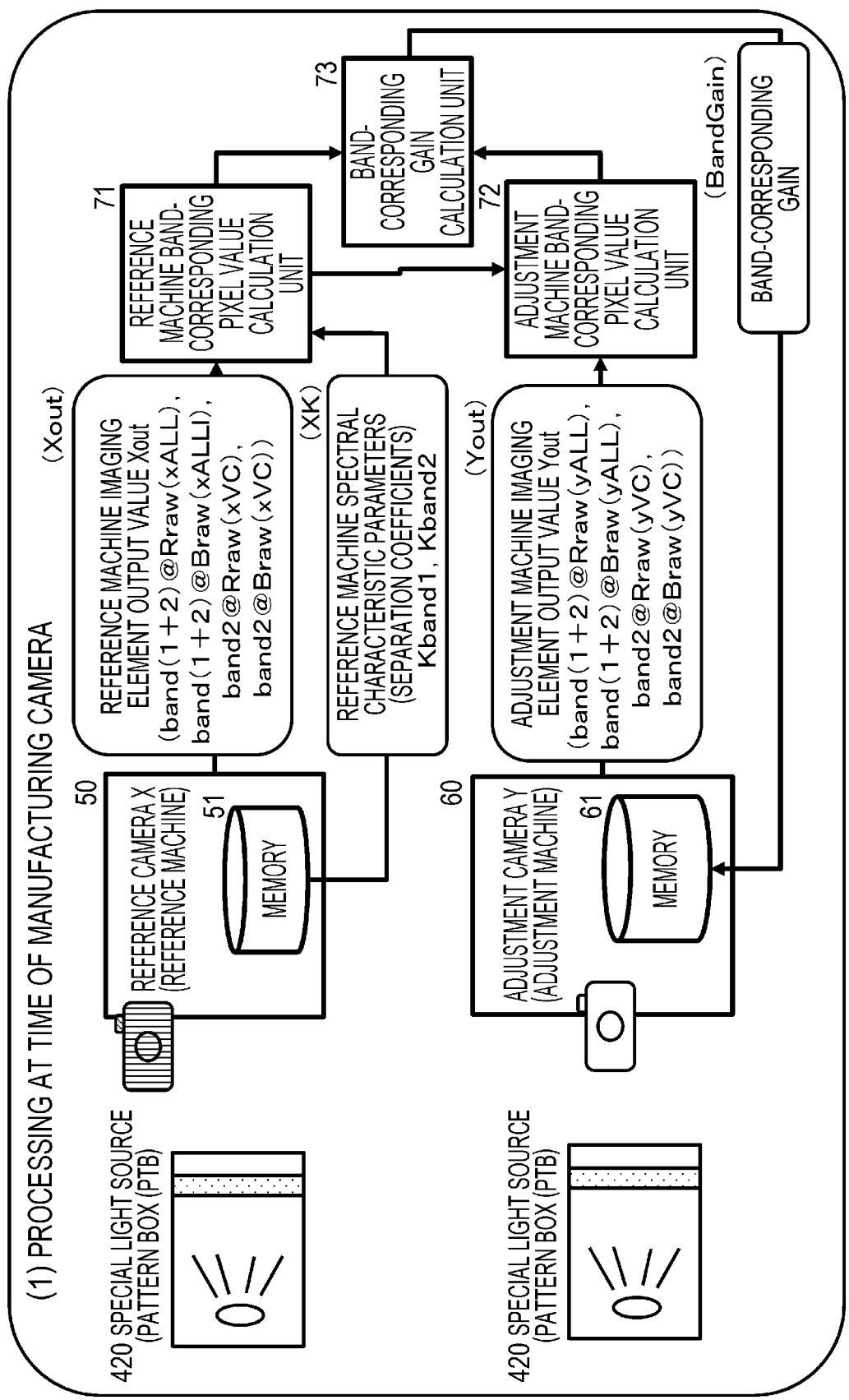
FIG. 39 is a diagram explaining an adjustment example of output variation of an imaging device of Example 4 of the present disclosure.

In Example 4, band-corresponding gain calculation processing and memory storage processing of the adjustment camera Y (adjustment machine) 60 are executed in accordance with the configuration of "(1) Processing at time of manufacturing camera" illustrated in FIG. 39.

Processing of Example 4 will be described with reference to FIG. 39.

In Example 4, as illustrated in FIG. 39, first, the reference camera (reference machine) 50 and the adjustment camera Y (adjustment machine) 60 capture an image of output light of the special light source (pattern box (PTB)) 420.

The special light source (pattern box (PTB)) 420 has the configuration described with reference to FIG. 37. That is, the all-band transmission window (ALL) or the VC filter is included.

By imaging the output light of such a special light source (pattern box (PTB)) 420 by sequentially switching the transmission windows, the following pixel values can be acquired as the output values shown in FIG. 39, that is, the pixel values (output values Xout) (=Rraw, Braw) of the R pixel and the B pixel of the reference camera X (reference machine) 50.

At time of imaging all-band transmission window (ALL) transmitted light, $$Rraw(xALL)=band(1+2)@Rraw(xALL)$$

$$Braw(xALL)=band(1+2)@Braw(xALL)$$

At time of imaging VC filter transmitted light, $$Rraw(xVC)=band2@Rraw(xVC)$$

$$Braw(xVC)=band2@Braw(xVC)$$

Note that the symbol (xALL) indicates a pixel value at the time of imaging the all-band transmission window (ALL) transmitted light by the reference camera X (reference machine) 50.

The symbol (xVC) indicates a pixel value at the time of imaging the VC filter transmitted light by the reference camera X (reference machine) 50.

Meanwhile, the following pixel values can be acquired as the pixel values (output values Xout) (=Rraw, Braw) of the pixel values (output values Xout) (=Rraw, Braw) of the R pixel and the B pixel of the adjustment camera Y (adjustment machine) 60.

At time of imaging all-band transmission window (ALL) transmitted light, $$Rraw(yALL)=band(1+2)@Rraw(yALL)$$

$$Braw(yALL)=band(1+2)@Braw(yALL)$$

At time of imaging VC filter transmitted light, $$Rraw(yVC)=band2@Rraw(yVC)$$

$$Braw(yVC)=band2@Braw(yVC)$$

Note that the symbol (yALL) indicates a pixel value at the time of imaging the all-band transmission window (ALL) transmitted light by the adjustment camera Y (adjustment machine) 60.

The symbol (yVC) indicates a pixel value at the time of imaging the VC filter transmitted light by the adjustment camera Y (adjustment machine) 60.

Moreover, in Example 4, the spectral characteristic parameters (separation coefficients) calculated in advance are stored in the memory 51 of the reference camera X (reference machine) 50. The spectral characteristic parameters (separation coefficients) stored in the memory 51 are output ratio data of each of R and B pixels in the band 1 (band1) and the band 2 (band2), and are the following parameters.

$$Kband1(x)=band1@Braw/band1@Rraw$$

$$Kband2(x)=band2@Rraw/band2@Braw$$

The reference machine band-corresponding pixel value calculation unit 71 illustrated in FIG. 39 inputs the outputs of the reference camera X (reference machine) 50 illustrated in FIG. 39, that is, the pixel values of, at the time of imaging the all-band transmission window (ALL) transmitted light, $$Rraw(xALL)=band(1+2)@Rraw(xALL) \text{ and}$$

$$Braw(xALL)=band(1+2)@Braw(xALL), \text{ and}$$

at the time of imaging the VC filter transmitted light, $$Rraw(xVC)=band2@Rraw(xVC) \text{ and}$$

$$Braw(xVC)=band2@Braw(xVC), \text{ and}$$

the spectral characteristic parameters (separation coefficients) stored in the memory 51 of the reference camera X (reference machine) 50, $$Kband1(x)=band1@Braw/band1@Rraw \text{ and}$$

$$Kband2(x)=band2@Rraw/band2@Braw,$$

to calculate a reference machine band-corresponding pixel value.

Meanwhile, the adjustment machine band-corresponding pixel value calculation unit 72 inputs the outputs of the adjustment camera Y (adjustment machine) 60 illustrated in FIG. 39, that is, the pixel values of, at the time of imaging the all-band transmission window (ALL) transmitted light, $R$raw($y$ALL)=band(1+2)@$R$raw($y$ALL) and $B$raw($y$ALL)=band(1+2)@$B$raw($y$ALL), and at the time of imaging the VC filter transmitted light, $R$raw($y$VC)=band2@$R$raw($y$VC) and $B$raw($y$VC)=band2@$B$raw($y$VC), and calculated values by the reference machine band-corresponding pixel value calculation unit 71, to calculate an adjustment machine band-corresponding pixel value.

First, the reference machine band-corresponding pixel value calculation unit 71 illustrated in FIG. 39 uses the outputs of the reference camera X (reference machine) 50 illustrated in FIG. 39, that is, the pixel values based on the captured image, at the time of imaging the all-band transmission window (ALL) transmitted light, $R$raw($x$ALL)=band(1+2)@$R$raw($x$ALL) and $B$raw($x$ALL)=band(1+2)@$B$raw($x$ALL), and the spectral characteristic parameters (separation coefficients) acquired from the memory 51, $K$band1($x$)=band1@$B$raw/band1@$R$raw and $K$band2($x$)=band2@$R$raw/band2@$B$raw, to execute the repeated operation described earlier with reference to FIGS. 12 and 13, and calculate the following band-corresponding pixel values.

band(1)@$R$raw($x$ALL)

band(2)@$B$raw($x$ALL)

First, a formula corresponding to the formula shown in step S01 of FIG. 12 is generated.

In Example 4, it is only required to execute processing only for signals in the band 1 (band1) and the band 2 (band2) for each of R and B pixels. Thus, the formula of the present example corresponding to the formula shown in step S01 of FIG. 12 is as follows.

$A$raw=$a$1+$a$2

$B$raw=$b$1+$b$2

Substituting the output of each band of the reference camera X (reference machine) 50 described above into the formula results in (Formula 41) below.

$R$raw($x$ALL)=band1@$R$raw($x$ALL)+band2@$R$raw($x$ALL)

$B$raw($x$ALL)=band1@$B$raw($x$ALL)+band2@$B$raw($x$ALL)    (Formula 41)

Moreover, (Formula 41) described above is developed into the formula shown in step S02 of FIG. 12 to generate (Formula 42) below.

band1@$R$raw($x$ALL)=$R$raw($x$ALL)−band2@$R$raw($x$ALL)

band2@$B$raw($x$ALL)=$B$raw($x$ALL)−band1@$B$raw($x$ALL)    (Formula 42)

Moreover, (Formula 42) described above is developed into the formula shown in step S02 of FIG. 12 to generate (Formula 43) below.

band1@$R$raw($x$ALL)=$R$raw($x$ALL)−($K$band2($x$)) (band2@$B$raw($x$ALL))

band2@$B$raw($x$ALL)=$B$raw($x$ALL)−($K$band1($x$)) (band1@$R$raw($x$ALL))    (Formula 43)

(Formula 43) described above corresponds to the formula of step S03 described earlier with reference to FIG. 12, that is, the band-corresponding pixel value calculation formula of (Formula 23) described earlier.

Hereinafter, the following values calculated by (Formula 43), band1@$R$raw($x$ALL) and band2@$B$raw($x$ALL), that is, the values corresponding to a1 and b2 of the formula shown in step S03 of FIG. 12, are substituted into the right side portion of (Formula 43) described above, whereby new values of a1 and b2, that is, band1@$R$raw($x$ALL)

band2@$B$raw($x$ALL)

are calculated.

After that, this operation is repeated. That is, the "repeated operation" is executed of repeating the iterative calculation using the band-corresponding pixel value calculation formula (Formula 23) described above a plurality of times.

When the iterative calculation using the band-corresponding pixel value calculation formula (Formula 23) described above is repeatedly executed a plurality of times, each of the values of a1 and b2, that is, band1@$R$raw($x$ALL) and band2@$B$raw($x$ALL), gradually converges. That is, convergence is achieved as described earlier with reference to FIG. 13.

In Example 4, as an example, the repeated operation using (Formula 43) described above is executed five times. As a result, the following convergence values are calculated.

band1@$R$raw($x$ALL)    (5)

band2@$B$raw($x$ALL)    (5)

The number (5) at the end of a value indicates that the value is a convergence value as a result of execution of the repeated operation using (Formula 43) described above five times.

The band1@$R$raw(xALL) (5) corresponds to a band-corresponding pixel value of the band 1 (band1) included in the pixel value of the R pixel element when the reference camera X (reference machine) 50 captures an image of the all-band transmission window (ALL) transmitted light, that is, $R$raw($x$ALL)=band(1+2)@$R$raw($x$ALL).

Furthermore, the band2@$B$raw(xALL) (5) corresponds to a band-corresponding pixel value of the band 2 (band2) included in the pixel value of the B pixel element when the reference camera X (reference machine) 50 captures an image of the all-band transmission window (ALL) transmitted light, that is, $B$raw($x$ALL)=band(1+2)@$B$raw($x$ALL).

Next, the reference machine band-corresponding pixel value calculation unit 71 illustrated in FIG. 39 outputs $$\text{band1}@R\text{raw}(x\text{ALL}) \tag{5},$$

which is the band-corresponding pixel value of the band 1 (band1) acquired by the above-described repeated operation, and $$B\text{raw}(xVC)=\text{band2}@B\text{raw}(xVC),$$

which is the band-corresponding pixel value of the band 2 (band2) acquired as an output at the time of imaging the VC filter transmitted light,
to the band-corresponding gain calculation unit 73.

Next, a description will be given of the processing executed by the adjustment machine band-corresponding pixel value calculation unit 72.

From the pixel values at the time of imaging the all-band transmission window (ALL) transmitted light, that is, $$R\text{raw}(y\text{ALL})=\text{band}(1+2)@R\text{raw}(y\text{ALL}) \text{ and}$$

$$B\text{raw}(y\text{ALL})=\text{band}(1+2)@B\text{raw}(y\text{ALL}),$$

the adjustment machine band-corresponding pixel value calculation unit 72 calculates the following adjustment machine band-corresponding pixel values.
band1@Rraw (yALL)
band2@Braw(yALL)
These band-corresponding pixel values are calculated.

The adjustment machine band-corresponding pixel value calculation unit 72 calculates the adjustment machine band-corresponding pixel values described above by using the following convergence value calculated as a result of the repeated operation executed by the reference machine band-corresponding pixel value calculation unit 71.

$$\text{band1}@R\text{raw}(x\text{ALL}) \tag{5}$$

$$\text{band2}@B\text{raw}(x\text{ALL}) \tag{5}$$

Note that Rraw(yALL) and $B$raw($y$ALL), which are the pixel values (output values Xout) of the R pixel and the B pixel at the time of imaging the all-band transmission window (ALL) transmitted light by the adjustment camera Y (adjustment machine) 60, can be expressed as (Formula 44) below.

$$R\text{raw}(y\text{ALL})=\text{band1}@R\text{raw}(y\text{ALL})+\text{band2}@R\text{raw}(y\text{ALL})$$

$$B\text{raw}(y\text{ALL})=\text{band1}@B\text{raw}(y\text{ALL})+\text{band2}@B\text{raw}(y\text{ALL}) \tag{Formula 44}$$

Furthermore, assuming that the bandwidths of the band 1 (band1) and the band 2 (band2) are sufficiently small with respect to the change in the light source and the change in the spectral characteristic of the camera, the band gain of the band obtained from the light source output at the time of imaging the VC filter transmitted light of the special light source 420 between the reference machine and the adjustment machine can be regarded to be substantially constant.

Based on this assumption, (Formula 45) below is derived.

$$\text{band2}@R\text{raw}(y\text{ALL})=((\text{band1}@R\text{raw}(x\text{ALL})(5))/(\text{band2}@R\text{raw}(xVC)))\times(\text{band2}@R\text{raw}(yVC))$$

$$\text{band2}@B\text{raw}(y\text{ALL})=((\text{band2}@B\text{raw}(x\text{ALL})(5))/(\text{band2}@B\text{raw}(xVC)))\times\text{band2}@B\text{raw}(yVC)) \tag{Formula 45}$$

The adjustment machine band-corresponding pixel value calculation unit 72 calculates the following adjustment machine band-corresponding pixel values on the basis of the above results. That is, the adjustment machine band-corresponding pixel values expressed in (Formula 46) below are calculated by substituting (Formula 45) described above into (formula 44) described above.

$$\text{band1}@R\text{raw}(y\text{ALL})=R\text{raw}(y\text{ALL})-\text{band2}@R\text{raw}(y\text{ALL})$$

$$\text{band1}@B\text{raw}(y\text{ALL})=B\text{raw}(y\text{ALL})-\text{band2}@B\text{raw}(y\text{ALL}) \tag{Formula 45}$$

Note that the spectral characteristic parameters (separation coefficients) corresponding to the adjustment camera Y (adjustment machine) 60,
can be expressed by (Formula 46) below.

$$K\text{band1}(y)=\text{band1}@B\text{raw}(y\text{ALL})/\text{band1}@R\text{raw}(y\text{ALL})$$

$$K\text{band2}(y)=\text{band2}@R\text{raw}(yVC)/\text{band2}@B\text{raw}(yVC) \tag{Formula 46}$$

The adjustment machine band-corresponding pixel value calculation unit 72 outputs $$\text{band1}@R\text{raw}(y\text{ALL})=R\text{raw}(y\text{ALL})-\text{band2}@R\text{raw}(y\text{ALL}),$$

which is the band-corresponding pixel value of the band 1 (band1) of the adjustment camera Y (adjustment machine) 60 expressed by (Formula 45) described above, and $$B\text{raw}(yVC)=\text{band2}@B\text{raw}(yVC),$$

which is the band-corresponding pixel value of the band 2 (band2) acquired as an output at the time of imaging the VC filter transmitted light, to the band-corresponding gain calculation unit 73.

The band-corresponding gain calculation unit 73 inputs the following band-corresponding pixel values of the respective bands 1 and 2 (band1 and band2) of the reference camera X (reference machine) 50 from the reference machine band-corresponding pixel value calculation unit 71.

Pixel value corresponding to band 1 (band1):

$$\text{band1}@R\text{raw}(x\text{ALL}) \tag{5}$$

Pixel value corresponding to band 2 (band2):
Braw(xVC)=band2@Braw(xVC)

Moreover, the following band-corresponding pixel values of the respective bands 1 and 2 (band1 and band2) are input from the adjustment camera Y (adjustment machine) 60 that performs inputting from the adjustment machine band-corresponding pixel value calculation unit 72.

Pixel value corresponding to band 1 (band1):

$$\text{band1}@R\text{raw}(y\text{ALL})=R\text{raw}(y\text{ALL})-\text{band2}@R\text{raw}(y\text{ALL})$$

Pixel value corresponding to band 2 (band2):
Braw(yVC)=band2@Braw(yVC)

The band-corresponding gain calculation unit 73 calculates a band-corresponding gain expressed in (Formula 47) below on the basis of these input values.

$$\text{Gain corresponding to band 1(band1)}=(\text{band1}@R\text{raw}(x\text{ALL})(5))/(\text{band1}@R\text{raw}(y\text{ALL}))$$

$$\text{Gain corresponding to band 2(band2)}=B\text{raw}(xVC)/B\text{raw}(yVC) \tag{Formula 47}$$

A processing sequence of the band-corresponding gain calculation processing of Example 4 will be described with reference to a flowchart illustrated in FIG. 40.

(Step S401)

First, in step S401, imaging processing of the special light source by the reference camera X (reference machine) and imaging processing of the special light source by the adjustment camera Y (adjustment machine) are executed. The image capturing is preferably executed under the same condition.

(Steps S402 and S403)

In the next steps S402 and S403, the captured pixel values of the reference camera X (reference machine) and the adjustment camera Y (adjustment machine), that is, the R pixel value (Rraw) and the B pixel value (Braw) are acquired.

The acquired pixel values are the following pixel values.

At time of imaging all-band transmission window (ALL) transmitted light, $$Rraw(ALL)=band(1+2)@Rraw(ALL)$$

$$Braw(ALL)=band(1+2)@Braw(ALL)$$

At time of imaging VC filter transmitted light, $$Rraw(VC)=band2@Rraw(VC)$$

$$Braw(VC)=band2@Braw(VC)$$

For the band 2 (band2), a band-corresponding pixel value can be acquired, but a band-corresponding pixel value for the band 1 (band1) cannot be acquired.

In the present example, as described above, the spectral characteristic parameters (separation coefficients) corresponding to the reference camera (reference machine) 50 are acquired from the memory 51, and the pixel values corresponding to the band 1 (band1) of the reference camera (reference machine) 50 are calculated by the repeated operation described earlier with reference to FIG. 12 by using the spectral characteristic parameters (separation coefficients).

Thereafter, the pixel values corresponding to the band 1 (band1) of the adjustment camera (adjustment machine) 60 are calculated by arithmetic processing using the pixel values corresponding to the band 1 (band1) of the reference camera (reference machine) 50.

In steps S402 and S403, the following band-corresponding pixel values are calculated or acquired.

Band-corresponding pixel values of reference camera X (reference machine) 50,

Pixel value corresponding to band 1 (band1):

$$band1@Rraw(xALL) \quad (5)$$

Pixel value corresponding to band 2 (band2):

$$Braw(xVC)=band2@Braw(xVC)$$

Band-corresponding pixel value of adjustment camera Y (adjustment machine) 60,

Pixel value corresponding to band 1 (band1):

$$band1@Rraw(yALL)=Rraw(yALL)-band2@Rraw(yALL)$$

Pixel value corresponding to band 2 (band2):

$$Braw(yVC)=band2@Braw(yVC)$$

(Step S404)

Next, in step S404, a band-corresponding gain is calculated by using the band-corresponding pixel value of the reference camera X (reference machine) and the band-corresponding pixel value of the adjustment camera Y (adjustment machine).

In Example 4, the band-corresponding gains to be calculated are the following band-corresponding gains.

Gain corresponding to band 1(band1)=(band1@Rraw(xALL)(5))/band1@Rraw(yALL)

Gain corresponding to band 2(band2)=Braw(xVC)/Braw(yVC)

The band-corresponding gains of these two bands, that is, the two bands corresponding to the transmitted light band of the dual band bus filter 302, are calculated.

(Step S405)

Finally, in step S405, the band-corresponding gains calculated in step S404 are stored in the memory of the adjustment camera Y (adjustment machine).

Note that, as described earlier with reference to FIG. 5, the reference machine band-corresponding pixel value obtained from the pixel value of the captured image by the reference camera X (reference machine) is used for the processing of calculating the band-corresponding gains of a large number of adjustment cameras Y (adjustment machines). Thus, the reference machine band-corresponding pixel value acquired in step S402 may be stored in, for example, a memory of the reference camera X (reference machine) or a memory of an external device, and this memory-stored data may be applied to the band-corresponding gain calculation processing for the subsequent other adjustment cameras Y (adjustment machines).

In this case, in a case where processing is performed on the second and subsequent adjustment cameras (adjustment machines), it becomes possible to perform processing in which image capturing is performed only by the adjustment camera Y (adjustment machine) in step S401, the processing in step S402 is omitted, and the reference machine band-corresponding pixel values stored in the memory are read and the band-corresponding gains of the adjustment machine are calculated in step S404.

Next, Example 4b will be described as another specific example of Example 4.

Figure 41:
FIG. 41 is a diagram explaining a multispectral camera used in Example 4b of the present disclosure.

Example 4b is an example in which a multispectral camera having a configuration illustrated in FIG. 41 is used as the reference camera X (reference machine) 50 and the adjustment camera Y (adjustment camera) 60.

A multispectral camera 430 illustrated in FIG. 41 has a configuration similar to that of the multispectral camera described earlier with reference to FIG. 10. The multispectral camera 430 uses the ABCD color filter illustrated in FIG. 9.

In the multispectral camera 430 illustrated in FIG. 41, imaging light of a subject input through a lens 431 is input to an imaging element (image sensor) 434 through a multiband pass filter (MBP) 432 and a color filter (RGBIR color filter) 433. An output of the imaging element (image sensor) 434 is input to a signal processing unit 435, and various types of signal processing are performed.

The multiband pass filter (MBP) 432 is a filter that selectively transmits a plurality of band lights.

The color filter (ABCD color filter) 433 of the multispectral camera 430 illustrated in FIG. 41 includes four types of filter regions of A, B, C, and D, and the multiband pass filter (MBP) 432 is also a filter that selectively transmits these four types of wavelengths of A, B, C, and D.

Also in Example 4b, similarly to Example 4 described above, an image of output light of the special light source is captured.

A configuration example of a special light source (pattern box (PTB)) 440 used in Example 4 will be described with reference to FIG. 42.

Figure 42:
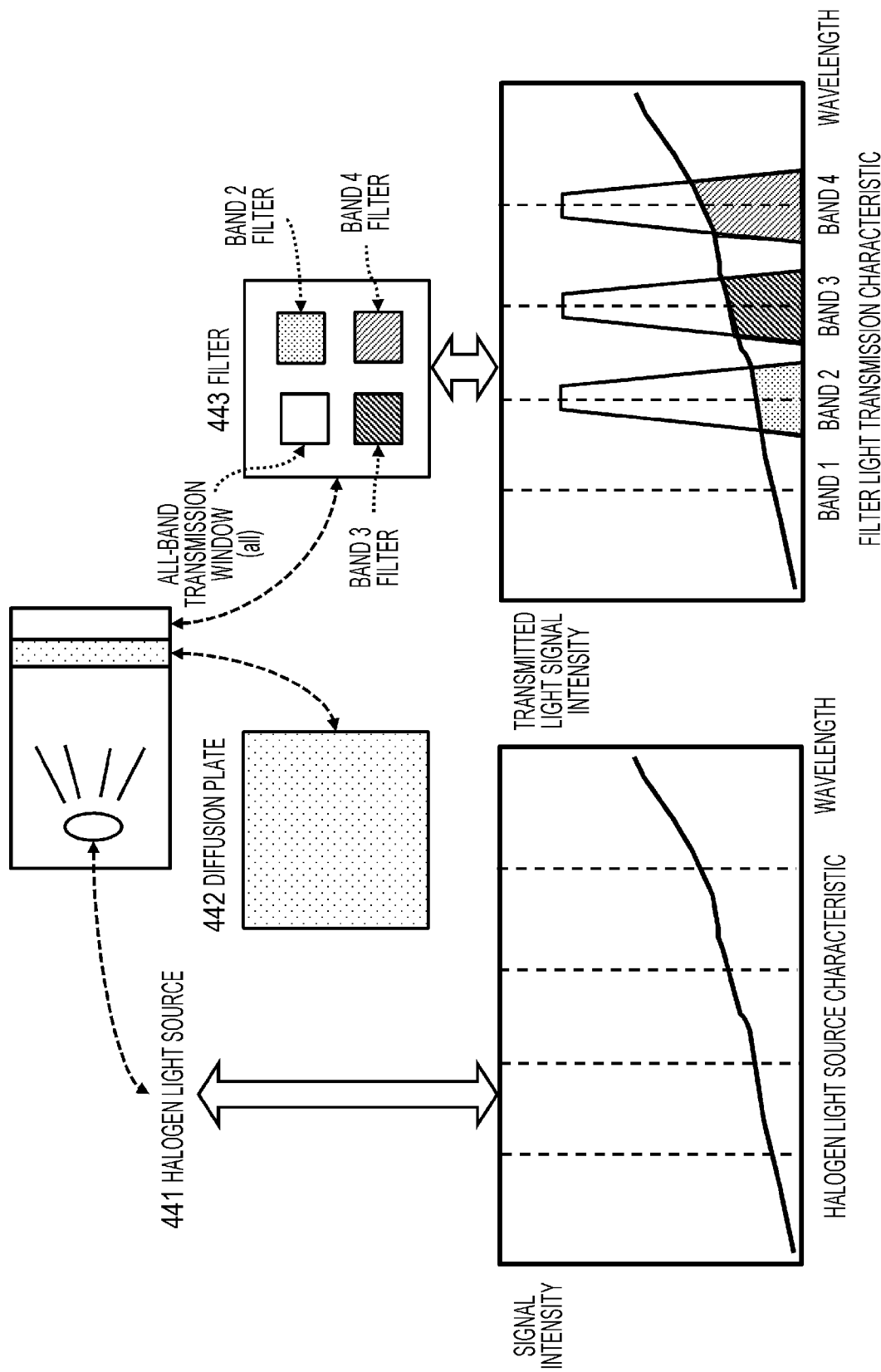
FIG. 42 is a diagram explaining a special feature light source used in Example 4b of the present disclosure.

As illustrated in FIG. 42, the special light source (pattern box) 440 includes a halogen light source 441, a diffusion plate 442, and a filter 443, and output light of the halogen light source 441 is output through the diffusion plate 442 and the filter 443, and an image of this output light is captured by multispectral cameras, that is, the reference camera (reference machine) 50 and the adjustment camera Y (adjustment machine) 60.

The halogen light source 441 has a characteristic as illustrated in the lower left part of the figure. The output light of the halogen light source 441 passes through the diffusion plate 442 having a relatively flat characteristic and is output through the filter 443. The filter 443 includes four windows; the all-band transmission window (ALL) and filters that selectively transmit light in the respective bands of the band 2 (band2), the band 3 (band3), and the band 4 (band4) are mounted to the four windows, respectively.

The all-band transmission window (ALL) is a window that transmits visible light and infrared light regions all. The light transmission characteristics of the other three filters are as illustrated in the lower right graph of FIG. 42.

That is, the three filters have characteristics of selectively transmitting light in the band 2 (band2), the band 3 (band3), and the band 4 (band4), respectively.

An image of the light transmitted through only one of the four, the window or the filter having such different light transmission characteristics, is captured by the multispectral cameras (the reference camera (reference machine) 50 and the adjustment camera Y (adjustment machine) 60. Light transmission windows are sequentially switched, and images of light in four different bands are sequentially captured by the multispectral cameras. The band-corresponding pixel values of each camera are calculated by using the pixel values obtained from these captured images and the spectral characteristic parameters (separation coefficients) stored in the memory 51 of the reference camera X (reference machine) 50, and the band-corresponding gains are calculated on the basis of the calculated band-corresponding pixel values.

Figure 43:
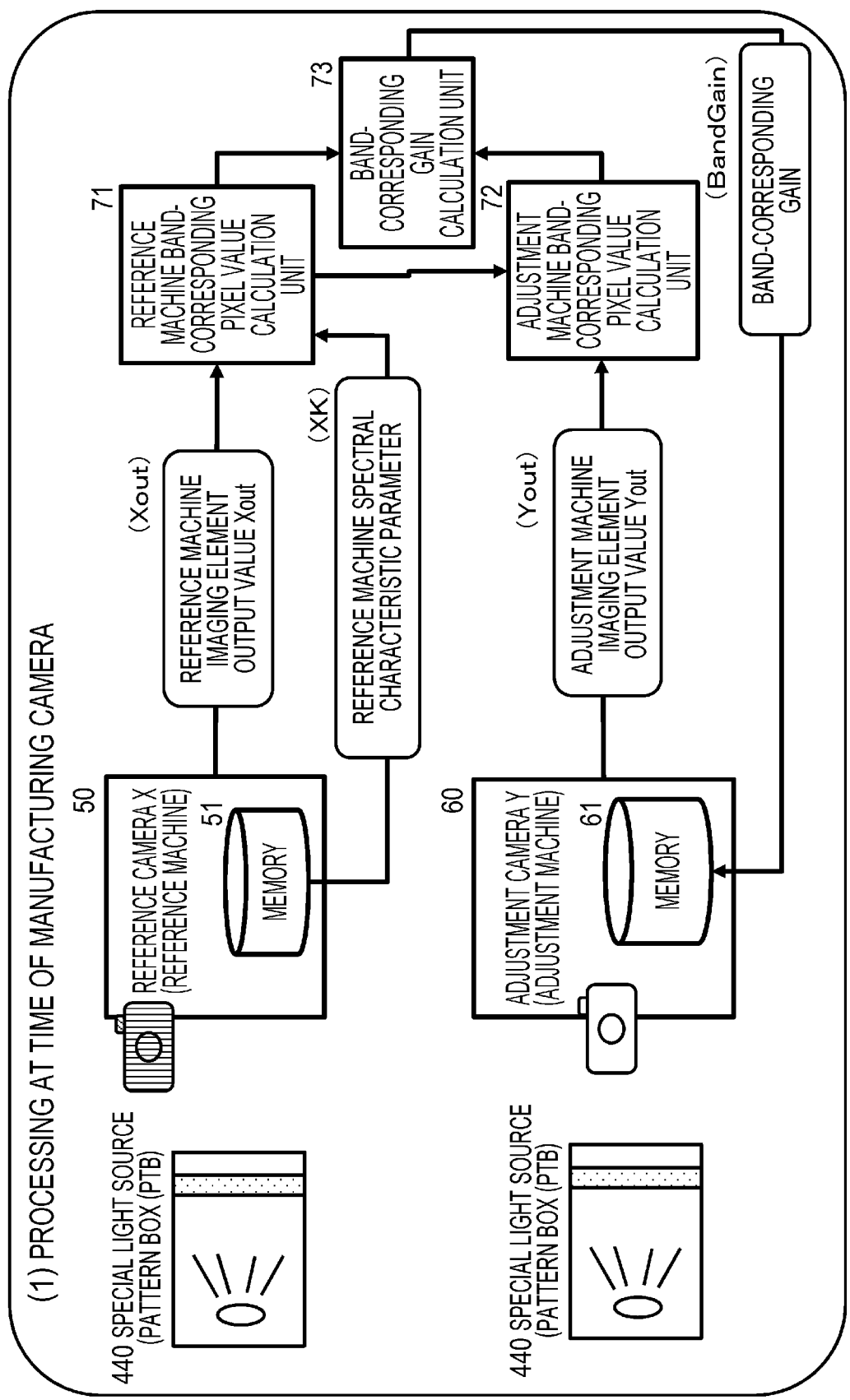
FIG. 43 is a diagram explaining an adjustment example of output variation of an imaging device of Example 4b of the present disclosure.

Processing at the time of manufacturing the camera in Example 4b is illustrated in FIG. 43.

The configuration illustrated in FIG. 43 is similar to the configuration of FIG. 39 described earlier as Example 4. However, the output values of each camera are different from the spectral characteristic parameters (separation coefficients) stored in the memory 51 of the reference camera X (reference machine) 50.

In Example 4b, the spectral characteristic parameters (separation coefficients) stored in the memory 51 of the reference camera X (reference machine) 50 are the following parameters. Note that a1 to d4 described below correspond to the points on the graph of FIG. 11 described earlier.

$Ka2(x)=a2(x)/b2(x)$ $Ka3(x)=a3(x)/c3(x)$ $Ka4(x)=a4(x)/d4(x)$ $Kb1(x)=b1(x)/a1(x)$ $Kb3(x)=b3(x)/c3(x)$ $Kb4(x)=b4(x)/d4(x)$ $Kc1(x)=c1(x)/a1(x)$ $Kc2(x)=c2(x)/b2(x)$ $Kc4(x)=c4(x)/d4(x)$ $Kd1(x)=d1(x)/a1(x)$ $Kd2(x)=d2(x)/b2(x)$ $Kd3(x)=d3(x)/c3(x)$

Note that (x) indicates a value corresponding to the reference machine.

For example, Ka2 $(x)=a2(x)/b2(x)$ is a ratio (a2 $(x)/b2(x)$) between the signal a2 and the signal b2 in the band B region of the graph illustrated in FIG. 11.

Ka3 $(x)=a3(x)/c3(x)$ is a ratio (a3 $(x)/c3(x)$) between the signal a3 and the signal c3 in the band C region of the graph illustrated in FIG. 11.

Ka4 $(x)=a4(x)/cd(x)$ is a ratio (a4 $(x)/d4(x)$) between the signal a4 and the signal d4 in the band D region of the graph illustrated in FIG. 11.

Kb1 $(x)=b1(x)/a1(x)$ is a ratio (b1 $(x)/a1(x)$) between the signal b1 and the signal a1 in the band A region of the graph illustrated in FIG. 11.

The same applies to others. The spectral characteristic parameters of the multispectral camera 430 are intensity ratios of the light transmitted through the plurality of different color filters constituting the color filter, in a specific band, that is, a transmitted light band of the multiband pass filter.

In Example 4b, it is assumed that the spectral characteristic parameters (separation coefficients) described above are stored in the memory 51 of the reference camera X (reference machine) 50.

In the configuration illustrated in FIG. 43, the filters of the bands 2 to 4 (band2 to band4) of the special light source (pattern box) 440 are switched, and image capturing is performed by each of the cameras (the reference camera X (reference machine) 50 and the adjustment camera Y (adjustment machine) 60).

Note that, as illustrated in FIG. 41, four types of filters of A, B, C, and D are set as the color filter of each camera. Thus, the A, B, C, and D pixel values Araw, Braw, Craw, and Draw are obtained as the pixel value output.

The pixel values of the respective pixels of A, B, C, and D of the reference camera X (reference machine) 50 at the time of imaging the band 2 (band2) filter transmitted light of the special light source (pattern box) 440 are as follows.

Araw@band2 $(x)$

Braw@band2 $(x)$

Craw@band2 $(x)$

Draw@band2 $(x)$

The pixel values of respective pixels of A, B, C, and D of the adjustment camera Y (adjustment machine) 60 are as follows.

Araw@band2 $(y)$

Braw@band2 $(y)$

Craw@band2 $(y)$

Draw@band2 $(y)$

The pixel values of the respective pixels of A, B, C, and D of the reference camera X (reference machine) 50 at the time of imaging the band 3 (band3) filter transmitted light of the special light source (pattern box) 440 are as follows.

Araw@band3 $(x)$

Braw@band3 $(x)$

Craw@band3 $(x)$

Draw@band3 $(x)$

The pixel values of respective pixels of A, B, C, and D of the adjustment camera Y (adjustment machine) 60 are as follows.

Araw@band3 $(y)$

Braw@band3 $(y)$

Craw@band3 $(y)$

Draw@band3 $(y)$

The pixel values of the respective pixels of A, B, C, and D of the reference camera X (reference machine) 50 at the time of imaging the band 4 (band4) filter transmitted light of the special light source (pattern box) 440 are as follows.

Araw@band4 (x)
Braw@band4 (x)
Craw@band4 (x)
Draw@band4 (x)

The pixel values of respective pixels of A, B, C, and D of the adjustment camera Y (adjustment machine) 60 are as follows.

Araw@band4 (y)
Braw@band4 (y)
Craw@band4 (y)
Draw@band4 (y)

Using these pixel values, the signal values (a2, b2, c2, d2, a3, b3, c3, d3, a4, b4, c4, d4) of the bands 2 to 4 (band2 to band4) included in the pixels of A, B, C, and D of the adjustment camera Y (adjustment machine) 60 are expressed by (Formula 51) below.

$a2(y)=A\text{raw@band2}(y),$ $b2(y)=B\text{raw@band2}(y),$ $c2(y)=C\text{raw@band2}(y),$ $d2(y)=D\text{raw@band2}(y),$ $a3(y)=A\text{raw@band3}(y),$ $b3(y)=B\text{raw@band3}(y),$ $c3(y)=C\text{raw@band3}(y),$ $d3(y)=D\text{raw@band3}(y)$ $a4(y)=A\text{raw@band4}(y),$ $b4(y)=B\text{raw@band4}(y),$ $c4(y)=C\text{raw@band4}(y),$ $d4(y)=D\text{raw@band4}(y)$ (Formula 51)

Furthermore, the spectral characteristic parameters (separation coefficients) of the adjustment camera Y (adjustment machine) 60 can be expressed as (Formula 52) k below.

$Ka2(y)=a2(y)/b2(y),$ $Ka3(y)=a3(y)/c3(y),$ $Ka4(y)=a4(y)/d4(y),$ $Kb3(y)=b3(y)/c3(y),$ $Kb4(y)=b4(y)/d4(y),$ $Kc2(y)=c2(y)/b2(y),$ $Kc4(y)=c4(y)/d4(y)$ $Kd2(y)=d2(y)/b2(y),$ $Kd3(y)=d3(y)/c3(y)$ (Formula 52)

Furthermore, also for the reference camera (reference machine) 50, the signal values (a2, b2, c2, d2, a3, b3, c3, d3, a4, b4, c4, d4) of the bands 2 to 4 (band2 to band4) included in the pixels of A, B, C, and D are expressed as (Formula 53) below.

$a2(x)=A\text{raw@band2}(x),$ $b2(x)=B\text{raw@band2}(x),$ $c2(x)=C\text{raw@band2}(x),$ $d2(x)=D\text{raw@band2}(x),$ $a3(x)=A\text{raw@band3}(x),$ $b3(x)=B\text{raw@band3}(x),$ $c3(x)=C\text{raw@band3}(x),$ $d3(x)=D\text{raw@band3}(x)$ $a4(x)=A\text{raw@band4}(x),$ $b4(x)=B\text{raw@band4}(x),$ $c4(x)=C\text{raw@band4}(x),$ $d4(x)=D\text{raw@band4}(x)$ (Formula 53)

The pixel values in a case where an image of light through the all-band transmission window (ALL) of the special light source 420 is captured are expressed as follows.

The A, B, C, and D pixel values of the reference camera X (reference machine) 50 are expressed as follows.

Araw (xAll)
Braw (xAll)
Craw (xAll)
Draw (xAll)

The A, B, C, and D pixel values of the adjustment camera Y (adjustment machine) 60 are expressed as follows.

Araw (yAll)
Braw (yAll)
Craw (yAll)
Draw (yAll)

The A, B, C, and D pixel values of the adjustment camera Y (adjustment machine) 60 in the case where the image of the light through the all-band transmission window (ALL) of the special light source 420 is captured can be expressed as (Formula 54) below.

$A\text{raw}(y\text{All})=\text{band1}@A\text{raw}(y\text{ALL})+\text{band2}@A\text{raw}(y\text{ALL})+\text{band3}@A\text{raw}(y\text{ALL})+\text{band4}@A\text{raw}(y\text{ALL})$ $B\text{raw}(y\text{All})=\text{band1}@B\text{raw}(y\text{ALL})+\text{band2}@B\text{raw}(y\text{ALL})+\text{band3}@B\text{raw}(y\text{ALL})+\text{band4}@B\text{raw}(y\text{ALL})$ $C\text{raw}(y\text{All})=\text{band1}@C\text{raw}(y\text{ALL})+\text{band2}@C\text{raw}(y\text{ALL})+\text{band3}@C\text{raw}(y\text{ALL})+\text{band4}@C\text{raw}(y\text{ALL})$ $D\text{raw}(y\text{All})=\text{band1}@D\text{raw}(y\text{ALL})+\text{band2}@D\text{raw}(y\text{ALL})+\text{band3}@D\text{raw}(y\text{ALL})+\text{band4}@D\text{raw}(y\text{ALL})$ (Formula 54)

Furthermore, the A, B, C, and D pixel values of the reference camera X (reference machine) 50 in the case where the image of the light through the all-band transmission window (ALL) of the special light source 420 is captured can be expressed as (Formula 55) below.

$A\text{raw}(x\text{All})=\text{band1}@A\text{raw}(x\text{ALL})+\text{band2}@A\text{raw}(x\text{ALL})+\text{band3}@A\text{raw}(x\text{ALL})+\text{band4}@A\text{raw}(x\text{ALL})$ $B\text{raw}(x\text{All})=\text{band1}@B\text{raw}(x\text{ALL})+\text{band2}@B\text{raw}(x\text{ALL})+\text{band3}@B\text{raw}(x\text{ALL})+\text{band4}@B\text{raw}(x\text{ALL})$ $$Craw(x\text{All}) = band1@Craw(x\text{ALL}) + band2@Craw(x\text{ALL}) + band3@Craw(x\text{ALL}) + band4@Craw(x\text{ALL})$$

$$Draw(x\text{All}) = band1@Draw(x\text{ALL}) + band2@Draw(x\text{ALL}) + band3@Draw(x\text{ALL}) + band4@Draw(x\text{ALL}) \quad \text{(Formula 55)}$$

The reference machine band-corresponding pixel value calculation unit 71 illustrated in FIG. 43 executes the following processing.

Since the spectral characteristic parameters (separation coefficients) of the reference camera X (reference machine) 50 can be acquired from the memory 51, the repeated operation described earlier with reference to FIG. 12 is executed for (Formula 55) described above. By this repeated operation, convergence signal values (a1, b2, c3, d4) of each of the bands 1 to 4 (band1 to band4) are calculated. That is, the band-corresponding pixel values expressed in (Formula 56) below can be calculated.

$$band1@A\text{raw}(x\text{ALL})$$

$$band2@B\text{raw}(x\text{ALL})$$

$$band3@C\text{raw}(x\text{ALL})$$

$$band4@D\text{raw}(x\text{ALL}) \quad \text{(Formula 56)}$$

The reference machine band-corresponding pixel value calculation unit 71 illustrated in FIG. 43 outputs the band-corresponding pixel values illustrated in (Formula 56) described above to the band-corresponding gain calculation unit 73.

Next, a description will be given of the processing executed by the adjustment machine band-corresponding pixel value calculation unit 72.

Similarly to Example 4 described earlier, assuming that the bandwidths of the bands 1 to 4 (band1 to band4) are sufficiently small with respect to the change in the light source and the change in the spectral characteristic of the camera, the band gain of the band obtained from the light source output of the special light source 440 between the reference machine and the adjustment machine can be regarded to be substantially constant.

On the basis of this assumption, the adjustment machine band-corresponding pixel value calculation unit 72 generates (Formula 57) below.

$$band2@A\text{raw}(y\text{All}) = (band2@B\text{raw}(x\text{All}))/b2(x) \times a2(y)$$

$$band3@A\text{raw}(y\text{All}) = (band3@C\text{raw}(x\text{All}))/c3(x) \times a3(y)$$

$$band4@A\text{raw}(y\text{All}) = (band4@D\text{raw}(x\text{All}))/d4(x) \times a4(y)$$

$$band2@B\text{raw}(y\text{All}) = (band2@B\text{raw}(x\text{All}))/b2(x) \times b2(y)$$

$$band3@B\text{raw}(y\text{All}) = (band3@C\text{raw}(x\text{All}))/c3(x) \times b3(y)$$

$$band4@B\text{raw}(y\text{All}) = (band4@D\text{raw}(x\text{All}))/d4(x) \times b4(y)$$

$$band2@C\text{raw}(y\text{All}) = (band2@B\text{raw}(x\text{All}))/b2(x) \times c2(y)$$

$$band3@C\text{raw}(y\text{All}) = (band3@C\text{raw}(x\text{All}))/c3(x) \times c3(y)$$

$$band4@C\text{raw}(y\text{All}) = (band4@D\text{raw}(x\text{All}))/d4(x) \times c4(y)$$

$$band2@D\text{raw}(y\text{All}) = (band2@B\text{raw}(x\text{All}))/b2(x) \times d2(y)$$

$$band3@D\text{raw}(y\text{All}) = (band3@C\text{raw}(x\text{All}))/c3(x) \times d3(y)$$

$$band4@D\text{raw}(y\text{All}) = (band4@D\text{raw}(x\text{All}))/d4(x) \times d4(y) \quad \text{(Formula 57)}$$

(Formula 57) described above is substituted into the formulas of (Formula 54) described earlier, that is, $$A\text{raw}(y\text{All}) = band1@A\text{raw}(y\text{ALL}) + band2@A\text{raw}(y\text{ALL}) + band3@A\text{raw}(y\text{ALL}) + band4@A\text{raw}(y\text{ALL})$$

$$B\text{raw}(y\text{All}) = band1@B\text{raw}(y\text{ALL}) + band2@B\text{raw}(y\text{ALL}) + band3@B\text{raw}(y\text{ALL}) + band4@B\text{raw}(y\text{ALL})$$

$$C\text{raw}(y\text{All}) = band1@C\text{raw}(y\text{ALL}) + band2@C\text{raw}(y\text{ALL}) + band3@C\text{raw}(y\text{ALL}) + band4@C\text{raw}(y\text{ALL})$$

$$D\text{raw}(y\text{All}) = band1@D\text{raw}(y\text{ALL}) + band2@D\text{raw}(y\text{ALL}) + band3@D\text{raw}(y\text{ALL}) + band4@D\text{raw}(y\text{ALL}) \quad \text{(Formula 54)}.$$

By substitution into this (Formula 54), a band-corresponding pixel value calculation formula for the bands 1 to 4 (band1 to band4) expressed in (Formula 58) below are obtained as a band-corresponding pixel value calculation formula for the adjustment camera Y (adjustment machine) 60.

$$band1@A\text{raw}(y\text{ALL}) = A\text{raw}(y\text{ALL}) - band2@A\text{raw}(y\text{ALL}) - band3@A\text{raw}(y\text{ALL}) - band4@A\text{raw}(y\text{ALL})$$

$$band2@B\text{raw}(y\text{ALL}) = B\text{raw}(y\text{ALL}) - band1@B\text{raw}(y\text{ALL}) - band3@B\text{raw}(y\text{ALL}) - band4@B\text{raw}(y\text{ALL})$$

$$band3@C\text{raw}(y\text{ALL}) = C\text{raw}(y\text{ALL}) - band1@C\text{raw}(y\text{ALL}) - band2@C\text{raw}(y\text{ALL}) - band4@C\text{raw}(y\text{ALL})$$

$$band4@D\text{raw}(y\text{ALL}) = D\text{raw}(y\text{ALL}) - band1@D\text{raw}(y\text{ALL}) - band2@C\text{raw}(y\text{ALL}) - band3@C\text{raw}(y\text{ALL}) \quad \text{(Formula 58)}$$

The adjustment machine band-corresponding pixel value calculation unit 72 outputs the band-corresponding pixel values of the bands 1 to 4 (band1 to band4) of the adjustment camera Y (adjustment machine) 60 expressed by (Formula 58) described above to the band-corresponding gain calculation unit 73.

The band-corresponding gain calculation unit 73 inputs the following band-corresponding pixel values of the respective bands 1 to 4 (band1 to band4) of the reference camera X (reference machine) 50 expressed by (Formula 56) described earlier, from the reference machine band-corresponding pixel value calculation unit 71.

band1@Araw (xALL)
band2@$B$raw(xALL)
band3@Craw (xALL)
band4@$D$raw(xALL)

Furthermore, the band-corresponding gain calculation unit 73 inputs the following band-corresponding pixel values of the respective bands 1 to 4 (band1 to band4) of the reference camera X (reference machine) 50 expressed by (Formula 58) described earlier, from the adjustment machine band-corresponding pixel value calculation unit 72.

band1@$A$raw($y$ALL)=$A$raw($y$ALL)−band2@$A$raw($y$ALL)−band3@$A$raw($y$ALL)−band4@$A$raw($y$ALL)

band2@$B$raw($y$ALL)=$B$raw($y$ALL)−band1@$B$raw($y$ALL)−band3@$B$raw($y$ALL)−band4@$B$raw($y$ALL)

band3@$C$raw($y$ALL)=$C$raw($y$ALL)−band1@$C$raw($y$ALL)−band2@$C$raw($y$ALL)−band4@$C$raw($y$ALL)

band4@$D$raw($y$ALL)=$D$raw($y$ALL)−band1@$D$raw($y$ALL)−band2@$C$raw($y$ALL)−band3@$C$raw($y$ALL)

The band-corresponding gain calculation unit 73 calculates band-corresponding gains expressed in (Formula 59) below on the basis of these input values.

Gain corresponding to band 1(band1)=(band1@$A$raw($x$ALL))/(band1@$A$raw($y$ALL))

Gain corresponding to band 2(band2)=(band2@$B$raw($x$ALL))/(band2@$B$raw($y$ALL))

Gain corresponding to band 3(band3)=(band3@$C$raw($x$ALL))/(band3@$C$raw($y$ALL))

Gain corresponding to band 4(band4)=(band4@$D$raw($x$ALL))/band4@$D$raw($y$ALL)

Figure 40:
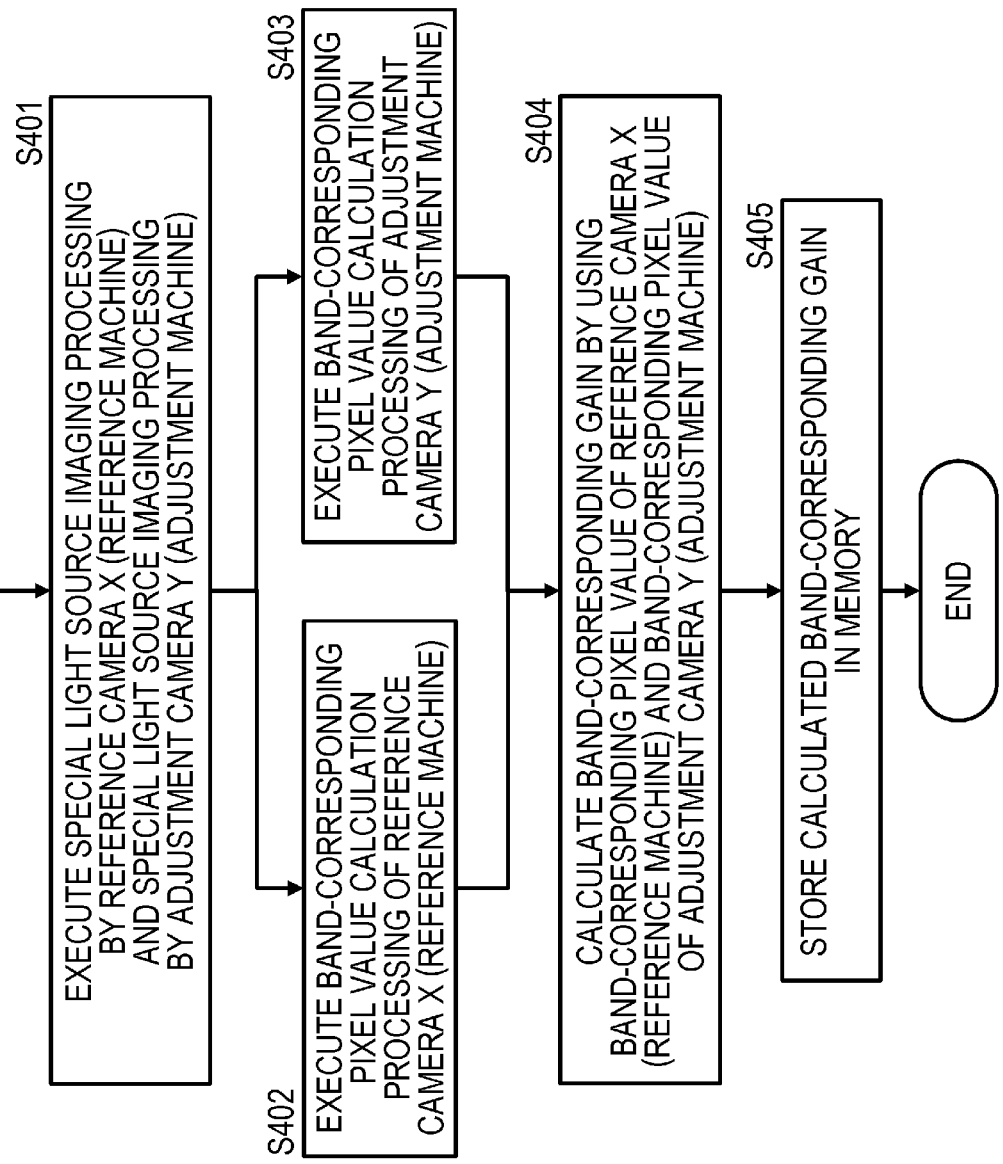
FIG. 40 is a diagram illustrating a flowchart explaining an image processing sequence of Example 4 of the present disclosure.

A processing sequence of the band-corresponding gain calculation processing of Example 4b is basically the same sequence as the processing flow of Example 4 described in the flowchart illustrated in FIG. 40 described earlier. The number of use bands and the spectral characteristic parameters (separation coefficients) are only different, and the basic flow of processing is similar processing.

Note that, also in Example 4 and Example 4b, similarly to the modifications of Examples 1 to 3 described earlier, the band-corresponding gain calculation processing may be executed not at the time of manufacturing the camera but at the time of using the camera (at the time of imaging).

A configuration may be adopted in which at the time of manufacturing the camera, the pixel value average value or the representative value is stored in the memory 61 of the adjustment camera Y (adjustment machine) 60, and the band-corresponding gain is calculated by using the pixel value average value or the representative value stored in the memory 61 at the time of using the camera (at the time of imaging).

10. Summary of Processing of Examples 1 to 4

Next, the processing of Examples 1 to 4 described above will be collectively described with reference to FIG. 44.

In FIG. 44,
(1) Processing at time of manufacturing camera, and
(2) Processing at time of using camera (at time of imaging) are shown separated vertically.

Furthermore, two pieces of processing of (1a) Design stage processing (measurement processing), and (1b) Camera manufacturing stage processing are shown as (1) Processing at time of manufacturing camera.

As (2) Processing at time of using camera (at time of imaging), (2a) Band-corresponding gain calculation processing of adjustment machine Y, and (2b) Captured image analysis processing are shown.

Note that, in any of Examples 1 to 4, the following band-corresponding pixel values are calculated in the final captured image analysis processing.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), Furthermore, any of Examples 1 to 4 illustrated in FIG. 44 is an example in which the band-corresponding gain calculation processing of the adjustment machine Y is executed as the processing at the time of using the camera (at the time of imaging).

Hereinafter, in each of Examples 1 to 4,
(1a) Design stage processing (measurement processing), and
(1b) Camera manufacturing stage processing, each of which is (1) Processing at time of manufacturing camera,
(2a) Band-corresponding gain calculation processing of adjustment machine Y, and ((2b) Captured image analysis processing, each of which is (2) Processing at time of using camera (at time of imaging),
will be sequentially described. Note that the processing of
(2a) Band-corresponding gain calculation processing of adjustment machine Y, and (2b) Captured image analysis processing, each of which is the processing at the time of using the camera (at the time of capturing), may be executed inside the camera that is the adjustment machine Y, or may be executed by an external device capable of acquiring data from the camera that is the adjustment machine Y, for example, an external device such as a PC or a server on a cloud, and the like.

Note that Examples 1 to 4 are examples in which the following processing is performed as described earlier.

(Example 1) Example using multispectral camera using dual band pass (DBP)
(Example 2) Example of executing temperature compensation to perform band-corresponding gain calculation and band-corresponding gain adjustment
(Example 3) Example of executing processing of calculating band-corresponding gain and processing of calculating spectral characteristic parameter (separation coefficient) using special light source
(Example 4) Example of executing processing of calculating band-corresponding gain and spectral characteristic parameter (separation coefficient) by using both measured spectral characteristic parameter (separation coefficient) of reference machine and special light source (Example 1) Example using multispectral camera using dual band pass (DBP)

In Example 1, the following processing is executed.
(1) Processing at Time of Manufacturing Camera
(1a) Design Stage Processing (Measurement Processing)

Measurement processing of the separation coefficients (Kband1, Kband2) of the reference machine X is executed as processing (measurement processing) at the design stage in Example 1.

Note that, here, an example is shown in which the spectral characteristic parameters (separation coefficients) of the band 1 (band1) and the band 2 (band2) of the reference machine X are measured, and the measured values are also used as the spectral characteristic parameters (separation coefficients) of the band 1 (band1) and the band 2 (band2) of the adjustment machine Y as they are.

The spectral characteristic parameters (separation coefficients) of the reference camera X (reference machine) can be calculated as follows.

Reference camera X (reference machine) Spectral characteristic parameter (separation coefficient) corresponding to band 1 (band1)

$$K\text{band1}(x) = \text{band1}@B\text{raw}(x)/\text{band1}@R\text{raw}(x)$$

Spectral characteristic parameter (separation coefficient) corresponding to band 2 (band2)

$$K\text{band2}(x) = \text{band2}@R\text{raw}(x)/\text{band2}@B\text{raw}(x)$$

(1b) Camera manufacturing stage processing,

In Example 1, processing of storing parameters to be applied for calculating the band-corresponding gain in the memory of the adjustment machine Y is executed as the camera manufacturing stage processing.

The example illustrated in FIG. 44 shows an example in which the following values are calculated and stored in the memory.

The band-corresponding output pixel values of the reference machine X: average values of Rraw(x) and Braw(x)
(Rrawave (x), Brawave (x)), and
the band-corresponding output pixel values of the adjustment machine Y: average values of Rraw(y) and Braw(y)
(Rraeave (y), Brawave (y)),
are calculated and stored in the memory of the adjustment machine Y.

Note that, instead of the average values, representative values may be calculated and stored in the memory.

The data stored in the memory of the adjustment machine Y is used in (2a) Band-corresponding gain calculation processing of adjustment machine Y, which is (2) processing at time of using camera (at time of imaging) described below.

Next, (2) Processing at time of using camera (at time of imaging) will be described.

(2a) Band-corresponding gain calculation processing of adjustment machine Y,

In the band-corresponding gain calculation processing of the adjustment machine Y, the processing of calculating the band-corresponding gain of the adjustment machine Y, which is a unique value of the adjustment machine Y, is executed by using the data stored in the memory of the adjustment machine Y in (1b) Camera manufacturing stage processing described above.

That is, by using memory-stored data,
the band-corresponding output pixel values of the reference machine X: average values of Rraw(x) and Braw (x) (Rrawave(x), Brawave (x)), or representative values, and
the band-corresponding output pixel values of the adjustment machine Y: average values of Rraw(y) and Braw (y)
(Rraeave (y), Brawave (y)), or representative values,
stored in the memory of the adjustment machine Y,
band-corresponding gains of the adjustment machine Y,
for example,
REDgain(y) and
NIRgain (y),
are calculated.

(2b) Captured image analysis processing

In the final captured image analysis processing, adjustment of an output value is performed by applying the band-corresponding gain calculated in (2a) Band-corresponding gain calculation processing of adjustment machine Y described above to an image captured by the adjustment machine Y.

As a result of the adjustment, the following band-corresponding pixel values are calculated as the final adjusted band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), Next, a description will be given of processing in (Example 2) Example 2 of executing temperature compensation to perform band-corresponding gain calculation and band-corresponding gain adjustment.

(1) Processing at Time of Manufacturing Camera (1a) Design Stage Processing (Measurement Processing)

In the processing (measurement processing) at the design stage in Example 2, measurement processing of the separation coefficients (Kband1, Kband2) of the reference machine X is executed similarly to Example 1 described above.

The spectral characteristic parameters (separation coefficients) of the band 1 (band1) and the band 2 (band2) of the reference machine X are measured, and the measured values are also used as the spectral characteristic parameters (separation coefficients) of the band 1 (band1) and the band 2 (band2) of the adjustment machine Y as they are.

Moreover, in Example 2, the temperature characteristic coefficient, which is a parameter to be applied to temperature characteristic compensation at the design stage, is measured by using the reference machine X. The temperature characteristic coefficient measured by using the reference machine X is also used as a value common to the reference machine X and the adjustment machine Y.

(1b) Camera manufacturing stage processing,

Also in Example 2, processing of storing parameters to be applied for calculating the band-corresponding gain in the memory of the adjustment machine Y is executed as the camera manufacturing stage processing, similarly to Example 1.

However, in Example 2, a temperature (T) of the device at the time of measuring the reference machine X data and the adjustment machine Y data is also measured, and the measured data is recorded in the memory together with the temperature information.

The example illustrated in FIG. 44 shows an example in which the following values are calculated and stored in the memory.

The band-corresponding output pixel values of the reference machine X at the temperature=T at the time of measurement: average values of Rraw(x) and Braw(x)
(Rrawave (x), Brawave (x)), and
the band-corresponding output pixel values of the adjustment machine Y at the temperature=T at the time of measurement: average values of Rraw(y) and Braw(y)
(Rraeave (y), Brawave (y)),
are calculated and stored in the memory of the adjustment machine Y.

Note that, instead of the average values, representative values may be calculated and stored in the memory.

The data stored in the memory of the adjustment machine Y is used in (2a) Band-corresponding gain calculation processing of adjustment machine Y, which is (2) processing at time of using camera (at time of imaging) described below.

Next, (2) Processing at time of using camera (at time of imaging) will be described.

(2a) Band-corresponding gain calculation processing of adjustment machine Y,

In the band-corresponding gain calculation processing of the adjustment machine Y, the processing of calculating the band-corresponding gain of the adjustment machine Y, which is a unique value of the adjustment machine Y, is executed by using the data stored in the memory of the adjustment machine Y in (1b) Camera manufacturing stage processing described above.

That is, by performing temperature characteristic compensation by using, the band-corresponding output pixel values of the reference machine X: average values of Rraw(x) and Braw (x) (Rrawave(x), Brawave (x)), or representative values, the band-corresponding output pixel values of the adjustment machine Y: average values of Rraw(y) and Braw (y)

(Rraeave (y), Brawave (y)), or representative values, and the temperature information (T) at the time of calculating these values, stored in the memory of the adjustment machine Y, band-corresponding gains of the adjustment machine Y, for example, REDgain(y) and NIRgain (y), are calculated.

(2b) Captured image analysis processing

In the final captured image analysis processing, adjustment of an output value is performed by applying the band-corresponding gain calculated in (2a) Band-corresponding gain calculation processing of adjustment machine Y described above to an image captured by the adjustment machine Y.

As a result of the adjustment, the following band-corresponding pixel values are calculated as the final adjusted band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), Next, a description will be given of processing in (Example 3) Example 3 of executing processing of calculating band-corresponding gain and processing of calculating spectral characteristic parameter (separation coefficient) using special light source.

(1) Processing at Time of Manufacturing Camera (1a) Design Stage Processing (Measurement Processing)

In the processing (measurement processing) at the design stage in Example 3, measurement processing of the separation coefficients (Kband1, Kband2) of the reference machine X is not executed. In Example 3, the separation coefficients of the reference machine X and the adjustment machine Y are calculated from a plurality of light sources observed in the next (1b) Camera manufacturing stage processing.

Thus, in the processing (measurement processing) at the design stage in Example 3, the temperature characteristic coefficient, which is a parameter to be applied to the temperature characteristic compensation, is measured by using the reference machine X. The temperature characteristic coefficient measured by using the reference machine X is used as a value common to the reference machine X and the adjustment machine Y.

(1b) Camera Manufacturing Stage Processing,

In Example 3, the separation coefficients of the reference machine X and the adjustment machine Y are calculated from a plurality of light sources observed in the (1b) Camera manufacturing stage processing.

In Example 3, by using the special light source (pattern box (PTB)) 400 described earlier with reference to FIG. 33, an image of the output light of the special light source (pattern box (PTB)) 400 is captured by multispectral cameras, that is, the reference camera (reference machine) 50 and the adjustment camera Y (adjustment machine) 60.

The special light source (pattern box (PTB)) 400 includes the IRC filter that is an infrared light (IR) cut filter and the VC filter that is a visible light (Visible) cut filter.

One of the IRC filter or the VC filter having such different light transmission characteristics is closed, and an image of light transmitted through only one filter is captured by the multispectral cameras (the reference camera (reference machine) 50 and the adjustment camera Y (adjustment machine) 60).

The filters that transmit light are sequentially switched, and images of light in two different bands are sequentially captured by the multispectral cameras.

An average value of the band-corresponding pixel values (output values) obtained by the imaging processing is calculated and stored in the memory of the adjustment machine Y. That is, as illustrated in FIG. 44, the following values are calculated and stored in the memory of the adjustment machine Y.

The band-corresponding pixel values (output values) of the reference machine X, that is, IRC-Rraw (x), IRC-Braw (x), VC-Rraw(x), and VC-Braw(x), and average values thereof, that is, IRC-Rrawave (x), IRC-Brawave (x), VC-Rrawave (x), and VC-Brawave (x)

are calculated and stored in the memory of the adjustment machine Y.

Moreover, the band-corresponding pixel values (output values) of the adjustment machine Y, that is, IRC-Rraw (y), IRC-Braw (y), VC-Rraw(y), and VC-Braw(y), and average values thereof, that is, IRC-Rrawave (y), IRC-Brawave (y), VC-Rrawave (y), and VC-Brawave (y)

are calculated and stored in the memory of the adjustment machine Y.

Note that, instead of the average values, representative values may be calculated and stored in the memory.

The data stored in the memory of the adjustment machine Y is used in (2a) Band-corresponding gain calculation processing of adjustment machine Y, which is (2) processing at time of using camera (at time of imaging) described below.

Next, (2) Processing at time of using camera (at time of imaging) will be described.

(2a) Band-corresponding gain calculation processing of adjustment machine Y,

In the band-corresponding gain calculation processing of the adjustment machine Y, the processing of calculating the band-corresponding gain of the adjustment machine Y, which is a unique value of the adjustment machine Y, is executed by using the data stored in the memory of the adjustment machine Y in (1b) Camera manufacturing stage processing described above.

Moreover, in Example 3, the separation coefficients of each of the reference machine X and the adjustment machine Y are also calculated.

(2b) Captured image analysis processing

In the final captured image analysis processing, adjustment of an output value is performed by applying the band-corresponding gain calculated in (2a) Band-corresponding gain calculation processing of adjustment machine Y described above to an image captured by the adjustment machine Y.

As a result of the adjustment, the following band-corresponding pixel values are calculated as the final adjusted band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), Next, a description will be given of processing in (Example 4) Example 4 of executing processing of calculating band-corresponding gain and spectral characteristic parameter (separation coefficient) by using both measured spectral characteristic parameter (separation coefficient) of reference machine and special light source.

In Example 4, as described earlier with reference to FIG. 37, an image of the output light of the special light source (pattern box (PTB)) having two light sources, one system of the special light source and the other one system of no filter (that is, light of all wavelengths passes), is captured by multispectral cameras, that is, the reference camera (reference machine) 50 and the adjustment camera Y (adjustment machine) 60.

The special light source (pattern box (PTB)) includes the all-band transmission window (ALL) and the VC filter that is a visible light (Visible) cut filter.

One of the all-band transmission window (ALL) or the VC filter having such different light transmission characteristics is closed, and an image of light transmitted through only one filter is captured by multispectral cameras (the reference camera (reference machine) 50 and the adjustment camera Y (adjustment machine) 60). The filters that transmit light are sequentially switched, and images of light in two different bands are sequentially captured by the multispectral cameras.

An average value of the band-corresponding pixel values (output values) obtained by the imaging processing is calculated and stored in the memory of the adjustment machine Y. That is, as illustrated in FIG. 44, the following values are calculated and stored in the memory of the adjustment machine Y.

The band-corresponding pixel values (output values) of the reference machine X, that is,
  all-Rraw (x), all-Braw (x),
  VC-Rraw(x), and VC-Braw(x), and
  average values thereof, that is,
  all-Rrawave (x), all-Brawave (x),
  VC-Rrawave (x), and VC-Brawave (x)
  are calculated and stored in the memory of the adjustment machine Y.

Moreover, the band-corresponding pixel values (output values) of the adjustment machine Y, that is,
  all-Rraw (y), all-Braw (y),
  VC-Rraw(y), and VC-Braw(y), and
  average values thereof, that is,
  all-Rrawave (y), all-Brawave (y),
  VC-Rrawave (y), and VC-Brawave (y)
  are calculated and stored in the memory of the adjustment machine Y.

Note that, instead of the average values, representative values may be calculated and stored in the memory.

The data stored in the memory of the adjustment machine Y is used in (2a) Band-corresponding gain calculation processing of adjustment machine Y, which is (2) processing at time of using camera (at time of imaging) described below.

Next, (2) Processing at time of using camera (at time of imaging) will be described.

(2a) Band-corresponding gain calculation processing of adjustment machine Y,

In the band-corresponding gain calculation processing of the adjustment machine Y, the processing of calculating the band-corresponding gain of the adjustment machine Y, which is a unique value of the adjustment machine Y, is executed by using the data stored in the memory of the adjustment machine Y in (1b) Camera manufacturing stage processing described above.

Moreover, in Example 4, the separation coefficient of the adjustment machine Y is also calculated.

(2b) Captured Image Analysis Processing

In the final captured image analysis processing, adjustment of an output value is performed by applying the band-corresponding gain calculated in (2a) Band-corresponding gain calculation processing of adjustment machine Y described above to an image captured by the adjustment machine Y.

As a result of the adjustment, the following band-corresponding pixel values are calculated as the final adjusted band-corresponding pixel values.

Band-corresponding pixel value of band 1 (band1) included in R pixel value (Rraw) of adjustment camera Y (adjustment machine) 60: band1@Rraw(y), Band-corresponding pixel value of band 2 (band2) included in B pixel value (Braw) of adjustment camera Y (adjustment machine) 60: band2@Braw(y), 11. Transfer of Camera-Specific Adjustment Data Such as Band-Corresponding Gain, and Processing Configuration to be Used Next, a description will be given of transfer of camera-specific adjustment data such as a band-corresponding gain, and a processing configuration to be used.

Camera-specific data such as the band-corresponding gain of the adjustment camera (adjustment machine) 60 can be transferred between devices as, for example, metadata corresponding to a camera or metadata attached to a captured image by the camera, and each device can perform processing based on the metadata, for example, processing such as pixel value correction.

Furthermore, for example, by applying various processing programs to the metadata, the separation performance can be improved, and the measurement accuracy of the degree of activity of the plant can also be improved.

In a case where the processing as in Examples 1 to 4 described above is performed, the data such as the separation coefficients that are measurement values of the reference machine X and the adjustment machine Y, the temperature characteristic coefficient, the average value or the representative value of each band-corresponding pixel value, and further, the band-corresponding gain of the adjustment machine Y can be propagated as metadata between various devices in a procedure of "design→factory→camera→PC, cloud, and the like".

It is possible to perform intelligent processing as going to the subsequent stage, and it is possible to improve the pixel value correction accuracy and the measurement accuracy of the degree of activity of the plant.

FIGS. 45A, 45B, 45C, and 45D are diagrams illustrating a transfer example of the separation coefficients that are the measurement values of the reference machine X and the adjustment machine Y, the average value or the representative value of each band-corresponding pixel value, and further the metadata that is the data such as the band-corresponding gain of the adjustment machine Y.

FIGS. 45A, 45B, 45C, and 45D are diagrams illustrating an example of four stages of processing below and a flow of data between the stages of processing.

FIG. 45A Design stage processing

FIG. 45B Processing at time of manufacturing camera

FIG. 45C Processing at time of using camera (at time of imaging)

FIG. 45D Processing after camera imaging (camera, PC, cloud server)

In FIG. 45A Design stage processing, for example, reference machine fixed data such as a separation coefficient and a temperature characteristic coefficient are acquired from the reference machine X.

The reference machine fixed data such as the separation coefficient and the temperature characteristic coefficient acquired in the FIG. 45A(a) Design stage processing are used in the next FIG. 45B(b) Processing at time of manufacturing camera.

For example, in FIG. 45B(b) Processing at time of manufacturing camera in a camera factory, acquisition of the band-corresponding pixel values based on the image capturing by the reference machine X and the adjustment machine Y, processing of calculating the average value or the representative value of the band-corresponding pixel values based on the acquired pixel values, and the like are performed. Moreover, temperature measurement at the time of image capturing, and the like are also performed.

These pieces of data are recorded, for example, in the memory (camera storage illustrated in the figure) of the adjustment machine Y.

Note that, in FIG. 45B(b) Processing at time of manufacturing camera in the camera factory, measurement of the reference machine X is performed at the same time as measurement of the adjustment machine Y because the light source does not always keep constant output and spectral characteristics, and thus the measurement of the reference machine X is performed at the same time as the measurement of the adjustment machine Y.

In the next FIG. 45C Processing at time of using camera (at time of imaging), image capturing by the adjustment machine Y is executed.

In the example illustrated in FIGS. 45A, 45B, 45C, and 45D, the processing of calculating the band-corresponding gain applied to the pixel value (output value) of the captured image is executed in the next FIG. 45D Processing after camera imaging (camera, PC, cloud server).

In FIG. 45C Processing at time of using camera (at time of imaging) illustrated in FIGS. 45A, 45B, 45C, and 45D, image capturing by the adjustment machine Y is executed, and data recorded in the memory (camera storage illustrated in the figure) of the adjustment machine Y is recorded as metadata corresponding to the captured image.

For example, the average value or the representative value of the band-corresponding pixel values calculated on the basis of the pixel values of the captured images of the reference machine X and the adjustment machine Y is recorded as the metadata corresponding to the captured images.

Note that the metadata may be recorded in a metadata dedicated recording area different from the image.

The captured image and the metadata corresponding to the captured image are transferred to a device that executes the next FIG. 45D(d) Processing after camera imaging (camera, PC, cloud server), for example, a camera, a PC, a server on a cloud, or the like.

Here, for example, the camera, the PC, or the server on the cloud performs the processing of calculating the band-corresponding gain by using the metadata corresponding to the image, and further performs the processing of calculating the band-corresponding pixel value based on the pixel value of the captured image by applying the calculated band-corresponding gain.

As a program applied to the processing of calculating the band-corresponding pixel value here, various different processing programs can be applied, and processing can be performed to which various programs for calculating a more accurate analysis value, such as applying different programs depending on a situation of the captured image.

12. Configuration Example of Image Processing Device and Image Processing System of Present Disclosure Next, a description will be given of a configuration example of an image processing device and an image processing system of the present disclosure.

Figure 46:
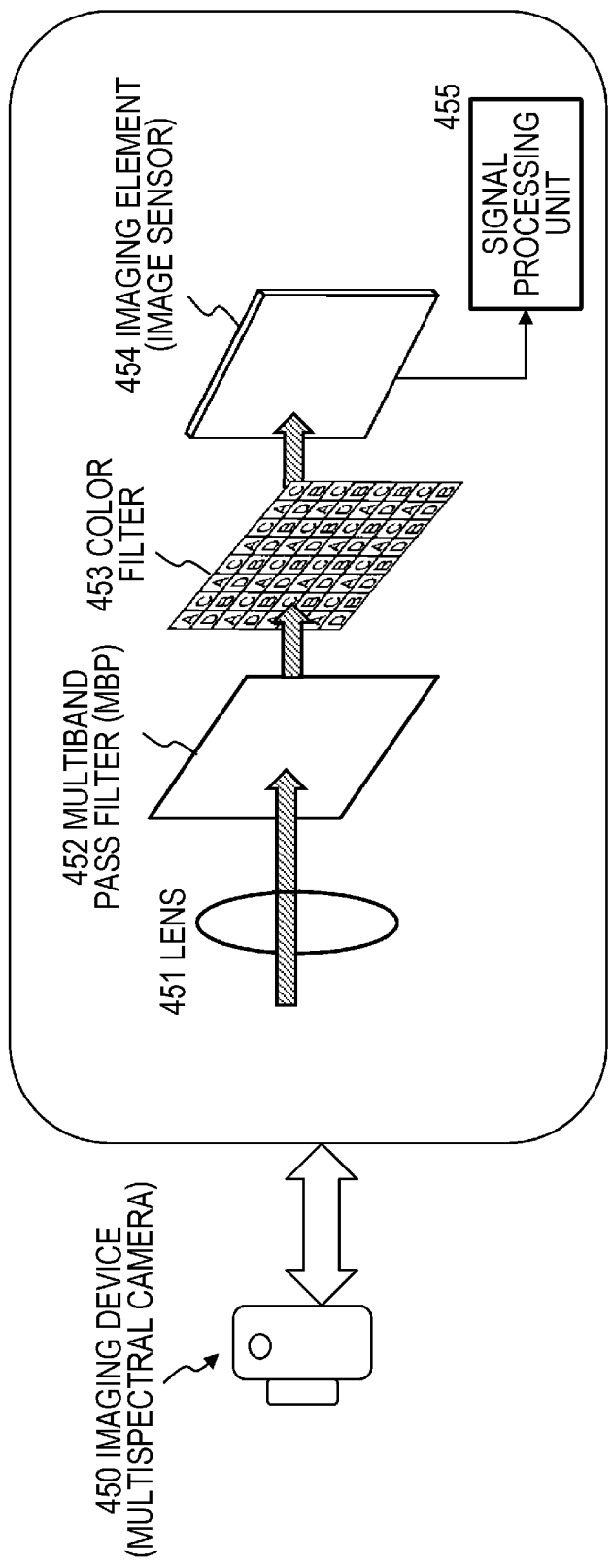
FIG. 46 is a diagram explaining a configuration example of an imaging device (multispectral camera) that is an example of the image processing device of the present disclosure.

The image processing device of the present disclosure is, for example, an imaging device (multispectral camera) 450 having a configuration as illustrated in FIG. 46.

Imaging light of a subject input through a lens 451 of the imaging device (multispectral camera) 450 is input to an imaging element (image sensor) 454 through a multiband pass filter (MBP) 452 and a color filter (RGBIR color filter or the like) 453.

Moreover, a RAW image pixel value (Rraw or the like) of the imaging element (image sensor) 454 is input to a signal processing unit 455, and signal processing is performed.

The signal processing unit 455 calculates a band-corresponding pixel value corresponding to each band (wavelength) by using the RAW image pixel value (Rraw or the like) of the imaging element (image sensor) 454, and further executes calculation of a band-corresponding gain or output value adjustment based on the band-corresponding gain.

Moreover, in the signal processing unit 455 or a subsequent processing unit, processing of generating a high-precision color image with less noise components using band-corresponding high-precision pixel values, processing of analyzing color components of the subject, and the like are executed.

Note that the signal processing unit 455 may be configured to execute data processing by a program (software) or may be configured using hardware such as an FPGA.

Figure 47A:
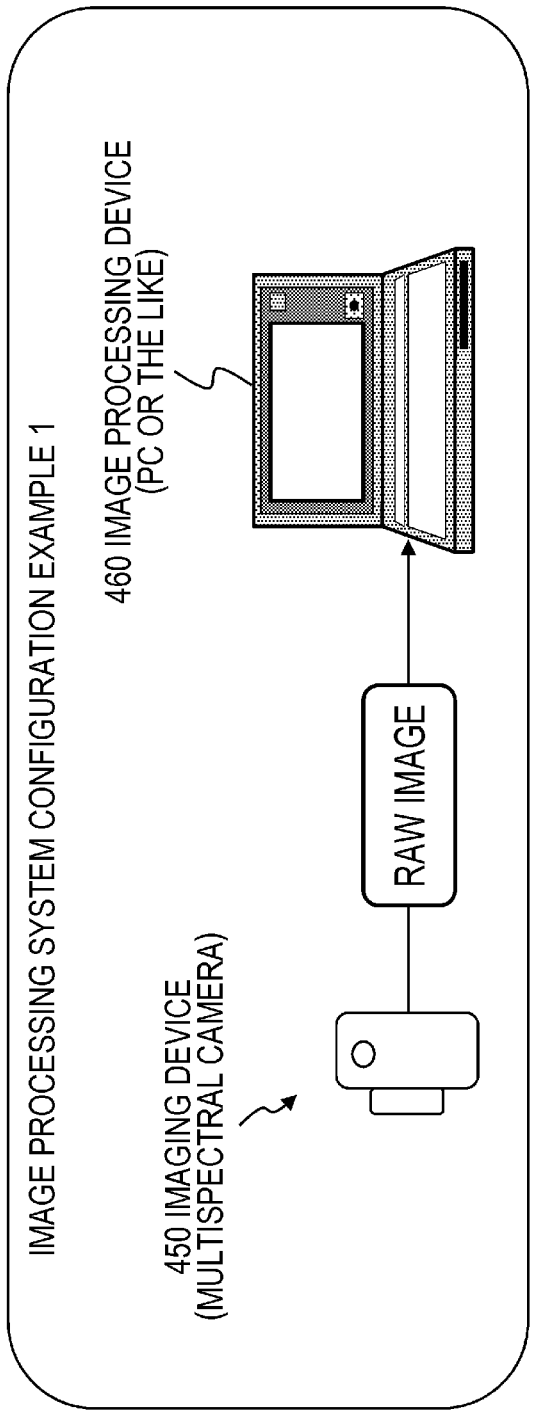
FIGS. 47A and 47B are diagrams illustrating a configuration example of the image processing device and an image processing system of the present disclosure.
Figure 47B:
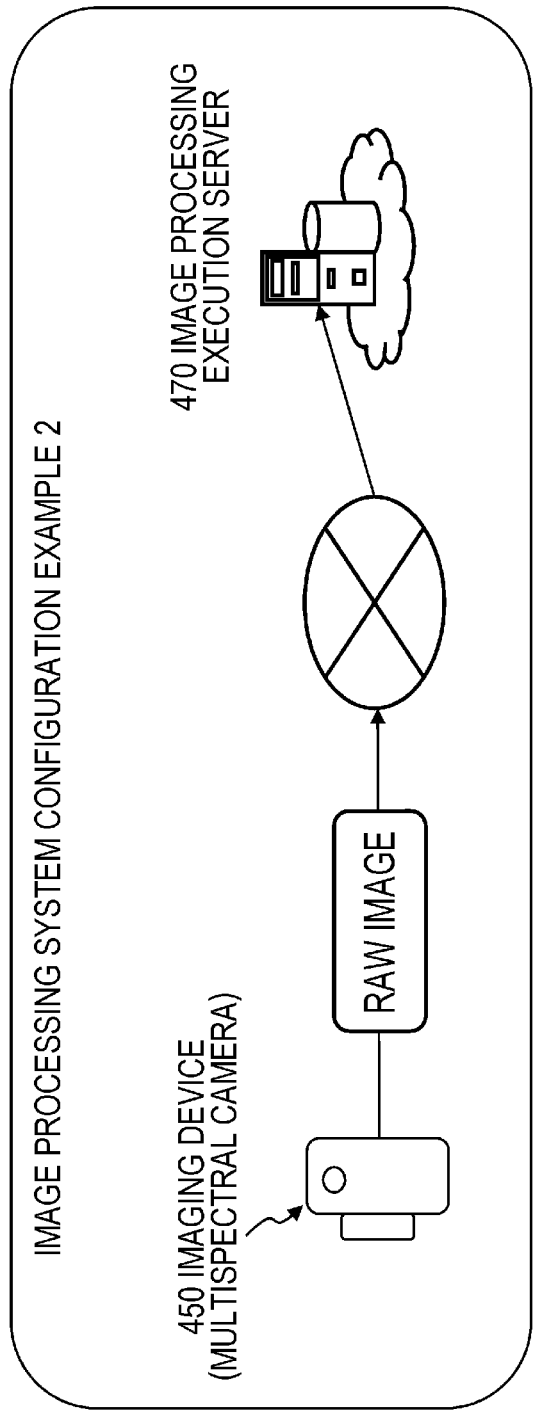

Note that the image processing device of the present disclosure may have not only the configuration of the camera alone as illustrated in FIG. 46, but a configuration using a system illustrated in FIGS. 47A and 47B, for example.

FIG. 47A illustrates a configuration in which a captured image (RAW image) of the multispectral camera 450 is input to an image processing device 460 such as a PC, and data processing is executed by the image processing device 460.

The image processing device 460 such as the PC executes processing of calculating a band-corresponding pixel value corresponding to each band (wavelength), calculation of a band-corresponding gain, or output value adjustment based on the band-corresponding gain, by using a RAW image pixel value (Rraw or the like) input from the multispectral camera 450.

Moreover, as illustrated in FIG. 47B, the system has a configuration in which the captured image (RAW image) of the multispectral camera 450 is input to an image processing execution server 470 via a network, and data processing is executed by the image processing execution server 470.

The image processing execution server 470 executes processing of calculating a band-corresponding pixel value corresponding to each band (wavelength), calculation of a band-corresponding gain, or output value adjustment based on the band-corresponding gain, by using a RAW image pixel value (Rraw or the like) input from the multispectral camera 450.

As described above, the image processing device and the system of the present disclosure can have various configurations.

13. Hardware Configuration Example of Image Processing Device

Next, a hardware configuration example of the image processing device will be described with reference to FIG. 48.

FIG. 48 is a diagram illustrating a hardware configuration example of the image processing device that executes the processing of the present disclosure.

A Central Processing Unit (CPU) 501 functions as a control unit or a data processing unit that executes various types of processing in accordance with a program stored in Read Only Memory (ROM) 502 or a storage unit 508. For example, the processing is executed according to the sequence described in the above-described examples. Random access memory (RAM) 503 stores the program executed by the CPU 501, data, and the like. These CPU 501, ROM 502, and RAM 503 are connected to each other by a bus 504.

The CPU 501 is connected to an input/output interface 505 via the bus 504, and the input/output interface 505 is connected to an input unit 506 inputting a captured image by an imaging unit 521 and including various user-input switches, a keyboard, a mouse, a microphone, and the like, and an output unit 507 that executes data output to a display unit 522, a speaker, and the like. The CPU 501 executes various types of processing in response to commands input from the input unit 506, and outputs processing results to the output unit 507, for example.

The storage unit 508 connected to the input/output interface 505 includes, for example, a hard disk or the like, and stores the program executed by the CPU 501 and various data. A communication unit 509 functions as a transmission/reception unit for Wi-Fi communication, Bluetooth (registered trademark) (BT) communication, and other data communication via a network such as the Internet and a local area network, and communicates with an external device.

A drive 510 connected to the input/output interface 505 drives a removable medium 511 such as a magnetic disk, an optical disk, a magneto-optical disk, or a semiconductor memory such as a memory card, and executes data recording or reading.

14. Summary of Configuration of Present Disclosure

In the above, the examples of the present disclosure have been described in detail with reference to specific examples. However, it is self-evident that those skilled in the art can make modifications and substitutions of the examples without departing from the gist of the present disclosure. In other words, the present invention has been disclosed in the form of exemplification, and should not be interpreted restrictively. To determine the gist of the present disclosure, the scope of claims should be taken into consideration.

Note that, the technology disclosed in this specification can have the following configuration.

(1) An image processing device including
a signal processing unit that calculates a gain or gain calculation parameters for matching an output of an adjustment camera that is a multispectral camera with an output of a reference camera, in which
the signal processing unit calculates a band-corresponding gain or band-corresponding gain calculation parameters that match the output of the adjustment camera with the output of the reference camera, on the basis of:
a reference machine band-corresponding pixel value that is a pixel value within a specific band acquired on the basis of an output value of an imaging element of the reference camera; and
an adjustment machine band-corresponding pixel value that is a pixel value within a specific band acquired on the basis of an output value of an imaging element of the adjustment camera.

(2) The image processing device according to (1), in which
the signal processing unit includes:
a reference machine band-corresponding pixel value average value calculation unit that calculates an average value of band-corresponding pixel values that are pixel values within a specific band on the basis of the output value of the imaging element of the reference camera; and
an adjustment machine band-corresponding pixel value average value calculation unit that calculates an average value of band-corresponding pixel values on the basis of the output value of the imaging element of the adjustment camera, and
calculates a reference machine band-corresponding pixel value average value and an adjustment machine band-corresponding pixel value average value calculated, as the band-corresponding gain calculation parameters, and stores the band-corresponding gain calculation parameters in a memory of the adjustment camera.

(3) The image processing device according to (1) or (2), in which
the signal processing unit calculates
a reference machine band-corresponding pixel value representative value calculated on the basis of the output value of the imaging element of the reference camera, and
an adjustment machine band-corresponding pixel value representative value calculated on the basis of the output value of the imaging element of the adjustment camera, as the band-corresponding gain calculation parameters, and stores the band-corresponding gain calculation parameters in a memory of the adjustment camera.

(4) The image processing device according to any of (1) to (3), in which
the signal processing unit includes:
a reference machine band-corresponding pixel value calculation unit that calculates a band-corresponding pixel value that is a pixel value within a specific band on the basis of the output value of the imaging element of the reference camera;

an adjustment machine band-corresponding pixel value calculation unit that calculates a band-corresponding pixel value on the basis of the output value of the imaging element of the adjustment camera; and a band-corresponding gain calculation unit that calculates the band-corresponding gain that matches the output of the adjustment camera with the output of the reference camera, on a basis of a result of comparison between the reference machine band-corresponding pixel value calculated by the reference machine band-corresponding pixel value calculation unit and the adjustment machine band-corresponding pixel value calculated by the adjustment machine band-corresponding pixel value calculation unit.

(5) The image processing device according to any of (1) to (4), in which the reference camera and the adjustment camera each are a multispectral camera including:

a multiband pass filter that selectively transmits band light of a specific band;

a color filter that transmits band light of a specific band in units of pixels of the imaging element; and the imaging element that receives light transmitted through the multiband pass filter and the color filter.

(6) The image processing device according to any of (1) to (5), in which the signal processing unit calculates a band-corresponding pixel value by using a RAW image-based pixel value signal in units of pixels based on an imaging element output value of a band-corresponding pixel value calculation target camera, and a spectral characteristic parameter of the band-corresponding pixel value calculation target camera.

(7) The image processing device according to (6), in which the signal processing unit executes iterative calculation of a band-corresponding pixel value calculation formula using the RAW image-based pixel value signal in units of pixels based on the imaging element output value of the band-corresponding pixel value calculation target camera, and the spectral characteristic parameter of the band-corresponding pixel value calculation target camera, to calculate a convergence value by the iterative calculation as the band-corresponding pixel value.

(8) The image processing device according to (7), in which the spectral characteristic parameter is an intensity ratio in a specific band of light transmitted through a plurality of different color filters constituting the color filter.

(9) The image processing device according to (8), in which the specific band is a transmitted light band of a multiband pass filter mounted on the reference camera and the adjustment camera.

(10) The image processing device according to any of (1) to (9), in which the signal processing unit includes:

a reference machine temperature characteristic compensation unit that executes temperature characteristic compensation processing on the reference machine band-corresponding pixel value; and an adjustment machine temperature characteristic compensation unit that executes temperature characteristic compensation processing on the adjustment machine band-corresponding pixel value, and calculates the band-corresponding gain or the band-corresponding gain calculation parameters by using the reference machine band-corresponding pixel value after temperature characteristic compensation generated by the reference machine temperature characteristic compensation unit and the adjustment machine band-corresponding pixel value after temperature characteristic compensation generated by the adjustment machine temperature characteristic compensation unit.

(11) The image processing device according to any of (1) to (10), in which the signal processing unit sets pixel values acquired by imaging output light of a special light source that outputs light within a specific band by the reference camera and the adjustment camera as the reference machine band-corresponding pixel value and the adjustment machine band-corresponding pixel value as they are.

(12) An image processing device including:

a multiband pass filter that selectively transmits band light of a specific band;

a color filter that transmits band light of a specific band in units of pixels of an imaging element;

an imaging element that receives light transmitted through the multiband pass filter and the color filter; and a signal processing unit that executes signal processing on an output of the imaging element, in which the signal processing unit acquires band-corresponding gain calculation parameters for calculating a band-corresponding gain that is a gain in units of specific bands from a memory, and calculates the band-corresponding gain on the basis of the band-corresponding gain calculation parameters acquired, and multiplies the output of the imaging element by the band-corresponding gain calculated, to execute output value adjustment processing that matches the output of the imaging element with an output of a reference machine.

(13) The image processing device according to (12), in which the band-corresponding gain calculation parameters stored in the memory include an average value or a representative value of reference machine band-corresponding pixel values that are pixel values within a specific band acquired on the basis of an output value of an imaging element of a reference camera; and an average value or a representative value of adjustment machine band-corresponding pixel values that are pixel values within a specific band acquired on the basis of an output value of an imaging element of an adjustment camera corresponding to the image processing device.

(14) The image processing device according to (12) or (13), in which the image processing device includes a band-corresponding pixel value calculation unit that calculates a band-corresponding pixel value on the basis of an output value of the imaging element, and the signal processing unit multiplies the band-corresponding pixel value calculated by the band-corresponding pixel value calculation unit by the band-corresponding gain calculated on the basis of the band-corresponding gain calculation parameters acquired from the memory, to execute the output value adjustment processing.

(15) The image processing device according to any of (12) to (14), in which the image processing device includes:

a band-corresponding pixel value calculation unit that calculates a band-corresponding pixel value on the basis of an output value of the imaging element; and a temperature characteristic compensation unit that executes temperature characteristic compensation processing on the band-corresponding pixel value calculated by the band-corresponding pixel value calculation unit, and the signal processing unit multiplies the band-corresponding pixel value after temperature characteristic compensation generated by the temperature characteristic compensation unit by the band-corresponding gain calculated on the basis of the band-corresponding gain calculation parameters acquired from the memory, to execute the output value adjustment processing.

(16) An image processing device including:

a multiband pass filter that selectively transmits band light of a specific band;

a color filter that transmits band light of a specific band in units of pixels of an imaging element;

an imaging element that receives light transmitted through the multiband pass filter and the color filter; and a signal processing unit that executes signal processing on an output of the imaging element, in which the signal processing unit acquires a band-corresponding gain that is a gain in units of specific bands from a memory, and multiplies the output of the imaging element by the band-corresponding gain acquired, to execute output value adjustment processing that matches the output of the imaging element with an output of a reference machine.

(17) An image processing method executed in an image processing device, in which the image processing device includes a signal processing unit that calculates a gain for matching an output of an adjustment camera that is a multispectral camera with an output of a reference camera, and the signal processing unit calculates a band-corresponding gain or band-corresponding gain calculation parameters that match the output of the adjustment camera with the output of the reference camera, on the basis of:

a reference machine band-corresponding pixel value that is a pixel value within a specific band acquired on the basis of an output value of an imaging element of the reference camera; and an adjustment machine band-corresponding pixel value that is a pixel value within a specific band acquired on the basis of an output value of an imaging element of the adjustment camera.

(18) An image processing method executed in an image processing device, in which the image processing device includes:

a multiband pass filter that selectively transmits band light of a specific band;

a color filter that transmits band light of a specific band in units of pixels of an imaging element;

an imaging element that receives light transmitted through the multiband pass filter and the color filter; and a signal processing unit that executes signal processing on an output of the imaging element, and the signal processing unit acquires band-corresponding gain calculation parameters for calculating a band-corresponding gain that is a gain in units of specific bands from a memory, and calculates the band-corresponding gain on the basis of the band-corresponding gain calculation parameters acquired, and multiplies the output of the imaging element by the band-corresponding gain calculated, to execute output value adjustment processing that matches the output of the imaging element with an output of a reference machine.

(19) A program for causing an image processing device to execute image processing, in which the image processing device includes a signal processing unit that calculates a gain for matching an output of an adjustment camera that is a multispectral camera with an output of a reference camera, and the program causes the signal processing unit to calculate a band-corresponding gain or band-corresponding gain calculation parameters that match the output of the adjustment camera with the output of the reference camera, on the basis of:

a reference machine band-corresponding pixel value that is a pixel value within a specific band acquired on the basis of an output value of an imaging element of the reference camera; and an adjustment machine band-corresponding pixel value that is a pixel value within a specific band acquired on the basis of an output value of an imaging element of the adjustment camera.

(20) A program for causing an image processing device to execute image processing, in which the image processing device includes:

a multiband pass filter that selectively transmits band light of a specific band;

a color filter that transmits band light of a specific band in units of pixels of an imaging element;

an imaging element that receives light transmitted through the multiband pass filter and the color filter; and a signal processing unit that executes signal processing on an output of the imaging element, and the program causes the processing unit to acquire band-corresponding gain calculation parameters for calculating a band-corresponding gain that is a gain in units of specific bands from a memory, and calculate the band-corresponding gain on the basis of the band-corresponding gain calculation parameters acquired, and multiply the output of the imaging element by the band-corresponding gain calculated, to execute output value adjustment processing that matches the output of the imaging element with an output of a reference machine.

Furthermore, the series of processing steps described in the specification can be executed by hardware, software, or a combination of both. In the case of executing processing by software, it is possible to install and execute a program recording the processing sequence in a memory in a computer incorporated in dedicated hardware, or to install and execute the program in a general-purpose computer capable of executing various types of processing. For example, the program can be recorded in a recording medium in advance. In addition to installing from the recording medium to the computer, the program can be received via a network such as a local area network (LAN) or the Internet, and installed in the recording medium such as a built-in hard disk.

Note that, the various types of processing described in the specification are not only executed in chronological order in accordance with the description but also may be executed in parallel or individually depending on the processing capability of the device that executes the processing or depending on necessity. Furthermore, in this specification, the term "system" is a logical group configuration of a plurality of devices, and is not limited to the one in which the devices of each configuration are in the same housing.

INDUSTRIAL APPLICABILITY

As described above, according to a configuration of an example of the present disclosure, a device and a method are implemented that execute gain calculation processing and gain adjustment processing for matching the output of the imaging element of the multispectral camera with the output of the reference machine.

Specifically, for example, as the gain calculation processing for matching the output of the adjustment camera with the output of the reference camera at the time of manufacturing the multispectral camera, the band-corresponding gain is calculated that matches the output of the adjustment camera with the output of the reference camera, on the basis of: the reference machine band-corresponding pixel value that is the pixel value within the specific band acquired on the basis of the output value of the imaging element of the reference camera; and the adjustment machine band-corresponding pixel value that is the pixel value within the specific band acquired on the basis of the output value of the imaging element of the adjustment camera. Furthermore, at the time of using the camera, the output value adjustment processing that matches the output of the imaging element with the output of the reference machine is executed, by acquiring the band-corresponding gain from the memory, and multiplying the output of the imaging element by the acquired band-corresponding gain.

With these configurations, the device and the method are implemented that execute the gain calculation processing and the gain adjustment processing for matching the output of the imaging element of the multispectral camera with the output of the reference machine.

REFERENCE SIGNS LIST

10 Multispectral camera
11 Lens
12 Dual bandpass filter
13 Color filter
14 Imaging element (image sensor)
21 Reference camera X (reference machine)
22 Adjustment camera Y (adjustment machine)
31 Each-color-corresponding gain calculation unit
33 Each-color-corresponding gain adjustment unit
34 Image processing unit
50 Reference camera X (reference machine)
60 Adjustment camera Y (adjustment machine)
71 Reference machine band-corresponding pixel value calculation unit
72 Adjustment machine band-corresponding pixel value calculation unit
73 Band-corresponding gain calculation unit
81 Adjustment machine band-corresponding pixel value calculation unit
82 Band-corresponding gain adjustment unit
83 Image processing unit
100 Multispectral camera
101 Lens
102 Multiband pass filter
103 Color filter
104 Imaging element (image sensor)
105 Signal processing unit
200 Special light source (pattern box)
201 Halogen light source
202 diffusion plate
203 Filter
300 Multispectral camera
301 Lens
302 Multiband pass filter
303 Color filter
304 Imaging element (image sensor)
321 Reference machine temperature characteristic compensation unit
322 Adjustment machine temperature characteristic compensation unit
331, 332 Spectral characteristic parameter (separation coefficient) calculation unit
400 Special light source (pattern box)
401 Halogen light source
402 diffusion plate
403 Filter
420 Special light source (pattern box)
421 Halogen light source
422 diffusion plate
423 Filter
430 Multispectral camera
431 Lens
432 Multiband pass filter
433 Color filter
434 Imaging element (image sensor)
435 Signal processing unit
440 Special light source (pattern box)
441 Halogen light source
442 diffusion plate
443 Filter
450 Imaging device (multispectral camera)
451 Lens
452 Multiband pass filter
453 Color filter
454 Imaging element (image sensor)
455 Signal processing unit
460 Image processing device
470 Image processing execution server
501 CPU
502 ROM
503 RAM
504 Bus
505 Input/output interface
506 Input unit
507 Output unit
508 Storage unit
509 Communication unit
510 Drive
511 Removable medium
521 imaging unit
522 Display unit

The invention claimed is:
1. An image processing device, comprising:
a central processing unit (CPU) configured to calculate one of a band-corresponding gain or band-corresponding gain calculation parameters to match a first output value of a reference camera with a second output value of an adjustment camera that is a first multispectral camera, based on:
a reference machine band-corresponding pixel value that is a first pixel value within a specific band, wherein
the first pixel value is acquired based on the first output value of a first imaging element of the reference camera; and
an adjustment machine band-corresponding pixel value that is a second pixel value within the specific band, wherein
the second pixel value is acquired based on the second output value of a second imaging element of the adjustment camera.

2. The image processing device according to claim 1, wherein the CPU is further configured to:
calculate a first average value of band-corresponding pixel values that are first pixel values within the specific band based on the first output value of the first imaging element of the reference camera, wherein the first pixel values include the first pixel value;
calculate a second average value of band-corresponding pixel values that are second pixel values within the specific band based on the second output value of the second imaging element of the adjustment camera, wherein the second pixel values include the second pixel value; and
store the first average value of band-corresponding pixel values and the second average value of band-corresponding pixel values as the band-corresponding gain calculation parameters in a memory of the adjustment camera.

3. The image processing device according to claim 1, wherein
the CPU is further configured to:
calculate signal proce-sing unit calculates a reference machine band-corresponding pixel value representative value calculated based on the first output value of the first imaging element of the reference camera;
calculate an adjustment machine band-corresponding pixel value representative value based calculated on the second output value of the second imaging element of the adjustment camera; and
store the reference machine band-corresponding pixel value representative value and the adjustment machine band-corresponding pixel value representative value as the stores the band-corresponding gain calculation parameters in a memory of the adjustment camera.

4. The image processing device according to claim 1, wherein the CPU is further configured to calculate the band-corresponding gain based on a result of comparison between the reference machine band-corresponding pixel value and the adjustment machine band-corresponding pixel value.

5. The image processing device according to claim 1, wherein
the reference camera is a second multispectral camera, and
the adjustment camera includes:
a multiband pass filter configured to selectively transmit band light of the specific band;
a color filter configured to transmit the band light of the specific band in units of pixels of the second imaging element; and
the second imaging element configured to receive the band light transmitted through the multiband pass filter and the color filter.

6. The image processing device according to claim 1, wherein the CPU is further configured to calculate a band-corresponding pixel value by using a RAW image-based pixel value signal in units of pixels based on a third imaging element output value of a band-corresponding pixel value calculation target camera and a spectral characteristic parameter of the band-corresponding pixel value calculation target camera.

7. The image processing device according to claim 6, wherein the CPU is further configured to execute iterative calculation of a band-corresponding pixel value calculation formula using the RAW image-based pixel value signal in the units of pixels based on the third imaging element output value of the band-corresponding pixel value calculation target camera and the spectral characteristic parameter of the band-corresponding pixel value calculation target camera, to calculate a convergence value by the iterative calculation as the band-corresponding pixel value.

8. The image processing device according to claim 7, wherein the spectral characteristic parameter is an intensity ratio in the specific band of light transmitted through a plurality of different color filters.

9. The image processing device according to claim 8, wherein the specific band is a transmitted light band of a multiband pass filter mounted on the adjustment camera.

10. The image processing device according to claim 1, wherein
the CPU is further configured to:
execute a first temperature characteristic compensation processing on the reference machine band-corresponding pixel value;
execute a second temperature characteristic compensation processing on the adjustment machine band-corresponding pixel value; and
calculate the band-corresponding gain or the band-corresponding gain calculation parameters by using the reference machine band-corresponding pixel value after the first temperature characteristic compensation processing and the adjustment machine band-corresponding pixel value after the second temperature characteristic compensation processing.

11. The image processing device according to claim 1, wherein
the CPU is further configured to set pixel values acquired by imaging output light of a special light source that outputs light within the specific band by the reference camera and the adjustment camera as the reference machine band-corresponding pixel value and the adjustment machine band-corresponding pixel value, and
the pixel values include the first pixel value and the second pixel value.

12. An image processing device, comprising:
a multiband pass filter configured to selectively transmit band light of a specific band;
a color filter configured to transmit the band light of the specific band in units of pixels of a first imaging element;
the first imaging element configured to receive the band light transmitted through the multiband pass filter and the color filter; and
a central processing unit (CPU) configured to:
execute signal processing on a first output value of the first imaging element;

acquire band-corresponding gain calculation parameters from a memory;
calculate a band-corresponding gain based on the acquired band-corresponding gain calculation parameters, wherein
the band-corresponding gain is a gain in units of specific bands, and
the units of specific bands include the specific band; and
multiply the first output value of the first imaging element by the calculated band-corresponding gain, to execute output value adjustment processing that matches the first output value of the first imaging element with a second output value of a second imaging element of a reference camera.

13. The image processing device according to claim 12, wherein
the band-corresponding gain calculation parameters stored in the memory include:
a first average value or a first representative value of reference machine band-corresponding pixel values that are first pixel values within the specific band, wherein the first pixel values are acquired based on the second output value of the second imaging element of the reference camera; and
a second average value or a second representative value of adjustment machine band-corresponding pixel values that are second pixel values within the specific band, wherein the second pixel values are acquired based on the first output value of the first imaging element of an adjustment camera corresponding to the image processing device.

14. The image processing device according to claim 12, wherein
the CPU is further configured to:
calculate a band-corresponding pixel value based on the first output value of the first imaging element; and
multiply the calculated band-corresponding pixel value by the calculated band-corresponding gain, to execute the output value adjustment processing.

15. The image processing device according to claim 12, wherein
the CPU is further configured to:
calculate a band-corresponding pixel value based on the first output value of the first imaging element;
execute a temperature characteristic compensation processing on the calculated band-corresponding pixel value; and
multiply the band-corresponding pixel value after the temperature characteristic compensation processing by the calculated band-corresponding gain, to execute the output value adjustment processing.

16. An image processing device, comprising:
a multiband pass filter configured to selectively transmit band light of a specific band;
a color filter configured to transmit the band light of the specific band in units of pixels of a first imaging element;
the first imaging element configured to receive the band light transmitted through the multiband pass filter and the color filter; and
a central processing unit (CPU) configured to:
execute signal processing on a first output value of the first imaging element;
acquire a band-corresponding gain that is a gain in units of specific bands from a memory, wherein the units of specific bands include the specific band; and
multiply the first output value of the first imaging element by the acquired band-corresponding gain, to execute output value adjustment processing that matches the first output value of the first imaging element with a second output value of a second imaging element of a reference camera.

17. An image processing method, comprising:
in an image processing device:
calculating one of a band-corresponding gain or band-corresponding gain calculation parameters to match a first output value of a reference camera with a second output value of an adjustment camera that is a first multispectral camera, based on:
a reference machine band-corresponding pixel value that is a first pixel value within a specific band, wherein
the first pixel value is acquired based on the first output value of a first imaging element of the reference camera; and
an adjustment machine band-corresponding pixel value that is a second pixel value within the specific band, wherein
the second pixel value is acquired based on the second output value of a second imaging element of the adjustment camera.

18. An image processing method, comprising:
in an image processing device, wherein the image processing device includes: a multiband pass filter, a color filter, an imaging element, and a signal processing unit:
selectively transmitting, by the multiband pass filter, band light of a specific band;
transmitting, by the color filter, the band light of the specific band in units of pixels of a first imaging element;
receiving, by the imaging element, the transmitted band light transmitted through the multiband pass filter and the color filter;
executing, by the signal processing unit, signal processing on a first output value of the first imaging element;
acquiring, by the signal processing unit, band-corresponding gain calculation parameters from a memory;
calculating, by the signal processing unit, a band-corresponding gain based on the acquired band-corresponding gain calculation parameters, wherein
the band-corresponding gain is a gain in units of specific bands, and
the units of specific bands include the specific band; and
multiplying, by the signal processing unit, the first output value of the first imaging element by the calculated band-corresponding gain, to execute output value adjustment processing that matches the first output value of the first imaging element with a second output value of a second imaging element of a reference camera.

19. A non-transitory computer-readable medium having stored thereon, computer-executable instructions which, when executed by a processor, cause the processor to execute operations, the operations comprising:
calculating one of a band-corresponding gain or band-corresponding gain calculation parameters to match a first output value of a reference camera with a second output value of an adjustment camera that is a first multispectral camera, based on:
- a reference machine band-corresponding pixel value that is a first pixel value within a specific band, wherein
  - the first pixel value is acquired based on the first output value of a first imaging element of the reference camera; and
- an adjustment machine band-corresponding pixel value that is a second pixel value within the specific band, wherein
  - the second pixel value is acquired based on the second output value of a second imaging element of the adjustment camera.

20. A non-transitory computer-readable medium having stored thereon, computer-executable instructions which, when executed by a processor of an image processing device including a multiband pass filter, a color filter, an imaging element, and a signal processing unit, cause the processor to execute operations, the operations comprising:

selectively transmitting, by the multiband pass filter, band light of a specific band;

transmitting, by the color filter, the band light of the specific band in units of pixels of a first imaging element;

receiving, by the imaging element, the transmitted band light;

executing, by the signal processing unit, signal processing on a first output value of the first imaging element;

acquiring, by the signal processing unit, band-corresponding gain calculation parameters from a memory;

calculating, by the signal processing unit, a band-corresponding gain based on the acquired band-corresponding gain calculation parameters, wherein
  the band-corresponding gain is a gain in units of specific bands, and
  the units of specific bands include the specific band; and multiplying, by the signal processing unit, the first output value of the first imaging element by the calculated band-corresponding gain, to execute output value adjustment processing that matches the first output value of the first imaging element with a second output value of a second imaging element of a reference camera.

* * * * *